United States Patent [19]

Cashel et al.

[11] 4,125,894
[45] Nov. 14, 1978

[54] ENGINE TEST AND DISPLAY APPARATUS

[75] Inventors: Aloysius T. Cashel, Mt. Prospect; Frank Perna, Barrington; Gerald C. Trussell, Park Ridge; Alfred C. D'Souza, Chicago; Richard A. Karlin, Chicago; James R. Caruth, Chicago; Gary L. Van Ermen, Rolling Meadows; Robert W. Arnston, Schaumburg; Gary F. Comiskey, Evanston; Frederick R. Borgens, Crystal Lake; Keith A. Kreft, Mt. Prospect; Arthur Damm, Franklin Park, all of Ill.; Dennis C. Sienaski, Saint Ann, Mo.; Robert C. Shepardson, Cupertino, Calif.; Yam C. Leung, Bloomingdale; Thomas M. Jankowski, Cary, both of Ill.

[73] Assignee: Sun Electric Corporation, Chicago, Ill.

[21] Appl. No.: 798,181

[22] Filed: May 18, 1977

Related U.S. Application Data

[63] Continuation of Ser. No. 641,362, Dec. 16, 1975, abandoned.

[51] Int. Cl.² ........................ G06F 15/50; F02P 5/04
[52] U.S. Cl. ................................. 364/442; 73/117.2; 324/16 R; 364/424
[58] Field of Search ............... 364/424, 425, 442, 551; 73/112, 116, 117.2, 117.3, 118; 123/32 EA; 340/146.2; 324/15, 16 R, 16 S

[56] References Cited

U.S. PATENT DOCUMENTS

| | | | |
|---|---|---|---|
| 3,485,093 | 12/1969 | Muller et al. | 73/116 |
| 3,763,420 | 10/1973 | Maisonville | 324/16 R |
| 3,768,004 | 10/1973 | Abnett et al. | 324/16 R |
| 3,864,964 | 2/1975 | Voelz | 73/116 |
| 3,919,466 | 11/1975 | Howyler et al. | 73/116 |
| 3,942,365 | 3/1976 | Hanson et al. | 73/116 |
| 3,969,614 | 7/1976 | Moyer et al. | 123/32 EA |
| 3,972,230 | 8/1976 | Hanson et al. | 73/116 |

Primary Examiner—Malcolm A. Morrison
Assistant Examiner—Errol A. Krass
Attorney, Agent, or Firm—Allegretti, Newitt, Witcoff & McAndrews

[57] ABSTRACT

The disclosure describes an improved automated engine diagnosing device employing a digital data processor computer and a cathode ray tube display monitor which displays engine parameter (i.e., condition) values in alphabetic, numeric, and graphical form. Some data is accumulated from the engine by means of direct digital measurements, whereas other data is obtained from the engine by an analog-to-digital converter. The data is then processed by the computer and displayed on the cathode ray tube display monitor.

128 Claims, 91 Drawing Figures

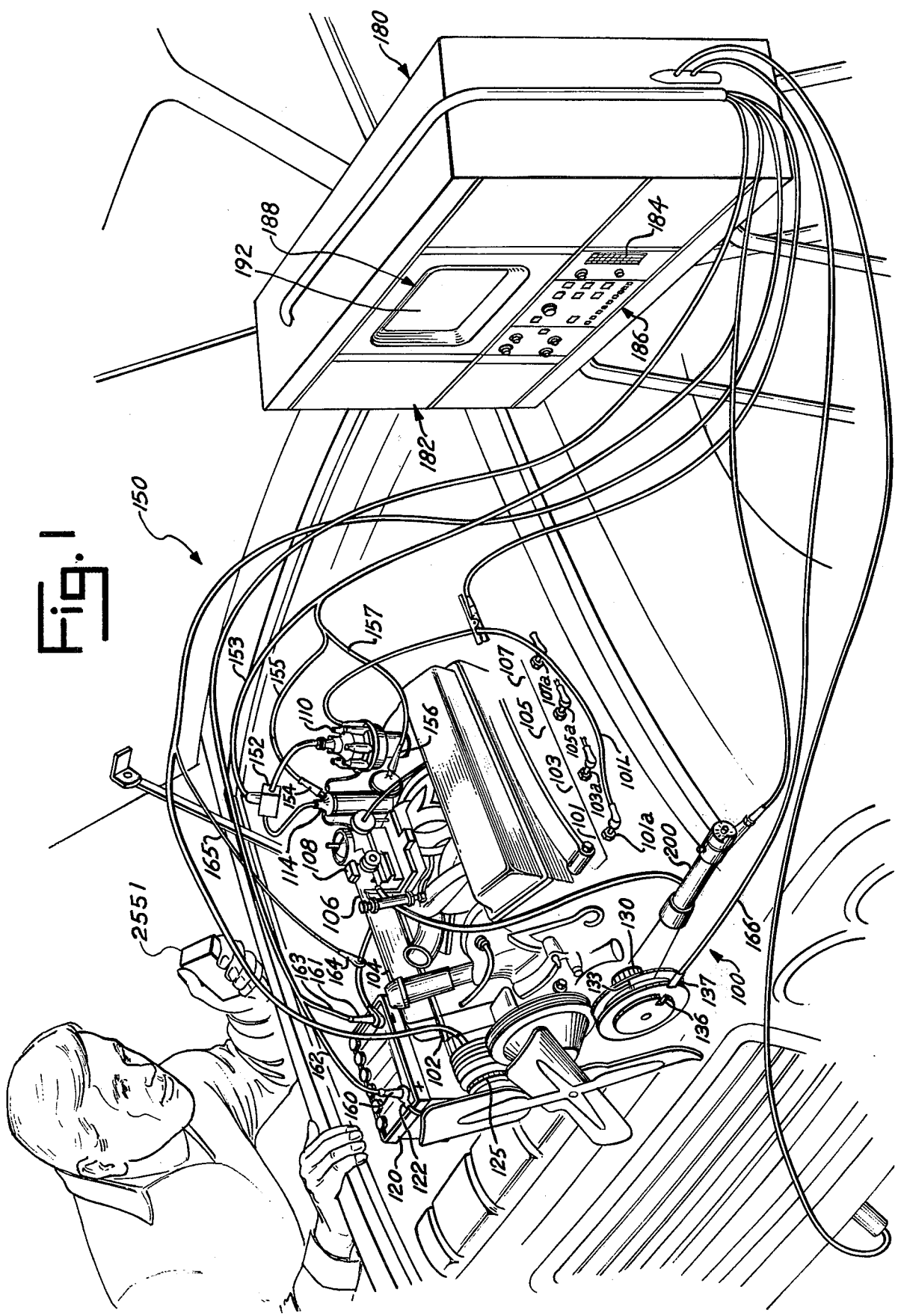

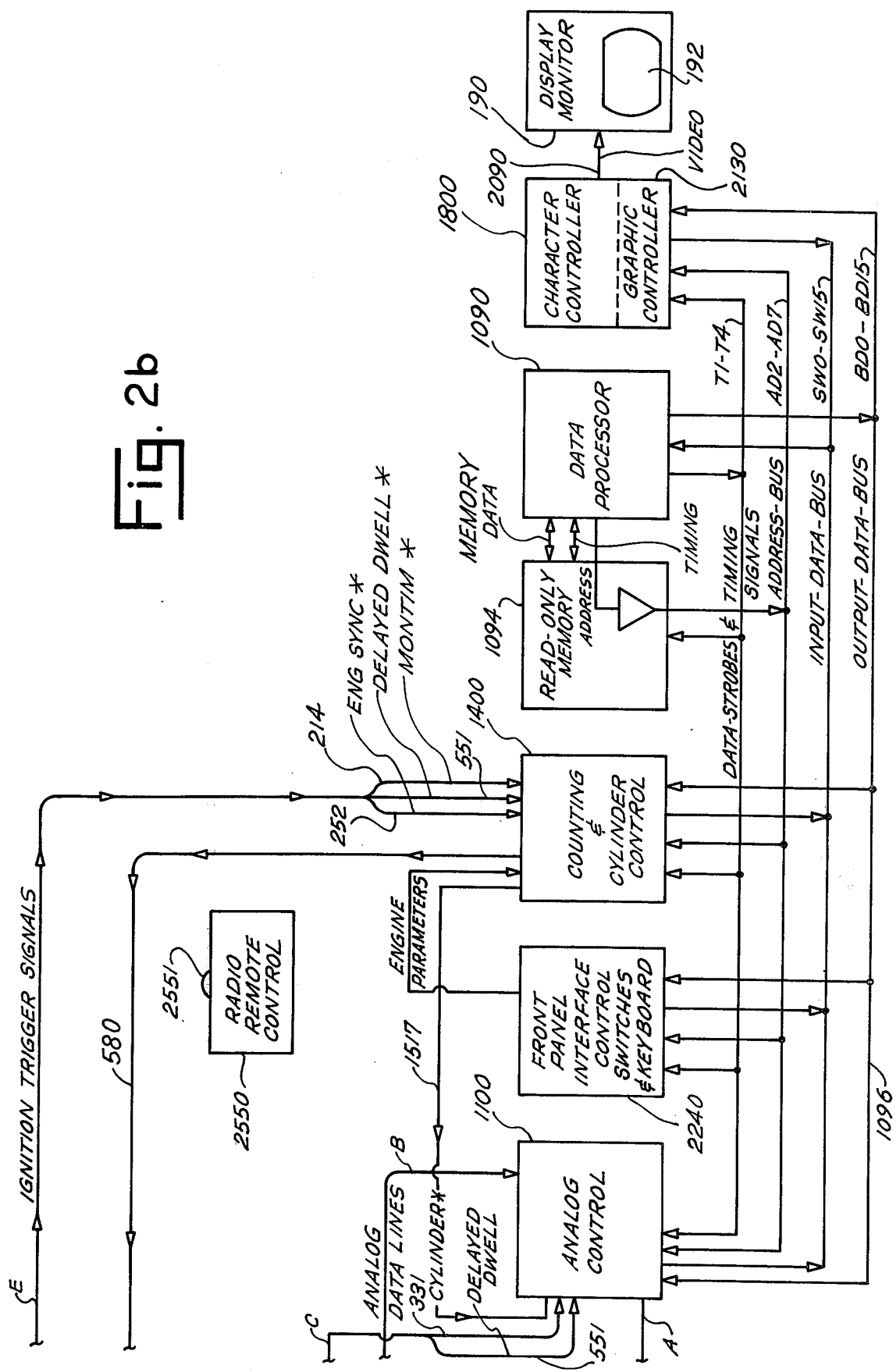

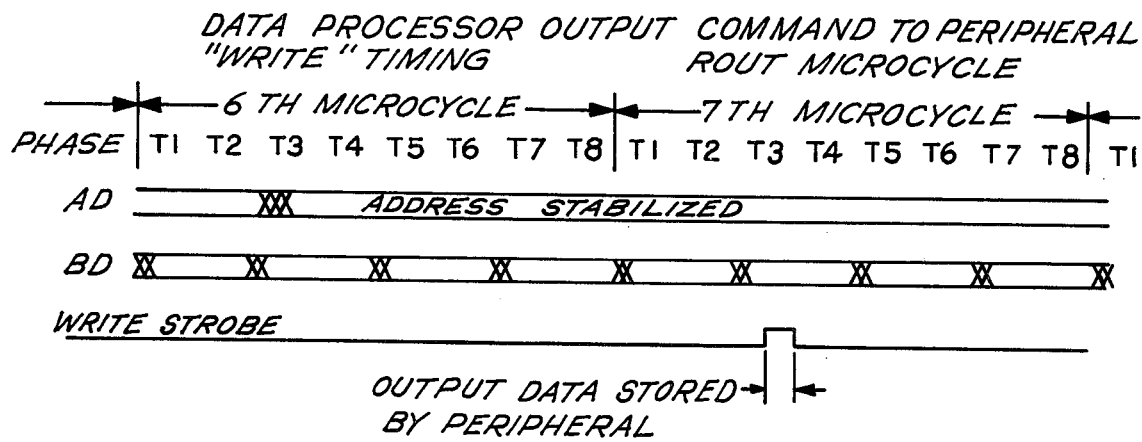
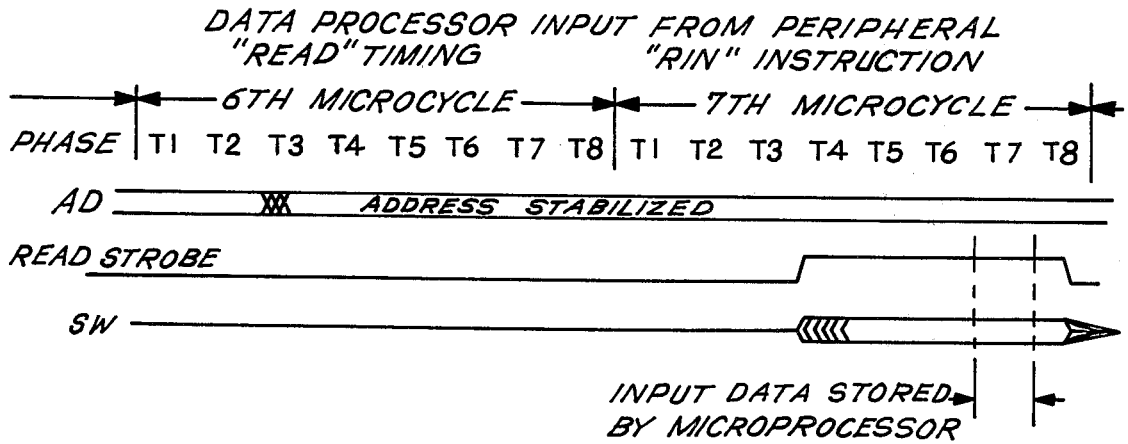

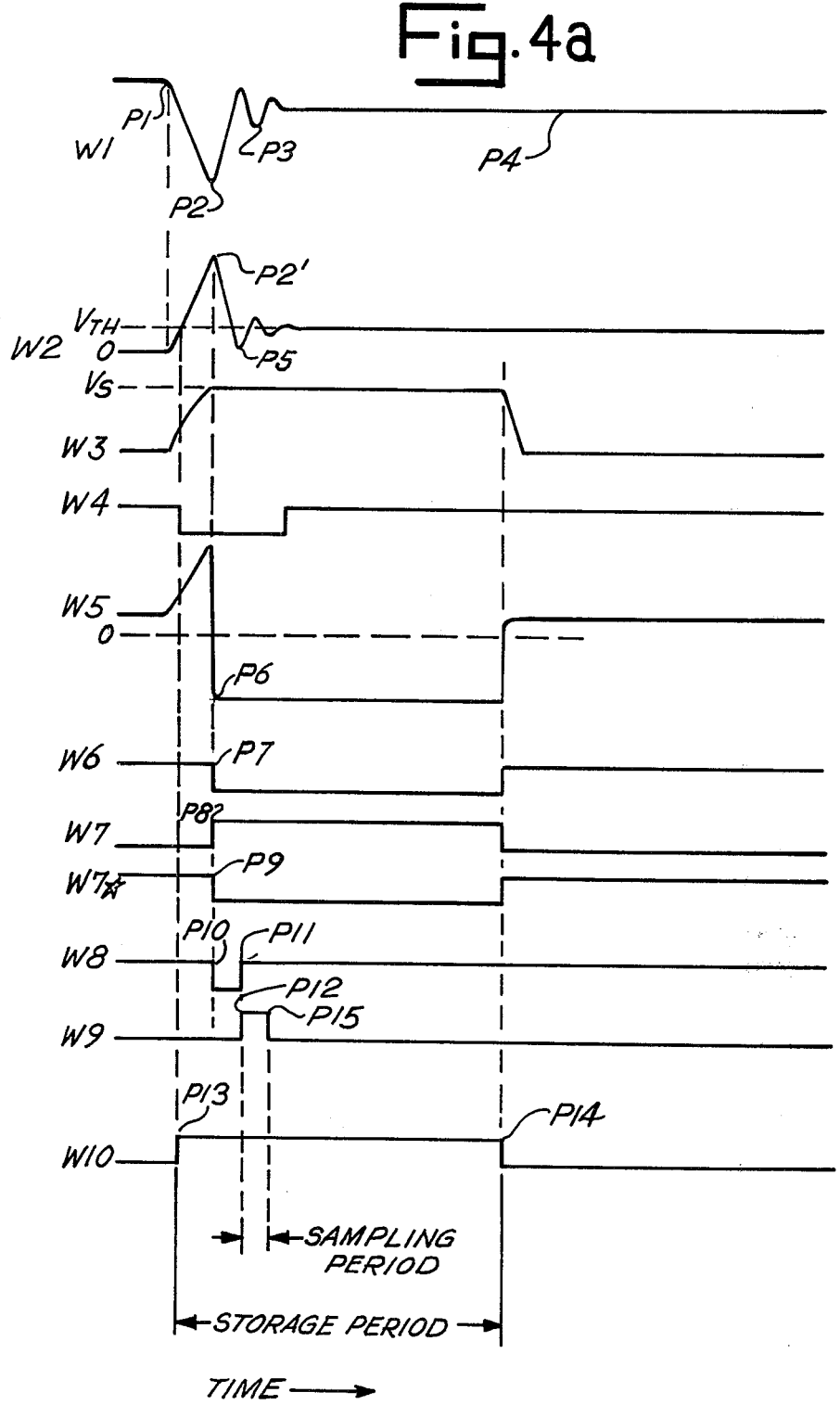

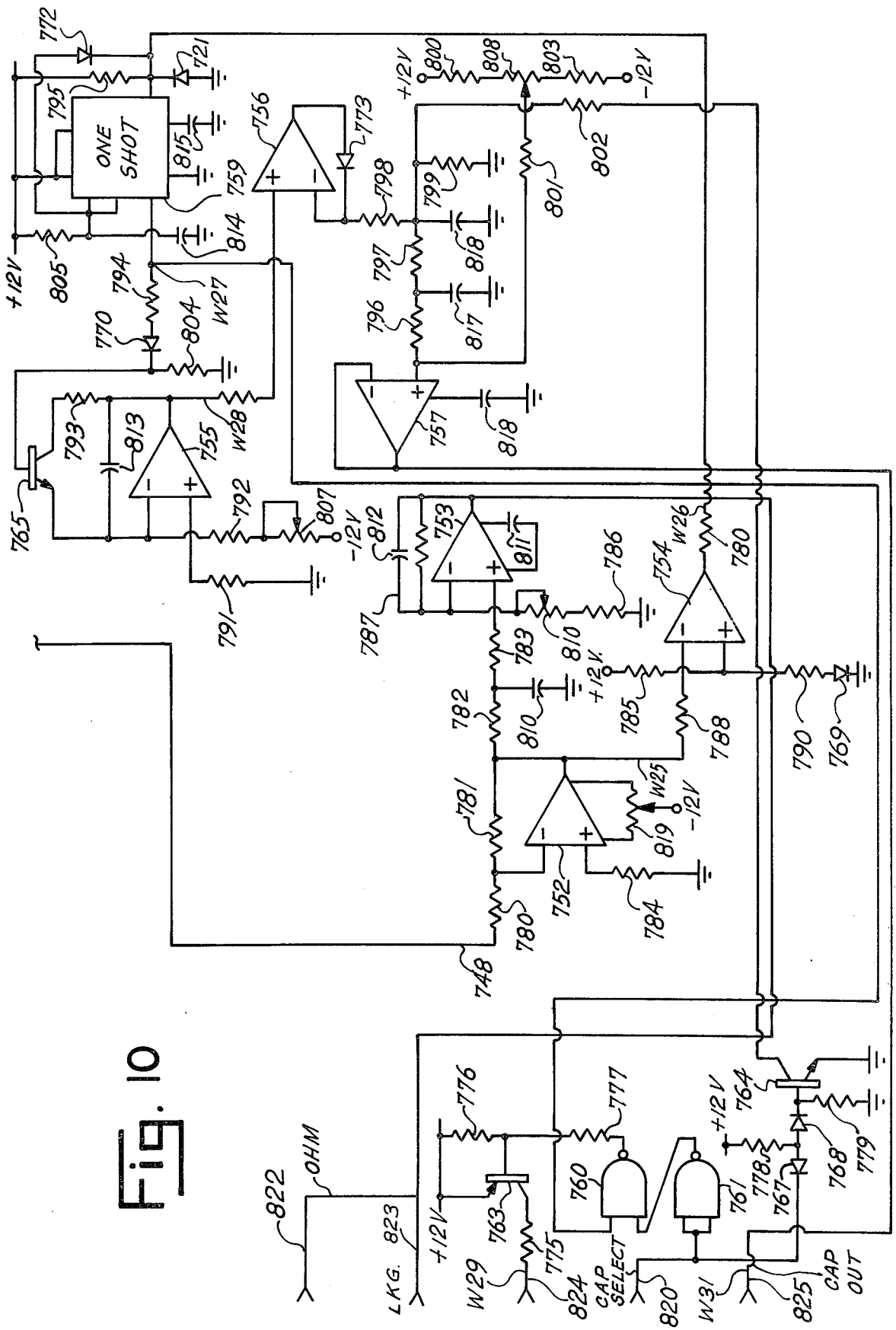

CONDENSER LEAKAGE TESTER

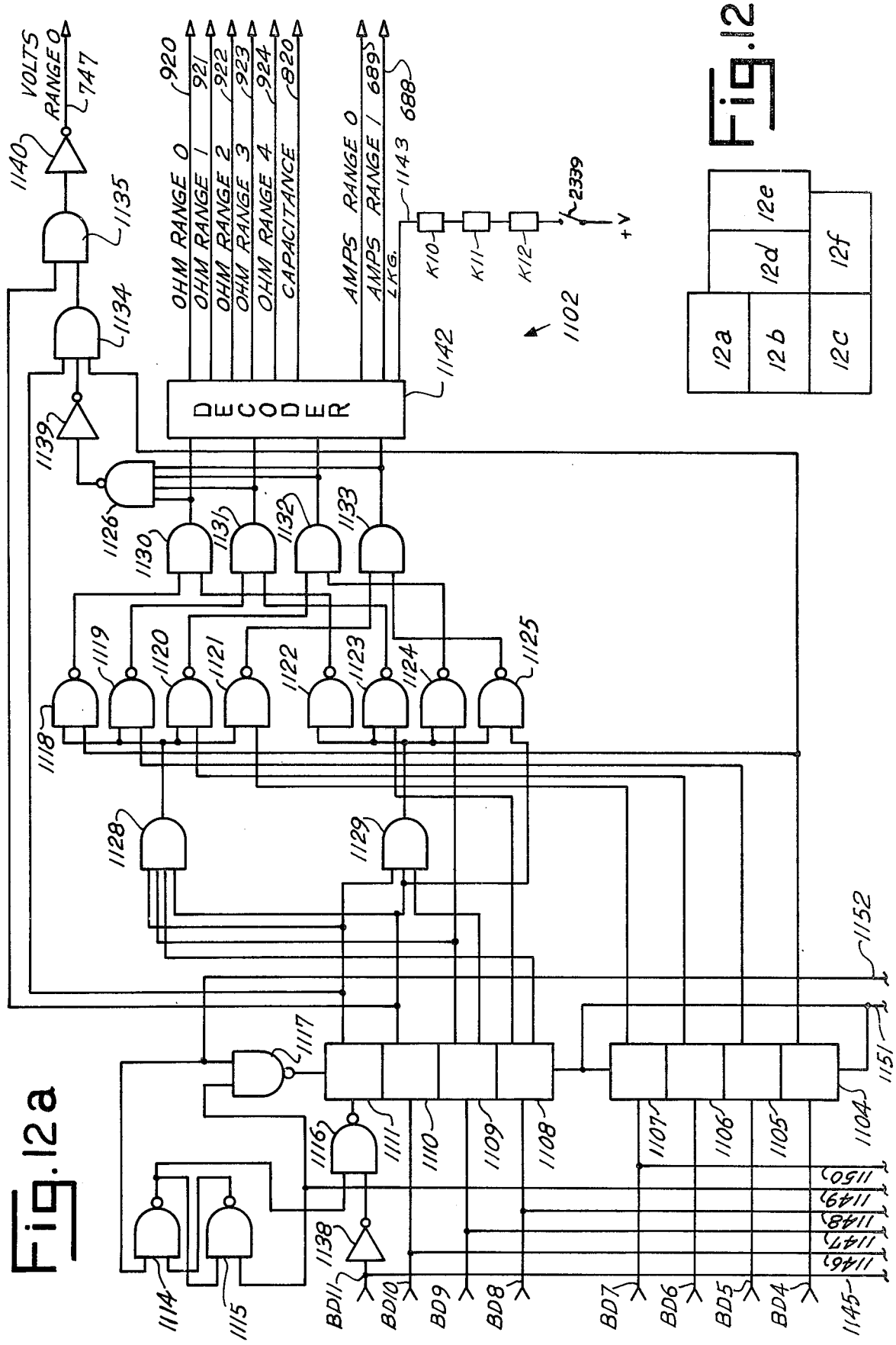

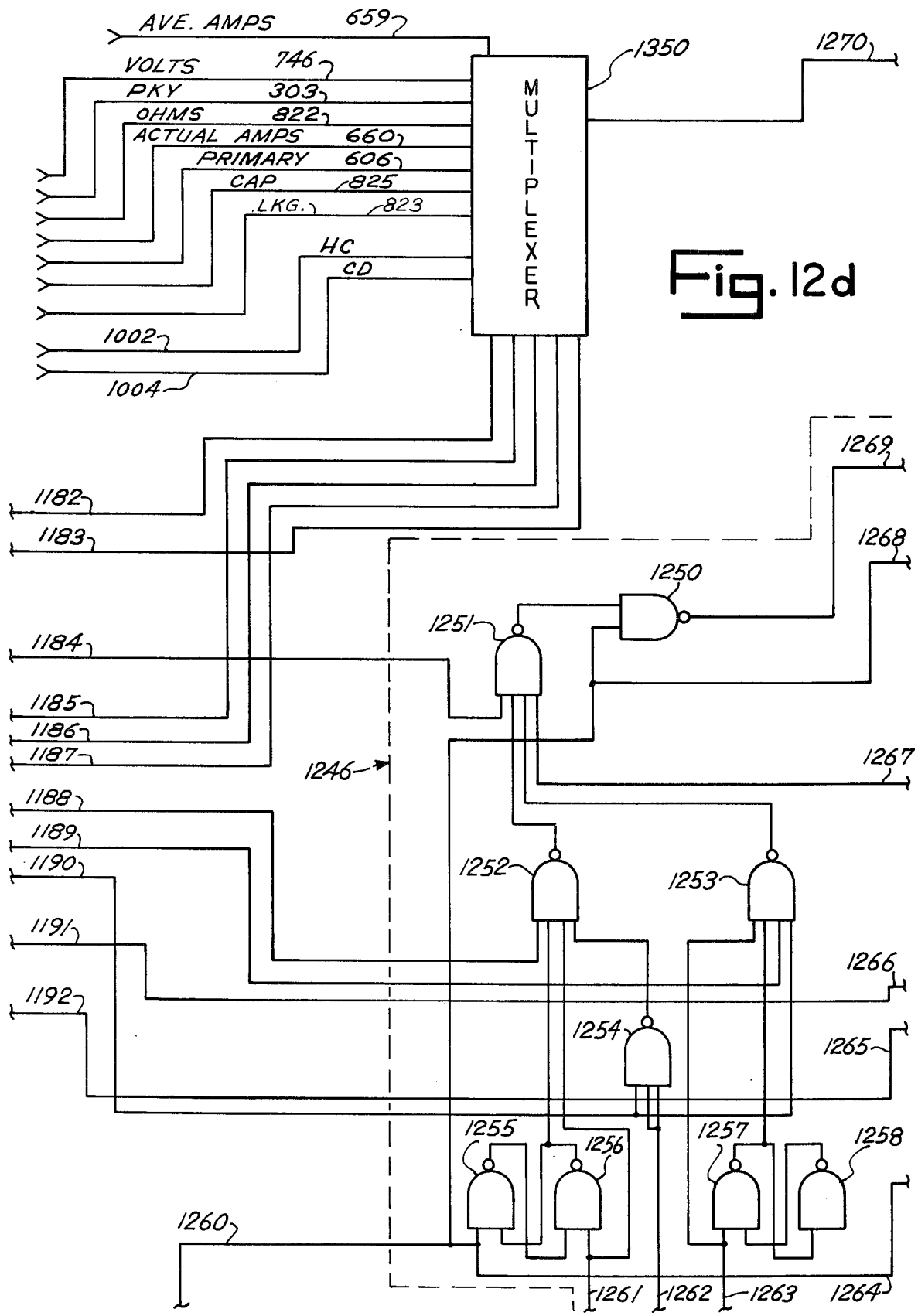

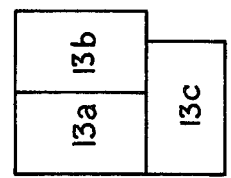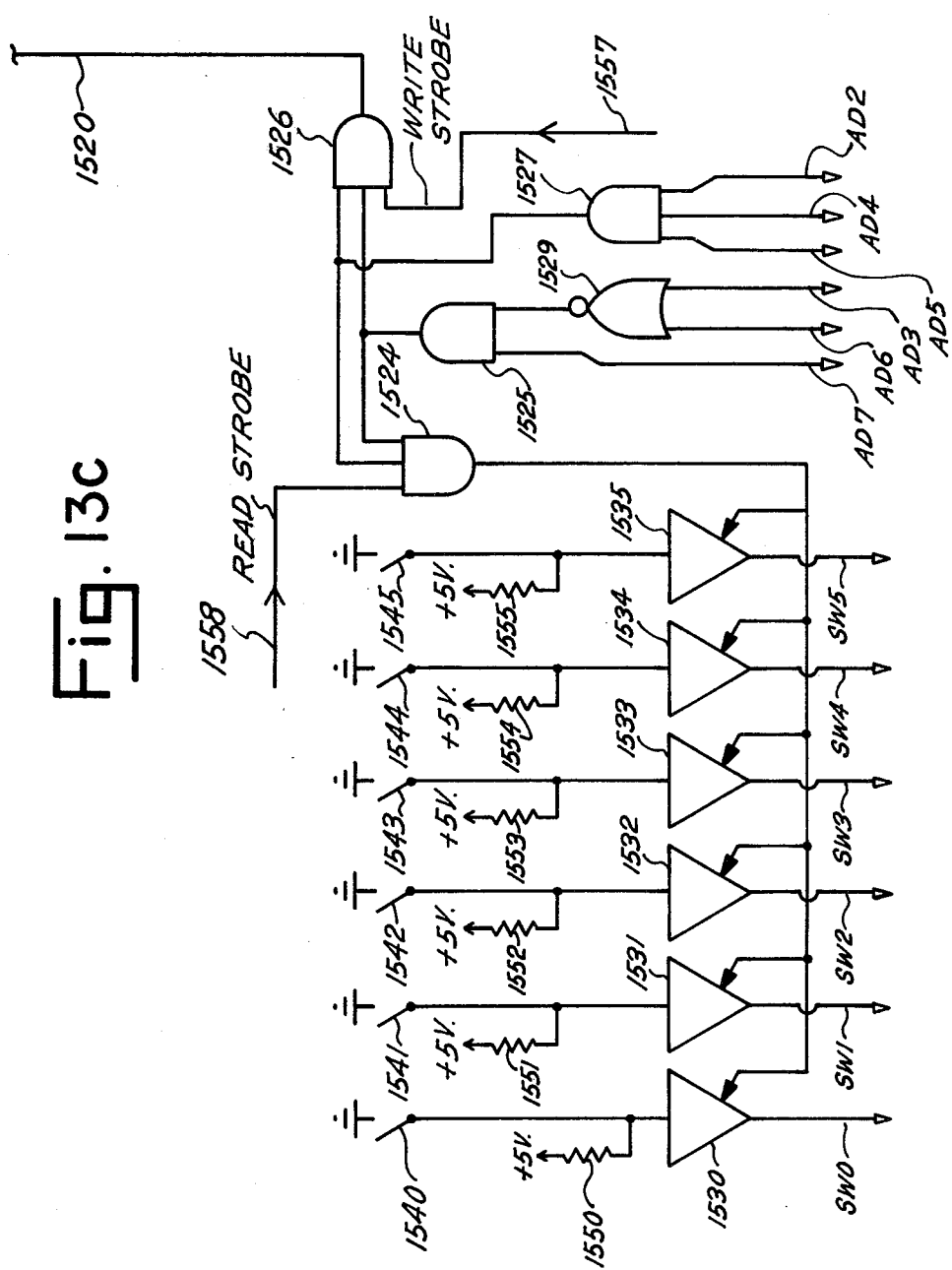

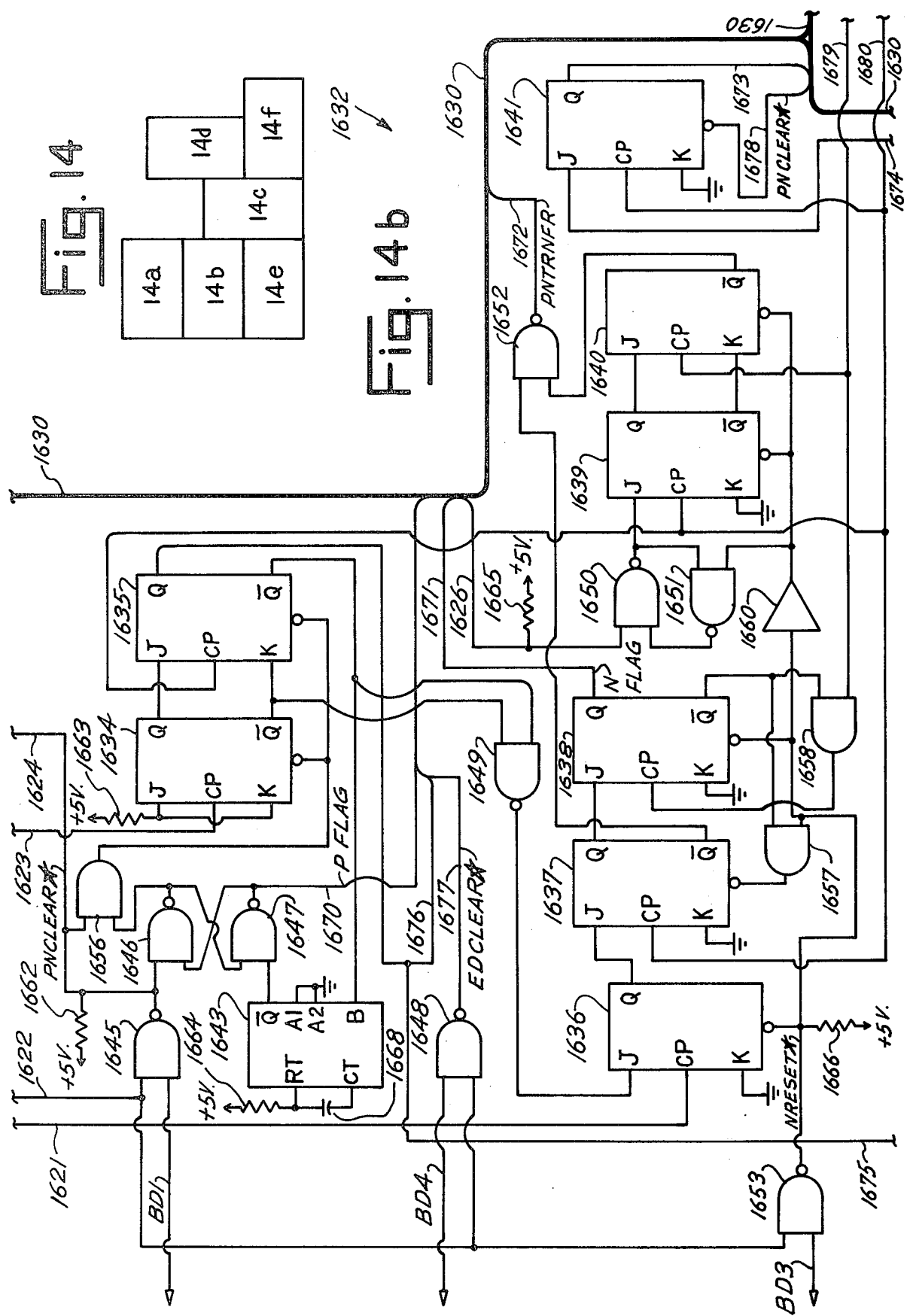

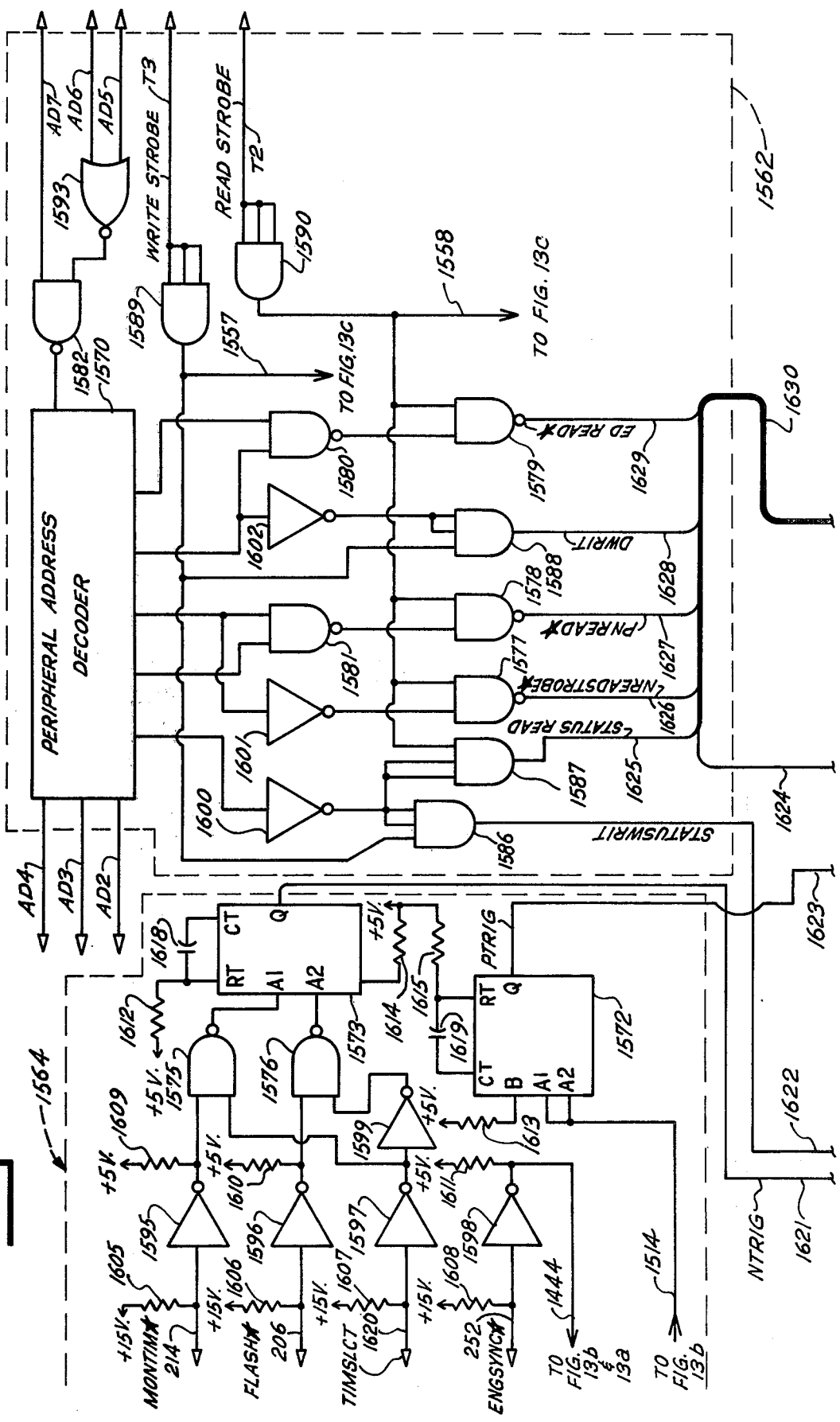

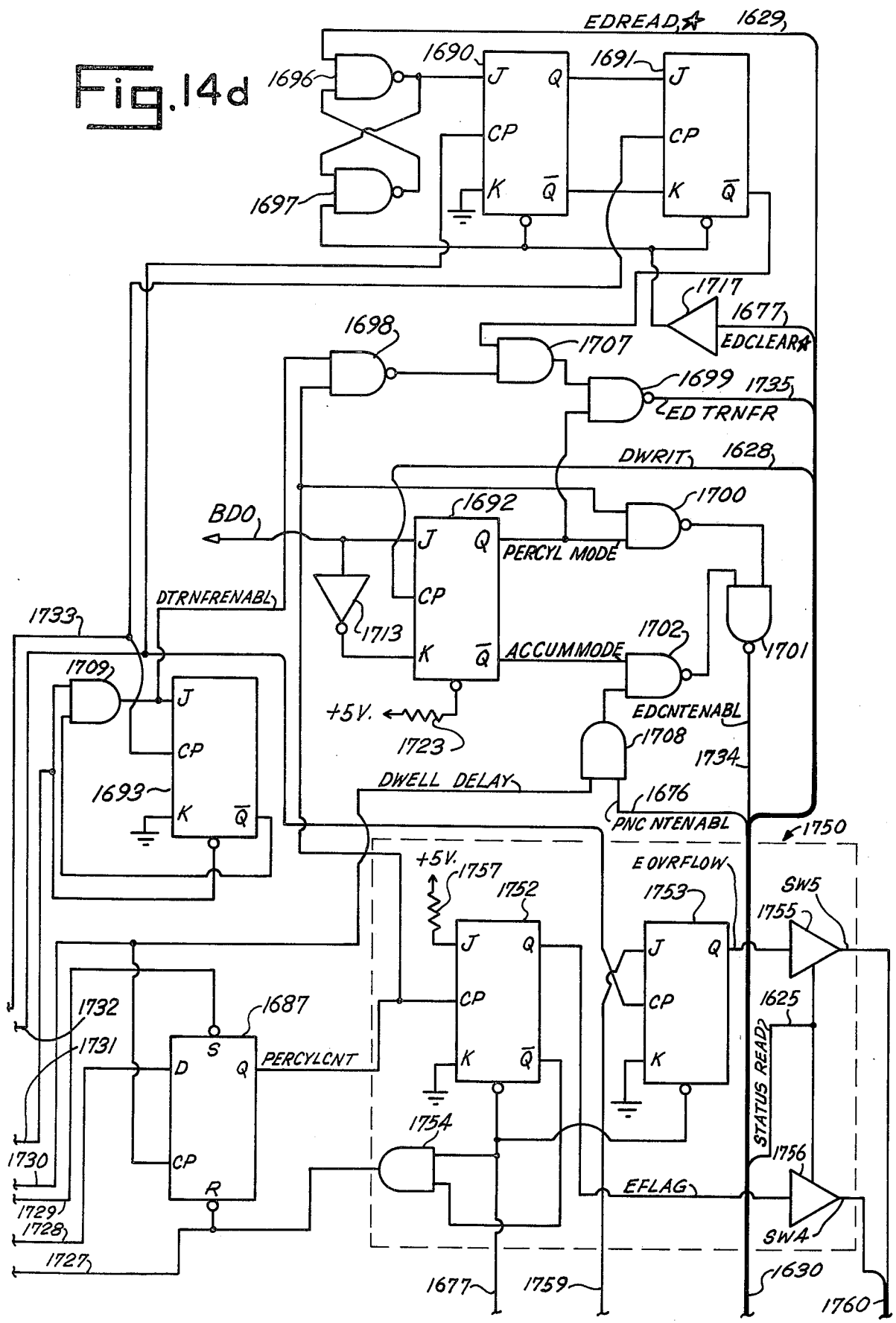

CLOCK PHASES & SEQUENCE SYNCHRONIZATION

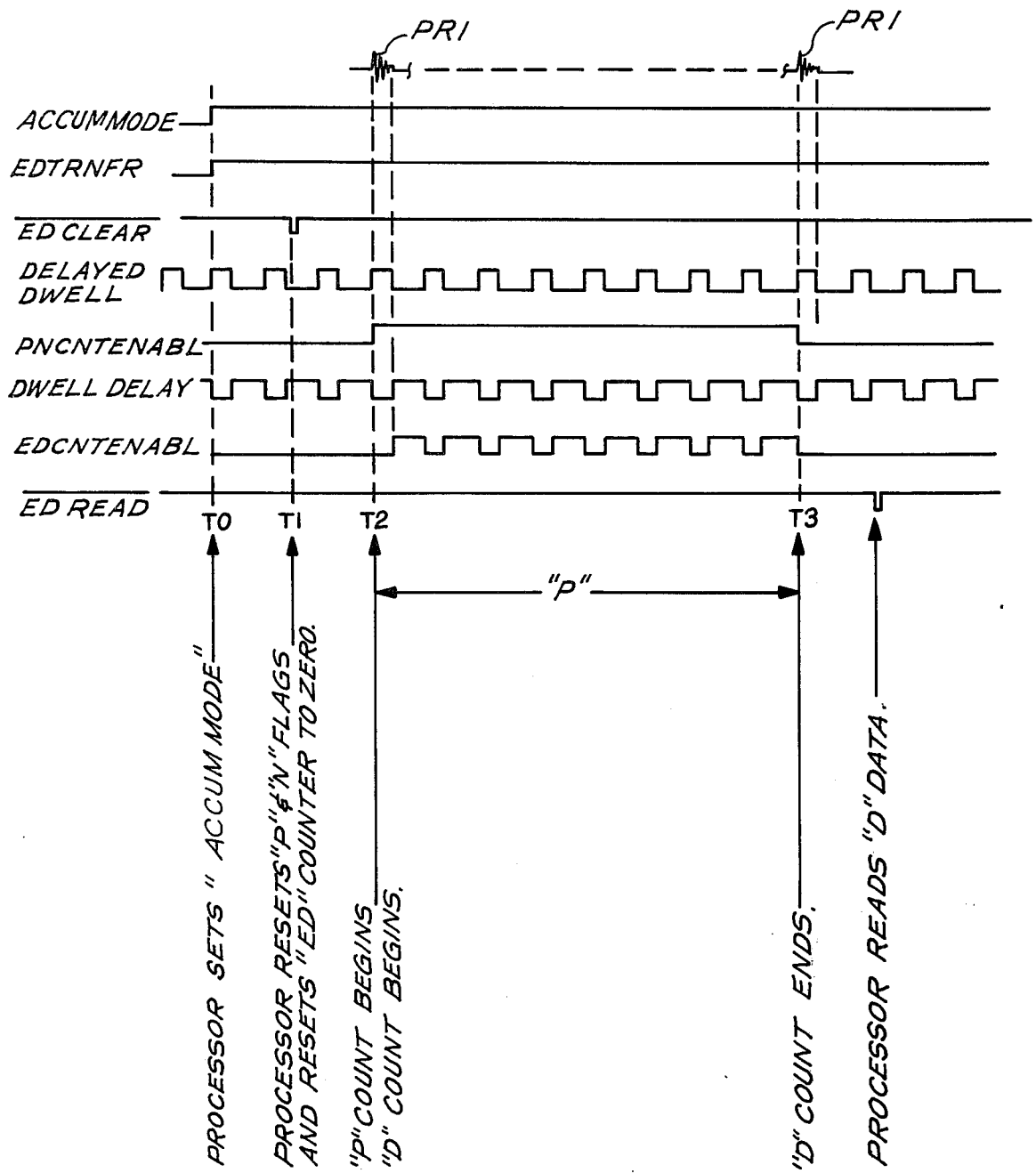

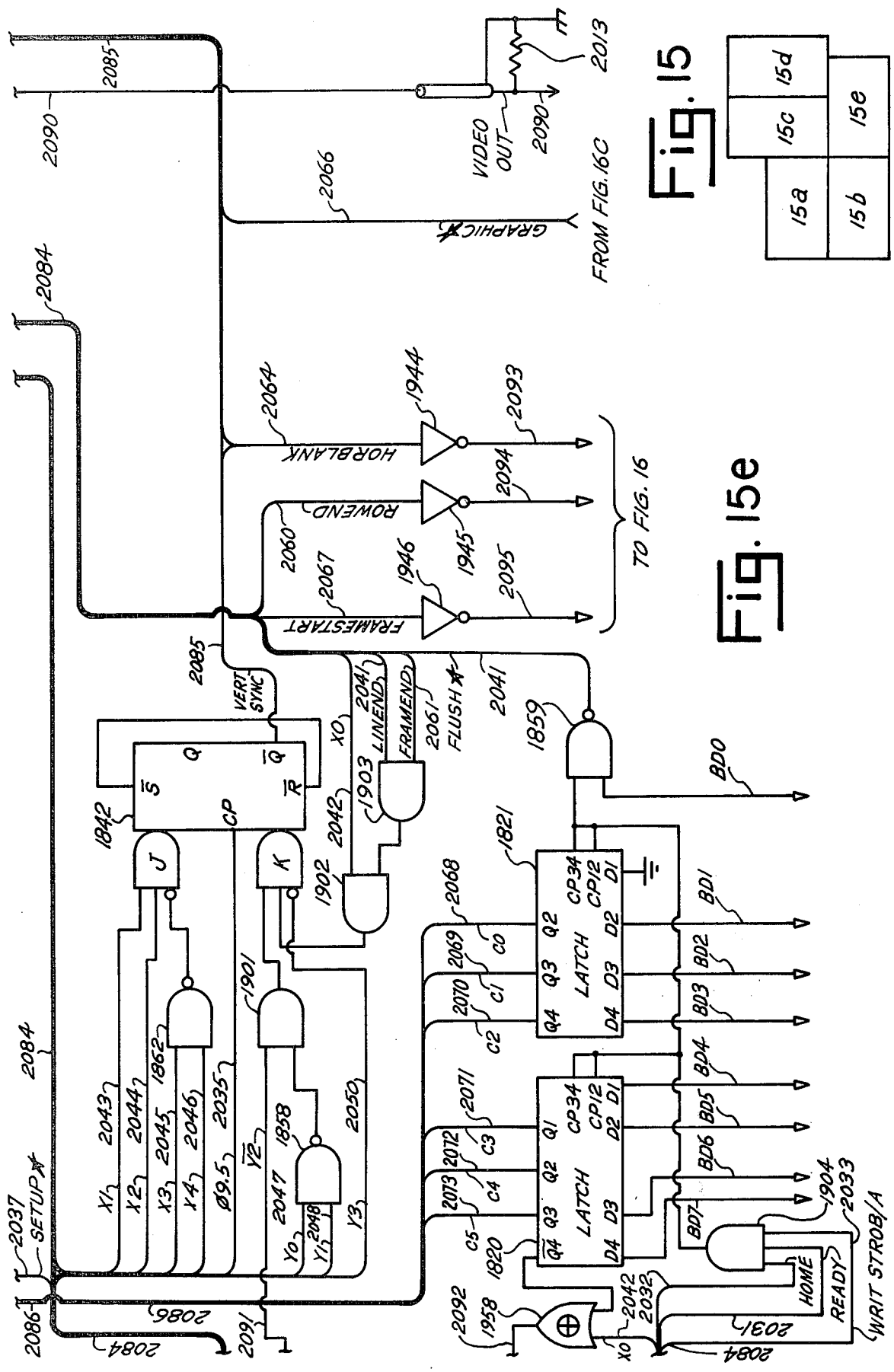

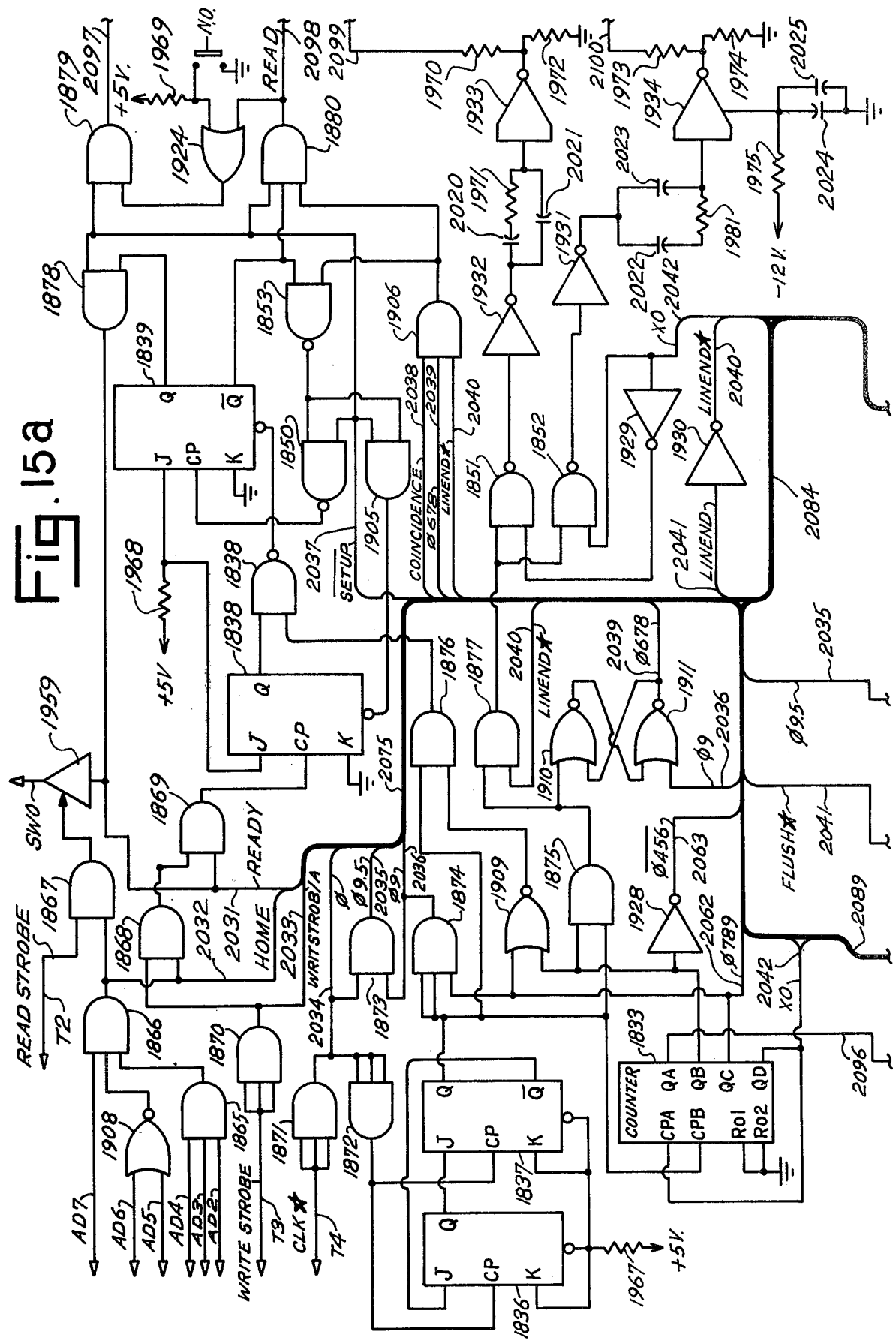

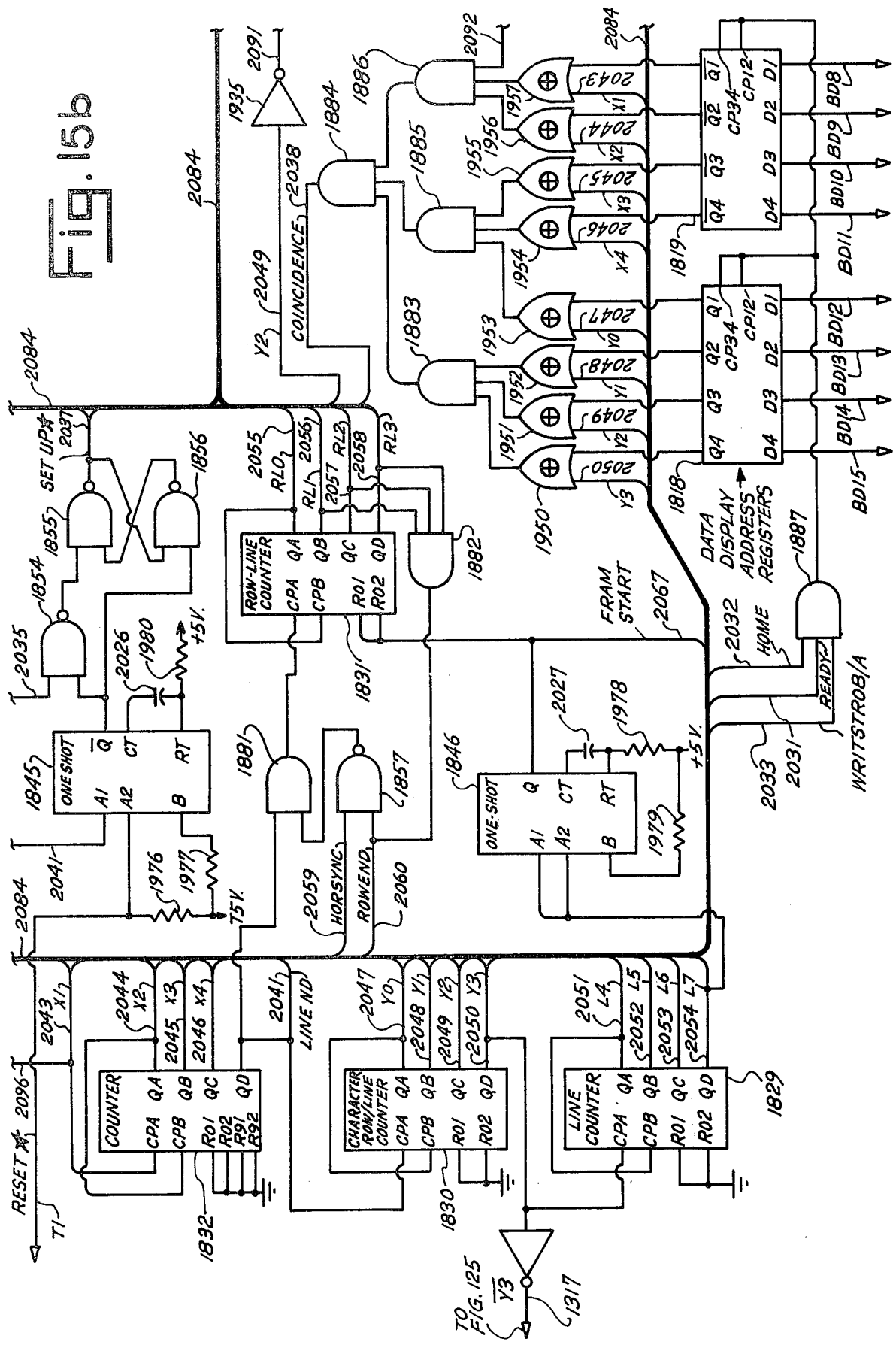

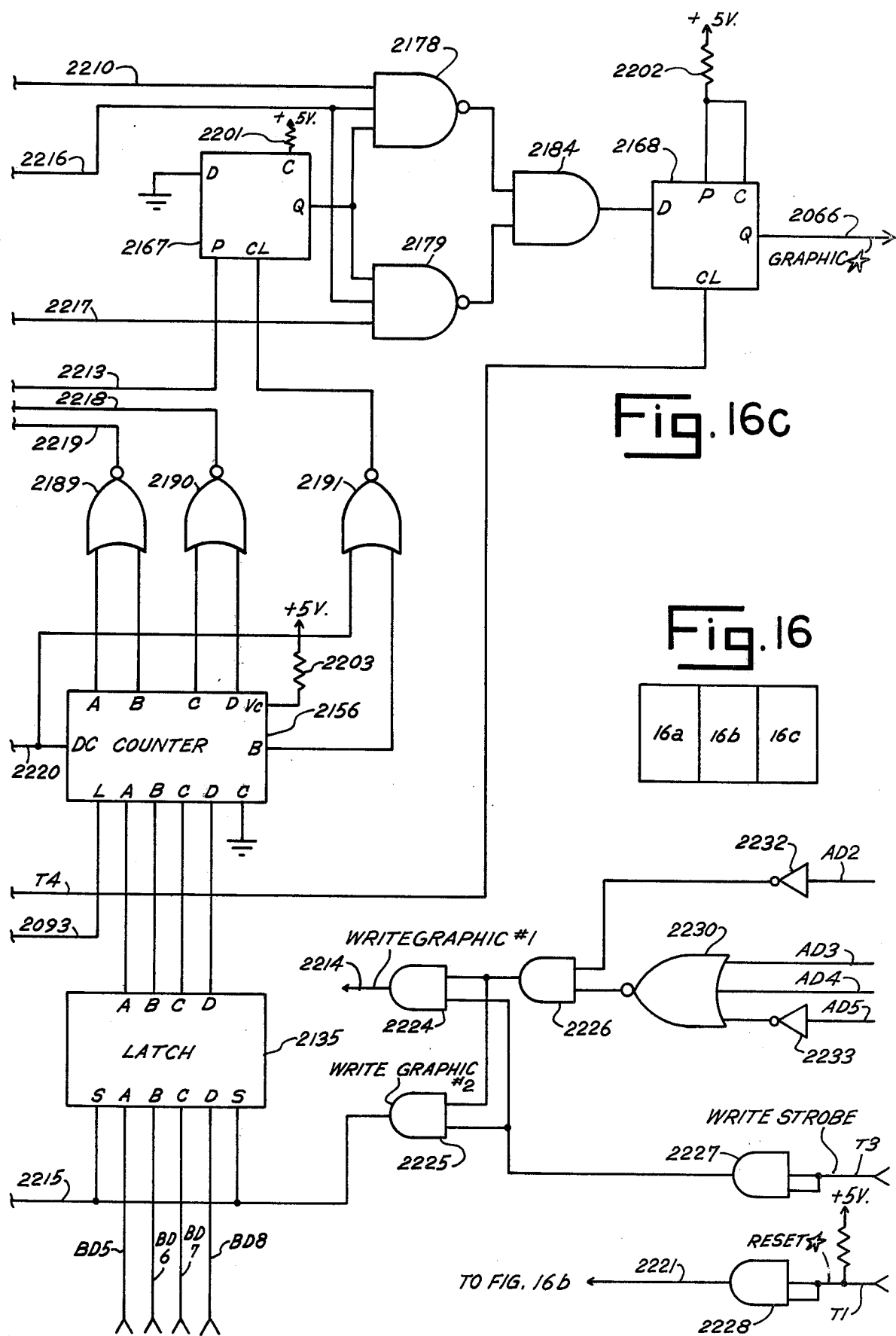

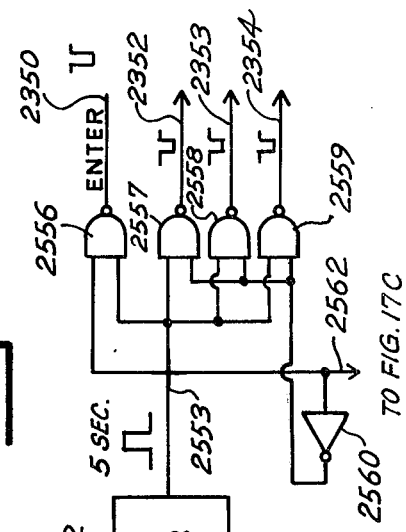
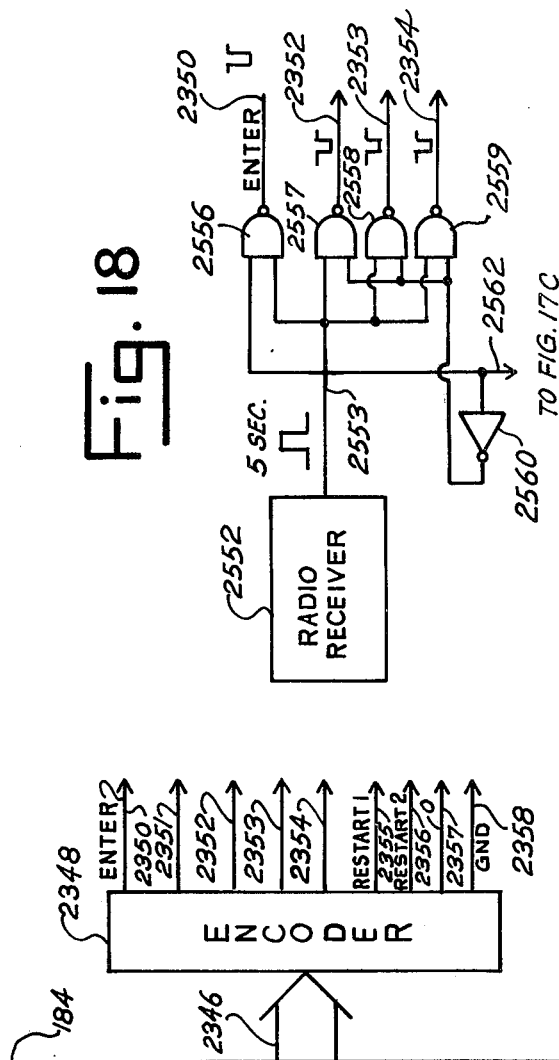
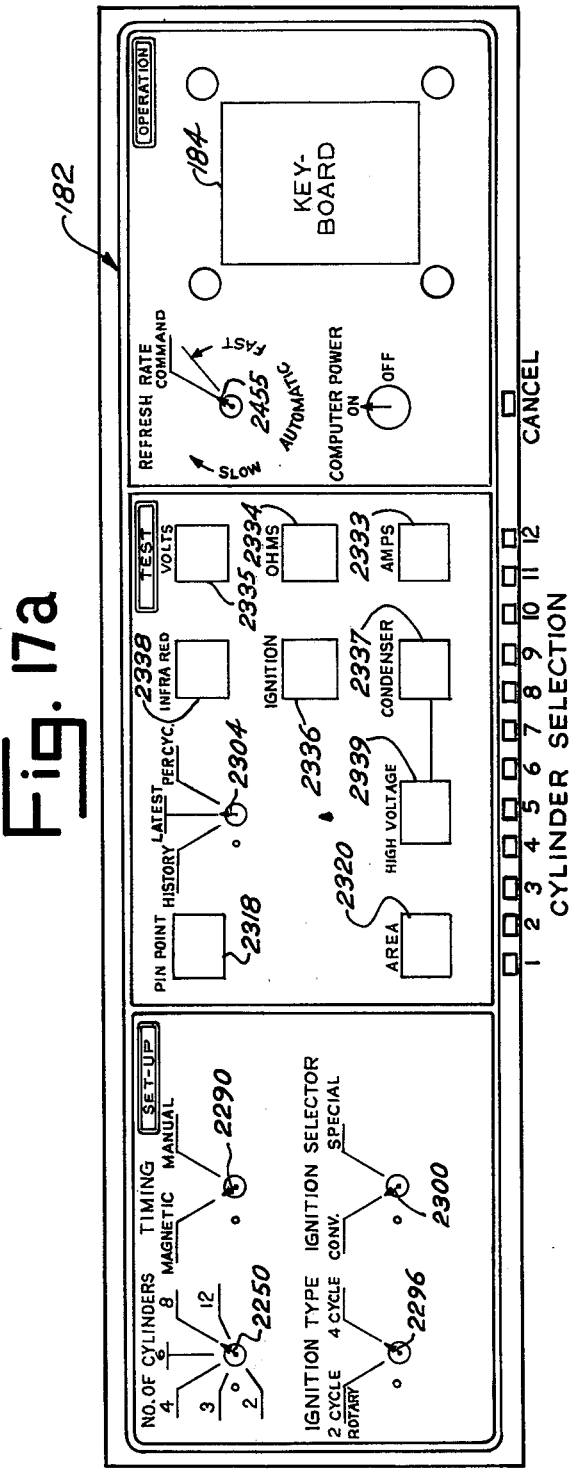

BASIC EXECUTIVE CONTROL SEQUENCE

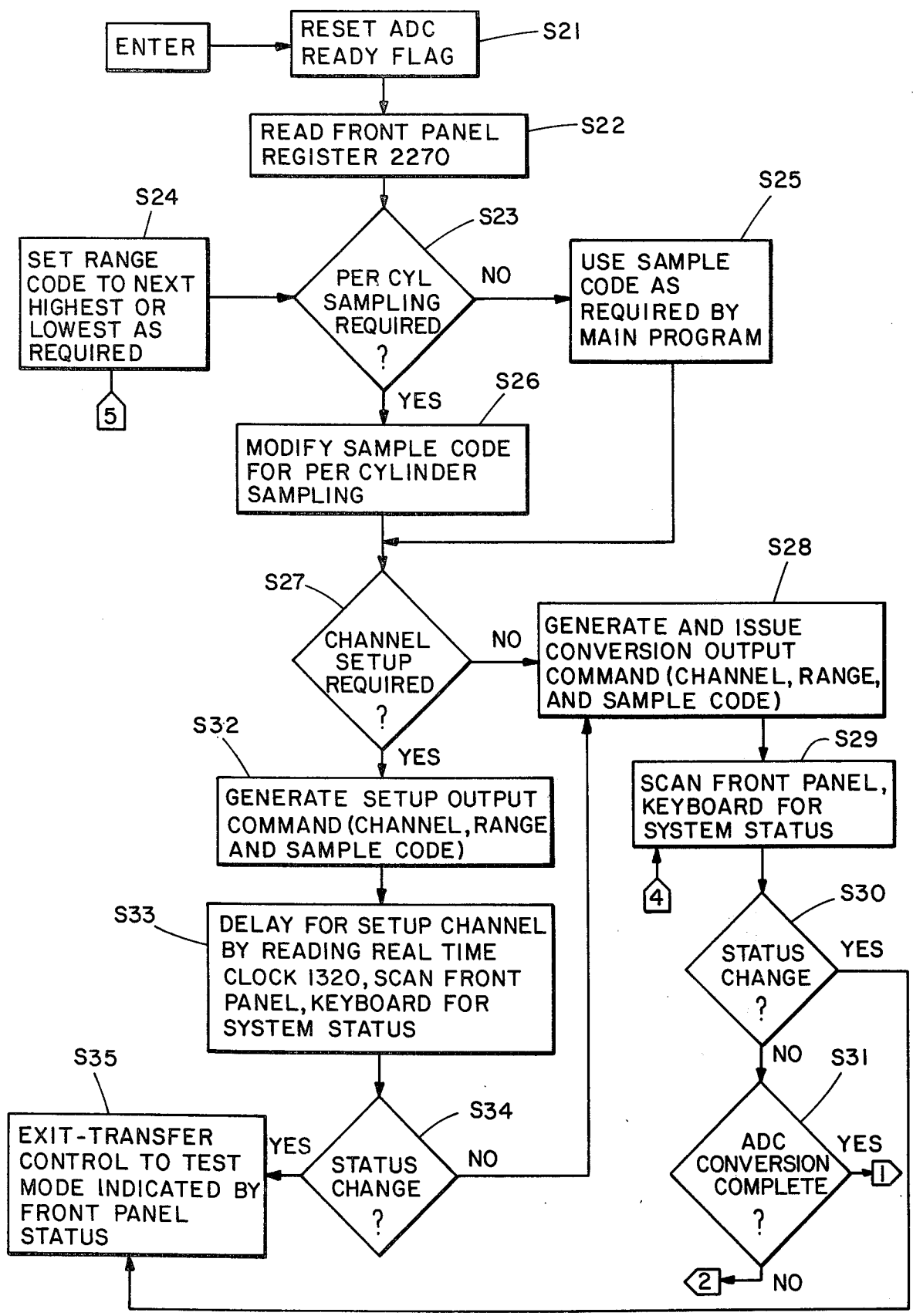
ANALOG/DIGITAL CONVERTER DATA ACQUISITION & DISPLAY
FIG. 20 - PART I

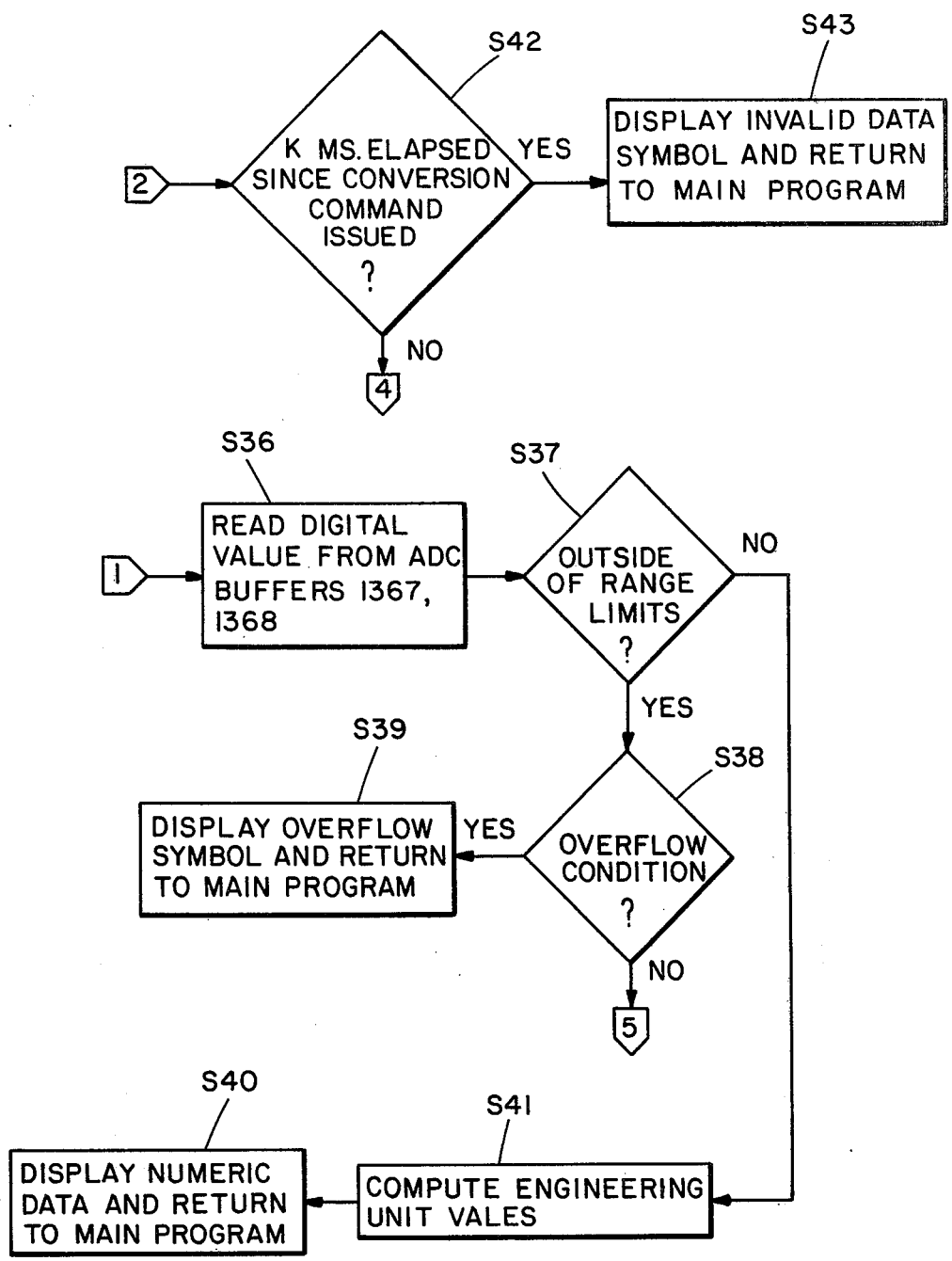
FIG.20-PART 2

NOTE 1: M = FULL SCALE VALUE OF $X_{HC,CO}$
NOTE 2: L = ALLOWABLE NEGATIVE OFFSET
NOTE 3: $A_1, B_1, C_1, D_1$
$A_2, B_2, C_2, D_2$ LINEARIZATION CONSTANTS

HC MEASURED IN PPM (PARTS PER MILLION)
CO MEASURED IN %

EMISSIONS DATA ACQUISITION AND DISPLAY

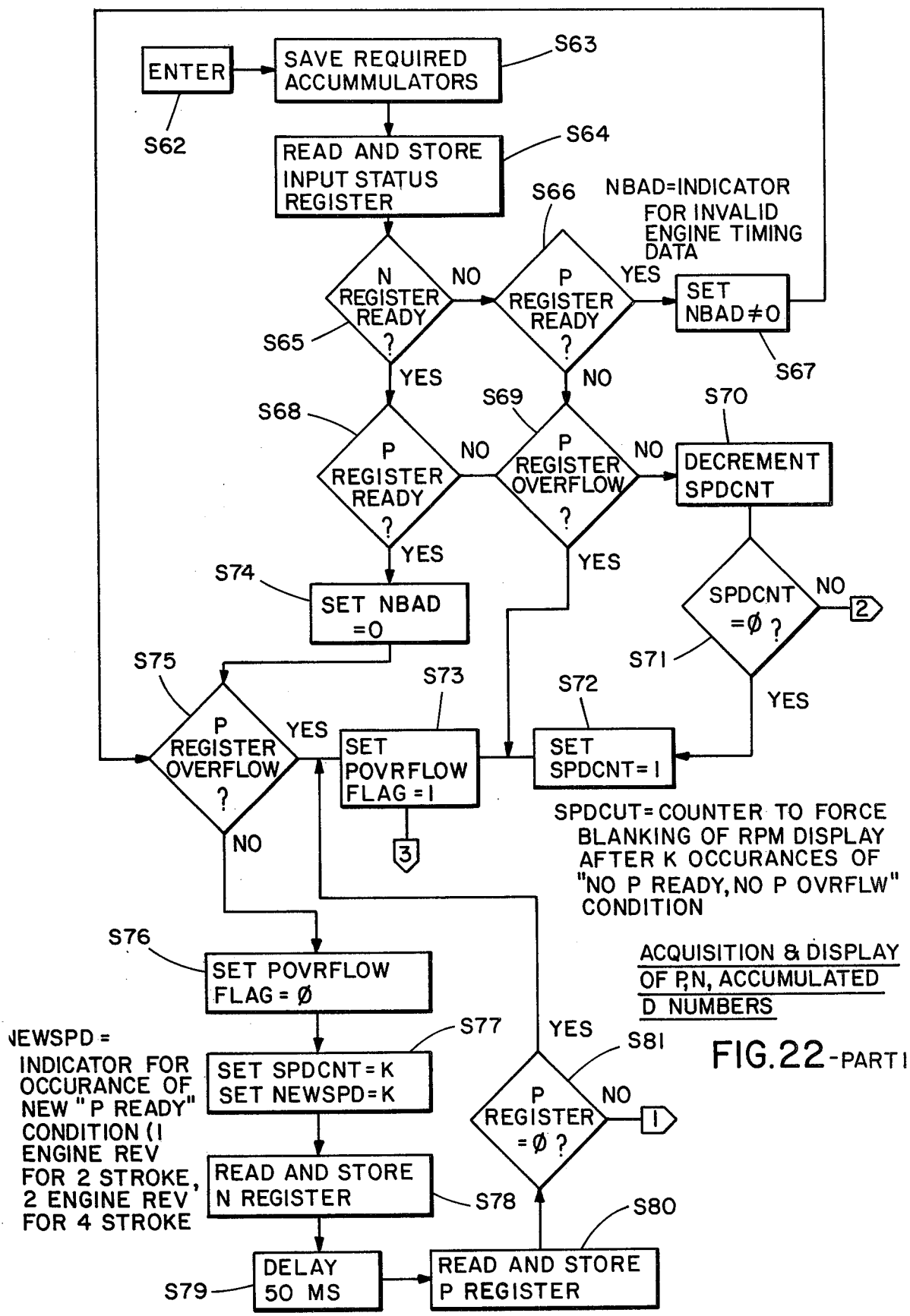

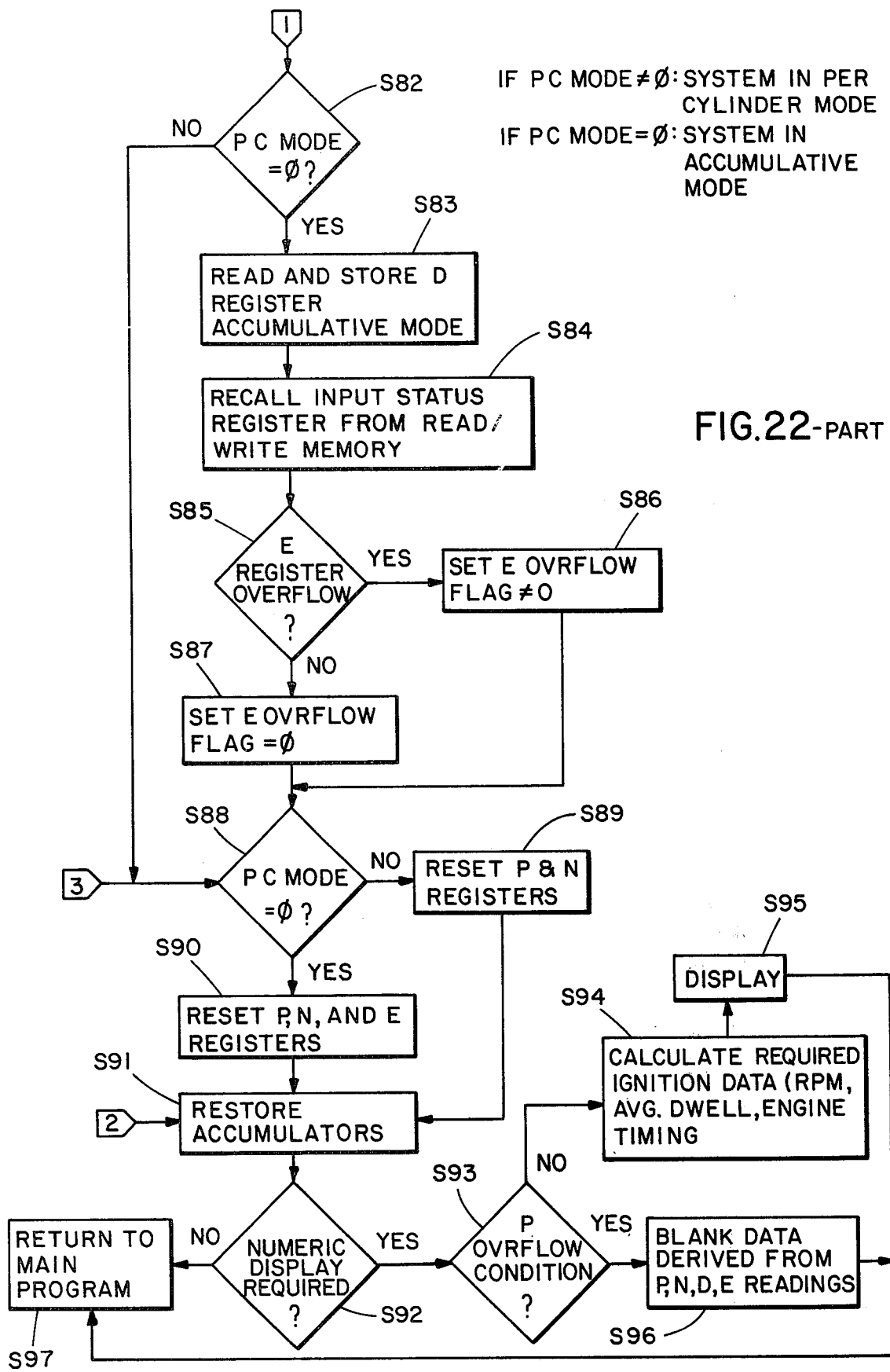
FIG.22-PART 2

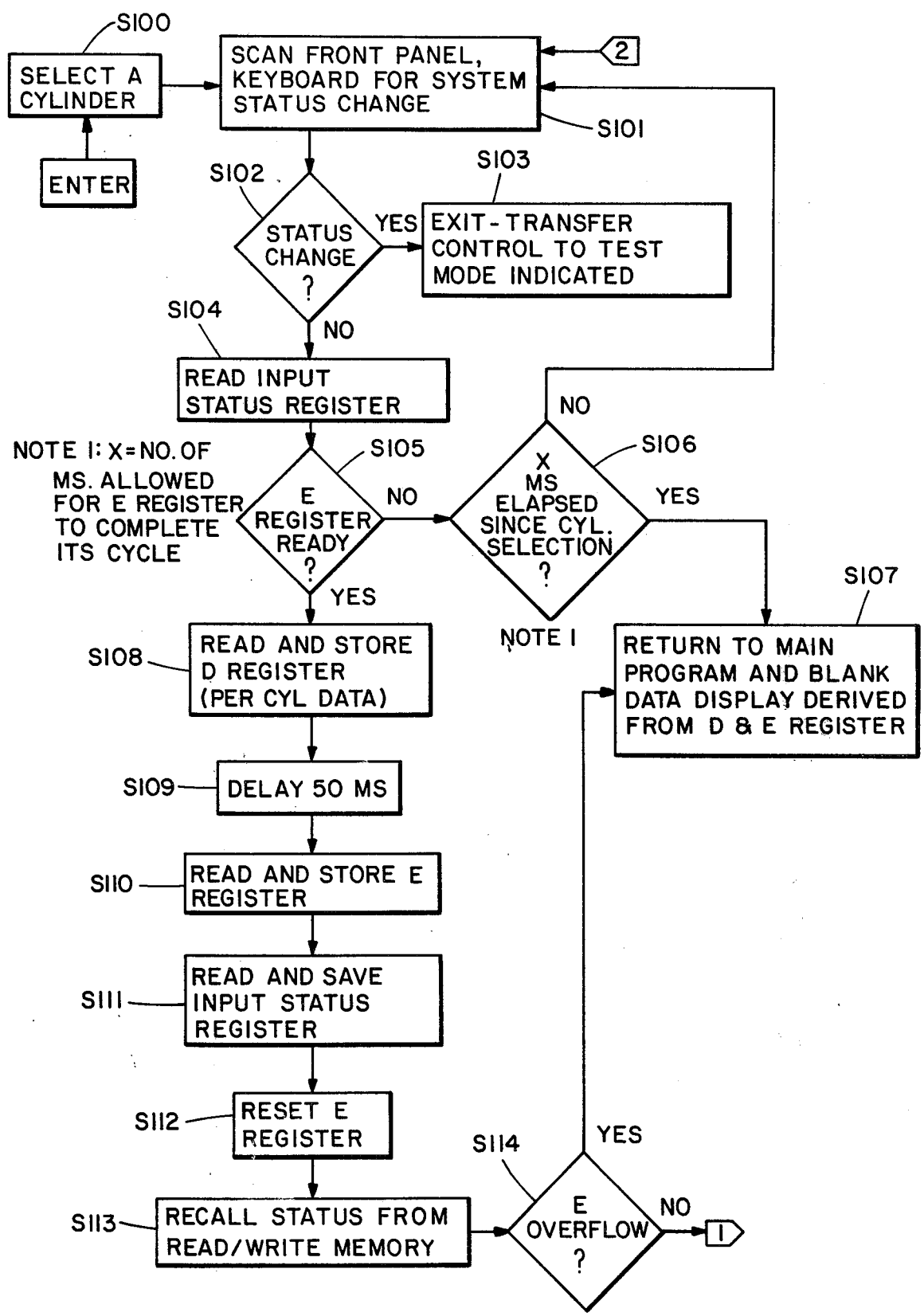
ACQUISITION & DISPLAY OF D(PER CYL) AND E NUMBERS
FIG. 23 - PART I

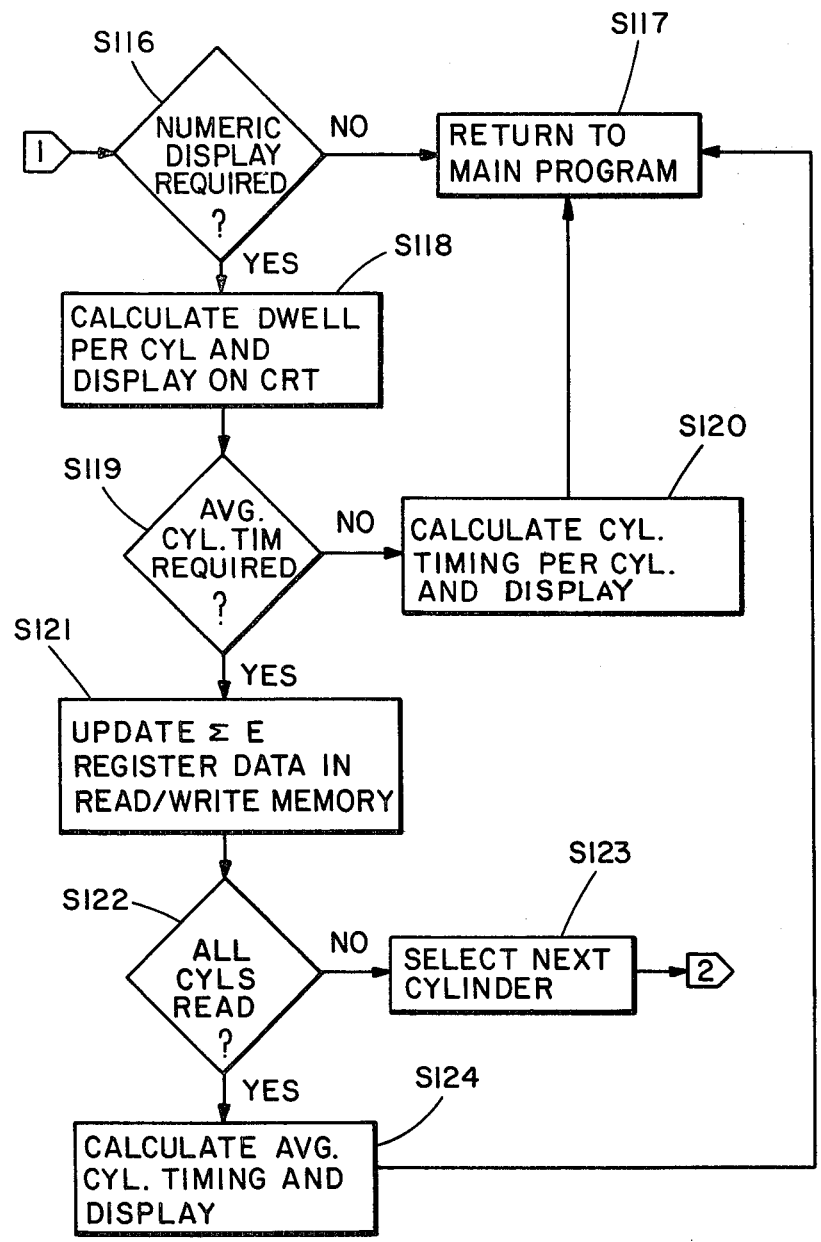
FIG. 23 - PART 2

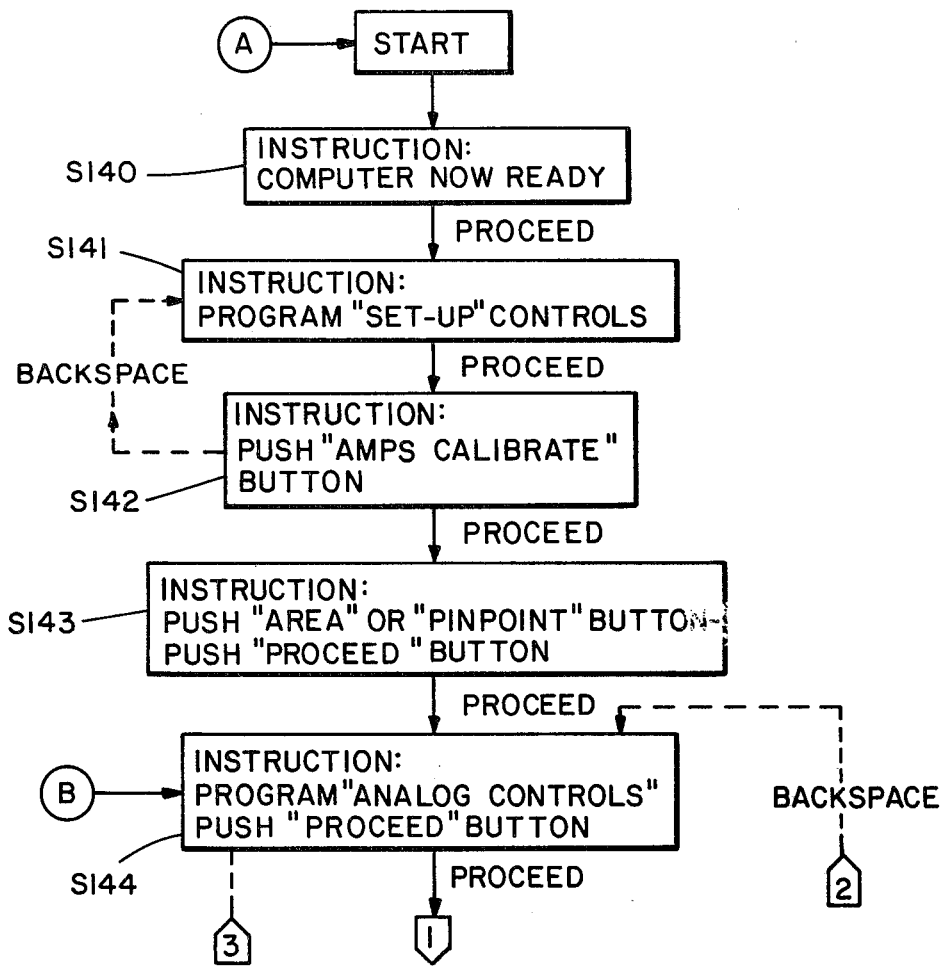
MAN/MACHINE FLOW DIAGRAM
FIG.25 -PART I

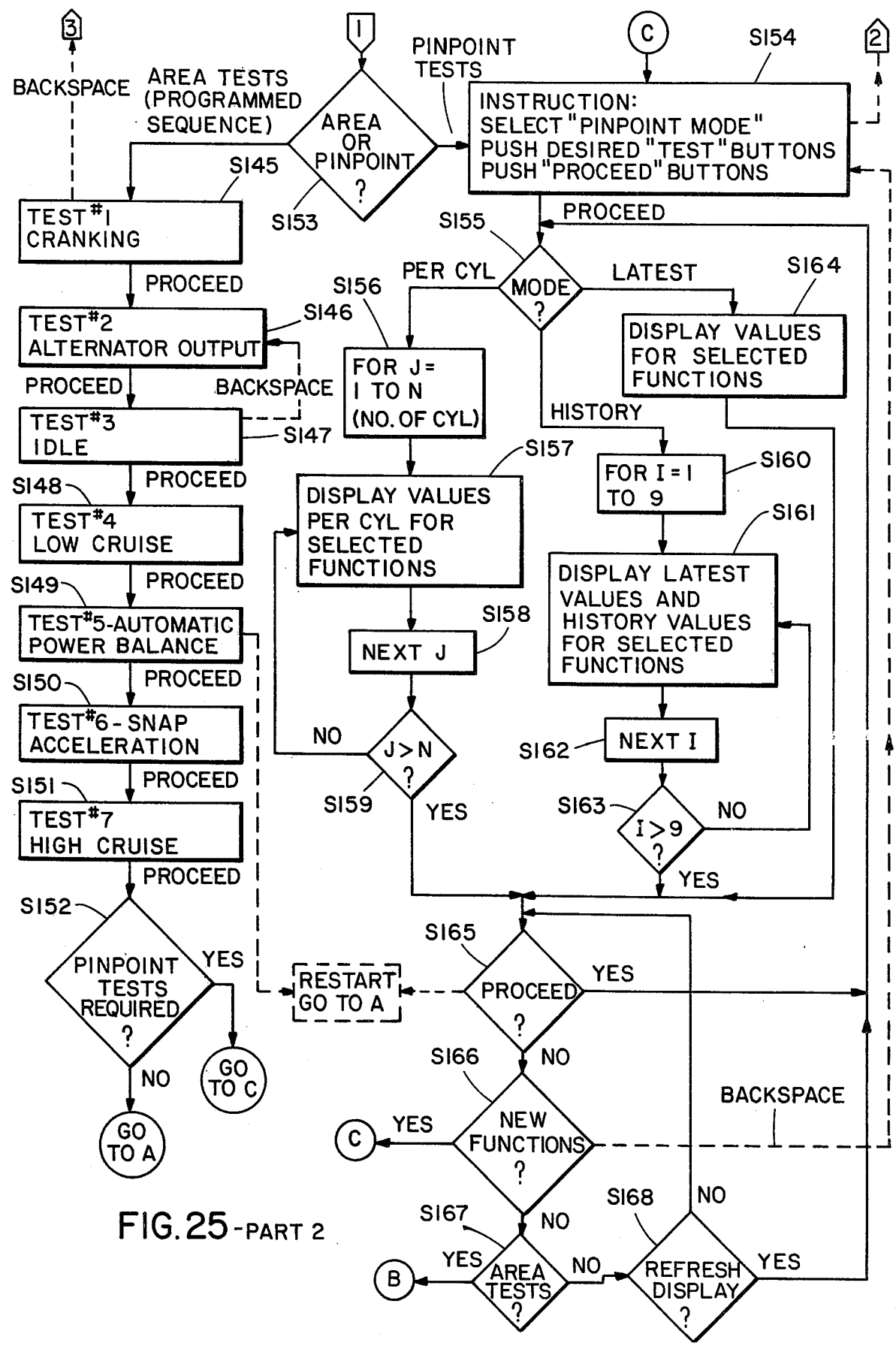
FIG. 25 - PART 2

```
COMPUTER NOW READY

MAKE TEST CONNECTIONS

PUSH "PROCEED" BUTTON
```

FIG. 26

```
PROGRAM "SET-UP" CONTROLS
* NO. OF CYLS.
* IGN. TYPE
* IGN. SELECTOR
* TIMING
  IF MAGNETIC,
  "ENTER" TDC OFFSET ANGLE

ACCEPTED              -XXX.X
```

FIG. 27

PUSH "AMPS CALIBRATE" BUTTON

AMPS CALIBRATION COMPLETE

FIG.28

PUSH "AREA" OR "PINPOINT" BUTTON

PUSH "PROCEED" BUTTON

FIG.29

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | | | | | | | | | | | T | E | S | T | | 1 | - | C | R | A | N | K | I | N | G | | | | | | | |
| 1 | | | | | | | | | | | | | | | | | | | | | | | | | | | | | | | | |
| 2 | D | I | S | A | B | L | E | | I | G | N | I | T | I | O | N | | | | | | | | | | | | | | | | |
| 3 | C | R | A | N | K | | E | N | G | I | N | E | | | | | | | | | | | | | | | | | | | | |
| 4 | | | | | | | | | | | | | | | | | | | | | | | | | | | | | | | | |
| 5 | | B | A | T | T | E | R | Y | | | | | | | | | | | | X | X | . | X | | V | O | L | T | S | | | |
| 6 | | S | T | A | R | T | E | R | | D | R | A | W | | | | | | | | X | X | X | | A | M | P | S | | | | |
| 7 | | C | R | A | N | K | I | N | G | | S | P | E | E | D | | | | | X | X | X | X | | R | P | M | | | | | |
| 8 | | D | Y | N | . | | D | I | S | T | . | | R | E | S | . | | | | X | . | X | X | | V | O | L | T | S | | | |
| 9 | | D | W | E | L | L | | | | | | | | | | | | | | X | X | . | X | | D | E | G | | | | | |
| 10 | | | | | | | | | | | | | | | | | | | | | | | | | | | | | | | | |
| 11 | | C | O | I | L | | O | U | T | P | U | T | | | | | | | | | X | X | | K | V | | | | | | | |
| 12 | | | | | | | | | | | | | | | | | | | | | | | | | | | | | | | | |
| 13 | | | | | | | | | | | | | | | | | | | | | | | | | | | | | | | | |
| 14 | | | | | | | | | | | | | | | | | | | | | | | | | | | | | | | | |
| 15 | | | | | | | | | | | | | | | | | | | | | | | | | | | | | | | | |

FIG. 30

AREA TEST I-CRANKING

AREA TEST 2-ALTERNATOR OUTPUT

FIG. 35 — AREA TEST 3-IDLE

AREA TEST 4 - LOW CRUISE

AREA TEST 5 - AUTOMATIC POWER BALANCE

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | ! | . | . | ! | . | . | ! | . | . | ! | . | . | ! | . | . | ! | . | . | ! | . | . | ! | . | . | ! | . | . | ! | . | . | ! | . |
| 1 | 0 | | | | 1 | | | | 2 | | | | 3 | | | | 4 | | | | 5 | | | | 6 | 0 | 0 | 0 | | R | P | M |
| 2 | | | | | | | | | | | | | | | | | | | | | | | | | | | | | | | | |
| 3 | | | | | | | | T | E | S | T | | 7 | - | H | I | G | H | | C | R | U | I | S | E | | | | | | | |
| 4 | B | R | I | N | G | | E | N | G | I | N | E | | T | O | | T | E | S | T | | S | P | E | E | D | | | | | | |
| 5 | E | N | G | I | N | E | | S | P | E | E | D | | | | | | | | | X | X | X | X | | R | P | M | | | | |
| 6 | D | W | E | L | L | | | | | | | | | | | | | | | | X | X | . | X | | D | E | G | | | | |
| 7 | D | W | E | L | L | | V | A | R | I | A | T | I | O | N | | | | | | X | . | X | | | D | E | G | | | | |
| 8 | T | I | M | I | N | G | | A | D | V | A | N | C | E | | | | | | | X | . | X | | | D | E | G | | | | |
| 9 | I | N | I | T | I | A | L | | + | | A | D | V | A | N | C | E | | | X | X | . | X | | | D | E | G | | A | D | V. |
| 10 | C | O | | | | | | | | | | | | | | | | | | | X | X | . | X | | % | | | | | | |
| 11 | H | C | | | | | | | | | | | | | | | | | | | X | X | X | X | | P | P | M | | | | |
| 12 | C | H | A | R | G | I | N | G | | V | O | L | T | S | | | | | | | X | X | . | X | | V | O | L | T | S | | |
| 13 | | | | | | | | | | | | | | | | | | | | | | | | | | | | | | | | |
| 14 | | | | | | | | | | | | | | | | | | | | | | | | | | | | | | | | |
| 15 | | | | | | | | | | | | | | | | | | | | | | | | | | | | | | | | |

AREA TEST 7 - HIGH CRUISE

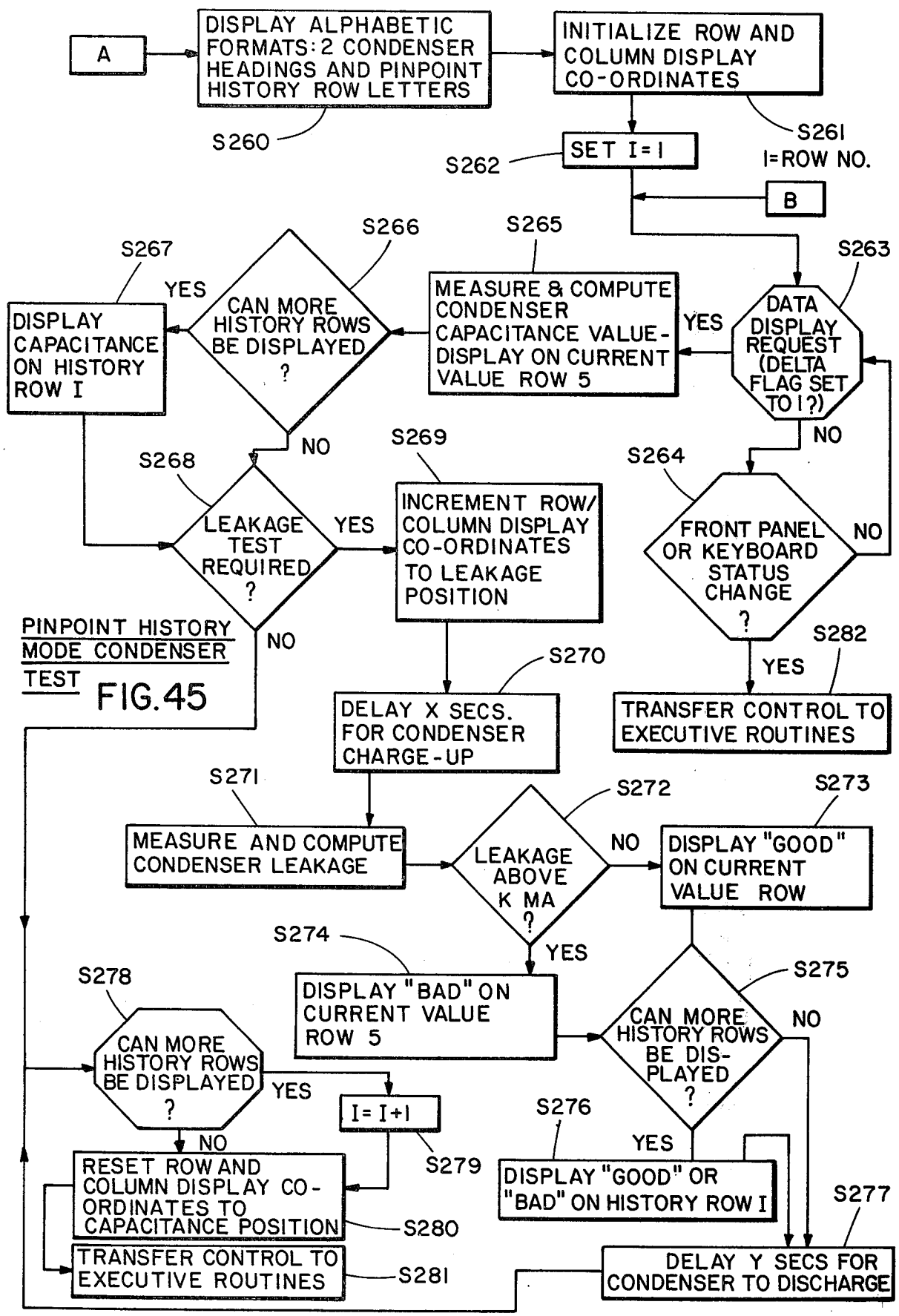

ENGINE TEST AND DISPLAY APPARATUS

This is a continuation of application Ser. No. 641,362, filed on Dec. 16, 1975 now abandoned.

BACKGROUND AND SUMMARY OF THE INVENTION

The servicing of vehicle engines is becoming increasingly important because of road safety considerations and the public awareness of automotive emissions on the environment. In addition, the engines of current vehicles are becoming more difficult and complicated to diagnose and analyze. As a result, one object of the present invention is to provide an automated and rapid diagnostic device which will reduce the cost of labor involved in diagnosing vehicle engines.

Other objects of the invention are:

(1) to provide precise and objective evaluation of malfunction to avoid customer returns;

(2) to display data accumulated from a vehicle engine in an easy-to-understand form;

(3) to provide an improved device for displaying engine rpm, dwell and cylinder timing by direct digital measurement;

(4) to provide a device for displaying the values of engine parameters on a cathode ray tube display monitor in alphabetic, digital and graphical form;

(5) to provide a cathode ray tube display monitor of the foregoing type in which the history of an engine parameter is displayed as a function of time;

(6) to provide an improved device in which related vehicle engine tests are grouped together and displayed simultaneously on a cathode ray tube display monitor, and in which the tests are sequenced one after another in an automatic manner;

(7) to provide a sequencing mode of operation of the foregoing type in which data is remembered by the apparatus from one test grouping to another;

(8) to provide an improved device for displaying engine parameter values for each cylinder of a multicylinder engine;

(9) to provide a means of displaying the speed of a vehicle engine on a cathode ray tube display monitor by means of a bar graph;

(10) to provide an automatic vehicle engine diagnosing device capable of remembering calibration constants and automatically processing the data received from the engine by linearizing the value of the data;

(11) to provide an improved vehicle engine diagnosing device capable of deciding whether components of the engine are in good working order or should be replaced;

(12) to provide an improved device which is automatically capable of measuring the power balance of a vehicle engine;

(13) to provide an automatic power balance device of the foregoing type in which the speed of the engine over several engine revolutions is averaged during the power balancing procedure;

(14) to provide an improved apparatus for measuring the parameters of an engine by an analog circuit which is automatically set to the proper range depending on the value of the parameter being measured; and

(15) to provide an improved vehicle engine testing device which is capable of storing maximum and minimum values of the engine parameters and of displaying the values stored.

(16) to provide an improved vehicle testing device capable of displaying a value if an engine parameter lies within an acceptable range and capable of displaying a symbol if the engine parameter lies outside the acceptable range.

DESCRIPTION OF THE DRAWINGS

These and other objects, advantages and features of the present invention will hereafter appear in connection with the accompanying drawings wherein like numbers refer to like parts throughout and wherein:

FIG. 1 is a perspective view of an internal combusion engine that is connected to a preferred form of the present invention;

FIGS. 2a and 2b are schematic diagrams of an ignition system of the engine shown in FIG. 1 connected to a system block diagram of a preferred form of the present invention;

FIGS. 2c and 2d are timing diagrams showing the manner in which data is transmitted and received by the data processor of the present invention;

FIG. 4a illustrates exemplary voltage waveforms generated by the signal sampler shown in FIG. 4;

FIG. 10 is a schematic diagram of an ohmeter circuit made in accordance with the present invention;

FIG. 12 illustrates the manner in which FIGS. 12a–12f should be arranged;

FIGS. 12a–12f are schematic diagrams of a preferred form of analog system made in accordance with the present invention;

FIG. 13 illustrates the manner in which FIGS. 13a–13c should be arranged;

FIGS. 13a–13c are schematic diagrams of a preferred form of cylinder selection circuit made in accordance with the present invention;

FIG. 14 illustrates the manner in which FIGS. 14a–14f should be arranged;

FIGS. 14a–14f are schematic diagrams of a preferred form of a counting and cylinder control system made in accordance with the invention;

FIG. 14j illustrates exemplary voltage waveforms used to control the generation of D and E numbers in the counters of circuits 1770–1773 during the accumulative mode of operation;

FIG. 15 illustrates the manner in which FIGS. 15a–15e should be arranged;

FIGS. 15a–15e are schematic diagrams of a preferred form of a character controller made in accordance with the present invention;

FIG. 16 illustrates the manner in which FIGS. 16a–16c should be arranged;

FIGS. 16a–16c are schematic block diagrams of a preferred form of graphic controller made in accordance with the present invention;

FIG. 17a is a plan view of a preferred form of front control panel for use in the present invention;

FIG. 17b is a schematic diagram of a preferred form of the keyboard shown in FIG. 17a;

FIG. 18 is a logic schematic diagram of a preferred form of remote control circuitry made in accordance with the invention;

FIG. 20 is a flowchart illustrating the analog-to-digital converter data acquisition and display program segment executed by the data processor;

FIG. 22 is a flowchart illustrating the manner in which the data processor acquires the P, N and accumulated D numbers and displays the rpm, average dwell and engine timing parameters calculated from the numbers;

FIG. 23 is a flowchart illustrating the manner in which the data processor acquires the E number and the D number in the per cylinder mode and the manner in which the dwell per cylinder, cylinder timing per cylinder and average cylinder timing parameters are displayed based on the acquired numbers;

FIG. 25 is a flowchart illustrating the overall operation of the system;

FIG. 26 illustrates the format displayed on the CRT screen during step S140 of the flowchart shown in FIG. 25;

FIG. 27 illustrates the format displayed on the CRT screen during step S141 of the flowchart shown in FIG. 25;

FIG. 28 illustrates the format displayed on the CRT screen during step S142 of the flowchart shown in FIG. 25;

FIG. 29 illustrates the format displayed on the CRT screen during step S143 of the flowchart shown in FIG. 25;

FIG. 30 illustrates the format displayed on the CRT screen during area test 1;

FIG. 35 is a flowchart illustrating the program segment executed by the data processor during area test 3;

FIG. 36 illustrates the format displayed on the CRT screen during area test 4;

FIG. 38 illustrates the format displayed on the CRT screen during area test 5;

FIG. 40 illustrates the format displayed on the CRT screen during area test 7;

FIG. 42 illustrates the format displayed on the CRT screen after the completion of the area tests;

FIG. 43 illustrates the format displayed on the CRT screen during the pin point ignition test in the per cylinder mode;

FIG. 44 illustrates the format displayed on the CRT screen during the pin point condenser test in the history mode; and FIG. 45 is a flowchart illustrating the program segment executed by the data processor during the pin point condenser test in the history mode.

DESCRIPTION OF THE PREFERRED EMBODIMENT

INTRODUCTION

Figure 2A:
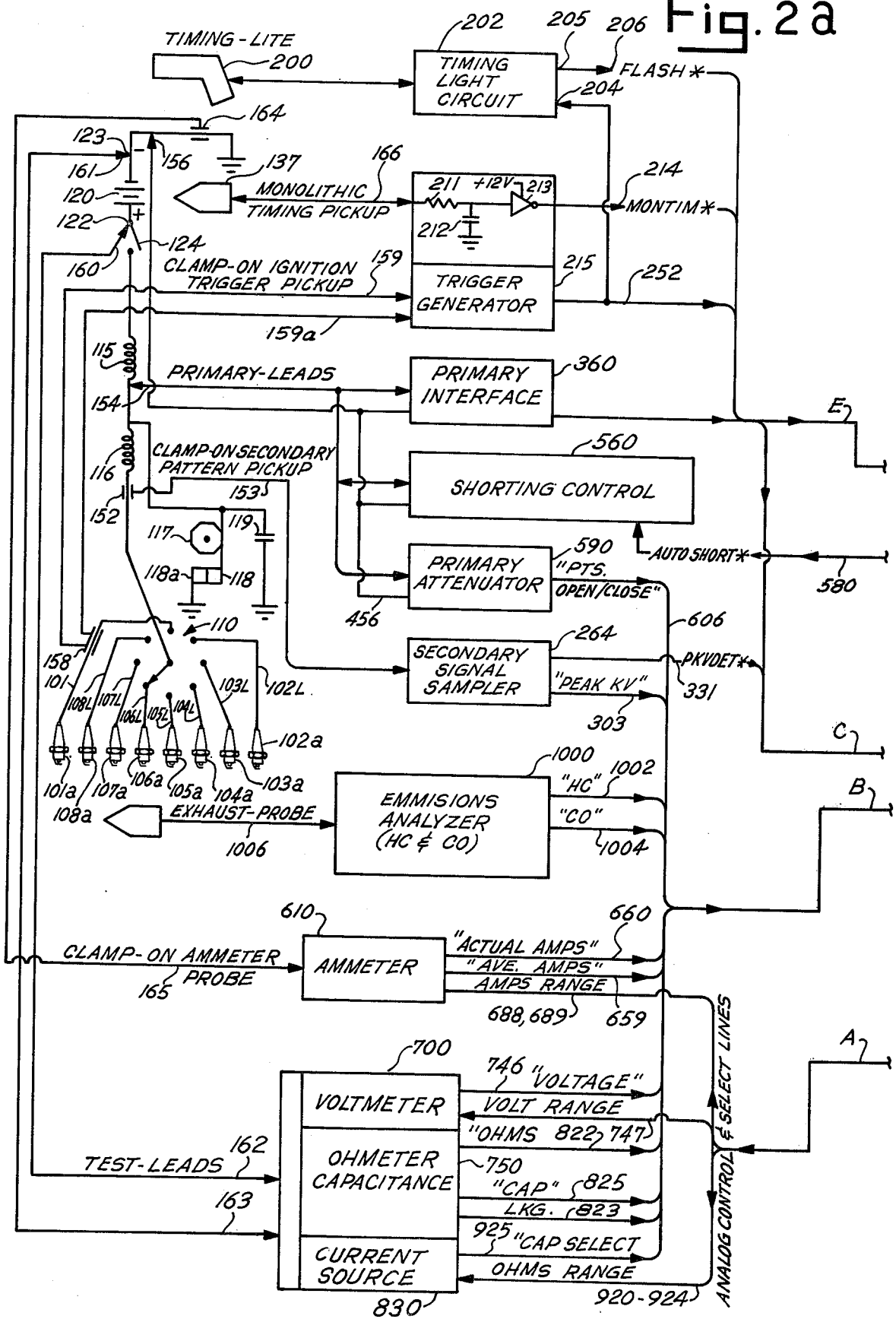

Referring to FIGS. 1, 2a and 2b, an exemplary V-8 internal combustion engine 100 can be diagnosed by the present invention. A schematic diagram of the ignition system of engine 100 is shown in FIG. 2a.

Engine 100 comprises cylinders or ignition chambers 101–108 which are fitted with spark plugs or ignitors 101a–108a. The invention also can be used with a Wankel-type engine which uses firing chambers rather than cylinders. Spark plugs 101a–108a are connected to a distributor 110 by spark plug leads 101L–108L, respectively. Distributor 110 includes a rotor 112 which distributes high voltage ignition signals to each of the spark plugs in a defined sequence. The rotor receives high voltage ignition signals from a coil assembly 114 comprising a primary coil 115 that is magnetically coupled to a secondary coil 116. Voltage signals are generated in the primary coil by a 8-sided cam 117 which is mechanically rotated in synchronism with engine 100 in order to periodically open and close contact points 118, 118a. A conventional distributor capacitor 119 is connected across contact points 118, 118a. The primary coil voltage induces in the secondary coil high voltage ignition or firing signals or pulses which fire the spark plugs sequentially.

Electrical power is supplied to the ignition system by a conventional 12 volt battery 120 having a positive terminal 122 and a negative terminal 123. An ignition switch 124 is connected in series between the battery and primary coil 115, and an alternator 125 charges battery 120.

Although engine 100 is shown with a conventional mechanical contact point ignition system, it should be understood that the present invention can be used to diagnose more sophisticated ignition systems in which electronic or semi-conductor switches are used in place of contacts 118, 118a.

Engine timing marks 130 are fixed to the block of the engine and cooperate with a damper mark 133 on the rotating engine vibration damper 132 in order to properly time the firing of the spark plugs. The engine damper also can include a slot 136, the position of which can be detected by a conventional magnetic pick-up 137 that produces a change in voltage when slot 136 moves past the location of the pick-up. Such devices are well-known in the art and need not be described in detail. Basically, they comprise an electronic circuit typically fabricated on a single or monolithic chip of silicon, and are therefore, commonly referred to as "monolithic" pick-ups.

A preferred form of the present invention which can be used to diagnose an engine of the abovedescribed type basically comprises a cable assembly 150, a case assembly 180, a display monitor 190, including a cathode ray tube (CRT) face 192, a timing light 200, a timing light circuit 202, a monolithic input circuit 210, a trigger generator 215, a secondary signal sampler 264, a primary interface circuit 360, a shorting control circuit 560, a primary attenuator 590, an ammeter circuit 610, a voltmeter circuit 700, an ohmeter-capacitance circuit 750, a current source circuit 830, a condenser leakage test circuit 950, an infra-red emissions analyzer 1000, a data processor 1090, a read-only memory 1094, a processing bus 1096, an analog control system 1100, a counting and cylinder control system 1400, a character controller 1800, a graphic controller 2130, a front panel interface circuit 2240, and a remote controller 2550.

The system can be approximately divided into the functions of (1) data acquisition, (2) acquisition control, (3) display and (4) system processing and management. The function performed by each of the basic system circuits is shown in Table A:

TABLE A

| DATA ACQUISITION | ACQUISITION CONTROL | DISPLAY | SYSTEM PROCESSING & MANAGEMENT |
| --- | --- | --- | --- |
| Cable Assembly 150 | Analog Control System 1100 | Display Monitor 190 | Data Processor 1090 |
| Timing Light 200 | Control System 1400 | Character Controller 1800 | Read-Only Memory 1094 |
| Timing Light Circuit 202 | Front Panel Interface 2240 | Graphic Controller 2130 | Processing Bus 1096 |
| Monolithic Input Circuit 210 | Remote Controller 2550 | | |
| Trigger Generator 215 | | | |
| Secondary Signal Sampler 264 | | | |
| Primary Interface 360 | | | |
| Shorting Control 560 | | | |
| Primary Attenuator 590 | | | |
| Ammeter Circuit 610 | | | |
| Voltmeter Circuit 700 | | | |
| Ohmeter-Capacitance Circuit 750 | | | |
| Current Source 830 | | | |
| Condenser Leakage Test Circuit 950 | | | |
| Emission Analyzer 1000 | | | |

In general, the preferred system made in accordance with the present invention is capable of instructing an operator how to connect and set up the system, capable of conducting area tests in order to locate a general area of malfunction, and capable of conducting pin point tests which isolate a specific difficulty within the general area of malfunction:

The instruction of the operator begins as soon as the system is turned on at the front panel. At that time, the set of written instructions appearing on CRT face 192 informs the operator to connect the cables to the engine, to properly set up the system, to calibrate various measuring devices, and to enter data relating to the engine being tested.

In the area tests, a specified sequence of testing automatically is conducted by the system in order to locate the general area of malfunction. As the operator pushes a proceed button on keyboard 184, the system automatically evaluates the engine under cranking, idle, low cruise, snap acceleration and high cruise conditions. As each area test is conducted, the critical parameters of the engine are measured and displayed on CRT face 192.

After the area tests are completed, the operator may move to any one of several pin point tests designed to locate a specific defective component within the general area of malfunction determined in the area tests. In the process of conducting the tests, the system is capable of generating data on a per cylinder or accumulated basis, as well as measuring the data on a historical basis at time intervals determined by the operator. This mode of operation is particularly useful for studying such characteristics as spark advance curves. During all of the tests, the information is conveniently displayed in alphabetic and numeric, as well as graphical form on CRT face 192.

In order to completely describe the system, the data acquisition circuits will first be discussed in detail. Then the data processor 1090 and processing bus 1096 will be described so that the mode of operation of the analog control system 1100 and the counting and cylinder control system 1400 can be understood. The display circuits will then be described in detail, followed by a discussion of the front panel interface and remote controller which enable the operator to interface with the overall system. Finally, the programmed instructions stored in read-only memory 1094, which control the overall operation of the system, will be described.

CABLE ASSEMBLY 150

Referring to FIGS. 1 and 2a, cable assembly 150 comprises a secondary pattern pick-up 152 which is a capacitive attenuator capable of reducing the high voltage signal at the secondary coil to appropriate levels that can be handled by the amplifiers of the secondary signal sampler. After the secondary signal has been attenuated by the pick-up by factor of about 213:1, the attenuated signal is transmitted to the secondary signal sampler over lead 153.

The primary signal is sampled by a primary clip 154 and a lead 155, as well as a clip 156 and a lead 157 which are connected to chassis ground.

A clamp-on trigger pick-up 158 is normally clipped around the spark plug lead for the number 1 cylinder (e.g., lead 101L) and generates signals each time the number 1 spark plug (i.e., plug 101a) is fired. The signals are transmitted through conductors 159, 159a to the trigger generator.

During area tests, test clips 160, 161, which conduct signals through leads 162 and 163, respectively, are normally connected to the battery with the polarity shown. However, the leads can be used to measure voltage drops across any two points in the automotive system, and the leads also are used for conducting ohmeter and coil/condenser tests.

An ammeter probe 164 is normally connected around one lead of battery 120. The probe is a Hall-effect transducer that can be used to sense the fluctuations in the dc currect flowing into or out of the battery. The probe has a polarity indicator which is necessary to determine the direction of current flow. Such devices are well-known in the art and need not be described in detail. The signal generated by the ammeter probe is conducted to the ammeter circuit by lead 165.

A lead 166 is connected from the monolithic timing pick-up 137 to the monolithic input circuit 210.

CASE ASSEMBLY 180

Referring to FIG. 1, case assembly 180 comprises a front panel 182 that includes a keyboard 184 for reading the digits 0–9 into the system. The panel also includes a control switch assembly 186 which performs various input control functions.

The case assembly is fitted around a conventional display monitor 190, such as Model XM-702-72 manufactured by Motorola Corp., Chicago, Ill. The monitor has a cathode ray tube with a display face 192, for displaying data in alphabetic, numeric or graphical form.

TIMING LIGHT 200 AND TIMING LIGHT CIRCUIT 202

Referring to FIG. 2a, timing light 200 is a conventional device for producing a brilliant flash of light in order to illuminate the timing marks on engine 100. Such devices are well-known in the art and need not be described in detail.

Timing light circuit 202 contains an adjustable delay circuit which flashes the light and generates a FLASH* pulse after an ENG. SYNC* pulse is received at input 204. The operator adjusts the amount of delay in the delay circuit until the flash occurs as timing mark 133 coincides with the 0 advance or top-dead-center line of marks 130. Such circuitry is well-known in the art and need not be described in detail. One circuit is described in U.S. Pat. No. 3,368,143.

MONOLITHIC INPUT CIRCUIT 210

Monolithic input circuit 210 comprises a resistor 211, a capacitor 212, an inverting amplifier 213, and an output conductor 214, connected as shown. (FIG. 2a).

TRIGGER GENERATOR 215

Trigger Generator 215 is used to generate an ENG. SYNC* pulse at the time the no. 1 cylinder of the engine is fired. (Throughout this speciifcation, an asterisk (*) is used to identify the inverse or complement of a pulse or signal identified without an asterisk.)

Figure 3:
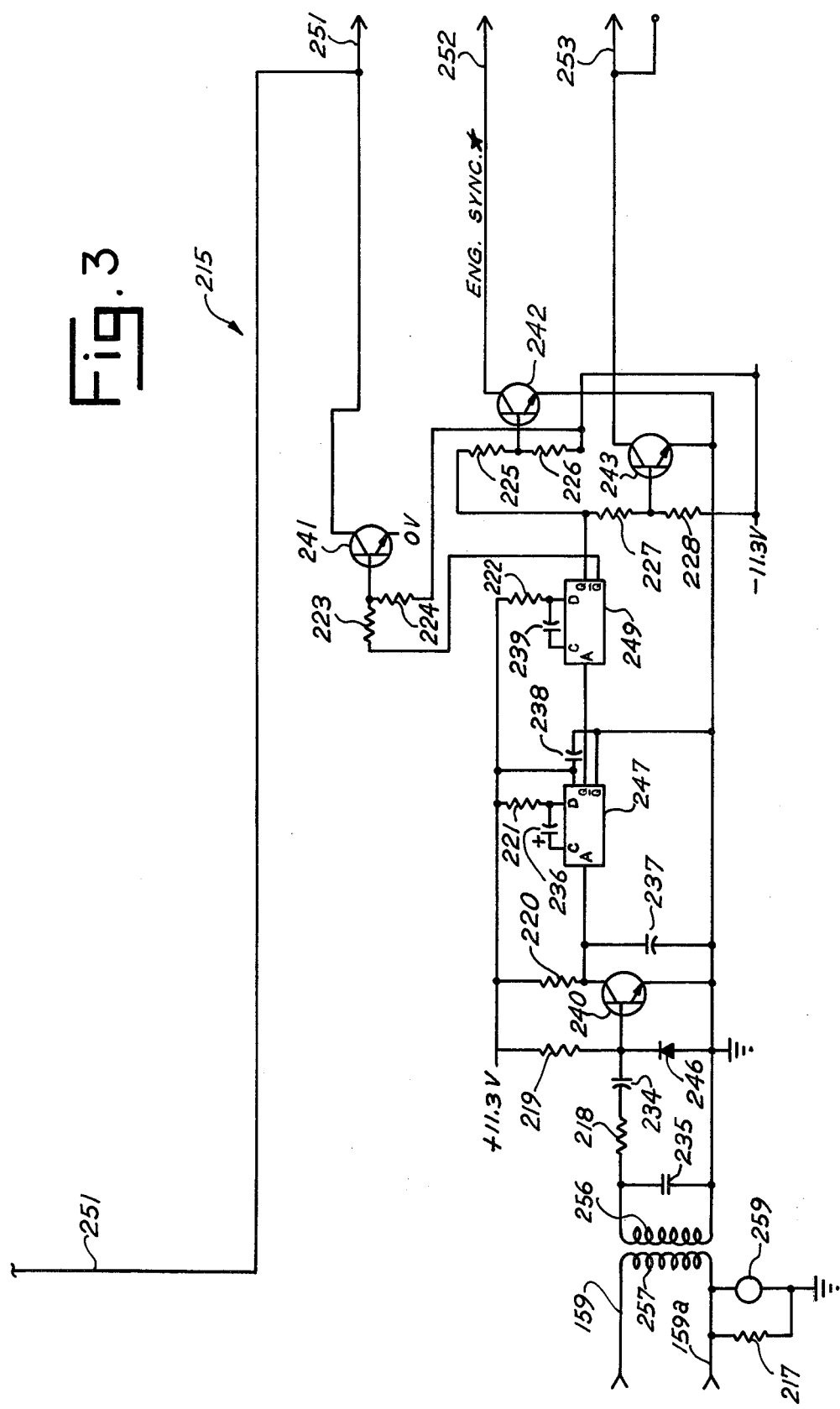
FIG. 3 is a schematic diagram of a preferred form of trigger generator made in accordance with the present invention.

Referring to FIG. 3, the trigger generator comprises resistors 217–228, capacitors 234–239, transistors 240–243 and a diode 246, connected as shown. A 9 millisecond one-shot multivibrator 247 and a 1.3 millisecond one-shot multivibrator 249 are used to suppress noise which may be picked up on the input in the trigger generator. Output conductor 251 provides an ENG. SYNC pulse when spark plug 101a is fired, and output conductors 252–253 each provide an ENG. SYNC* pulse which is the complement of the ENG. SYNC pulse. An output lead 254 is connected to the primary interface circuit. Transformer coils 256, 257 provide an input signal from trigger pick-up 158, and over voltage protection is provided by a varactor 259.

SECONDARY SIGNAL SAMPLER 264

Secondary signal sampler 264 produces an output voltage proportional to the peak secondary voltage which can be sampled by analog system 1100.

Figure 4:
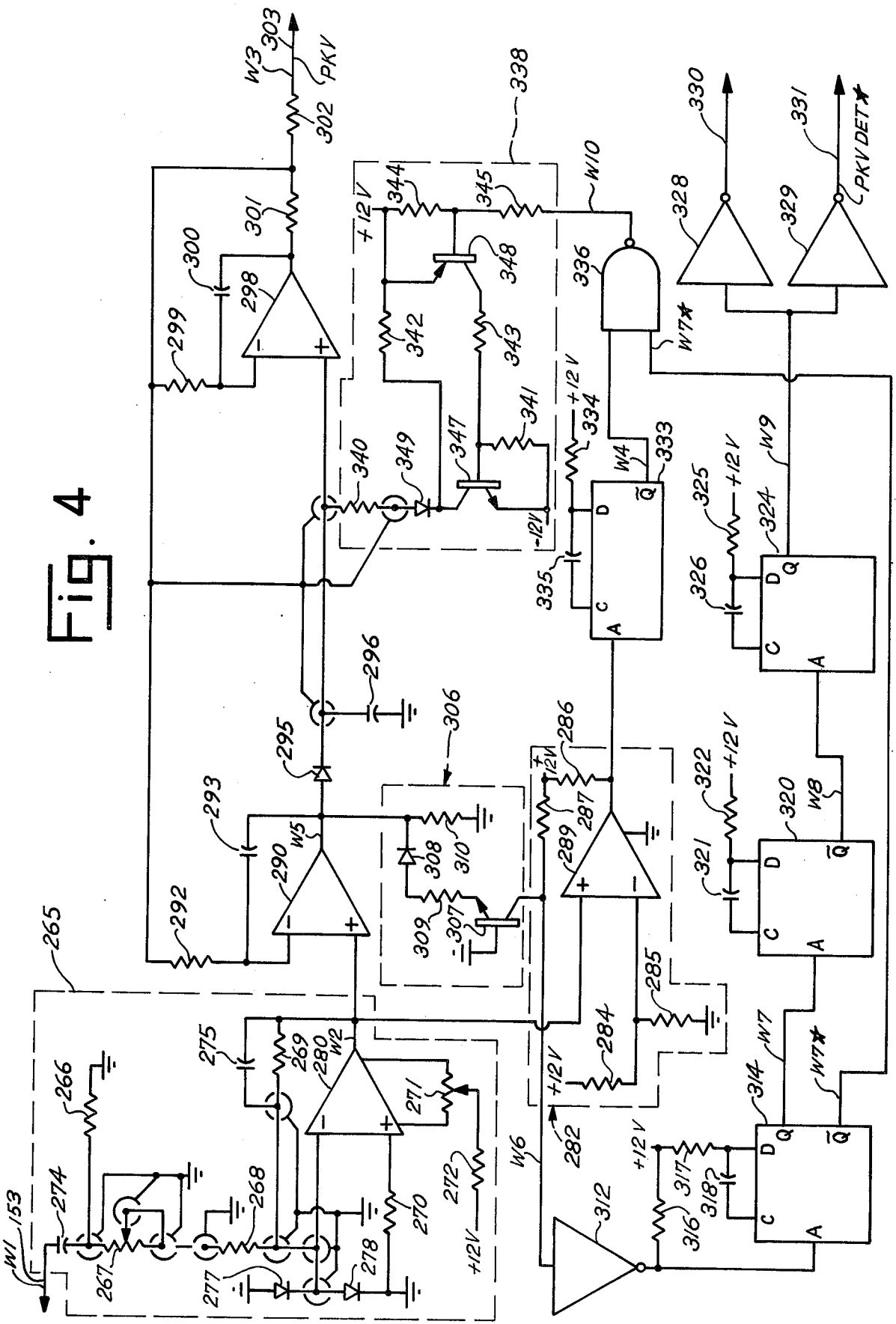
FIG. 4 is a schematic diagram of a preferred form of secondary signal sampler made in accordance with the present invention.

Referring to FIG. 4, the secondary signal sampler comprises input circuitry 265 which includes resistors 266–272, capacitors 274–275, diodes 277–278 and inverting amplifier 280. A threshold detector 282 comprises resistors 284–287 and an amplifier 289, and a driver amplifier 290 is controlled by a feedback resistor 292 and a capacitor 293. A diode 295 allows a storage capacitor 296 to charge to a positive voltage, but prevents the capacitor from discharging in the opposite direction.

Sampler 264 also comprises an output buffer amplifier 298 that is controlled by a feedback resistor 299 and a feedback capacitor 300. The output signal from amplifier 298 is coupled through resistors 301 and 302 to an output conductor 303.

A cross over detector 306 comprising a transistor 307, a diode 308 and resistors 309, 310 provides an output signal which operates through an inverting amplifier 312 in order to switch the output state of a paralysis one-shot multivibrator 314 that is controlled by resistors 316, 317, as well as a capacitor 318. The period of one-shot 314 is approximately 700 microseconds. The Q output of one-shot 314 switches a time delay one-shot 320 which is controlled by a capacitor 321 and a resistor 322 to produce a pulse having a duration of about 70 microseconds. The $\overline{Q}$ output of one-shot 320 switches the state of a sample pulse one-shot multivibrator 324 which is controlled by a resistor 325 and a capacitor 326 to produce a pulse having a duration of about 70 microseconds.

Sampler 264 also includes inverters 328, 329 which have their outputs connected to leads 330, 331, respectively.

A store one-shot multivibrator 333 is controlled by a resistor 334 and a capacitor 335 to produce an output pulse having a duration of about 300 microseconds.

A NAND gate 336 controls a store-dump circuit 338 comprising resistors 340–345, transistors 347–348 and a diode 349, all of which enable the charging or discharging of capacitor 296.

Referring to FIGS. 4 and 4a, secondary signal sampler 264 operates in the following manner:

Waveforms W1–W10 in FIG. 4a represent the voltage waveforms occurring at the like-lettered points of the circuit shown in FIG. 4. The vertical axis represents volts and the horizontal axis represents time.

W1 represents a fragmentary and somewhat idealized voltage waveform generated by secondary coil 116. The line of waveform W1 form P1 to P2 represents the firing line voltage transmitted to a spark plug in order to fire the plug when points 118, 118a open. Point P2 represents the peak voltage across the plug and the point in time at which current begins to flow across the plug gap. A small oscillation, P3, may occur as current begins to flow across the plug gap. P4 represents the "steady-state" spark line during which current continues to flow across the plug gap.

Amplifier 280 responds to waveform W1 in the manner shown by waveform W2. While the firing voltage is building up across the spark plug, voltage on the output of amplifier 280 increases from approximately 0 volts to the voltage shown at P2'. As the voltage increases, it crosses a threshold level VTH which causes the $\overline{Q}$ output of one-shot 333 to switch to its 0 state (waveform W4). As the voltage of waveform W2 is increasing from 0 volts to voltage P2', diode 295 is forward biased so that capacitor 296 is charged to a positive voltage. This voltage is fed back from the output of amplifier 298 through resistors 301 and 292 to the inverting input of amplifier 290. Due to the feed back arrangement, the output voltage of amplifier 298 has the waveform shown at W3 in FIG. 4a. Waveform W3 is referred to as the PKV signal in other parts of this specification.

As soon as waveform W2 passes peak voltage P2', diode 295 is reversed biased, and the output voltage of amplifier 290 rapidly decreases to a voltage P6 below 0 volts. This causes the output of crossover detector 306 to switch to its 0 state as shown at point P7 of waveform W6. Waveform W6 remains in its 0 state for approximately 700 microseconds. When waveform W6 is switched to its 0 state at point P7, the Q output of paralysis one-shot 314 is switched to its one state (waveform W7 at point P8), and the $\overline{Q}$ output of paralysis one-shot 314 is switched to its one state (waveform W7* at point P9). At this same time, the Q output of delay one-shot 320 is switched to its 0 state (waveform W8 at point P10) for about 70 microseconds.

When waveform W8 returns to its one state at point P11, the Q output of sample pulse one-shot 324 is switched to its one state at point P12 (waveform W9) and stays in its one state for about 70 microseconds. As long as either waveform W4 or waveform W7* is in its 0 state, the output of NAND gate 336 is switched to its 1 state (waveform W10). During this time period between points P13 and P14, transistor 348 is switched to its conductive state and transistor 347 is switched to its none-conductive state, so that capacitor 296 can store a positive voltage. As soon as the output of NAND gate 336 returns to its 0 state at time P14, transistor 347 is switched to its conductive state so that capacitor 296 is rapidly discharged.

The discharge of capacitor 296 returns waveform W3 to its initial state, thereby preparing the circuitry for another cycle of operation. As will be explained in more detail later, the time period between points P12 and P15 (waveform W9) defines a sampling period during which the maximum amplitude of the secondary waveform W1 can be sampled on conductor 303. Waveform W9 is referred to as the PKV RET signal in other parts of this specification.

PRIMARY INTERFACE 360

Primary interface circuit 360 generates a DELAYED DWELL* pulse having a duration proportional to the time contact points 118, 118a when closed.

Figure 5:
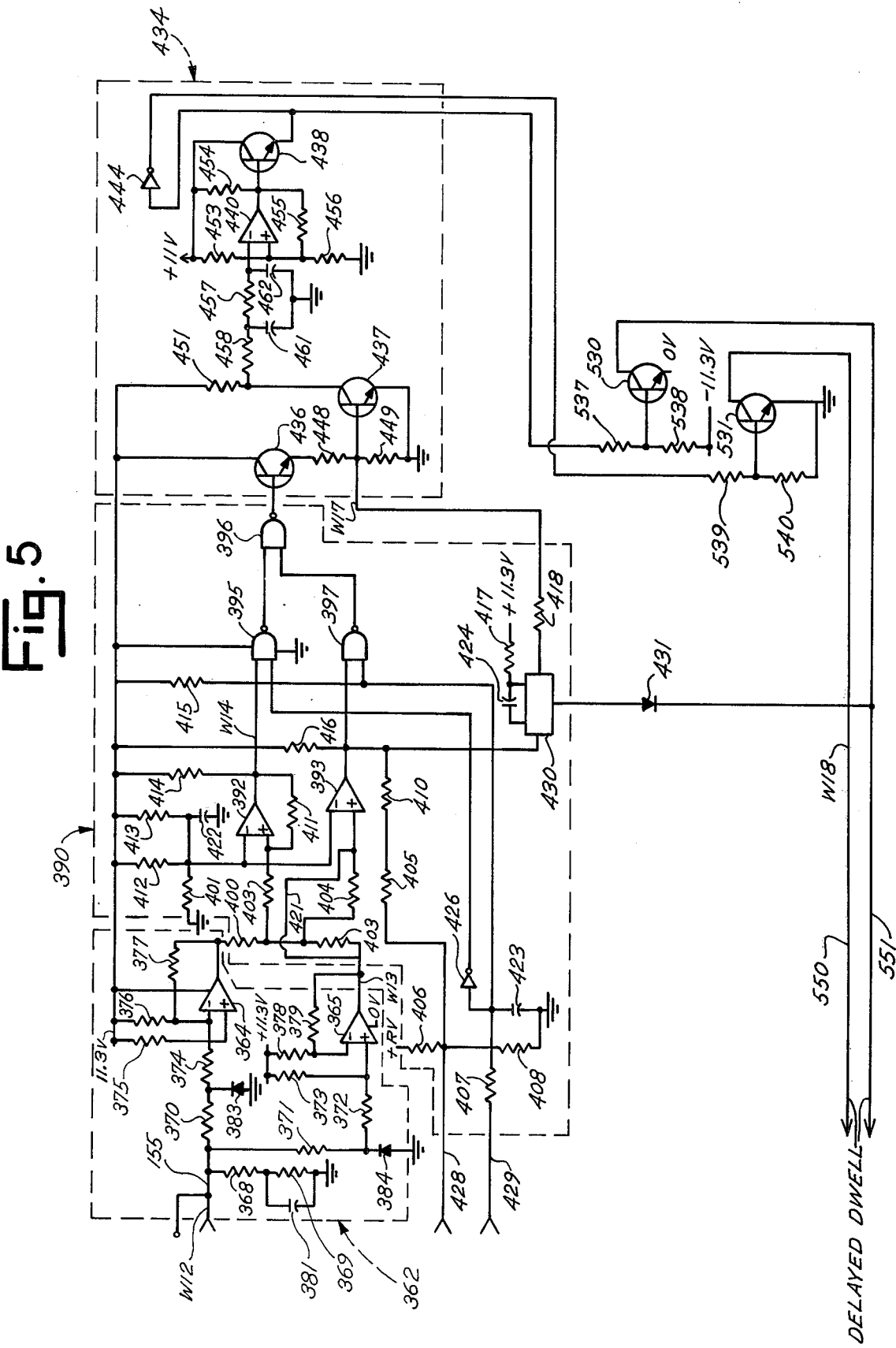
FIG. 5 is a schematic diagram of a preferred form of primary-secondary interface circuit made in accordance with the present invention.

Referring to FIG. 5, circuit 360 includes an input circuit 362 capable of conditioning signals from a positive or negative grounded battery system. Circuitry 362 comprises operational amplifiers 364, 365, each connected as a comparator circuit, as well as resistors 368–379, a capacitor 381 and diodes 383, 384, connected as shown. A conditioning circuit 390 processes signals from conventional as well as high energy ignition circuits by means of operational amplifiers 392, 393, respectively, each of which is connected as a comparator circuit. The conditioning circuit also includes NAND gates 395–397, resistors 400–418, capacitors 421–424, an inverter 426, input conductors 428, 429, and a one-shot multivibrator 430 connected to a diode 431.

A stretching and delay circuit 434 includes transistors 436–438, an operational amplifier 440 connected as a comparator circuit, an inverter 444, resistors 448, 449, 451, 453–458, and capacitors 461–462, all connected as shown.

Driver transistors 530–531 amplify the signals conducted to output conductors 550–551. The transistors are biased by resistors 537–540.

Primary interface circuit 360 is basically used to condition the signals received from engine 100 in order to provide a DELAYED DWELL* pulse.

Figure 5A:
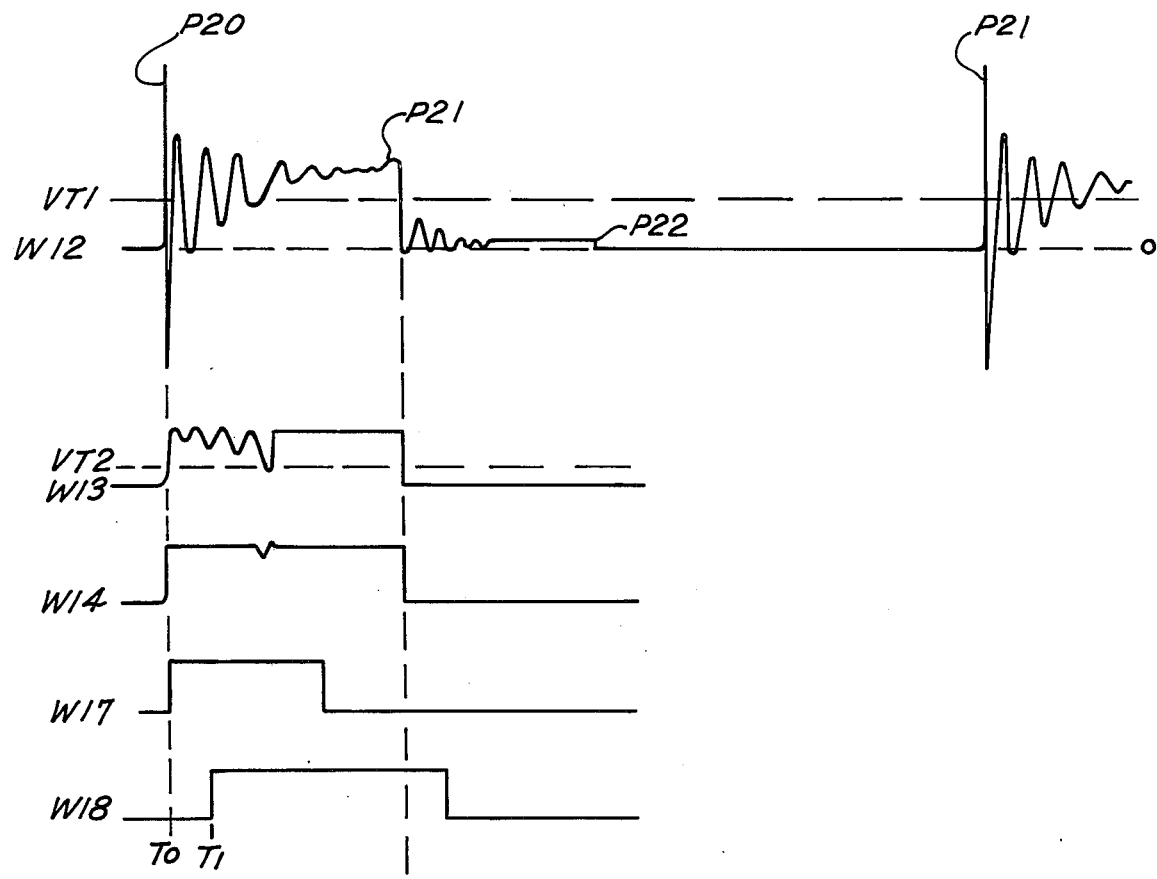
FIG. 5a illustrates exemplary voltage waveforms generated by the signal sampler shown in FIG. 5.

Referring to FIGS. 5 and 5a, the primary interface circuit 360 operates as follows:

Waveform W12 illustrates an exemplary primary voltage waveform of the type received on conductor 155 from primary coil 115. Waveform W12 includes a firing line P20 generated at the time contact points 118, 118a open in order to fire a spark plug. The line between points P20 and P21 on waveform W12 indicates the time period during which current is gapping across the spark plug. At point P22, contact points 118, 118a close in order to initiate the dwell portion of the ignition cycle. The dwell portion ends at point P21 when the contact points again open in order to fire another spark plug.

Operational amplifiers 364 and 365 are arranged to accommodate either a negative battery or positive battery ignition system, respectively. The amplifiers from input primary signal W12 remove many of the oscillations by means of a comparator technique. For example, the inverting input of operational amplifier 365 may be biased approximately at voltage VT1 (waveform W12). In response to this operation, the output of operational amplifier 365 produces voltage waveform W13.

Operational amplifiers 392 and 393 apply the same comparator technique as amplifiers 364 and 365 in order to convert waveform W13 into a signal more nearly resembling a pulse, such as voltage waveform W14. In order to achieve this result, the inverting input of operational amplifier 392 can be set at approximately VT2 volts (waveform W13). In this mode of operation, operational amplifier 392 produces an output voltage waveform W14 which closely resembles a pulse of the type useful for the data processing apparatus described later.

Operational amplifier 393 is used in connection with so-called high energy ignition (HEI) systems that produce higher voltages than conventional ignition systems. As a result, operational amplifier 393 is less sensitive than operational amplifier 392.

The output of amplifier 393 is connected to the input of one-shot 430 in order to produce an output voltage waveform W17. This voltage is used as a noise blanking signal in order to produce a more nearly uniform pulse at the input of stretching and delay circuit 434.

Monostable multivibrator 430 produces a pulse having a duration of approximately 1 millisecond. It has been found that a multivibrator of this type is needed in connection with certain models of vehicle ignition systems which have a particularly long dwell time period.

NAND gates 395-397 select either the output of amplifier 392 or the output of amplifier 393 for conduction to circuit 434 depending on the state of conductor 429 which is operated from a switch on front panel 182. The switch is set by the operator depending on whether a conventional system or a special high energy ignition system is used in the vehicle being tested. (See FIG. 17a).

The output of transistor 436 is amplified by a transistor 437 and is delayed by a filter and delay circuit comprising resistors 457, 458 and capacitors 461, 462. The delay circuit delays the leading and trailing edges of voltage waveform W14 by approximately 600 microseconds in order to produce a voltage waveform W18. This voltage is amplified by operational amplifier 440 and transistor 438. After being conditioned by inverter 444 and additional driver transistors 530, 531, the waveform and its inverse are transmitted over output conductors 550 and 551 as DELAYED DWELL and DELAYED DWELL* pulses, respectively.

SHORTING CONTROL CIRCUIT 560

Figure 6:
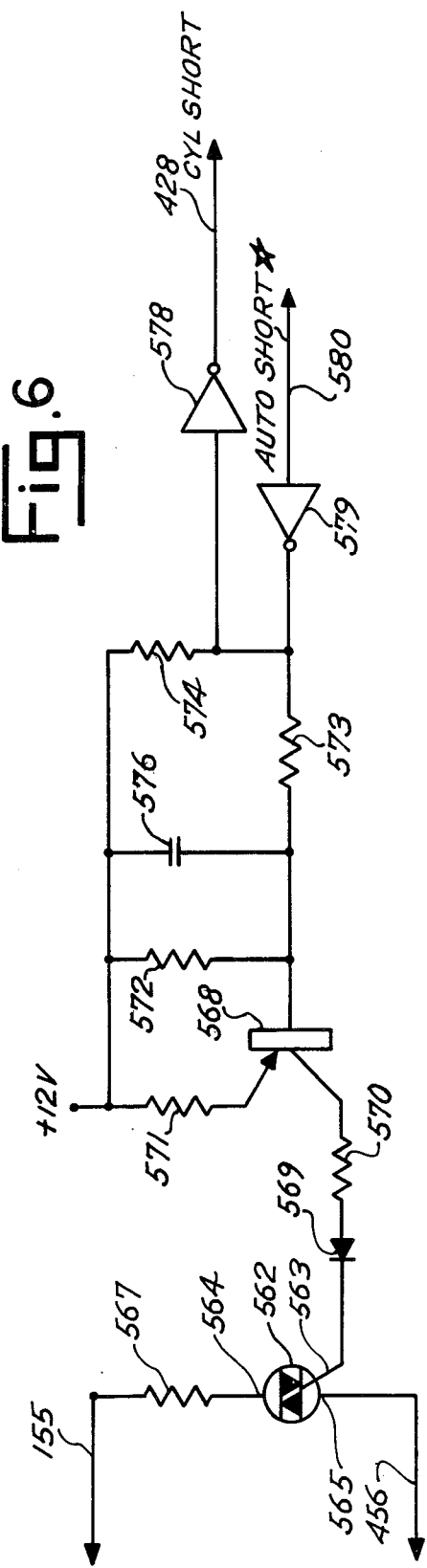
FIG. 6 is a schematic diagram of a preferred form of shorting control circuit made in accordance with the invention.

Referring to FIG. 6, shorting control circuit 560 comprises a triac 562 having a gate 563 and current conducting terminals 564, 565. The triac is connected in series with a resistor 567. Gate 563 is driven by a transistor 568, as well as a diode 569, resistors 570-574 and a capacitor 576. Inverters 578, 579 provide the various signals with proper polarity. Triac 562 is switched to its conductive state whenever the signal on conductor 580 is switched to its logical 1 state (i.e., whenever a positive AUTO SHORT* is received). Whenever triac 562 is switched to its conductive state, contacts 118, 118a are shorted to ground (except for the low resistance of resistor 567 and triac 562), and the primary and secondary coils are prevented from firing any spark plugs.

PRIMARY ATTENUATOR 590

Figure 7:
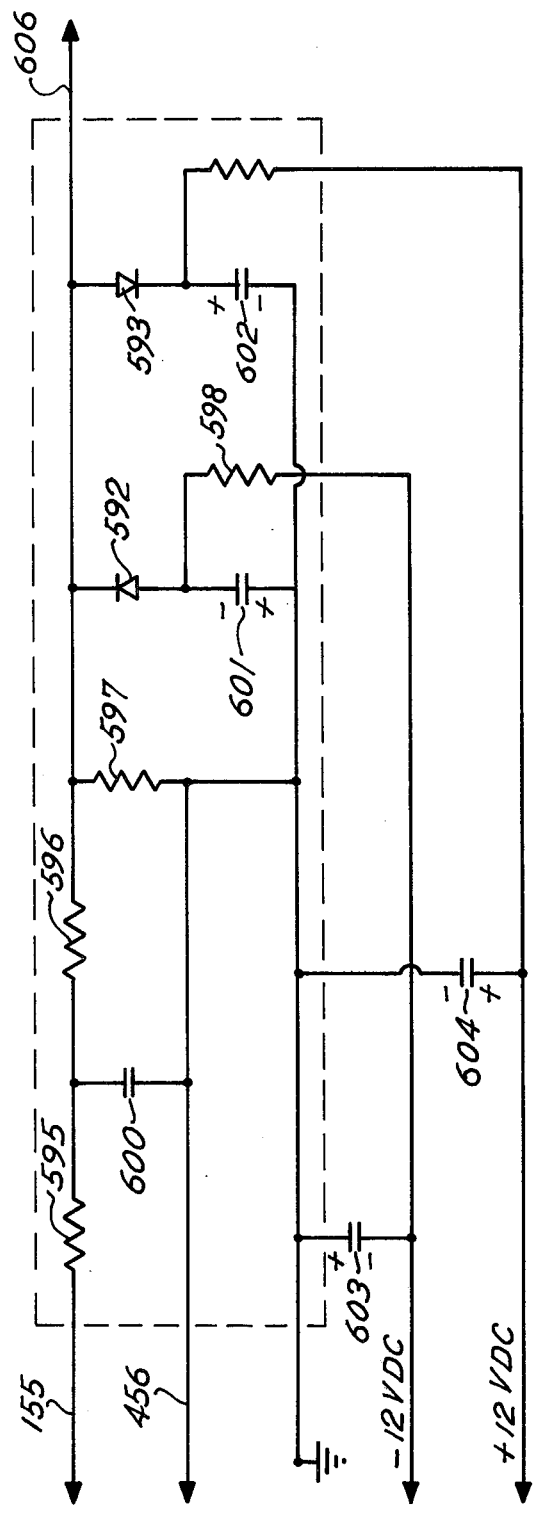
FIG. 7 is a schematic diagram of a preferred form of primary attenuator circuit made in accordance with the present invention.

Referring to FIG. 7, primary attenuator 590 comprises diodes 592, 593, resistors 595-598 and capacitors 600-604, connected as shown. The circuitry filters and clips the primary signal generated by primary coil 115, and provides an input to analog system 1100.

AMMETER CIRCUIT 610

Ammeter Circuit 610 provides output signals proportional to the average amperes and instantaneous amperes flowing through any test wire associated with engine 100, such as the battery cable. The circuit can be automatically ranged and zeroed by the analog system 1100 and data processor.

Figure 8:
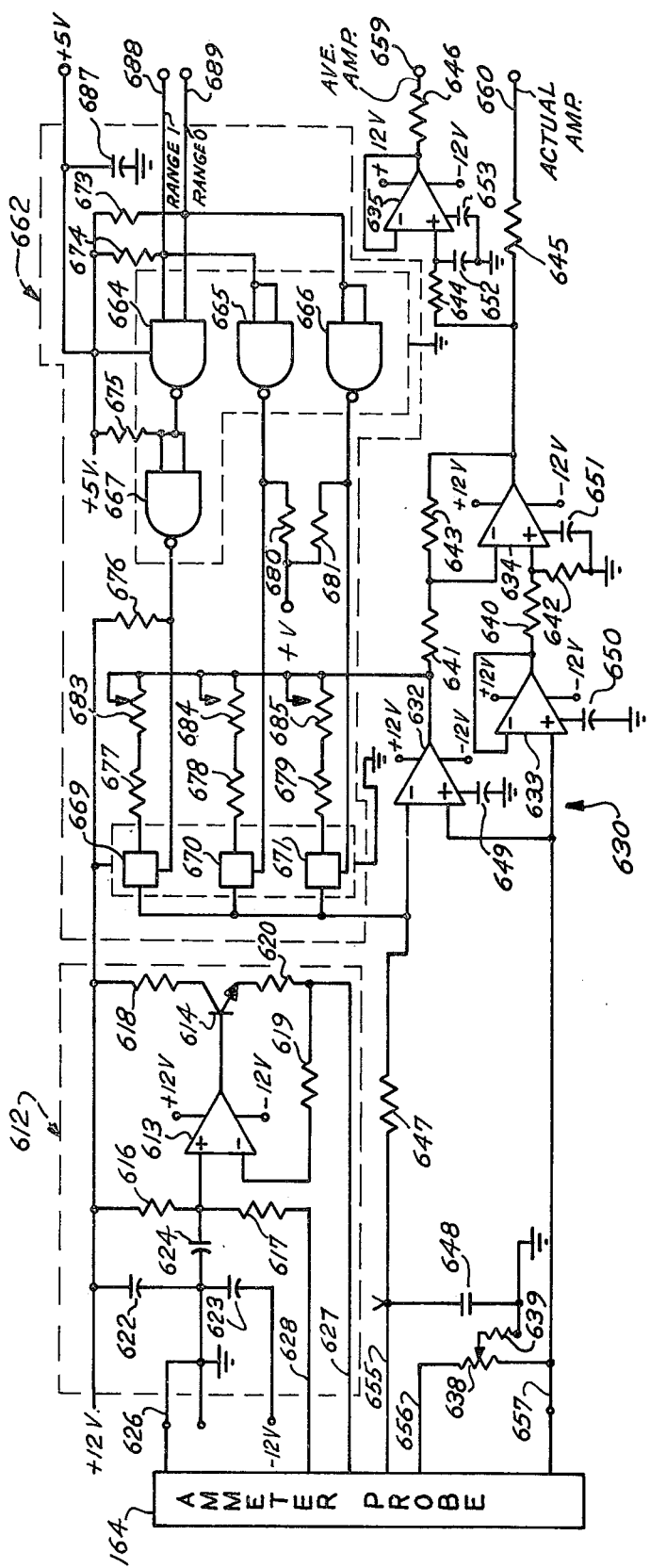
FIG. 8 is a schematic diagram of an ammeter circuit made in accordance with the present invention.

Referring to FIG. 8, ammeter circuit 610 basically comprises a bias circuit 612, a differential amplifier circuit 630 and a range circuit 662.

Bias circuit 612 comprises an operational amplifier 613, a transistor 614, resistors 616-620, and capacitors 622-624, all connected as shown. The components are arranged to provide a constant voltage for ammeter probe 164 through conductor 627. A feedback signal is returned from ammeter probe 164 over conductor 628.

Ammeter probe 164 incorporates a Hall-effect generator which produces a fluctuating dc voltage between conductors 655 and 657 which is proportional to the instantaneous flux density of the field surrounding the wire around which the probe is placed. The flux density, in turn, is proportional to the current flowing through the wire. One such probe is manufactured by Sun Electric Corp., Chicago, Ill., under part number 6005-0133. The voltage difference is measured by differential amplifier circuit 630 by the use of operational amplifiers 632-635, resistors 638-647 and capacitors 648-653. Conductor 656, resistor 639 and potentiometer 638 serve as zero adjustment elemnents to compensate for the offset of the Hall-effect generator.

On output conductor 659, the differential amplifier circuit provides a voltage having an amplitude proportional to the average current flowing through the test wire; on output conductor 660, the differential amplifier circuit provides a voltage having an amplitude proportional to the instantaneous or actual value of the current flowing through the test wire. The circuitry relating to operational amplifiers 632-634 has a relatively rapid time constant so that rapid dc fluctuations in the current flowing through the test wire result in corresponding fluctuations of the voltage on output conductor 660. The circuitry associated with operational amplifier 635 includes additional filtering and a longer time constant so that the voltage appearing on output conductor 669 is proportional to the average current fluctuation in the test wire.

The sensitivity of differential amplifier circuit 630 is controlled by range circuit 662 which includes NAND gates 664–667, switching gates 669–671, resistors 673–681, potentiometers 683–685 and a capacitor 687. The value of the resistance in the feedback circuit of operational amplifier 632 is controlled by the conductive state of gate switches 669–671. These gate switches, in turn, are controlled by the logical state of the range adjustment signals appearing on range 1 control conductor 688 and range 0 control conductor 689.

VOLTMETER CIRCUIT 700

Figure 9:
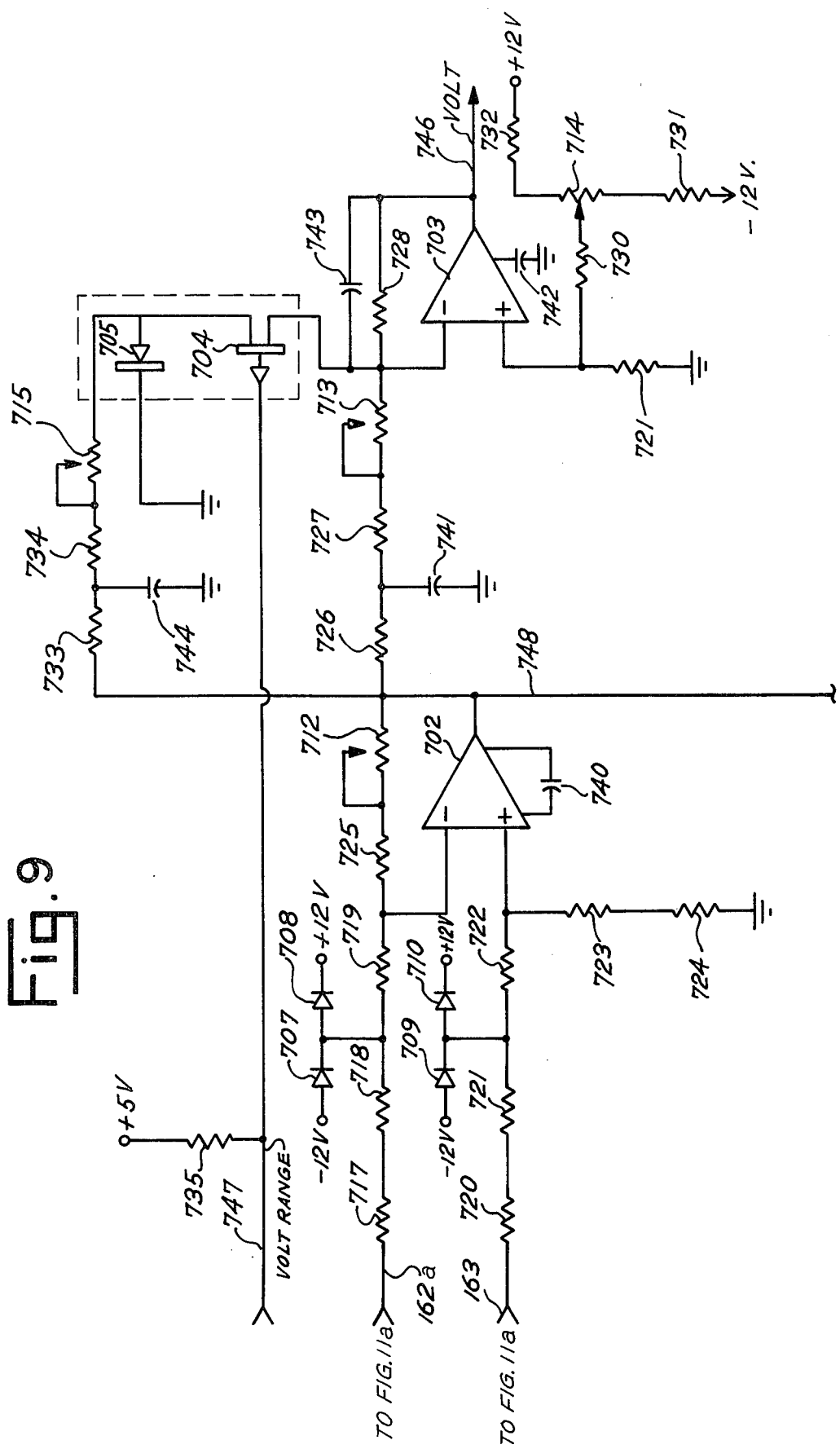
FIG. 9 is a schematic diagram of a voltmeter circuit made in accordance with the invention.

Referring to FIG. 9, voltmeter circuit 700 produces on an output conductor 746 a voltage signal having an amplitude proportional to the voltage across test leads 162, 163. The circuit can be automatically ranged by analog system 1100 and the data processor.

Circuit 700 includes operational amplifiers 702, 703 and a field effect transistor 704, as well as a protection diode 705. The circuit also includes potentiometers 712–715, resistors 717–735, and capacitors 740–744, all connected as shown.

The gain of amplifier 703 is adjusted by changing the logic state of the signal on input conductor 747. If small voltages are being measured, the range adjustment signal on conductor 747 is switched to its logical 0 state which turns on field effect transistor 704 so that the gain of amplifier 703 is increased. If larger voltages are being measured, the range signal on conductor 747 is switched to its logical 1 state so that the field effect transistor 704 is switched to its non-conductive state, thereby decreasing the gain of amplifier 703. An output conductor 748 transmits a signal to ohmeter-capacitance circuit 750.

OHMETER-CAPACITANCE CIRCUIT 750

Ohmeter-capacitance circuit 750 is used to provide a voltage signal on output conductors 822 and 825 which is proportional to the resistance or capacitance, respectively across which test leads 162 and 163 are placed. Referring to FIG. 10, circuit 750 includes operational amplifiers 752–757 and a one-shot multivibrator 759. NAND gates 760, 761 perform logical switching and additional switching functions are performed by transistors 763–765. The circuit also includes diodes 767–773, resistors 775–805, potentiometers 807–810 and capacitors 811–819. An input conductor 820 provides a switching signal whenever the circuit is intended to measure the value of a capacitor.

CURRENT SOURCE CIRCUIT 830

Figure 11:
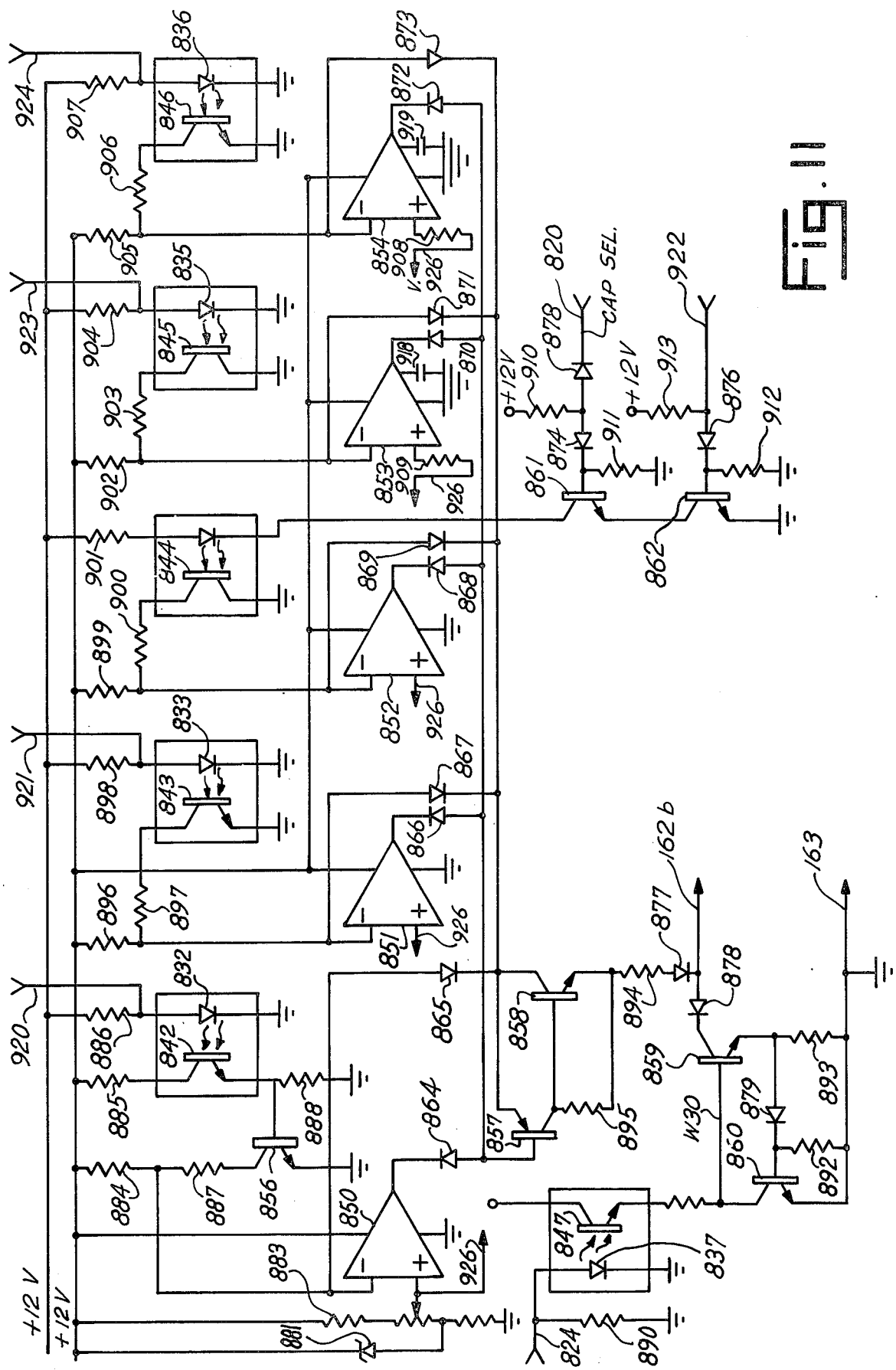
FIG. 11 is a schematic block diagram of a preferred form of a current source circuit made in accordance with the present invention.

Current is supplied to test leads 162, 163 for use by the ohmeter-capacitance circuit by means of a current source circuit 830 (FIG. 11). Circuit 830 includes light-emitting diodes 823–837 which are capable of switching photosensitive transistors 842–847, respectively. The circuit also includes operational amplifiers 850–854, transistors 856–862, switching diodes 864–879, a Zener diode 881, resistors 883–913, an adjustable potentiometer 916, capacitors 918–919, and a connecting conductor 926. The amount of current conducted by circuit 832 to test leads 162, 163 is determined by the logical state of an Ohm range 0 conductor 920, an Ohm range 1 conductor 921, an Ohm range 2 conductor 922, an Ohm range 3 conductor 923, an Ohm range 4 conductor 924 and a capacitor select conductor 820.

The circuitry described in FIGS. 10 and 11 operates as follows:

In order to measure the resistance placed across test leads 162, 163, one of input conductors 920–924 is switched to its logical 0 state, depending on the value of the resistor being measured. An appropriate current is then supplied to test leads 162, 163 so that a sufficient voltage is developed across the test leads. This voltage is amplified by operational amplifiers 702 (FIG. 9), 752 and 753 (FIG. 10). As a result, a voltage is produced on output conductor 822 which has a magnitude proportional to the resistance between test leads 162, 163.

Figure 10A:
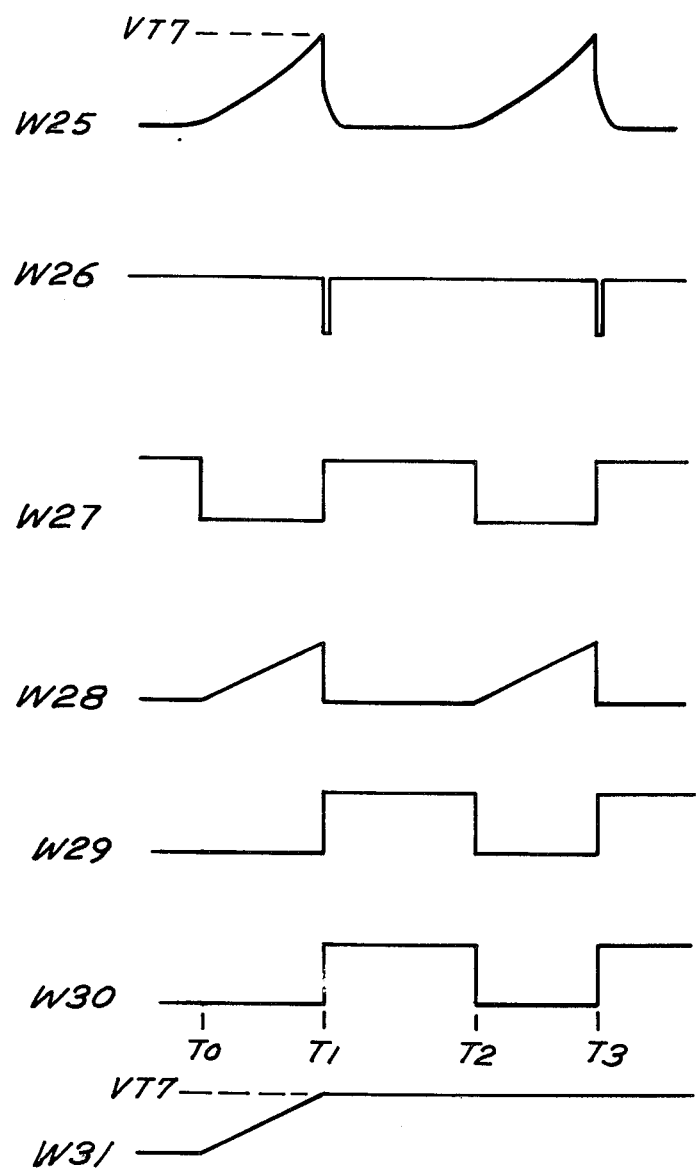
FIG. 10a illustrates exemplary voltage waveforms generated by the circuitry shown in FIG. 10.

When the value of the capacitor placed across leads 162, 163 is to be determined, capacitance select conductor 820 is switched to its logical 0 state at time T0 (FIG. 10a). At that time, the collector of transistor 763 is already at its 0 state (waveform W29 — FIG. 10a), and the base of transistor 859 (FIG. 11) is already at its 0 state (waveform W30 — FIG. 10a) so that transistor 859 is in its non-conductive state, thereby allowing the test capacitor connected across test leads 162, 163 to draw current and to store charge. The increase in voltage across the capacitor due to charge storage is amplified by amplifiers 702 and 752 in order to produce voltage waveform W25 (FIG. 10a). When voltage waveform W25 is increased to voltage level VT7 (i.e., at time T1), the output of comparator 754 is switched to its 0 state (waveform W26) so that the output of one-shot multivibrator 759 (waveform W27) is switched to its one state.

Between times T0 and T1, amplifier 755 is operated as an integrator in order to produce voltage waveform W28. At time T1, transistor 765 is switched to its conductive state by the output of multivibrator 759 so that voltage waveform W28 is returned to a low value. Also at time T1, the voltage waveform W29 on output conductor 824 is switched to its one state, thereby causing transistor 859 (FIG. 11) to switch to its conductive state. At time T1, the test capacitor connected between leads 162, 163 discharges through diode 878, transistor 859, resistor 893, diode 879 and resistor 892 so that voltage waveform W25 decays to a low value.

At time T2, the output of multivibrator 759 automatically returns to its 0 state so that transistor 859 is switched to its non-conductive state, thereby allowing the test capacitor to charge. As a result, the circuitry produces the waveforms as shown in FIG. 10a between time periods T2 and T3 which are analogous to the same voltages produced during time period T0 to T1.

The peak value of voltage waveform W28 is proportional to the capacitance of the test capacitor. Operational amplifier 756 and diode 773 cooperate in order to store the peak value of waveform W28 at the inverting input of amplifier 756. The peak value signal is filtered by a network comprising resistors 796–799 and capacitors 817–818. The signal is then impedance matched to output conductor 825 by a buffer amplifier 757. The peak value of the signal produced by the buffer amplifier, (voltage waveform W31) is proportional to the capacitance of the test capacitor.

CONDENSER LEAKAGE TEST CIRCUIT 950

Figure 11A:
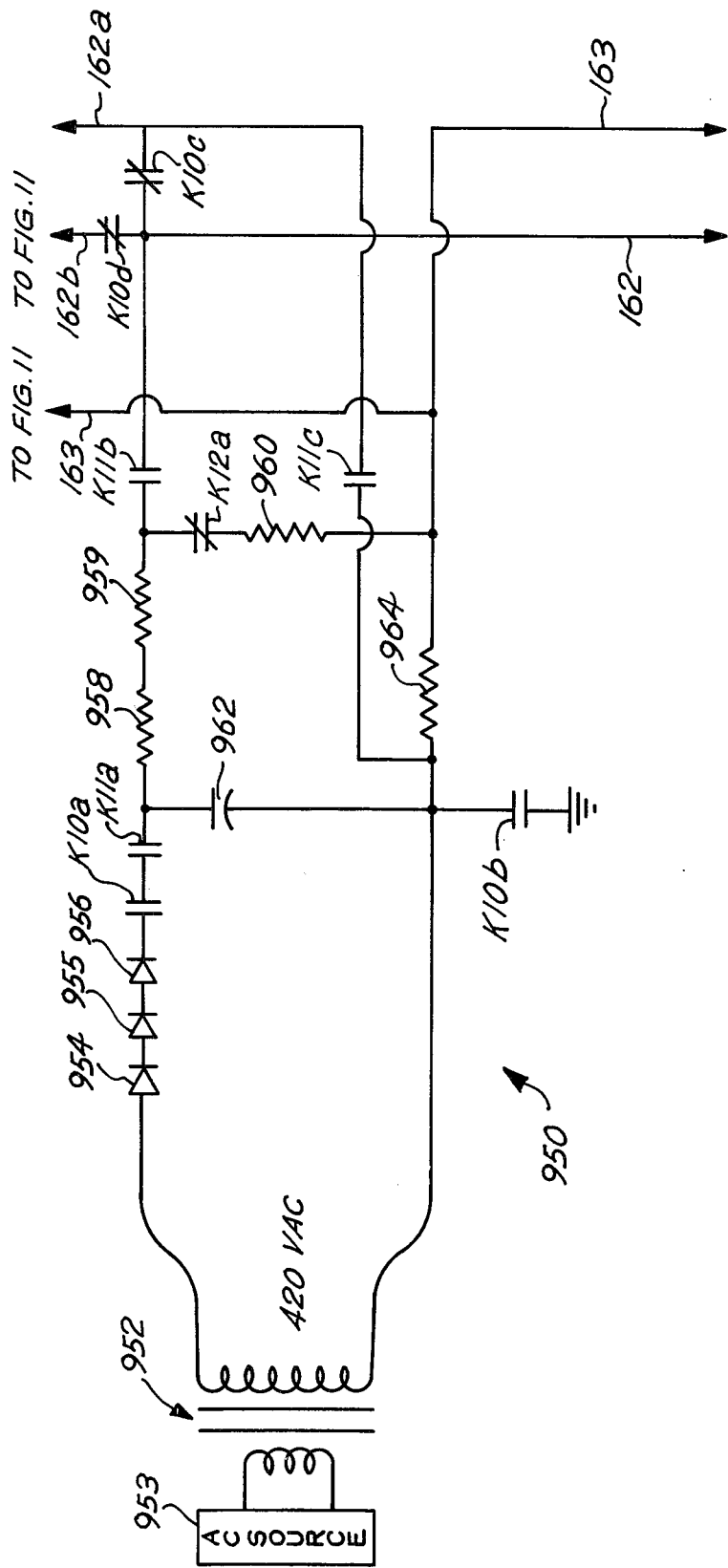
FIG. 11a is a schematic diagram of a condenser leakage tester circuit made in accordance with the present invention.

Referring to FIG. 11a, condenser leakage test circuit 950 comprises a step-up transformer 952 which increases the voltage of a 117 volt AC source 952 to approximately 420 volts AC. The circuit also includes diodes 954–956, resistors 958–960, a capacitor 962 and a leakage current resistor 964. Normally open relay contacts K10a, K10b and normally closed relay contacts K10c, K10d are operated by a relay coil K10 (FIG. 12a); normally open relay contacts K11a, K11b and k11c are operated by a relay coil K11 (FIG. 12a)

and normally closed relay contacts K12a are operated by a relay coil K12 (FIG. 12a).

During a capacitor leakage test, leads 162, 163 are placed across a condenser which is being tested. In response to the depression of a HIGH-VOLTAGE switch on front panel 182, circuit 950 applies a high voltage to output test leads 162, 163. Any leakage current through the test condenser generates a voltage across resistor 964 which is conducted to the circuitry of FIG. 11 over conductors 163, 162a.

The relay contacts in FIG. 11a are shown in their normal states which exist while a leakage test is not being conducted. When a leakage test is being conducted (i.e., when leakage conductor 1143 (FIG. 12a) is switched to its 0 state by decoder 1142), the relay contacts are switched to their reverse conditions by the current flowing through relay coils K10-K12.

INFRARED EMISSION ANALYZER 1000

Analyzer 1000 is fitted with an exhaust probe 1006 which is placed in the tail pipe assembly of the vehicle being tested. Analyzer 1000 may be implemented by a variety of available devices which are capable of producing an HC output voltage on conductor 1002 having an amplitude proportional to the amount of hydrocarbon emitted from engine 100 and which are capable of producing a CO voltage on conductor 1004 having an amplitude proportional to the amount of carbon monoxide emitted by engine 100. One such analyzer is Model U-912-1 manufactured by Sun Electric Corp., Chicago, Ill.

DATA PROCESSOR 1090

Overall system processing and management is controlled by data processor 1090. The processor performs a number of tasks which may be summarized as follows:

(1) Data is received from analog control 1100 and counting cylinder control 1400 which measure the parameters or conditions of the engine being tested;

(2) Data received from analog control and counting and cylinder control is manipulated to provide output commands to character controller 1800 and graphic controller 2130 which enable the display of alphabetic, numeric and graphical information on display monitor 190; and (3) The status of keyboard 184 and control switch assembly 186 are periodically monitored to determine the type of engine being tested and the kind of test desired by the operator.

As shown in FIG. 2b, data processor 1090 treats analog control 1100, counting and cylinder control 1400, character controller 1800, graphic controller 2130 and front panel interface as peripheral devices which are interconnected by means of a processing bus 1096. The bus includes output data bus conductors BD0-BD15, input data bus conductors SW0-SW15, address conductors AD2-AD7 and timing signal conductors T1-T4. The signal mnemonics for the pulses transmitted on conductors T1-T4 are shown in Table B.

TABLE B

| Timing Signal Conductor | Signal Mnemonic |
| --- | --- |
| T1 | RESET* |
| T2 | READ STROBE |
| T3 | WRITE STROBE |
| T4 | CLK* |

The manner in which the data processor outputs commands to peripheral devices, such as analog controller 1100 or counting and cylinder control 1400, is shown in FIG. 2c. The data processor operates through a number of microcycles, the 6th and 7th of which are illustrated in FIG. 2c. The bits of data transmitted in the output commands are communicated to the peripheral device over output data bus conductors BD0-BD15. In order to have the data on the BD conductors received by the proper peripheral devices, the proper address of the peripheral device must be placed on the address (AD) conductors during phase T3 of the 6th microcycle (FIG. 2c). During the remaining portion of the 6th microcycle and throughout the 7th microcycle, the address identifying bits on the AD conductors are stabilized. Throughout the 6th microcycle and part of the 7th microcycle, information used internally by the data processor continues to be placed on the output BD conductors. This mode of operation is signified by the x's shown in FIG. 2c during phases T3, T5 and T7 of the 6th microcycle and phase T1 of the 7th microcycle. Just prior to phase T3 of the 7th microcycle, the data processor places on the BD output conductors the bits of information intended to be received by the peripheral device addressed by the AD conductors. As soon as the data has stabilized on the BD conductors, between phases T3 and T4 of the 7th microcycle, the data processor generates a WRITE STROBE pulse. During the duration of the WRITE STROBE, the output data on the BD conductors is stored by the peripheral device for later use. After the WRITE STROBE is returned to its 0 state, a different peripheral device can be addressed and different data can be transmitted to the BD output conductors.

The manner in which the data processor inputs data from a peripheral device is shown in connection with FIG. 2d. As in the case of the output commands, and address of the peripheral device from which information is needed is placed on address conductors AD during phase T3 of the 6th microcycle. Throughout the remaining portion of the 6th microcycle and the 7th microcycle, this address remains stabilized on the AD conductors. During phase T3 of the 7th microcycle, the data processor transmits a READ STROBE on conductor T2 which enables the peripheral device addressed on conductors AD to transmit bits of data over the input data bus conductors SW. During phase T4 of the 7th microcycle, the input data is stabilized and remains stable until the phase T8 of the 7th microcycle. At the end of the 7th microcycle, the data processor returns the READ STROBE to its 0 state, and then can address a different peripheral device to receive additional information.

One suitable data processor is the IMP-16C manufactured by National Semiconductor Corporation, Santa Clara, Calif. The IMP-16C is a 16 bit parallel processor having an arithmetic unit and a control unit. The processor includes a read/write memory for temporarily storing values. For example, the values of various modified engine conditions or parameters are temporarily stored before they are transmitted to character controller 1800.

As shown in FIG. 2b, data processor 1090 is used in connection with a read only memory 1094 having a storage capacity of about 4k. The IMP-16C processor can be used with a variety of read only memories as long as they have an access time equal to or less than 850 nanoseconds. Instructions for wiring read only memory 1094 and connecting it to the processing bus and data processor may be found in the IMP-16C Application Manual published by National Semiconductor Corporation in January, 1974. (Publication No. 420021C).

ANALOG SYSTEM 1100

Analog system 1100 sets up and controls the data acquisition circuits previously described so that the various analog parameters or conditions of the engine are systematically channeled to a single analog-to-digital converter which makes the value of the parameter available to the data processor in the form of a digital measurement signal.

Referring to FIGS. 12a-12f, analog system 1100 basically comprises a range control circuit 1102, a set-up and selection circuit 1160, a sampling control circuit 1246, a real-time clock 1320, a multiplexer 1350, and an analog-to-digital converter 1352.

Referring to FIG. 12a, range control circuit 1102 receives input data from data output bus conductors BD4-BD11 and uses this information to determine the range of the engine parameter circuitry to be selected for a particular measurement. Information received on the data bus conductors is stored in quad latches 1104-1111 during the WRITE STROBE signal as described in FIG. 2c. The proper analog circuitry range is also selected by NAND gates 1114-1126, AND gates 1128-1135, inverters 1138-1140, and a binary decoder 1142. Decoder 1142 is connected to the range control conductors of the data acquisition circuits previously described. Range adjustment signals are transmitted over these conductors. Output conductors 1145-1152 interconnect the components in the manner shown.

Figure 12B:
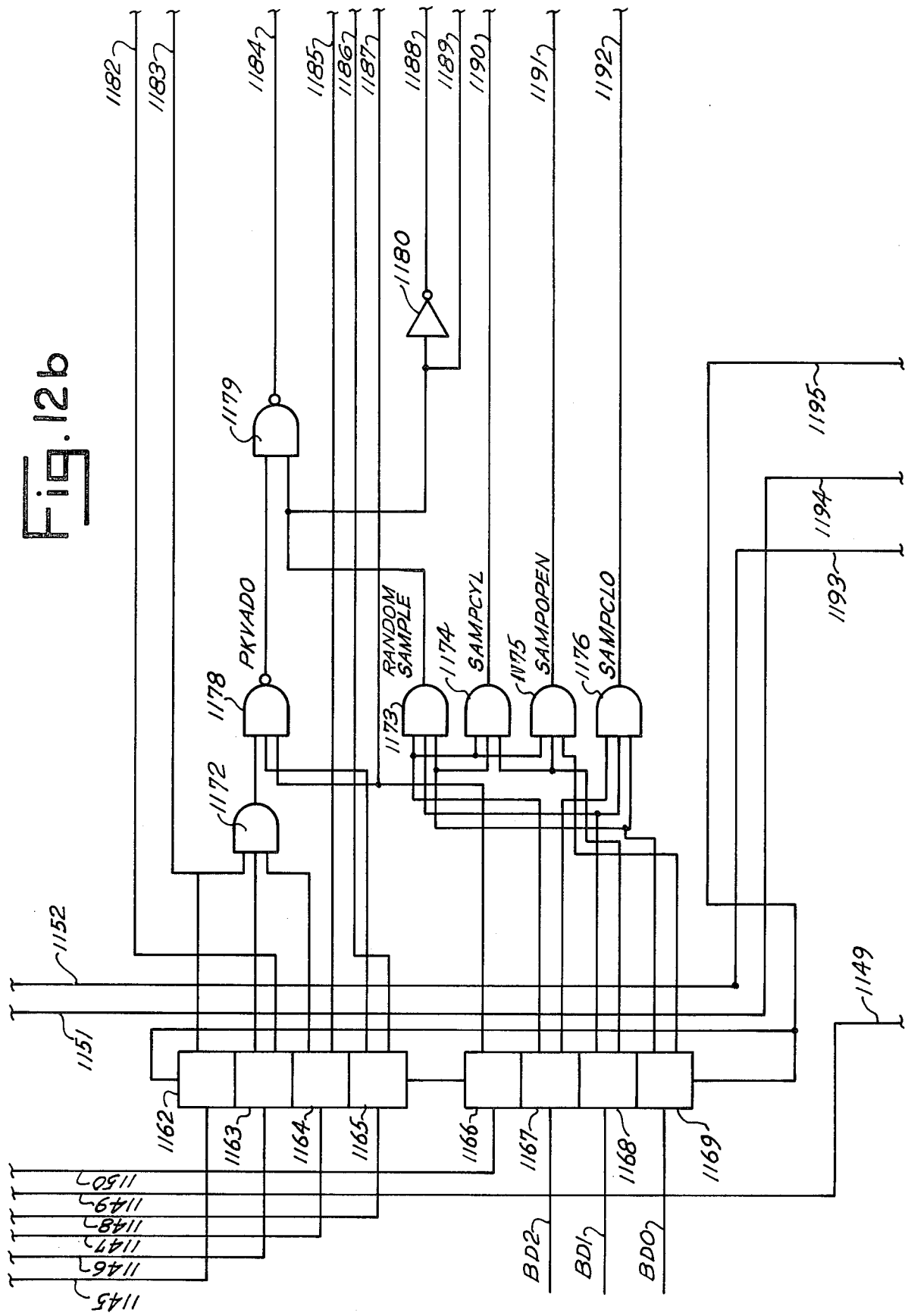
Figure 12C:
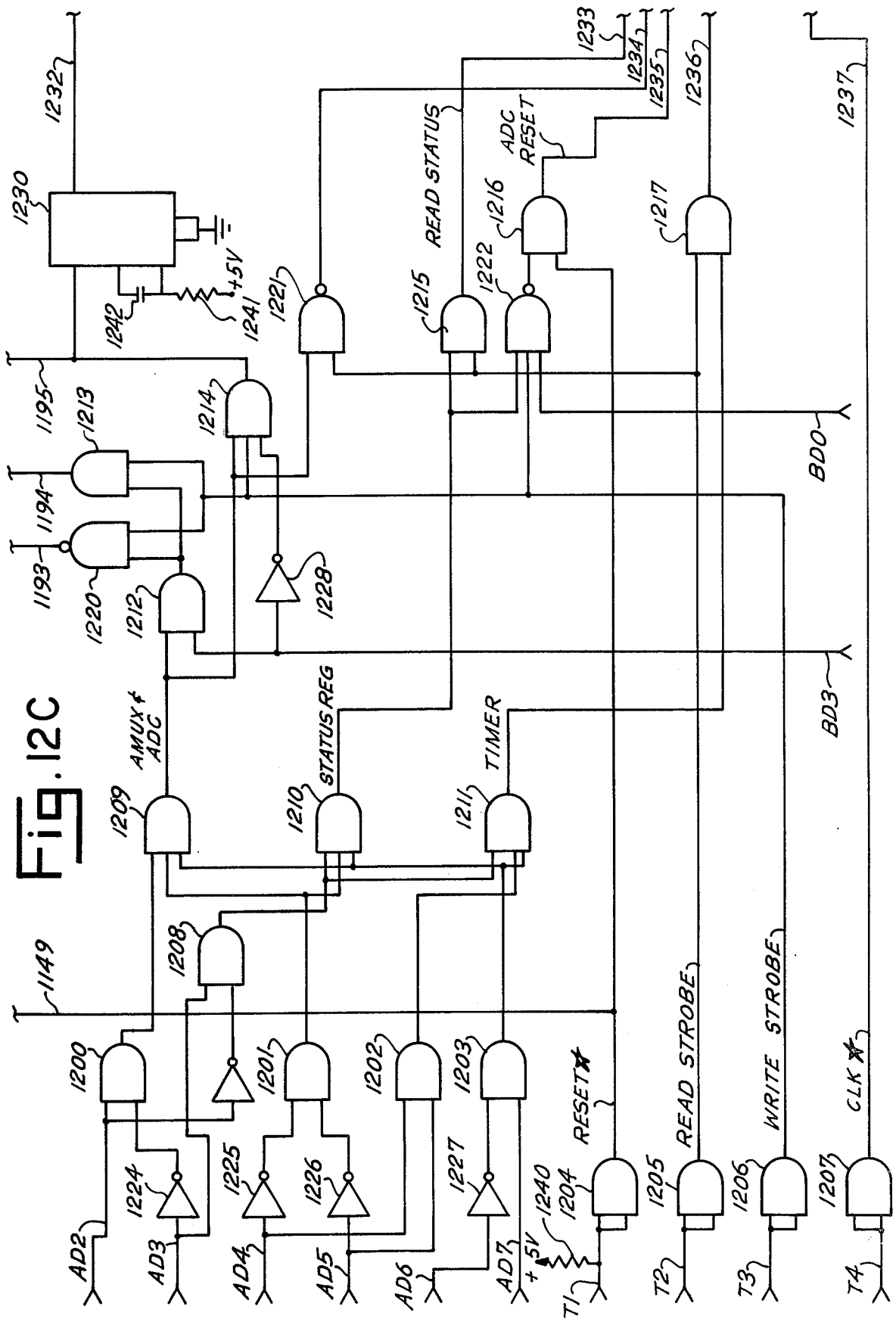

Referring to FIG. 12b, set-up and selection circuit 1160 comprises quad latches 1162-1169, data output bus conductors BD0-BD2, AND gates 1172-1176, NAND gates 1178-1179, an inverter 1180, and output conductors 1182-1195, all connected as shown. Referring to FIG. 12c, circuit 1160 also includes address bus conductors AD2-AD7, timing conductors T1-T4, data output bus conductors BD0-BD3, AND gates 1200-1217, NAND gates 1220-1222, inverters 1224-1228, a one shot multivibrator 1230, output conductors 1232-1237, resistors 1240-1241, and a capacitor 1242, all connected as shown.

Figure 12E:
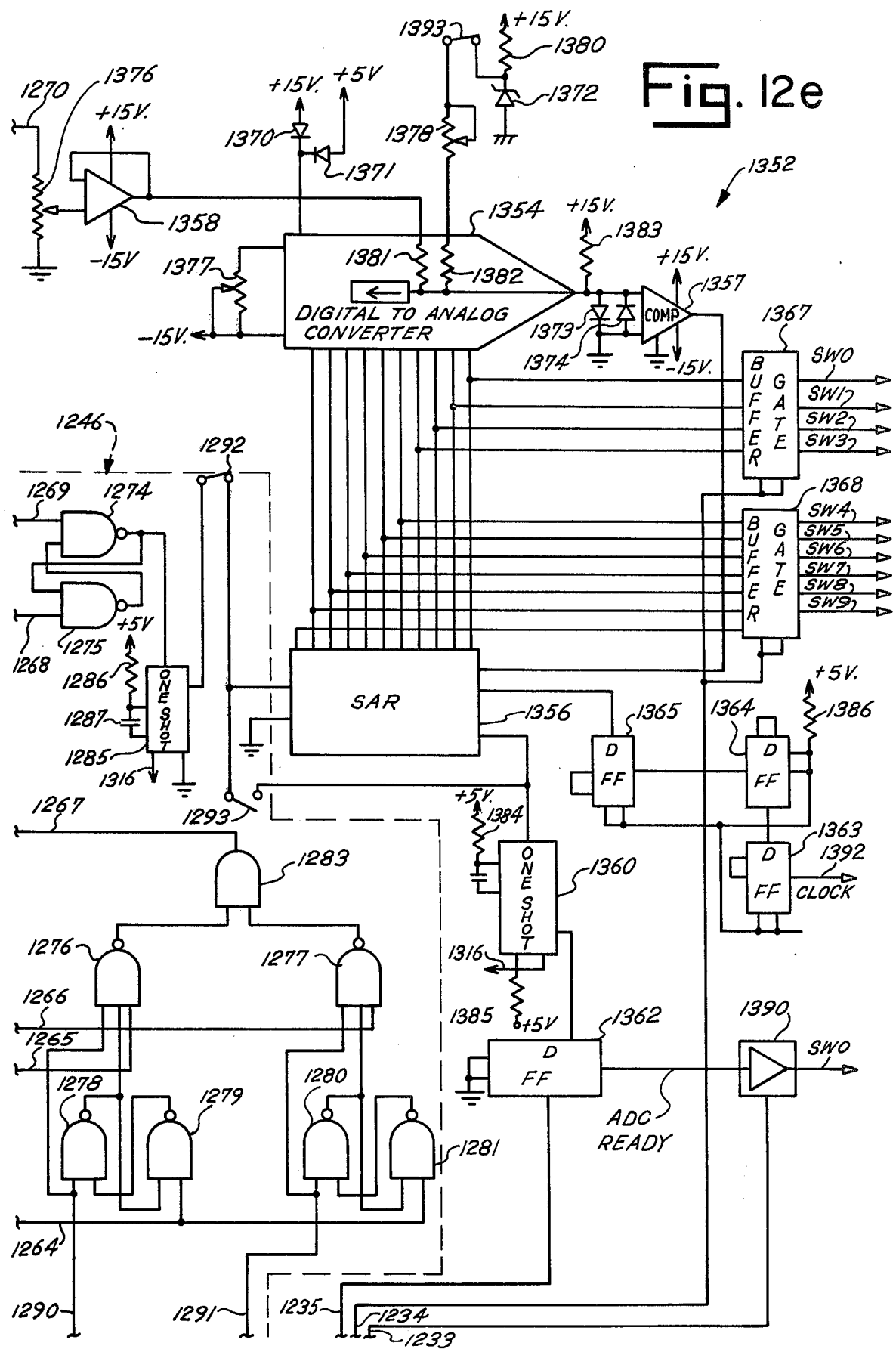
Figure 12F:
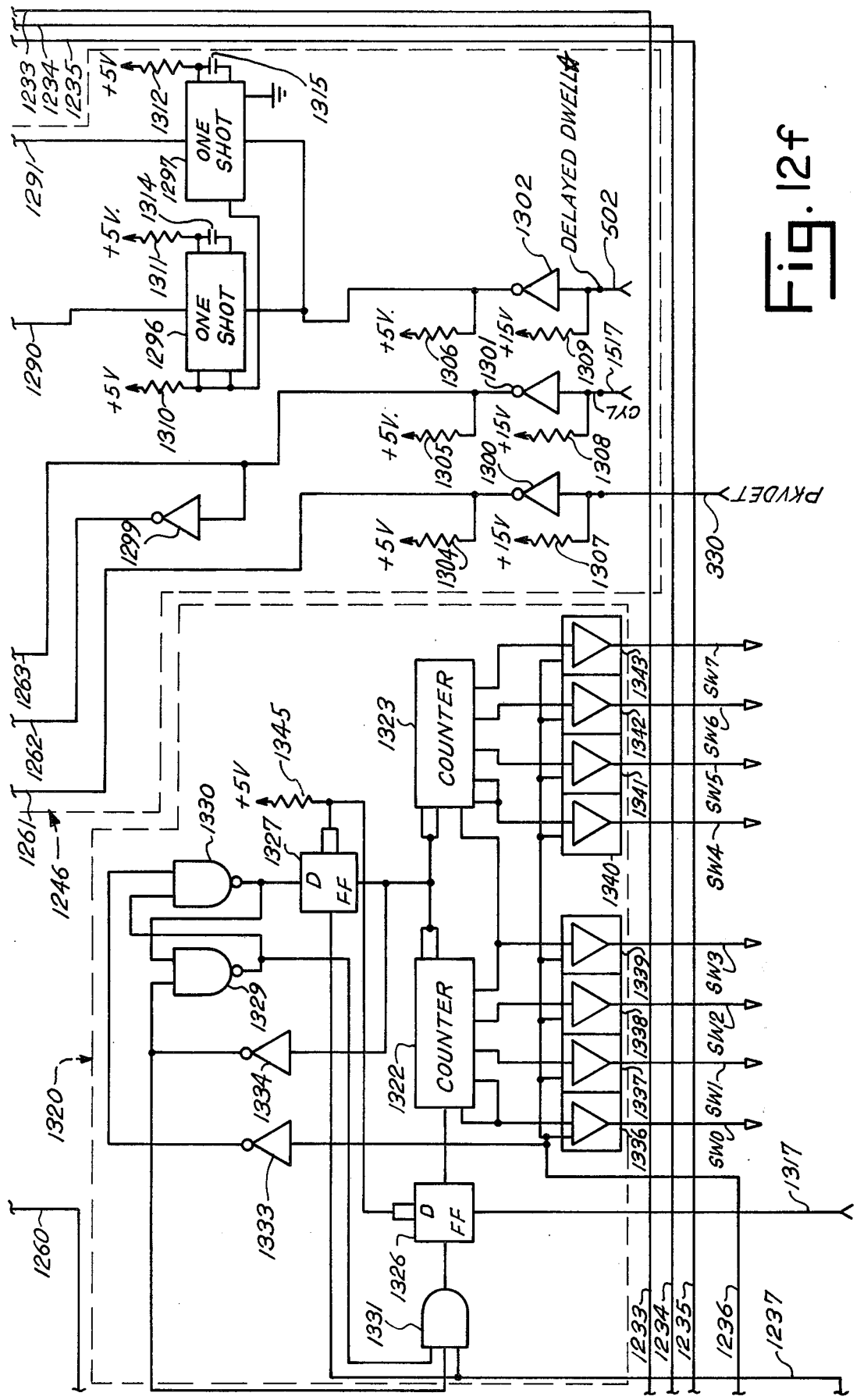

Referring to FIG. 12d, sampling control circuit 1246 comprises NAND gates 1250-1258 and output conductors 1260-1270. Referring to FIG. 12e, circuit 1246 also includes NAND gates 1274-1281, an AND gate 1283, a one shot multivibrator 1285, a resistor 1286, a capacitor 1287, output conductors 1290-1291, a run switch 1292 shown in the run position and a calibrate switch 1293 shown in the run position. Referring to FIG. 12f, sampling control circuit 1246 also includes one shot multivibrators 1296, 1297, inverters 1299-1302, resistors 1304-1312, capacitors 1314-1315, and output conductors 1316, 1317. As shown in FIGS. 12d -12f, the sampling control circuit receives inputs from conductors 330, 1517 and 502 which determine the point of time at which converter circuit 1352 begins to convert the data received by multiplexer 1350.

Referring to FIG. 12f, real-time clock 1320 comprises counters 1322, 1323, D-type flipflops 1326, 1327. NAND gates 1329, 1330, an AND gate 1331, inverters 1333, 1334, tristate buffers 1336-1343, a resistor 1345 and input data bus conductors SW0-SW7. The real-time clock indicates to the data processor how long an operation has been running. This is particularly useful when the analog measuring circuits are being set-up and selected.

Referring to FIG. 12e, analog-to-digital converter 1352 comprises a digital-to-analog converter 1354, a successive approximation register (SAR) 1356, a comparator 1357, an amplifier 1358, one-shot multivibrator 1360, D-type flipflops 1362-1365, tristate buffer gates 1367, 1368, diodes 1370-1374, potentiometers 1376-1378, resistors 1380-1386, a tristate buffer 1390 and an input conductor 1392 for receiving a clock pulse. A switch 1393 is shown in the closed or run position used during normal operation of the system. During calibration, switch 1393 is moved to its open position.

OPERATION OF ANALOG SYSTEM 1100

Ammeter circuit 610, voltmeter circuit 700 and ohmeter-capacitance circuit 750 each are capable of operating in a plurality of ranges depending on the magnitude of the parameter being measured. Each of these circuits requires the selection of the proper range. Once a range is selected, a time delay is required for the circuitry to settle or establish stable conditions before the analog-to-digital conversion is performed. In order to achieve this mode of operation, the data processor goes through a similar procedure for each of the circuits. The numerical values read in the various ranges is shown in Table C:

TABLE C

| PARAMETER | NUMERICAL RANGE IN DISPLAYED ENGINEERING UNITS | RANGE CODE | RANGE LIMIT NUMBERS READING ACCEPTABLE IF READING $\geq$ VALUE INDICATED, OTHERWISE SWITCH TO NEXT LOWEST RANGE | CONVERSION FACTOR |
|---|---|---|---|---|
| (1) VOLTS | 0-25.00 | 0 | ok | .0476 |
|  | 25.0-100.0 | 1 | $.2 \times 2^9$ | .1905 |
| (2) OHMS | 0-10.00 | 0 | ok | .0190 |
|  | 10.0-160.0 | 1 | $.05 \times 2^9$ | .30476 |
|  | 160-2560 | 2 | $.05 \times 2^9$ | 4.876 |
|  | 2560-40,960 | 3 | $.05 \times 2^9$ | 78.019 |
|  | 40,960-655,360 | 4 | $.05 \times 2^9$ | 1248.3 |
| (3) AMPS | 0-62.5 | 0 | ok | .1190 |
|  | 62.5-250 | 1 | $.2 \times 2^9$ | .4762 |
|  | 250-1000 | 2 | $.2 \times 2^9$ | 1.905 |

If the programming of the data processor calls for any analog value to be read from engine 100, it issues an ADC FLAG RESET OUTPUT COMMAND of the type shown in Table 1.

TABLE 1

| ADC FLAG RESET OUTPUT COMMAND ||||||||||
|---|---|---|---|---|---|---|---|---|---|
| T1 | T2 | T3 | T4 | AD2 | AD3 | AD4 | AD5 | AD6 | AD7 |
| 1 | 0 | 1 | 0 | 0 | 1 | 0 | 0 | 0 | 1 |

As shown in Table 1, the OUTPUT COMMAND is performed by placing binary bits 1010 on timing conductors T1–T4, respectively, and by placing binary bits 010001 on address conductors AD2–AD7, respectively. Of course, as explained in connection with FIG. 2c, each OUTPUT COMMAND, including the one shown in Table 1, requires a WRITE STROBE on conductor T3. In response to the coding shown in Table 1, the output of AND gate 1215 (FIG. 12c) is switched to its 1 state so that the output of D-type flipflop 1362 (FIG. 12e) is switched to its 0 state, thereby lowering the ADC READY flag.

After the ADC READY flag has been reset to 0, the data processor can issue an ADC SETUP OUTPUT COMMAND by placing the data bits shown in Table 2 on the address conductors AD2–AD7 and the data output conductors BD3–BD11.

an ADC CONVERSION OUTPUT COMMAND as shown in Table 4.

TABLE 4

| ADC CONVERSION OUTPUT COMMANDS | | | | | | | | | | | | | | | | | |
|---|---|---|---|---|---|---|---|---|---|---|---|---|---|---|---|---|---|
| AD2 | AD3 | AD4 | AD5 | AD6 | AD7 | BD0 | BD1 | BD2 | BD3 | BD4 | BD5 | BD6 | BD7 | BD8 | BD9 | BD10 | BD11 |
| | | | | | | ← Sampling Time → | | | | | | | | | ← Multiplex Channel → | | |
| 1 | 0 | 0 | 0 | 0 | 1 | | | 0 | — | — | — | | | | | | |

As soon as a WRITE STROBE is received by analog system 1100, the multiplex channel for the required conversion is designated by the bits on conductors BD7–BD11 and the sampling time is designated by the bits on conductors BD0–BD2. Bits BD0–BD2 enable the conversion to take place in synchronism with the DELAYED DWELL* signal on conductor 502, the CYL signal on conductor 1517, or the PKVDET signal on conductor 330. (FIG. 12f). As soon as the conversion is completed, the analog circuitry automatically raises the ADC READY flag by switching the output of D flipflop 1362 to its 1 state.

The data processor determines whether the ADC conversion is completed by inputting the ADC READY flag through an INPUT STATUS REGIS-

TABLE 2

| ADC SETUP OUTPUT COMMANDS | | | | | | | | | | | | | |
|---|---|---|---|---|---|---|---|---|---|---|---|---|---|
| AD2 | AD3 | AD4 | AD5 | AD6 | AD7 | BD3 | BD4 | BD5 | BD6 | BD7 | BD8 | BD9 | BD10 | BD11 |
| 1 | 0 | 0 | 0 | 0 | 1 | 1 | Range | | Analog Channel | | | | | |

As shown in Table 2, the analog channel (i.e., the parameter to be measured) is coded on conductors BD7–BD11 and is stored in latches 1107–1116, respectively (FIG. 12a). This information is used by multiplexer 1350 to select the proper parameter. The proper range of the parameter selecter for measurement is coded on conductors BD4–BD6 and is stored in latches 1104–1106, respectively during the WRITE STROBE.

After issuing the SETUP OUTPUT COMMAND, the data processor determines the proper period of time delay by inputing the count of real time clock 1320 through a REAL TIME CLOCK INPUT COMMAND shown in Table. 3.

TER INPUT COMMAND of the type shown in Table 5.

TABLE 5

| INPUT STATUS REGISTER INPUT COMMAND | | | | | | |
|---|---|---|---|---|---|---|
| AD2 | AD3 | AD4 | AD5 | AD6 | AD7 | SW0 |
| 0 | 1 | 0 | 0 | 0 | 1 | Status of ADC |

The status register consists of a number of storage latches, such as 1390 (FIG. 12e) which are scattered throughout the circuitry. By placing the address of the status register on conductors AD2–AD7, (shown in Table 5), the ADC READY flag can be read from the

TABLE 3

| REAL TIME CLOCK INPUT COMMAND | | | | | | | | | | | | | |
|---|---|---|---|---|---|---|---|---|---|---|---|---|---|
| AD2 | AD3 | AD4 | AD5 | AD6 | AD7 | SW0 | | SW1 | SW2 | SW3 | SW4 | SW5 | SW6 | SW7 |
| 0 | 1 | 1 | 1 | 0 | 1 | ← | | | ← Time → | | | | → |

The input command addresses the real time clock by putting the bit code shown in Table 3 on address conductors AD2–AD7. As soon as a READ STROBE is produced, the count of the real time clock is available over input conductors SW0–SW7. As explained previously, the real time clock registers the count of the increments of a free running clock having a period of about 1.008 milliseconds. The clock is capable of registering the count from 0 to 255 and then resetting to 0 and beginning the count again. A REAL TIME CLOCK INPUT COMMAND resets the clock to 0. By subsequently issuing another REAL TIME CLOCK INPUT COMMAND, the data processor can determine the amount of elapsed time, and thereby knows whether the analog circuit has had sufficient time to set up.

After an appropriate amount of time has elapsed, based on data from the real time clock, the data processor initiates the analog-to-digital conversion by issuing state of conductor SW0, and the status of many other functions in the circuitry can be read from various SW conductors which will be described hereafter. If the data processor finds that the ADC READY flag is in its 1 state, it knows that the analog-to-digital conversion is complete. At this point in time, data processor can receive the digital measurement signal stored in buffer gates 1367, 1368, corresponding to the desired analog parameter, by issuing a READ ADC INPUT COMMAND shown in Table 6.

TABLE 6

| READ ADC INPUT COMMAND | | | | | | |
|---|---|---|---|---|---|---|
| AD2 | AD3 | AD4 | AD5 | AD6 | AD7 | SW0–SW9 |
| 1 | 0 | 0 | 0 | 0 | 1 | ADC Data |

As shown in Table 6, as soon as a READ STROBE is generated by the data processor, the ADC digital measurement signal is available for storage by the data processor over conductors SW0–SW9.

COUNTING AND CYLINDER CONTROL SYSTEM 1400

Figure 13A:
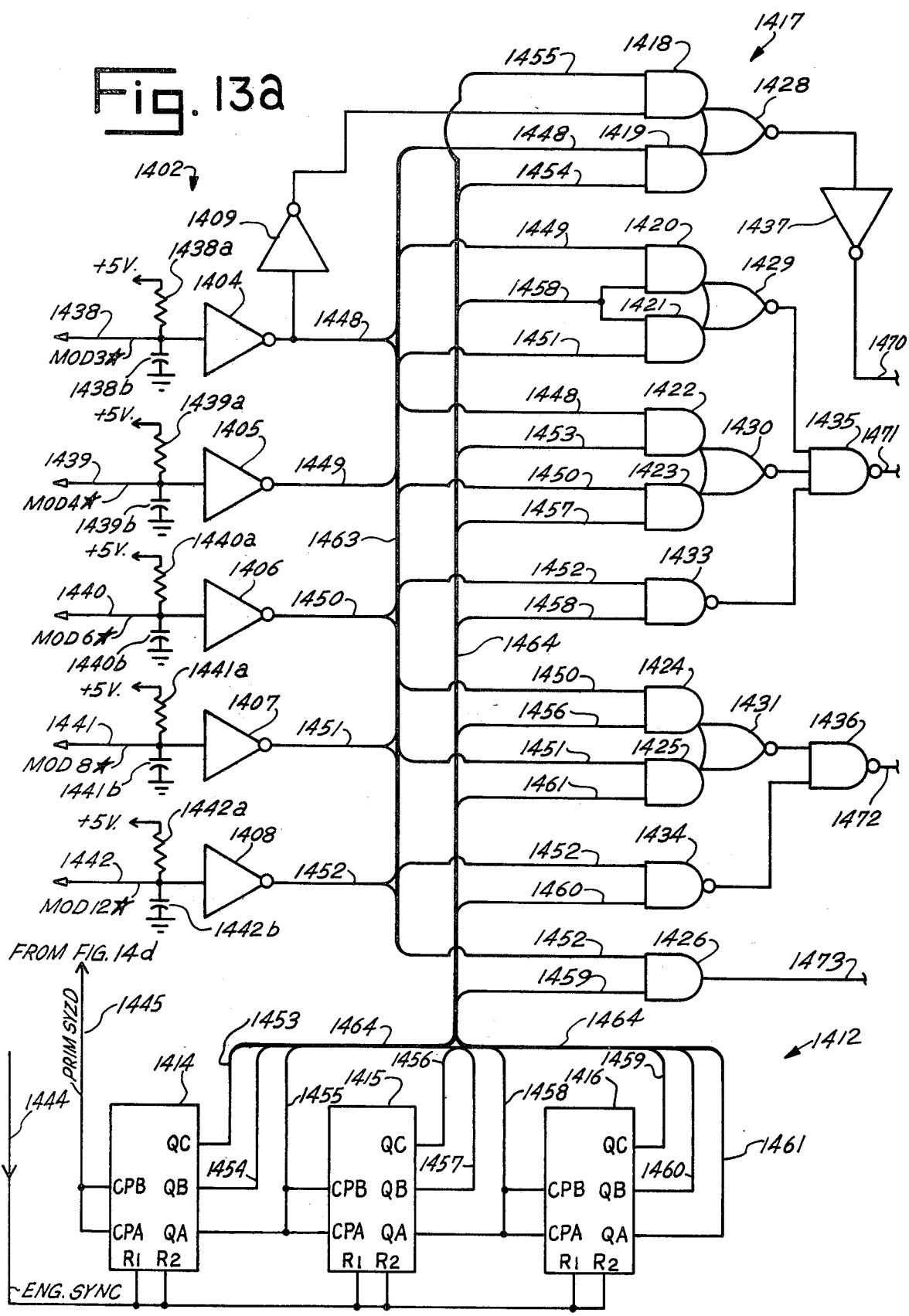
Figure 13B:
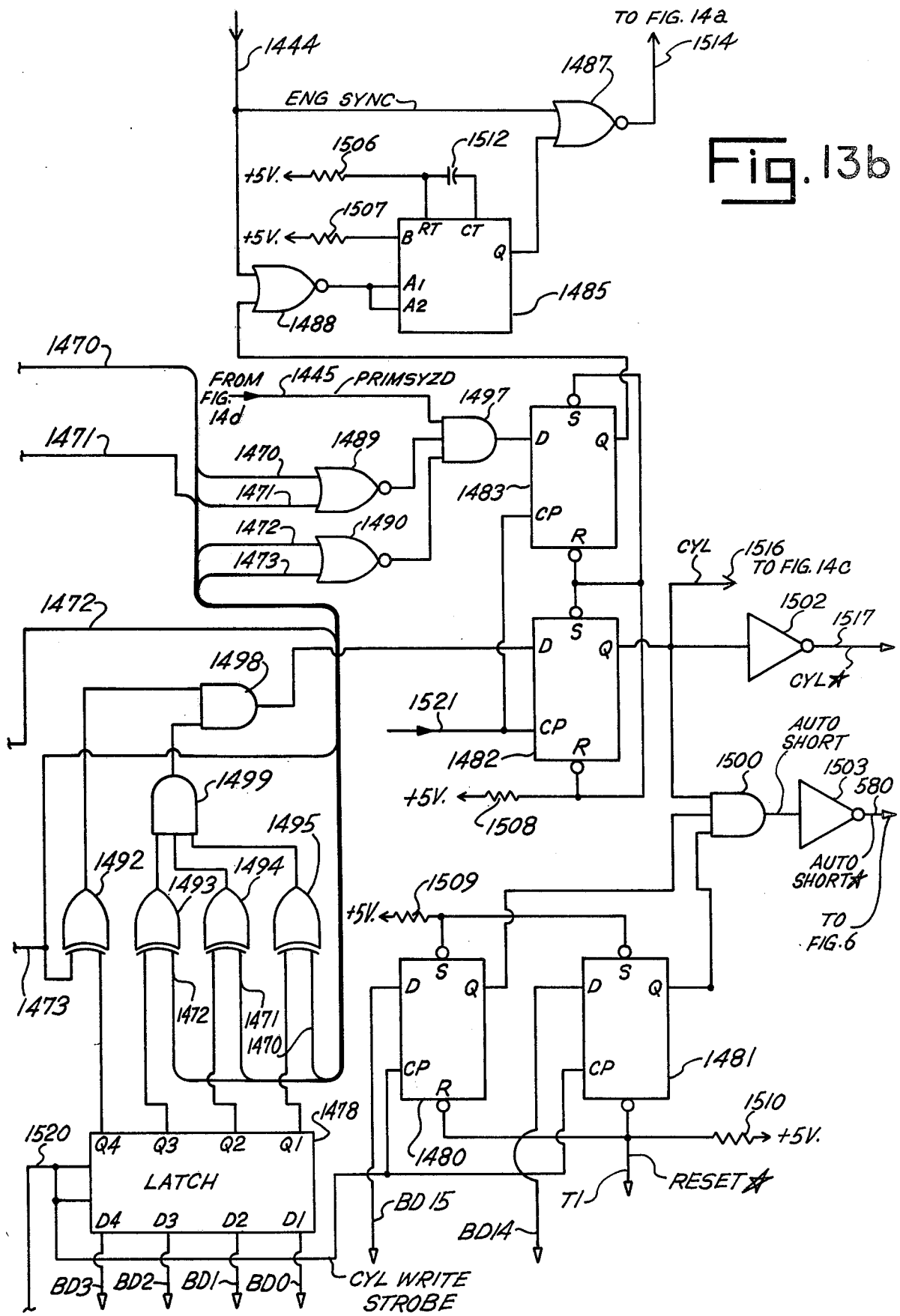

Referring to FIGS. 13a–13c, counting and cylinder control system 1400 comprises a cylinder selection circuit 1402, a counter circuit 1412, and a decoder circuit 1417, together with additional components.

Referring to FIG. 13a, cylinder selection circuit 1402 comprises input inverters 1404–1409. The inverters receive inputs from conductors 1438–1442 that are connected to resistors 1438a–1442a and capacitors 1438b–1432b, respectively. Input conductors 1438–1442 receive MOD3*, MOD4*, MOD6*, MOD8* and MOD12* signals from the front panel depending on whether the engine being tested has 3, 4, 6, 8 or 12 cylinders, respectively.

Counter circuit 1412 includes flipflop-type counters 1414–1416 which continuously count through states 0–7 without being reset, except when the circuit is initially connected to an operating engine. After the first pulse transmitted over conductor 1444 is received, the counter circuit is not reset, but continually counts through states 0–7 at a rate determined by the pulses received on conductor 1445.

Decoder circuit 1417 comprises AND gates 1418–1426, NOR gates 1428–1431, NAND gates 1433–1436 and an inverter 1437. The cylinder selection circuit, counter circuit and decoder circuit are interconnected by conductors 1448–1461 through cables 1463, 1464. Output conductors 1470–1473 represent digital bit positions 0–3, respectively for purposes of determining the spark plug of the engine which is about to be fired.

Referring to FIG. 13b, control system 1400 comprises a latch 1478 which receives binary information from data bus conductors BD0–BD3. The circuitry also includes D-type flipflops 1480–1483, a one-shot multivibrator 1485, NOR gates 1487–1490, Exclusive OR gates 1492–1495, AND gates 1497–1500, inverters 1502–1503, resistors 1506–1510, a capacitor 1512, and output conductors 1514, 1516, 1517, 1520 and 1521.

Exclusive OR gates 1492–1495 operate as comparators. When the binary number stored in latch 1478 is identical to the binary number represented on output conductors 1470–1473, the Exclusive OR gates cause AND gate 1498 to produce an output pulse. During the next clock pulse received over conductor 1521, the Q output of flipflop 1482 is switched to its one state and remains in its one state until the binary number represented by conductors 1470–1473 is changed.

Referring to FIG. 13c, counter and cylinder control system 1400 also comprises AND gates 1524–1527 and a NOR gate 1529 which are used to operate the remaining circuitry when an appropriate address in the form of binary data is received on address conductors AD2–AD7.

The system also includes logic gates 1530–1535, switches 1540–1545, and resistors 1550–1555. The circuitry can be used in order to manually introduce data into the data processor by means of manipulating the switches. Output conductors 1557–1558 connect the circuitry in the manner shown.

In order to designate a particular cylinder of engine 100 for shorting or sampling of engine parameters, the data processor issues a CYLINDER SELECT OUTPUT COMMAND shown in Table 7:

TABLE 7

| AD2 | AD3 | AD4 | AD5 | AD6 | AD7 | BD15 | BD0 – BD3 |
|---|---|---|---|---|---|---|---|
| 1 | 0 | 1 | 1 | 0 | 1 | Short = 1<br>Sample = 0 | No. of Cylinder |

If conductor BD15 is switched to its 1 state, the Q output of flipflop 1480 (FIG. 13b) is switched to its 1 state so that inverter 1503 is enabled to produce an AUTO SHORT* pulse. If conductor BD15 is switched to its 0 state, AND gate 1500 is disabled so that no AUTO SHORT* pulse can be produced. During the WRITE STROBE, the number of the selected cylinder is stored in latch 1478 from conductors BD0–BD3.

Referring to FIGS. 14a–14f, counting and cylinder control system 1400 also comprises an operating command decoding circuit 1562, a trigger generating circuit 1564, a phasing and synchronization circuit 1632, a clock and phase generator 1740, a status read-out circuit 1750 and a counter circuit 1764.

These circuits acquire data for measurement of rpm, average and per cyclinder dwell, and average and per cylinder cam lobe or cylinder timing.

Referring to FIG. 14a, circuits 1562 and 1564 comprise a binary coded decimal-to-decimal decoder 1570, one shot multivibrators 1572, 1573, NAND gates 1575–1582, AND gates 1586–1590, a NOR gate 1593, inverters 1595–1602, resistors 1605–1615, capacitors 1618, 1619, and output conductors 1620–1629 which comprise a cable 1630.

Operating command decoding circuit 1562 receives data on input conductors AD5–AD7, T2, T3, and decodes the information in order to determine the type of operation required. Trigger generating circuit 1564 receives timing signals over conductors 214, 206, 1620, and 252 in order to initiate certain modes of operation at the required time.

Figure 14C:
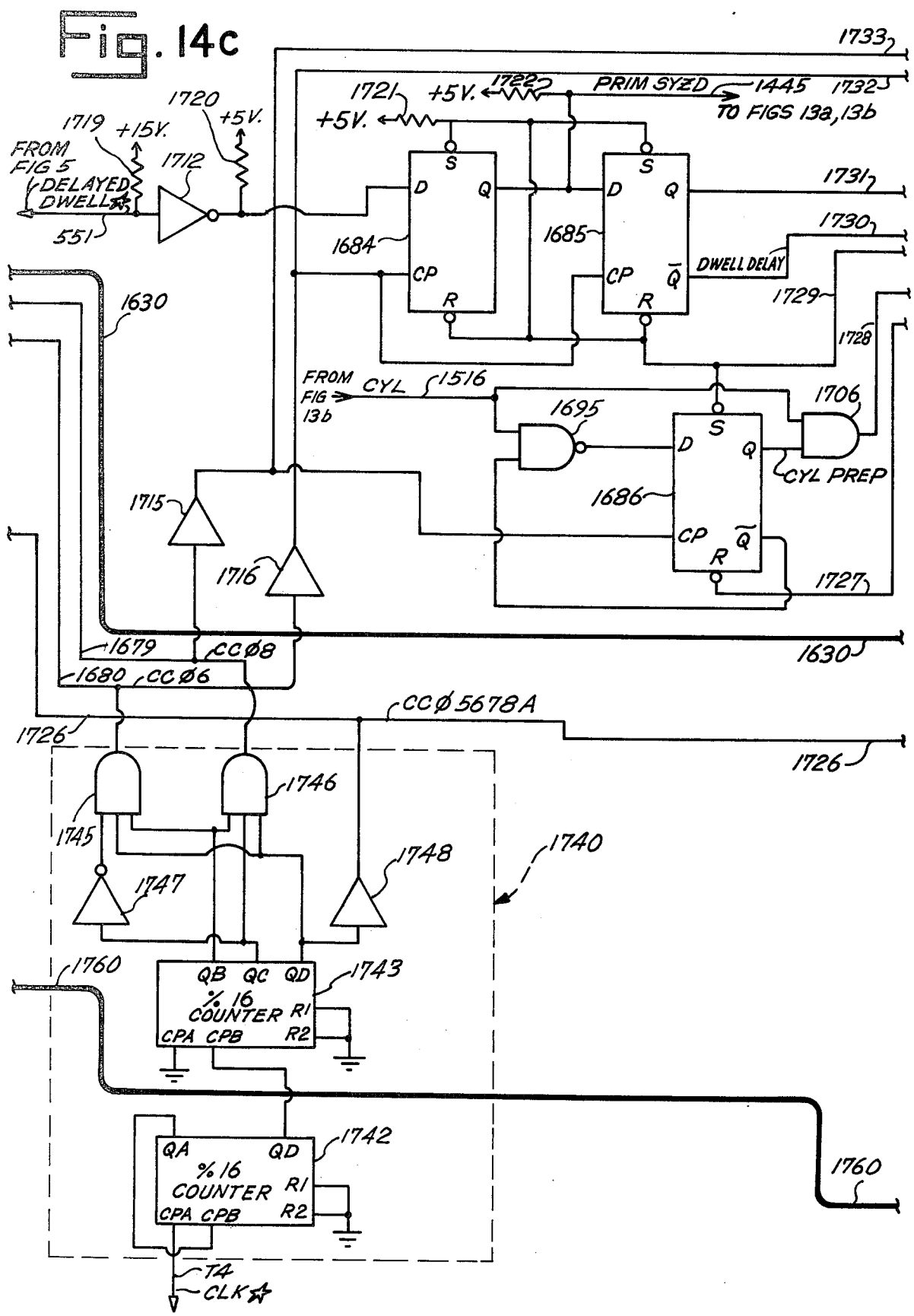

Referring to FIG. 14b, phasing and synchronization circuit 1632 comprises J-K flipflops 1634–1641, a one-shot multivibrator 1643, NAND gates 1645–1653, AND gates 1656–1658, and amplifier 1660, resistors 1662–1666, a capacitor 1668 and output conductors 1670–1680, all connected as shown. Referring to FIGS. 14c and 14d, circuit 1632 also comprises D-type flipflops 1684–1687, J-K flipflops 1690–1693, NAND gates 1695–1702, AND gates 1706–1709, inverters 1712–1713, amplifiers 1715–1717, resistors 1719–1723 and conductors 1726–1735. Among other functions, circuit 1632 serves as gate circuitry for transmitting clock pulses to counter circuit 1764 or inhibiting clock pulses from being transmitted to counter circuit 1764.

Referring to FIG. 14c, clock and phase generator 1740 comprises divide-by-sixteen counters 1742, 1743, AND gates 1745, 1746, an inverter 1747 and an amplifier 1748. Circuit 1740 generates various clock pulses displaced in phase in order to operate phasing and synchronization circuits 1632.

Referring to FIG. 14d, status read-out circuit 1750 comprises J-K flipflops 1752, 1753, an AND gate 1754, amplifiers 1755, 1756, a resistor 1757, an output conductor 1759 and an output cable 1760. Circuit 1750 provides signals on output conductors SW4 and SW5 which indicate whether certain portions of counter circuit 1764 have overflowed during the counting process.

Figure 14E:
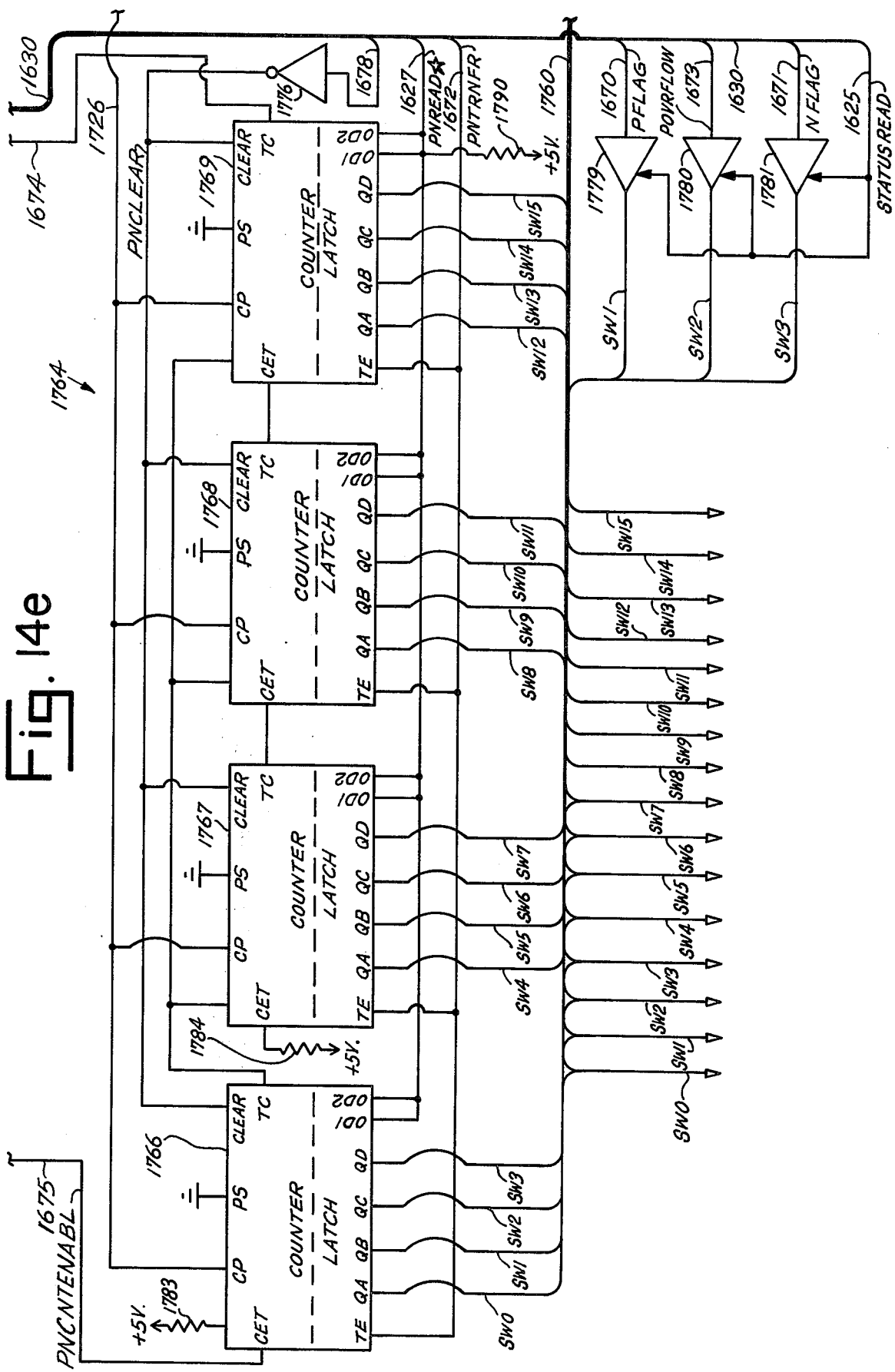
Figure 14F:
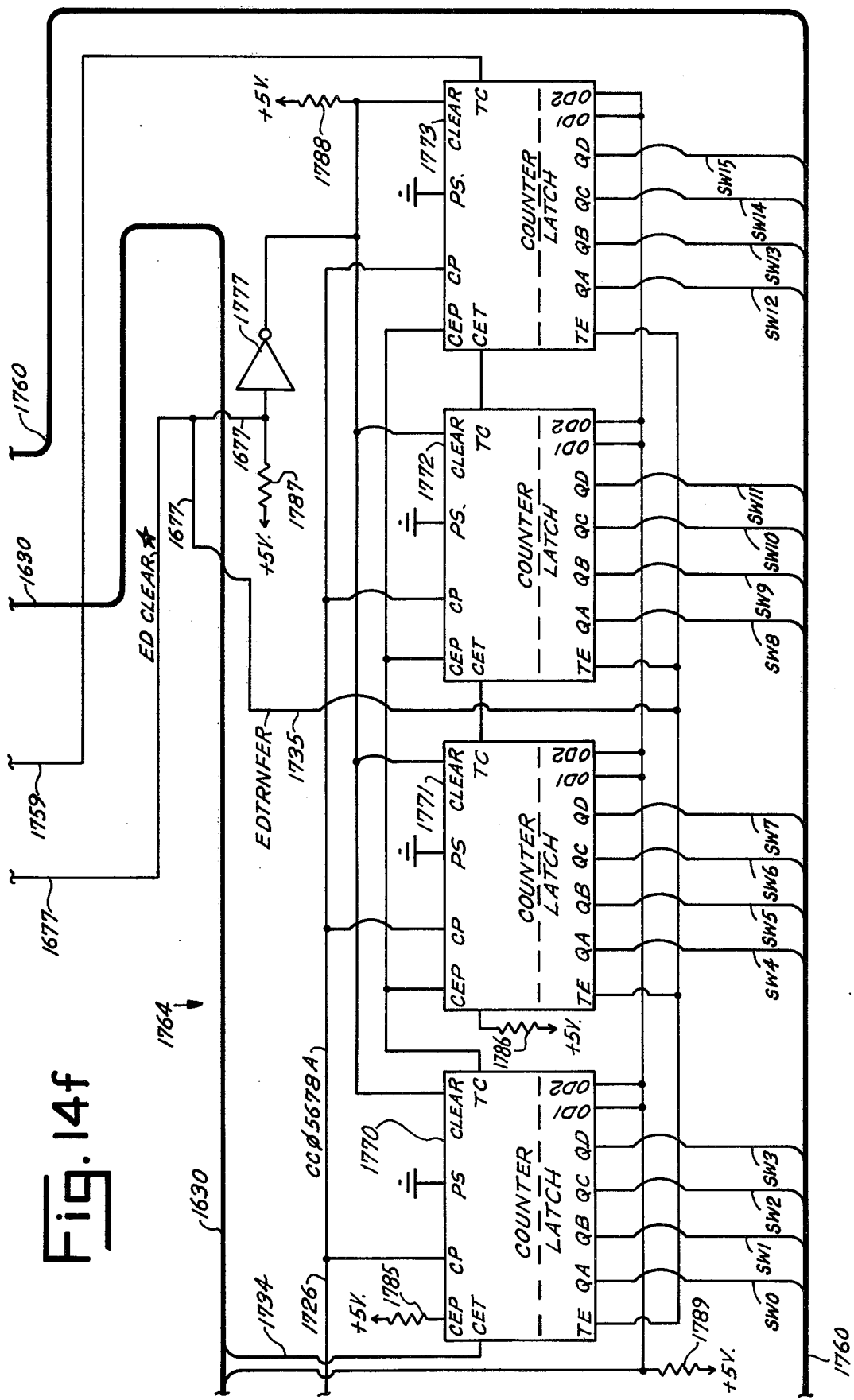

Referring to FIGS. 14e and 14f, counter circuit 1764 comprises counter-latches 1766–1773, such as National SemiConductor Model No. DM8554. Counterlatches 1766–1769 alternately generate a "P" count and an "N"

count, whereas counter-latches 1770–1773 alternately generate an "E" count and a "D" count. When the latches of circuits 1766–1769 hold the N number, they are referred to as the N register, and when they hold the P number, they are referred to as the P register. Likewise, when the latches of circuits 1770–1773 hold the D number, they are referred to as the D register, and when the latches hold the E number, they are referred to as the E register.

Circuit 1764 also includes inverters 1776, 1777, logic gates 1779–1781 and resistors 1783–1790. The logic gates are used to drive input data bus conductors SW1–SW3 in order to indicate flags which furnish information to the data processor.

OPERATION OF COUNTING AND CYLINDER CONTROL SYSTEM 1400

Figure 14G:
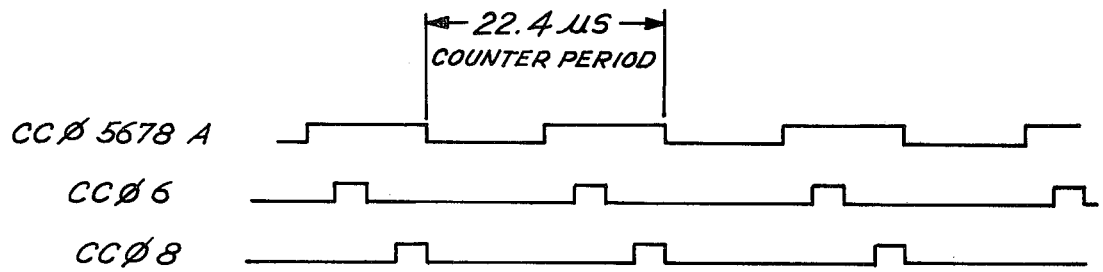
FIG. 14g illustrates exemplary clock pulses generated by the circuit shown in FIG. 14c.

The circuitry shown in FIGS. 13a–13c and 14a–14f operates as follows:

Referring to FIGS. 14c and 14g, clock and phase generator 1740 produces clock pulses CC05678A, CC06 and CC08. These clock pulses are used in order to provide the correct sequencing and synchronization of ignition information in the circuitry. The clock pulses are generated at about 89.286KHz.

Figure 14H:
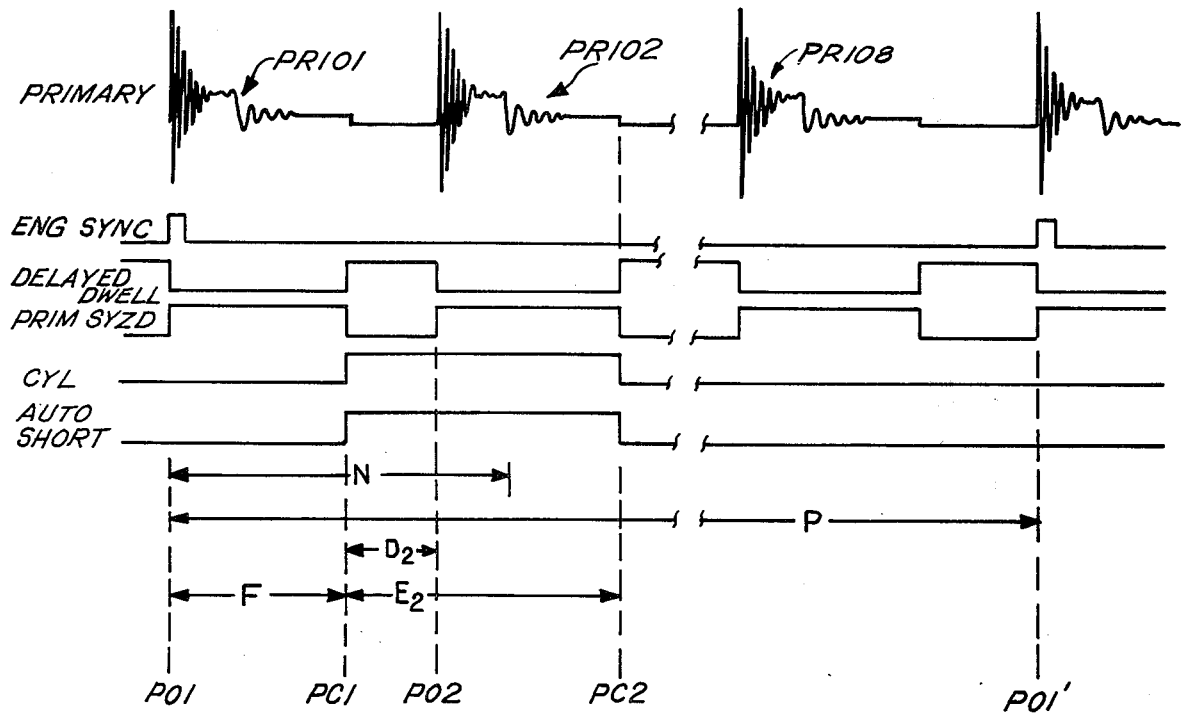
FIG. 14h illustrates exemplary voltage waveforms produced by the circuits shown in FIGS. 13a–13c and FIGS. 14a–14f.

FIG. 14h illustrates exemplary primary ignition waveforms PR101, PR102 and PR108 which correspond with the primary ignition signals produced in order to fire spark plugs 101a, 102a and 108a, respectively. Additional ignition waveforms, of course, are produced by primary coil 115 in order to fire spark plug 103a–107a. Also shown in FIG. 14h are the ENG SYNC pulses produced by the circuitry shown in FIG. 3, and the DELAYED DWELL* signal produced by the circuitry in FIG. 5. The DELAYED DWELL* signal is inverted by inverter 1712 (FIG. 14c) and is synchronized by clock signals CC06 in flipflop 1684 in order to produce the PRIM SYZD signals shown in FIG. 14h. The PRIM SYZD signals are transmitted to conductor 1445 in order to advance counters 1414–1416 (FIG. 13a).

When the system is turned on, the first ENG SYNC pulse resets counters 1414–1416, and thereafter, the counters continue to operate in response to the PRIM SYZD pulses without being reset. Due to the delays inherent in the filtering circuits in FIGS. 3 and 5, as well as the synchronizing operation of the circuitry shown in FIGS. 14a–14f, the ENG SYNC, DELAYED DWELL* and PRIM SYZD signals actually may be delayed a few hundred microseconds from their time relationship with the primary ignition signals shown in FIG. 14h.

In order to obtain information about the ignition signals for a particular cylinder of engine 100, the circuitry shown in FIGS. 13a–13c is capable of producing a CYL signal of the type shown in FIG. 14h. In the example shown in FIG. 14h, the CYL signal is used to obtain information for cylinder 102 or spark plug 102a. In order to produce the CYL signal shown in FIG. 14h, the data processor issues a CYLINDER SELECT OUTPUT COMMAND in the manner previously described.

The circuits shown in FIGS. 13a–13c and FIGS. 14a–14c are also used in order to derive digital numbers having values proportional to the time periods designated as N, P, D2 and E2 on FIG. 14h. More specifically, the N number has a value corresponding to the period of time from the opening of points 118, 118a to fire spark plug 101a (time P01, FIG. 14h) until the time the FLASH* signal is received from the timing light circuit over conductor 206 or the time the MONTIM* signal is received from the monolithic timing pick up over conductor 214. The P number has a value proportional to the period from time P01 to time P01' (FIG. 14h). That is, it has a value proportional to the time from one opening of contact points 118, 118a to fire spark plug 101a until the next opening of contact points 118, 118a to fire spark plug 101a. The D number has a value proportional to the period from the closing of contact points 118, 118a to the next opening of the contact points for a selected cylinder (i.e., the dwell time period). In the example shown in FIG. 14h, the D number has a value proportional to the duration from time PC1 to time P02, that is, from the time the points have closed after firing spark plug 101a, until the time the points open in order to fire spark plug 102a. The circuitry can obtain a D number for any selected cylinder, and also can provide an accumulated D number having a value corresponding to the D periods for all cylinders from time P01 to time P01', that is, for the entire ignition cycle. The E number has a value proportional to the time from the closing of points 118, 118a in order to fire a particular spark plug until the next successive closing of the points. This time period is known as the cylinder timing period. In the example shown in FIG. 14h, the E number has a value proportional to the time duration from time PC1 to time PC2, that is, from the time the contact points close in order to prepare for firing spark plug 102a until the time the points close again in order to prepare for firing spark plug 103a. In addition, the circuitry can also provide an accumulated E number having a value porportional to the sum of all the separate E numbers for each of the ignition wave forms occuring from time P01 to time P01', that is, an entire ignition cycle of the engine.

As shown in FIG. 14h, the D number has a value proportional to the time period during which the DELAYED DWELL* signal is in its 1 state and the E number has a value proportional to the time period from one transition of the DELAYED DWELL* signal from the 0 to the 1 state until the next transition of the DELAYED DWELL* signal from the 0 to the 1 state.

A firing time period F is defined as the time period from the opening of contacts 118, 118a to fire a spark plug until the closure of the contacts to start the dwell time period.

Figure 14I:
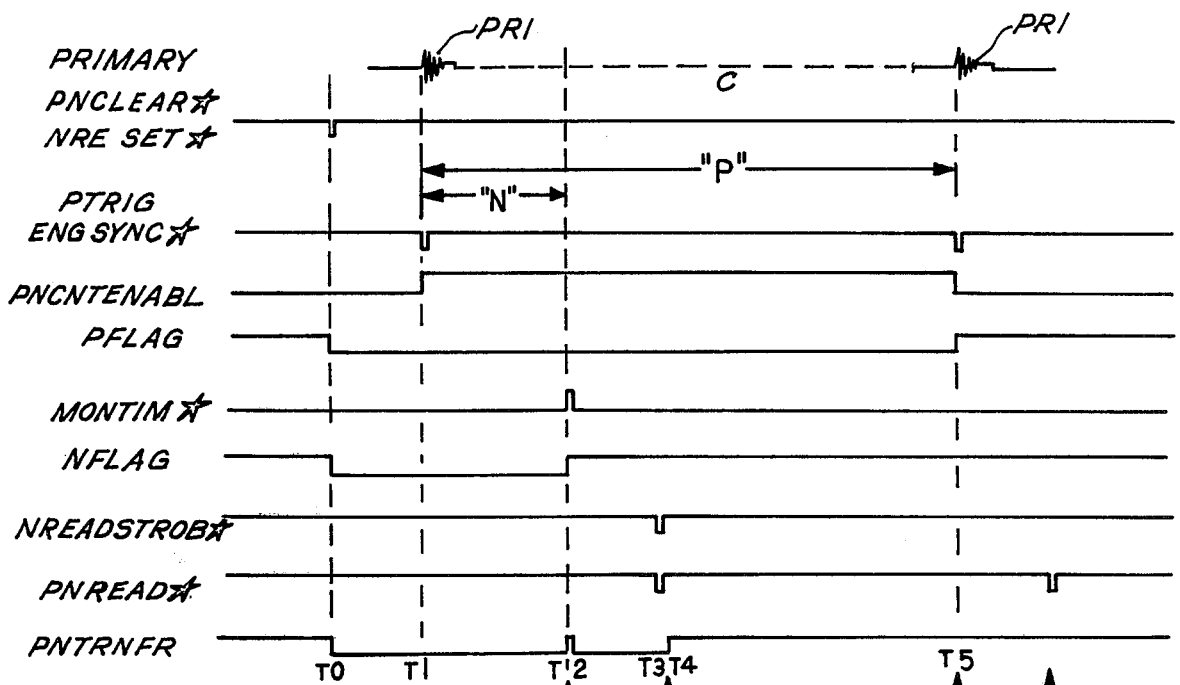
FIG. 14i illustrates exemplary voltage waveforms used to control the generation of P and N numbers in the counters of circuits 1766–1769.

Referring to FIG. 14i, the N and P numbers are obtained as follows:

The operator of the system throws an appropriate switch on the front panel (described hereafter) which energizes conductor 1620 (FIG. 14a) so that the circuitry responds to either the MONTIM* pulse received over conductor 214 or the FLASH* pulse received over conductor 206. In this example, it will be assumed that the circuitry is set to be responsive to the MONTIM* pulse.

When the data processor determines that it wants to obtain an N or a P number, it issues a P, N FLAG RESET OUTPUT COMMAND shown in Table 8.

TABLE 8

| P, N FLAG RESET | | | | | | OUTPUT COMMAND | | |
|---|---|---|---|---|---|---|---|---|
| AD2 | AD3 | AD4 | AD5 | AD6 | AD7 | BD1 | BD2 | BD3 |
| 0 | 1 | 0 | 0 | 0 | 1 | 1 | 1 | 1 |

In response to this COMMAND and a WRITE STROBE which switches conductor 1622 to its 1 state, NAND gate 1645 produces a PN CLEAR* pulse and NAND gate 1653 produces an N RESET* pulse (FIGS. 14b and 14i). In response to these pulses, the P FLAG and N FLAG signals are switched from their 1 to 0 states, the counters of circuits 1766–1769 are cleared to their 0 count states, and the PNTRNFR signal is switched from its 1 to its 0 state in order to close the port between the counters and latches in circuits 1766–1769. As shown in FIG. 14i, all of these operations occur at time T0.

As soon as contact points 118, 118a open to produce the next PR1 ignition signal, the ENG SYNC pulse is produced by the circuitry shown in FIG. 3 and is transmitted to conductor 252 (FIG. 14a). In response to this pulse, the PTRIG signal is produced by flipflop 1572. In response to the PTRIG pulse, the PNCNTENABL signal is switched from its 0 to 1 state in order to make the counter portion of circuits 1766–1769 responsive to clock pulses CC05678A. As shown in FIG. 14i, each of these events occurs at time T1.

At time T2, (FIG. 14i), the MONTIM* signal is received over conductor 214 (FIG. 14a). In response to the MONTIM* signal, one shot multivibrator 1573 generates an NTRIG signal which causes the N FLAG signal to switch from its 0 to 1 state. At the same time, the PNTRNFR signal is briefly switched to its 1 state so that the number represented in the counter portion of circuits 1766–1769 is transferred to the latch portion of the circuits. The transition of the PNTRNFR signal to its 1 state occurs between the CC05678A clock pulses so that the counter portion of circuits 1766–1769 continues to count without missing any clock pulses.

After time T2 (FIG. 14i), the N number is held in the latch portion of circuits 1766–1769 and may be read at any time by the data processor. In order to determine whether the N or P numbers are ready, the data processor issues a PN STATUS INPUT COMMAND shown in Table 9:

TABLE 9

| PN STATUS INPUT COMMAND | | | | | | |
|---|---|---|---|---|---|---|
| AD2 | AD3 | AD4 | AD5 | AD6 | AD7 | SW1 – SW3 |
| 0 | 1 | 0 | 0 | 0 | 1 | P,N STATUS |

When a READ STROBE is generated, the status of the PFLAG, NFLAG and POVRFLOW signals can be sensed over conductors SW1–SW3. When the data processor decides to read the N number, it issues a READ N INPUT COMMAND shown in Table 10.

TABLE 10

| READ N INPUT COMMAND | | | | | | |
|---|---|---|---|---|---|---|
| AD2 | AD3 | AD4 | AD5 | AD6 | Ad7 | SW0 – SW15 |
| 0 | 0 | 1 | 0 | 0 | 1 | ←N Number → |

In response to this command and a READ STROBE, the PNREAD* pulse and N READ STROBE* pulse are generated which causes the latches of circuits 1766–1769 to transmit the N number over conductors SW0–SW15 to the data processor. As shown in FIG. 14i, these events occur at the time T3.

At time T4, in response to the N READ STROBE* signal, flipflops 1639, 1640 and NAND gates 1650–1652 cause the PNTRNFR signal to switch from its 0 to 1 state so that the ports between the counters and latches of circuits 1766–1769 are opened. Thereafter, the latches store each number generated by the counters.

The counters of circuit 1766–1769 continue to count clock pulses until the occurrence of the next ENG SYNC* pulse at time T5. At this time, a PTRIG pulse is generated, the PNCNTENABL signal is switched from its 1 to 0 state to prevent the counters of circuits 1766–1769 from responding to any additional clock pulses, and the PFLAG signal is switched from its 0 to 1 state. At this point in time, the P number is held in the latches of circuits 1766–1769 and may be read by the data processor at any time.

When the data processor wants to know the status of the P number, it transmits a PN STATUS OUTPUT COMMAND (Table 9). Since the P FLAG signal is in its 1 state, the data processor knows that the P number is available for reading.

When the data processor desires to read the P number, it issues a P REA INPUT COMMAND shown in Table 11:

TABLE 11

| P READ INPUT COMMAND | | | | | | |
|---|---|---|---|---|---|---|
| AD2 | AD3 | AD4 | AD5 | AD6 | AD7 | SWO – SW15 |
| 1 | 1 | 0 | 0 | 0 | 1 | ←P NUMBER → |

In response to this command and a READ STROBE, the PN READ* pulse and N READ STROBE* pulse are generated on conductor 1627. In response to this signal, the latches of circuits 1766–1769 transmit the P number over conductors SW0–SW15 to the data processor.

Referring to FIG. 14j, in order to obtain a D number or an E number, the data processor first determines whether it wants an E or D number for a selected cylinder (the PER CYLINDER mode) or whether it wants to accumulate E or D numbers corresponding to all cylinders of the engine (the ACCUMULATED mode). In order to determine the mode, the data processor issues a MODE CONTROL OUTPUT COMMAND shown in Table 12:

TABLE 12

| MODE CONTROL OUTPUT COMMAND | | | | | | |
|---|---|---|---|---|---|---|
| AD2 | AD3 | AD4 | AD5 | AD6 | AD7 | BD0 |
| 1 | 0 | 1 | 0 | 0 | 1 | ACCUMULATIVE = 0 PER CYLINDER = 1 |

In response to this command and a WRITE STROBE, AND gate 1588 generates a D WRIT signal (FIG. 14a) which enables flipflop 1692 to store the MODE (FIG. 14d). In the example of FIG. 14j, it is assumed that the $\overline{Q}$ output of flipflop 1692 is switched to its 1 state, indicating the accumulative mode of operation. As shown in FIG. 14j, this switching takes place at time T0. In response to this operation of flipflop 1692, NAND gate 1699 forces the EDTRNFR signal on conductor 1735 to its 1 state.

At time T1, the data processor resets the E FLAG and resets the counters of circuits 1770–1773 to 0 by issuing an E FLAG RESET OUTPUT COMMAND shown in TABLE 13.

TABLE 13

| E FLAG RESET OUTPUT COMMAND | | | | | | | |
|---|---|---|---|---|---|---|---|
| AD2 | AD3 | AD4 | AD5 | AD6 | AD7 | BD4 | BD5 |
| 0 | 1 | 0 | 0 | 0 | 1 | 1 | 1 |

In response to this command, NAND gate 1648 (FIG. 14b) generates the EDCLEAR* pulse shown in FIG. 14j. In response to this pulse, the counters of circuits 1770-1773 are cleared to 0.

At time T2, when contact points 118, 118a open in order to create primary ignition signal PR1, the ENG SYNC pulse is generated. In response to the ENG SYNC pulse, the PNCNTENABLE signal is switched from its 0 to 1 state.

Every DELAYED DWELL* signal received on conductor 551 (FIG. 14c) results in a corresponding and slightly delayed DWELL DELAY signal produced at the Q̄ output of flipflop 1685. Subsequent to time T2 (FIG. 14j), each time the DWELL DELAY signal is switched to its 1 state, AND gate 1708 and NAND gates 1701 and 1702 (FIG. 14d) cause the EDCNTENABL signal on conductor 1734 to switch to its 1 state, thereby enabling the counters of circuits 1770-1773 to be responsive to clock pulses CC05678A. Since the time during which the DELAY DWELL signals are in their one state corresponds to the time during which the D number is to be produced, as shown in FIG. 14j, the counters of circuits 1770-1773 accept and count clock pulses each time the EDCNTENABL signal is switched to its 1 state.

This mode of operation continues until time T3 when the next ENG SYNC pulse is generated. At time T3, the PNCNTENABL signal is switched from its 1 to its 0 state, thereby forcing the EDCNTENABL signal to remain in its 0 state. As a result, the counters of circuits 1770-1773 no longer accept clock pulses.

Since the EDTRNFR signal has been in its 1 state during the entire time of operation, the latches of circuits 1770-1773 contain the accumulated D number counted by the counters up until time T3. This D number is available for reading by the data processor. At time T3, the P FLAG was switched from its 0 to 1 state in the same manner described in connection with FIG. 14i. Therefore, in order to determine whether the accumulated D number is available, the data processor determines the status of the P FLAG in the same manner described in connection with FIG. 14i.

If the data processor determines that the P FLAG is in its 1 state, it can read the accumulated D number by issuing a D READ INPUT COMMAND shown in Table 14:

TABLE 14

| D READ INPUT COMMAND | | | | | | |
|---|---|---|---|---|---|---|
| AD2 | AD3 | AD4 | AD5 | AD6 | AD7 | SW0 - SW15 |
| 1 | 0 | 1 | 0 | 0 | 1 | ←D NUMBER → |

In response to this command and a READ STROBE, an EDREAD* pulse is produced on conductor 1629 by NAND gate 1579 (FIG. 14a). This pulse causes the D number stored in the latches of circuits 1770-1773 to be conducted to the data processor over conductors SW0-SW15.

In order to generate the E and D numbers on a per cylinder basis, the data processor selects the cylinder for which the E and D numbers are to be measured in the manner previously described in connection with FIGS. 13a-13c. In the example shown in FIG. 14k, the cylinder 102 is selected.

Figure 14K:
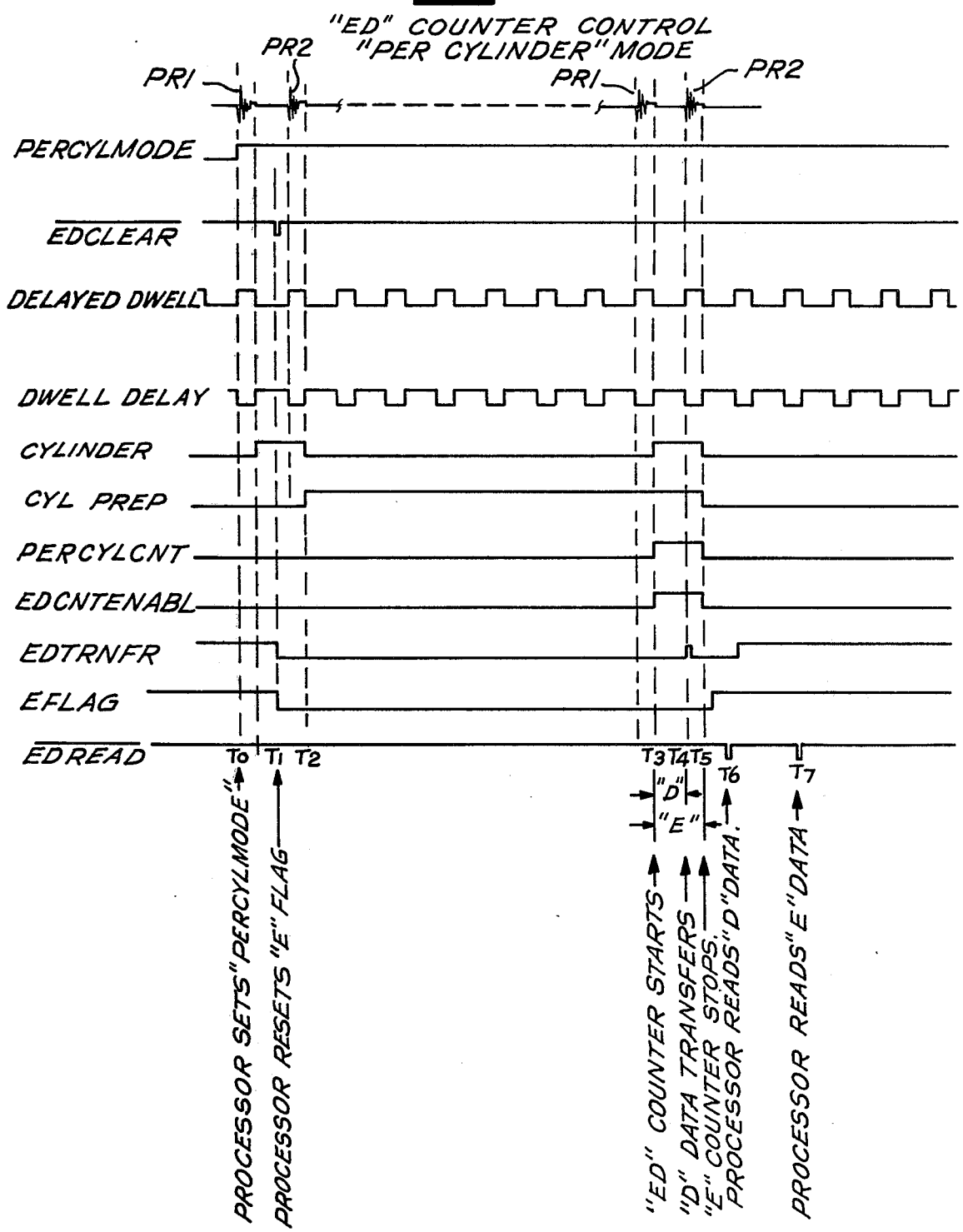
FIG. 14k illustrates exemplary voltage waveforms used to generate the D and E numbers in the counters of circuits 1770–1773 during the "per cylinder" mode of operation.

In order to establish the per cylinder mode of operation, the data processor issues the MODE CONTROL OUTPUT COMMAND shown in Table 12 so that the Q output of flipflop 1692 (the PERCYLMODE signal) shown in FIG. 14k is switched to its 1 state at time T0.

When the data processor is ready to start generating the E and D numbers, the F FLAG RESET OUTPUT COMMAND (Table 13) is issued so that the ED CLEAR* signal on conductor 1677 is briefly switched to its 0 state at time T1. In response to the ED CLEAR* pulse, NAND gate 1699 (FIG. 14d) switches the EDTRNFR signal from its 1 to 0 state. Also at time T1, the E FLAG signal on the Q output of flipflop 1752 (FIG. 14d) is switched from its 1 to 0 state.

The E and D numbers will not be counted until both the CYL signal transmitted to conductor 1516 from FIG. 13b and the CYLPREP signal generated by the Q output of flipflop 1686 are both in their 1 state (FIG. 14c). If the ED CLEAR* pulse is received during the time the CYL pulse is in its 1 state, the E and D numbers will not be generated until the next occurrence of the CYL pulse. From the trailing edge of the CYL pulse (time T2), the CYLPREP signal is switched from its 0 to 1 state, and the signal remains in the 1 state until the trailing edge of the next successive CYL pulse.

Referring to FIG. 14k, at time T3, when the DWELL DELAY, CYL and CYLPREP signals are all switched to their 1 states, the Q output of flipflop 1687 switches the PERCYLCNT signal from its 0 to 1 state (FIG. 14d). In response to this signal, NAND gate 1701 causes the EDCNTENABL signal on conductor 1734 to switch from a 0 to 1 state, so that the counters of circuits 1770-1773 begin to count the CC05678A clock pulses on conductor 1726. At time T4 (FIG. 14k) when the DWELL DELAY signal is switched from its 1 to 0 state in response to the opening of contact points 118, 118a, AND gate 1709 (FIG. 14d) generates a DTRNFRENABL pulse which briefly causes the EDTRNFR signal to switch to its 1 state, so that the D number is transferred from the counters of circuits 1770-1773 to the latches of circuits 1770-1773. The D transfer enable pulse is generated between the CC05678A clock pulses, so that the counters of circuits 1770-1773 continue to count the clock pulses in order to form the E number.

At time T5 (FIG. 14k), when the DWELL DELAY signal is switched from its 0 to 1 state in response to the closing of contact points 118, 118a, the CYL, CYLPREP, PRCYLCNT and EDCNTENABL signals are all switched from their 1 to 0 states, so that the counters of circuits 1770-1773 stop counting clock pulses. The E FLAG signal is then returned to its 1 state to indicate to the data processor that the E number is ready to be read.

If the data processor wants to know the status of the E number, it issues an E STATUS INPUT COMMAND shown in Table 15:

TABLE 15

| E STATUS INPUT COMMAND | | | | | | |
|---|---|---|---|---|---|---|
| AD2 | AD3 | AD4 | AD5 | AD6 | AD7 | SW4 SW5 |
| 0 | 1 | 0 | 0 | 0 | 1 | E,D STATUS |

In response to this command and a READ STROBE, status read conductor 1625 is switched to its 1 state by AND gate 1587 (FIG. 14a). In response to the STATUS READ pulse, the E FLAG is conducted to the data processor over conductor SW4 (FIG. 14d). Since the E FLAG is in its 1 state at this point in time, the D number is available for reading in the latch portion of circuits 1770-1773, and the E number is ready for reading in the counter portion of circuits 1770-1773.

In order to read the D number, the data processor issues the D READ INPUT COMMAND (Table 14), and the D number is read in the manner previously described at time T6 (FIG. 14k).

After a slight delay created by flipflops 1690, 1691, the EDTRNFR signal on conductor 1735 is switched from its 0 to 1 state so that the E number is transferred to the latches of circuits 1770-1773. Thereafter, at any arbitrary time T7, the data processor can read the E number by issuing an E READ INPUT COMMAND shown in Table 16:

TABLE 16

E READ INPUT COMMAND

| AD2 | AD3 | AD4 | AD5 | AD6 | AD7 | SW0 – SW15 |
|---|---|---|---|---|---|---|
| 0 | 1 | 1 | 0 | 0 | 1 | ←E NUMBER→ |

In response to this command and a READ STROBE, an EDREAD* pulse is generated by NAND gate 1579, and the E number held in the latches of circuits 1770-1773 is transmitted to the data processor over conductors SW0-SW15.

CHARACTER CONTROLLER 1800

Character controller 1800 is a charcter generator used to generate the video signals required to display alphabetic, numeric and symbolic characters on the face of the CRT tube located in display monitor 190. The character controller has a refresh capability which continues refreshing the data on the CRT screen once a set of characters has been inputted to the device by the data processor. This same set of characters will be refreshed until a new command is received from the data processor.

Referring to FIGS. 15a-15e, information relating to the display data is stored in a character generator read-only memory 1810. The appropriate data is also generated by a main shift register 1812 and dot display shift registers 1814, 1815. Data identifying the type of information to be displayed, as well as the location of the information on the CRT face, is received and stored in data display address registers 1818, 1819 and character identification latches 1820, 1821.

Controller 1800 also includes refresh buffer memories 1824-1826, a line counter 1829, a character row/line counter 1830, a row-line counter 1831, additional counters 1832, 1833, J-K flipflops 1836-1842, one-shot multivibrators 1845, 1846, NAND gates 1849-1864, AND gates 1865-1906, NOR gates 1908-1920, an OR gate 1924, inverters 1928-1946, Exclusive OR gates 1950-1958, a logic gate 1959, diodes 1961-1964, resistors 1967-2013, and capacitors 2020-2027. The components are connected by conductors 2031-2079 which are schematically shown as merging together into cables 2084-2087. Of course, in practice, the conductors remain isolated from each other. The entrance and exit points from the cables are clearly shown both by the numbers of the conductors at both ends and also by mnemonic identification codes drawn beside the conductors. Additional conductors 2090-2100 are also used in order to interconnect the components.

GRAPHIC CONTROLLER 2130

Graphic controller 2130 cooperates with character controller 1300 and data processor 1090 in order to produce a horizontal bar graph having a length proportional to engine rpm. The graphic controller has the same refresh capability as the character controller.

Figure 16A:
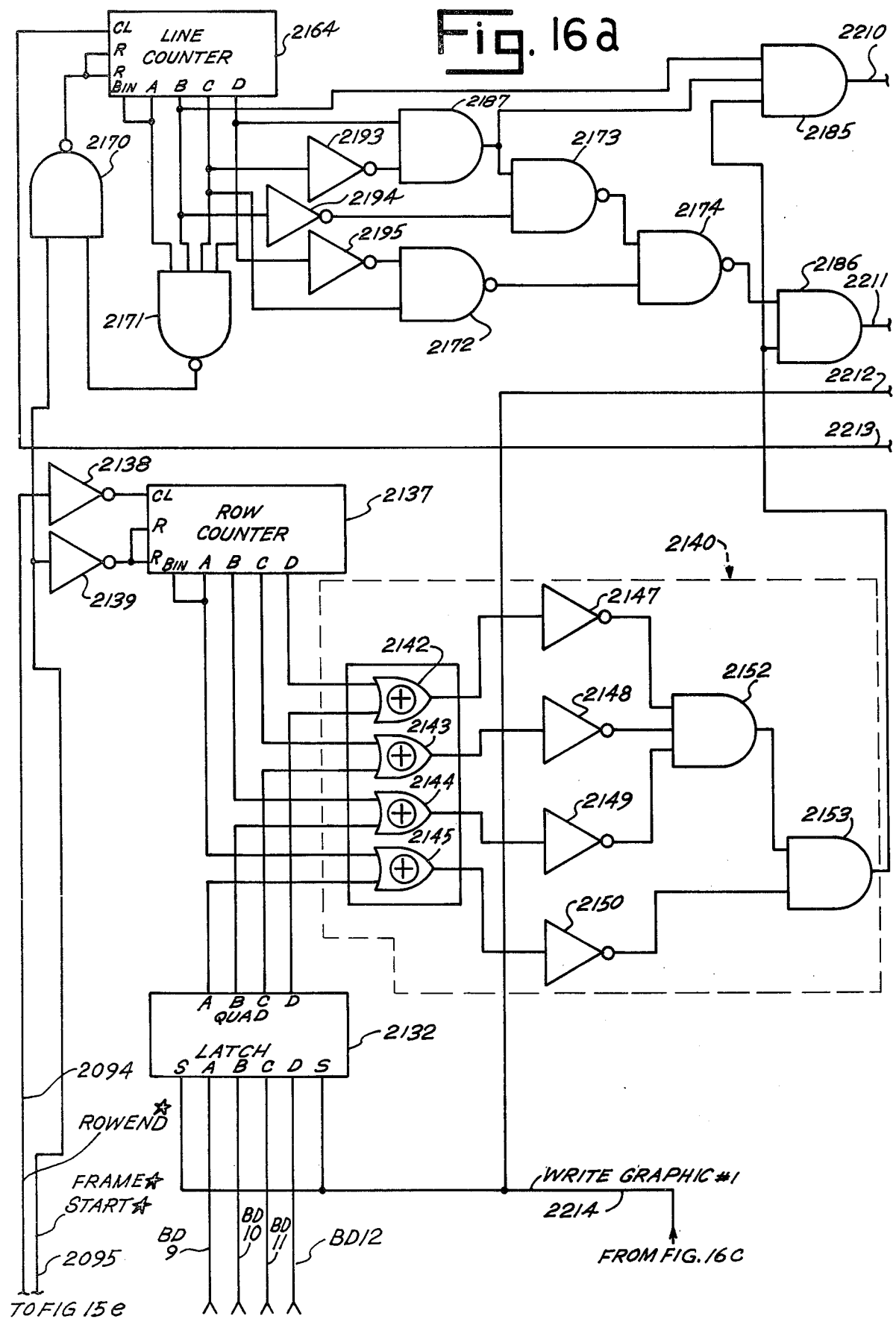
Figure 16B:
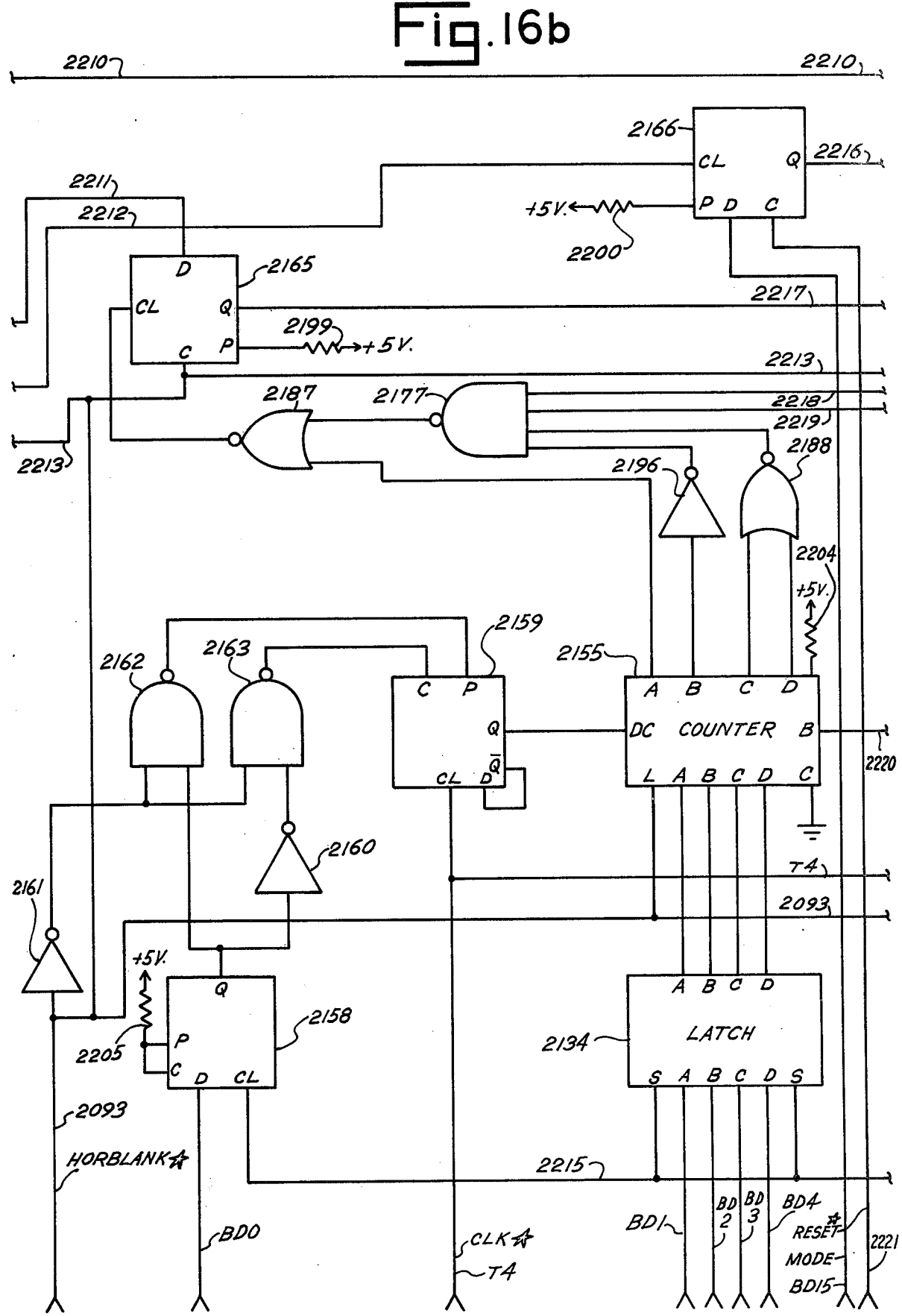

Referring to FIGS. 16a-16c, controller 2130 includes a latch 2132 which stores a row number corresponding to the row in which the bar graph is displayed and latches 2134, 2135 which store an rpm number controlling the length of the bar graph.

Controller 2130 also includes a row counter 2137 operated by inverters 2138, 2139. As soon as the number counted by the row counter is identical to the row number stored in latch 2132, a comparator 2140 indicates to the bar graph generating circuitry that the proper row has been reached. Comparator 2140 comprises Exclusive OR gates 2142-2145, inverters 2147-2150 and AND gates 2152, 2153. Down counters 2155, 2156 control the length of the bar graph.

Clearing and clocking circuitry within controller 2130 includes D-type flipflops 2158, 2159, inverters 2160, 2161, and NAND gates 2162, 2163.

Additional circuitry for placing the bar graph in the correct lines of the selected row and limiting the graph to the correct length includes a line counter 2164, D-type flipflops 2165-2168, NAND gates 2170-2174, 2177-2179, AND gates 2183-2186, NOR gates 2187-2191, inverters 2193-2196 and resistors 2199-2205. Conductors 2210-2221 are used to interconnect the circuitry in the manner shown, and commands from the data processor are decoded by AND gates 2224-2228, a NOR gate 2230 and inverters 2232, 2233.

OPERATION OF THE CHARACTER CONTROLLER 1800 AND THE GRAPHIC CONTROLLER 2130

The control of information placed on CRT 192 is maintained completely by character controller 1800 and graphic controller 2130. Both of the controllers have refresh capabilities to continue refreshing data on the CRT screen. Once the set of characters and/or bar graph position has been inputted to the controllers by the data processor, this same set of characters and/or bar graph position will be refreshed until a new command is received.

Figure 16D:
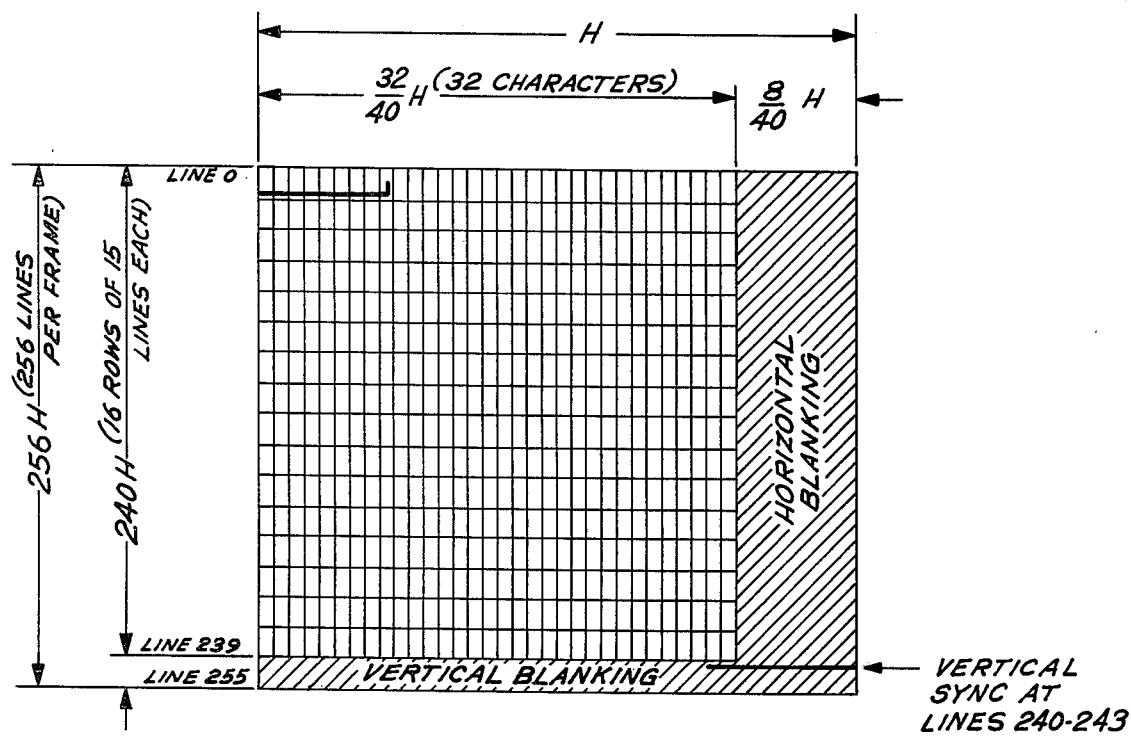
FIG. 16d is a schematic illustration of the manner in which the CRT display shown in FIG. 1 is divided by scanning into rows and columns.

For purposes of character display, CRT screen 192 is divided into 16 horizontal rows (row 0 at the top to row 15 at the bottom) and 32 vertical columns (column 0 at the left to column 31 at the right) (See FIG. 16d). CRT 192 includes an electron beamproducing electron gun which scans the face of the CRT with a predetermined number of parallel beam scan lines at a predetermined rate. Each line is scanned at the same predetermined rate during a time period having a predetermined duration. Character controller 1800 includes a clock, a line counter and a row counter which enable the scan of the electron gun to be divided into rows and lines within a row. A total of 512 characters may be placed on the screen at any one time. The character set normally stored in read-only memory 1810 is described in the following Table S:

TABLE S
CHARACTER SET FOR DISPLAY

| OCTAL CODE | CHARACTER | OCTAL CODE | CHARACTER | OCTAL CODE | CHARACTER | OCTAL CODE | CHARACTER |
|---|---|---|---|---|---|---|---|
| 00 | @ | 20 | P | 40 | (Blank) | 60 | 0 |
| 01 | A | 21 | Q | 41 | ' | 61 | 1 |
| 02 | B | 22 | R | 42 | "(Quote) | 62 | 2 |
| 03 | C | 23 | S | 43 | # | 63 | 3 |
| 04 | D | 24 | T | 44 | $ | 64 | 4 |
| 05 | E | 25 | U | 45 | % | 65 | 5 |
| 06 | F | 26 | V | 46 | & | 66 | 6 |
| 07 | G | 27 | W | 47 | '(Apostrophe) | 67 | 7 |
| 10 | H | 30 | X | 50 | ( | 70 | 8 |
| 11 | I | 31 | Y | 51 | ) | 71 | 9 |
| 12 | J | 32 | Z | 52 | * | 72 | : |
| 13 | K | 33 | [ | 53 | + | 73 | ; |
| 14 | L | 34 | \ | 54 | , (Comma) | 74 | < |
| 15 | M | 35 | ] | 55 | - | 75 | = |
| 16 | N | 36 | ↑ (Overflow) | 56 | . (Period) | 76 | > |
| 17 | O | 37 | ← | 57 | / | 77 | ? |

Only one character is entered into the controller registers 1818–1821 at a time, and each time a row and column must be specified in a CHARACTER CONTROLLER WRITE CHARACTER OUTPUT COMMAND shown in Table 17:

TABLE 17
CHARACTER CONTROLLER WRITE CHARACTER OUTPUT COMMAND

| AD2 | AD3 | AD4 | AD5 | AD6 | AD7 | BD0 | BD1–BD6 | BD7–BD11 | BD12–BD15 |
|---|---|---|---|---|---|---|---|---|---|
| 1 | 1 | 1 | 0 | 0 | 1 | 0 | ←acter→ | ←Column→ | ←Row→ |

As shown in Table 17, the address of the character controller is transmitted to conductors AD2–AD7, the BD0 conductor is set to its 0 state, the binary code of the character to be entered into the controller is transmitted to conductors BD1–BD6, the column in which the character is to be displayed is transmitted to conductors BD7–BD11, and the row in which the characters are to be displayed is transmitted to conductors BD12–BD15. The signals by which the column and row are identified constitute display address signals which determine the location on CRT screen 192 at which the character is displayed. These address signals as well as the corresponding character signals transmitted to conductors BD1–BD6, are normally stored in read-only memory 1094.

After the character is stored in the character controller, it is outputted to the CRT screen and the SW0 conductor is set to its 1 state, indicating that a new character can be accepted. The data processor can read the status of the ready/busy flag on conductor SW0 by issuing a CHARACTER CONTROLLER STATUS INPUT, COMMAND shown in Table 18.

TABLE 18
CHARACTER CONTROLLER STATUS INPUT COMMAND

| AD2 | AD3 | AD4 | AD5 | AD6 | AD7 | SW0 |
|---|---|---|---|---|---|---|
| 1 | 1 | 1 | 0 | 0 | 1 | 0 = busy |
|  |  |  |  |  |  | 1 = ready |

The approximate time required to store and display one character is about 1.1 millisecond.

By issuing a CHARACTER CONTROLLER FLUSH OUTPUT COMMAND shown in Table 19, the data processor can erase the CRT screen and all previous character data.

TABLE 19
CHARACTER CONTROLLER FLUSH OUTPUT COMMAND

| AD2 | AD3 | AD4 | AD5 | AD6 | AP7 | BD0 |
|---|---|---|---|---|---|---|
| 1 | 1 | 1 | 0 | 0 | 1 | 1 |

The erase operation takes about 7.0 milliseconds. No reset is required, simply a CHARACTER CONTROLLER STATUS INPUT COMMAND to sense the ready/busy flag.

Figure 16F:
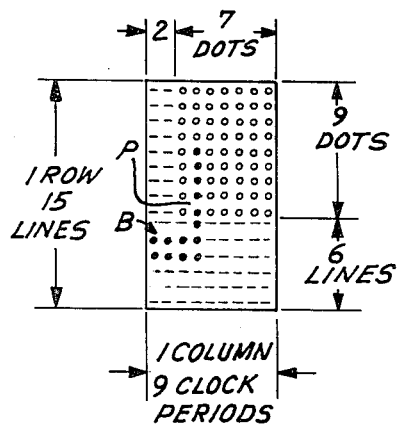
FIG. 16f is an enlarged view of the right hand end of the rpm bar shown in FIG. 16e.
Figure 16E:
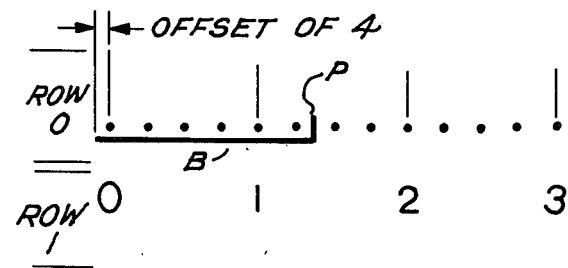
FIG. 16e is an enlarged plan view of a preferred form of a graphical rpm bar as displayed on the CRT.

For any test in which engine rpm needs to be displayed, the character controller and data processor place rpm scale marks in row 0 and arabic numerals corresponding to rpm is thousands in row 1 of the CRT screen, all as shown in FIG. 16e.

Referring to FIG. 16f, the block format for generation of a single character is divided horizontally into 9 clock periods and vertically into 15 lines per row. The rpm scale marks are generated approximately in the first 9 lines of row 0, and the horizontal bar portion of the rpm bar graph is generated in approximately lines 11, 12 and 13 of row 0.

In order to properly position the characters on the CRT screen, the character controller produces a HORBLANK signal at the end of each line. At the end of each 15 HORBLANK pulses, the controller knows that a row has been completed, and therefore, generates a ROWEND pulse. In addition, when the entire face of the CRT screen has been scanned, the controller produces a FRAMESTART pulse indicating that a new frame has started. These pulses are used by both the character controller and graphic controller in order to insure that video information is transmitted to the monitor over conductor 2090 (FIG. 15e) at the proper instant to place the character or graph in the correct position on the CRT face. The characters can be displayed on the CRT screen in a character group consisting of one or more characters.

Referring to FIGS. 16a–16c, the graphic controller can eliminate the bar graph shown in FIG. 16e from the CRT face by issuing a GRAPHIC CONTROLLER OUTPUT COMMAND shown in Table 20.

TABLE 20
GRAPHIC CONTROLLER OFF OUTPUT COMMAND

| AD2 | AD3 | AD4 | AD5 | AD6 | AD7 | BD15 |
|---|---|---|---|---|---|---|
| 0 | 0 | 0 | 1 | 0 | 1 | 0 |

In response to this command, the Q output of flipflop 2166 (FIG. 16b) is switched to a state which prevents pulses from being transmitted on the graphic output conductor 2066 (FIG. 16c).

The data processor can display the bar graph by issuing a GRAPHIC CONTROLLER DISPLAY OUTPUT COMMAND shown in Table 21.

TABLE 21

| GRAPHIC CONTROLLER DISPLAY OUTPUT COMMAND | | | | | | | | |
|---|---|---|---|---|---|---|---|---|
| AD2 | AD3 | AD4 | AD5 | AD6 | AD7 | BD0 – BD8 | BD9 – BD12 | BD15 |
| 0 | 0 | 0 | 1 | 0 | 1 | ←Length→ | ←Row→ | 1 |

That is, conductor BD15 is switched to its 1 state, the states of conductors BD0–BD8 determine the length of the bar graph, and the states of conductors BD9–BD12 determine the row in which it is displayed. In the present example, the bar graph is displayed in row 0 of the CRT face. (FIGURE 16e). The row number is normally stored in read-only memory 1094.

Referring to FIG. 16a, four binary 0's corresponding to row 0 are stored in latch 2132. As soon as row counter 2137 is reset to its 0 state by the receipt of a FRAMESTART* pulse on conductor 2095, comparator 2140 switches the output of AND gate 2153 to its 1 state. The FRAMESTART* pulse also resets counter 2164 to its 0 state. Thereafter, counter 2164 begins to count HORBLANK* pulses received from the character controller over conductor 2093. Thus, line counter 2164 advances one count at the end of each line of the display.

As shown in FIG. 16e, the rpm bar graph consists of a vertical pointer P which is 6 lines tall and a horizontal bar B which is 2 lines wide. Pointer P is generated in lines 4, 5, 6, 7, 8 and 9 of row 0 of the CRT display. In order to display the pointer, the output of AND gate 2186 is switched to its 1 state after line counter 2164 has counted 4 lines (i.e., 4 HORBLANK* pulses).

At the end of every display line, upon receipt of each HORBLANK* pulse, down counters 2155, 2156 are loaded with the length number stored in latches 2134, 2135. The number stored in the latches corresponds to the number of CLK* pulses received on conductor T4 which will give the appropriate designation of rpm on the rpm scale (FIG. 16e). Each clock period is 175 nanoseconds and corresponds to about 27.8 rpm on the rpm scale. In line 8 of row 0, as soon as counters 2155, 2156 have been counted down to 1 by the receipt of CLK* pulse, the output of NOR gate 2187 (FIG. 16b) is switched to its 1 state so that a pulse is clocked through D-flipflop 2165. This pulse, in turn, is gated through NAND gate 2179 and AND gate 2184 (FIG. 16c). The pulse is delayed by one clock period in D-type flipflop 2168 and is then transmitted over conductor 2066 to the character controller for display on the CRT screen. The same procedure is used in lines 5, 6, 7, 8 and 9 in order to generate the pointer P of the bar graph.

At the beginning of lines 10 and 11, row 0, the output of AND gate 2185 is switched to its 1 state. As a result, NAND gate 2178, AND gate 2184 and D-type flipflop 2168 enable the transmission of pulses to the character controller in response to the receipt of each CLK* pulse. As soon as counters 2155, 2156 have been counted down to 0 on each line, the output of NOR gate 2191 is switched to its 0 state to prevent additional graphic bar pulses from being transmitted to the character controller over conductor 2066. As a result, the bar and pointer are terminated at the appropriate point on the rpm scale (FIG. 16e).

The same procedure is followed for line 11 of row 0, so that the bar graph is displayed for the appropriate length in each of these lines. At the beginning of line 12, the outputs of both AND gates 2185 and 2186 are in their 0 state, thereby preventing the display of the bar graph in any additional lines of row 0.

FRONT PANEL INTERFACE CIRCUIT 2240

Figure 17C:
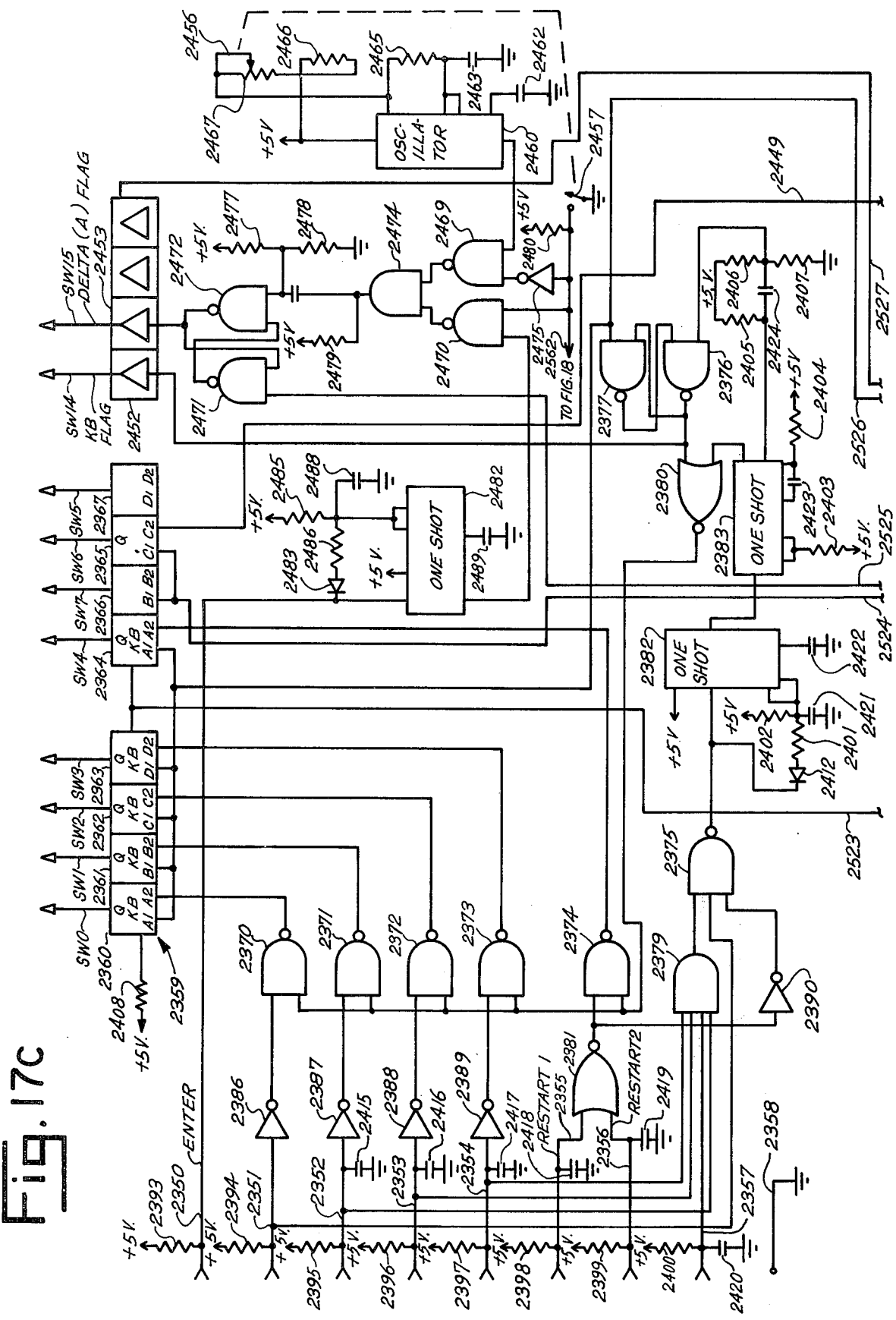
FIGS. 17c–17e are schematic diagrams of a preferred form of front panel interface circuit made in accordance with the invention.
Figure 17D:
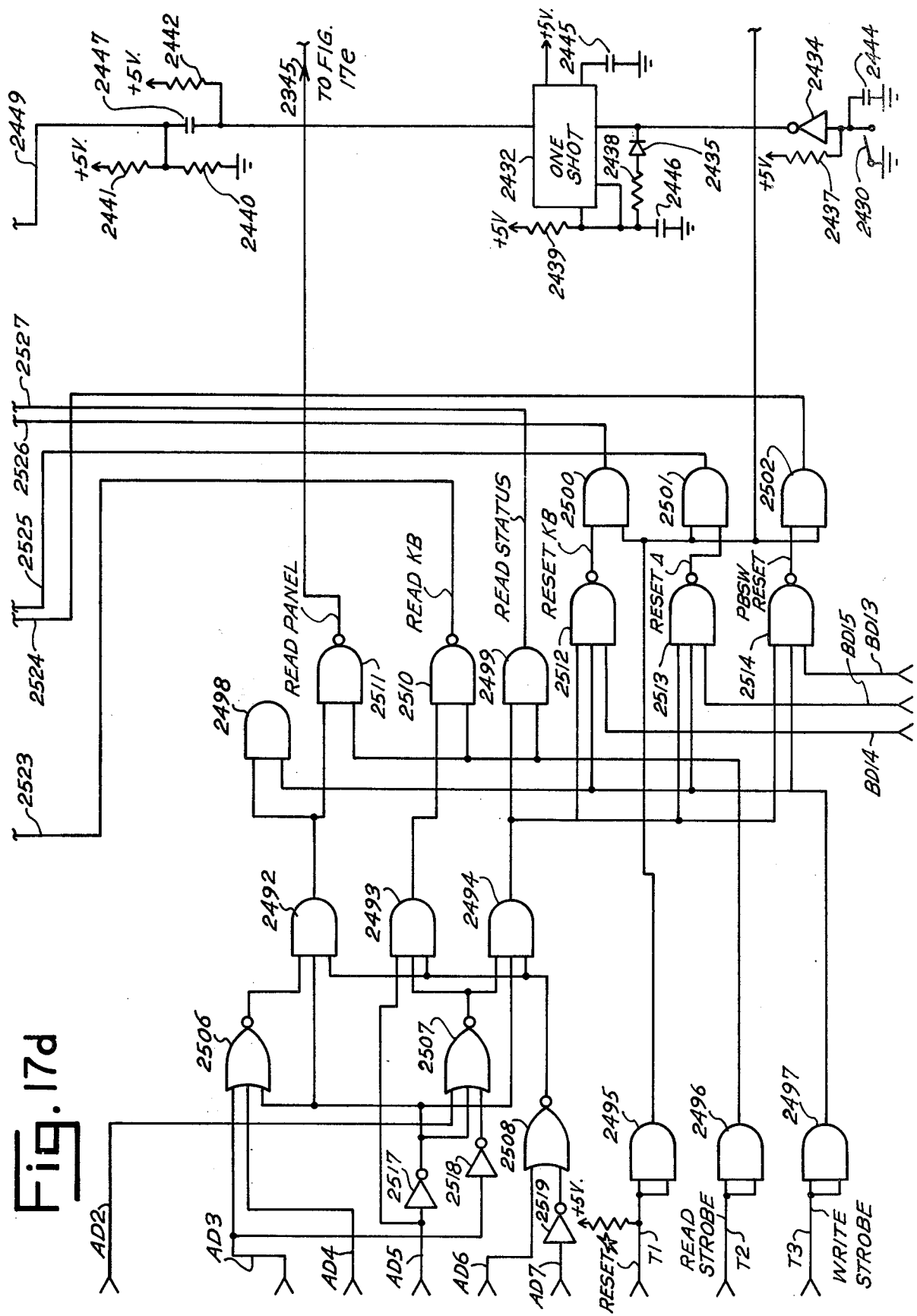
Figure 17E:
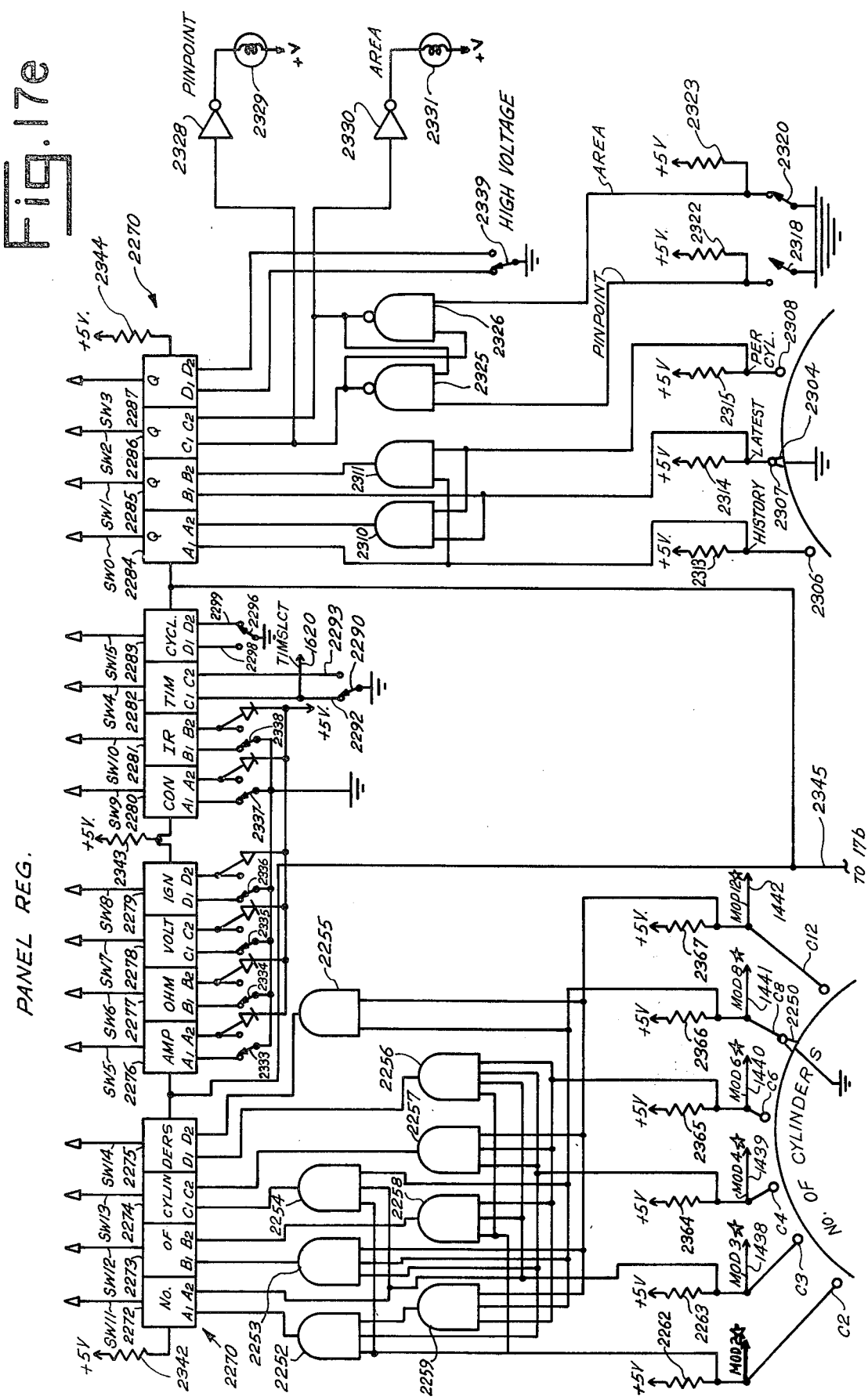

Referring to FIGS. 17a and 17e, front panel 182 includes the front panel interface circuitry 2240. As indicated in FIG. 17a, the circuitry includes the following set-up switches which must be properly adjusted by the operator before the system is ready for operation: cylinder number switch 2250, timing switch 2290, ignition type switch 2296, and ignition selector switch 2300.

Cylinder number switch 2250 is settable to the 2, 3, 4, 6, 8 and 12 cylinder positions which correspond to conductors C2, C3, C4, C6, C8 and C12, respectively. The information derived from the conductors is coded by AND gates 2252–2259 which are biased by resistors 2262–2268. The coded information is recorded in a panel register 2270 comprising latches 2272–2287, and the coded number of cylinders in engine 100 is held in latches 2272–2275.

Timing switch 2290 is set to the "magnetic" position corresponding to contact 2292 if timing information is to be received by magnetic pick-up 137 and is set to the "manual" position corresponding to contact 2293 if timing information is to be introduced by manual means, such as a timing light. The type of timing selected by switch 2290 is stored in latch 2282 of the panel register.

Ignition type switch 2296 is moved to the "2 cycle" position, corresponding to contact 2298, if a two-cycle engine is tested, and is moved to the four-cycle position, corresponding to contact 2299, if a four-cycle engine is tested. This information is stored in latch 2283.

Still referring to FIGS. 17a and 17e, the front panel includes a pin point mode switch 2304 which has contacts 2306–2308 corresponding to the "history", "latest" and "per cylinder" modes, respectively. Information from these contacts is coded by AND gates 2310, 2311, biased by resistors 2313–2315. The information is then stored in latches 2284, 2285 of the panel register.

The front panel also includes a pin point switch 2318 and an area switch 2320 which determine whether pin point or area tests are performed by the system. This information is coded by means of resistors 2322, 2323, NAND gates 2325, 2326 which prevent the pin point and area switches from being activated at the same time. If the pin point switch is activated, an amplifier 2328 illuminates a light bulb 2829 in order to indicate the mode of operation to the operator. If the area switch is activated, an amplifier 2330 illuminates a light bulb 2331 in order to indicate this mode of operation to the operator.

The type of pin point test desired by the operator is indicated by switches 2333–2339 which correspond to amperes, ohms, volts, ignition, condenser, infra-red emission analyser, and high voltage (leakage) tests, respectively. The information for switches 2333–2338 is stored in latches 2276–2281, respectively and the information from switch 2339 is stored in latch 2287. Resistors 2342-2344 bias the panel register and an output conductor 2345 is used to read the panel register in the manner described hereafter. Switches 2333-2338 are each shown in their off position connected to the 1 (e.g., A1) inputs of latches 2276-2281. In order to indicate that a pin point test is requested, the operator depresses the switches on the front panel which cause them to be moved to the "on" or 2 (e.g., A2) positions on the inputs of latches 2276-2281.

Referring to FIGS. 17a-17c, keyboard 184 has 20 switches which are conductively connected through a cable 2346 to a conventional encoder 2348. The encoder communicates with the circuitry shown in FIG. 17c through conductors 2350-2358. Each time the ENTER, RESTART 1, RESTART 2 and 0 switches are pushed, the respective conductors 2350, 2355, 2356 and 2357 are switched to their 0 states. The remaining conductors 2351-2354 are used to code the remaining switches of keyboard 184 into a binary code.

Referring to FIG. 17c, information transmitted from the keyboard is stored in a keyboard register 2359 comprising latches 2360-2364, as well as a latch 2365 used to indicate a request for an amperes calibrate procedure.

Circuitry used for transmitting keyboard data to latches 2360-2364 and for setting the KB FLAG in latch 2452 of the status register includes NAND gates 2370-2377, AND gate 2379, NOR gates 2380, 2381, one shot multivibrators 2382, 2383, inverters 2386-2390, resistors 2393-2408, a diode 2412 and capacitors 2415-2424.

If any of the switches on the keyboard is depressed, the normally 0 output of NAND gate 2375 is switched to its 1 state. As a result, the output of NOR gate 2380 is switched to its 1 state for about 1 millisecond so that NAND gates 2370-2374 can transmit data from the keyboard into latches 2360-2364, respectively. Thereafter, the 0 state of the output of NOR gate 2380 prevents additional information from being entered into latches 2360-2364. At the same time the output of NOR gate 2380 is switched to its 1 state, the output of the flipflop formed by NAND gates 2376, 2377 is switched to its 1 state in order to set the KB FLAG in latch 2452 to its 1 state. If a pulse is received over conductor 2526, the output of the flipflopp formed by NAND gates 2376, 2377, is reset to its 0 state, thereby resetting the KB FLAG to its 0 state and also resetting the keyboard register 2359 to its 0 state.

If the operator wants the system to perform an amps calibrate routine, he closes switch 2430 (FIG. 17d) which is located physically on the ammeter probe. Closure of switch 2430 stores a logical 1 signal in latch 2365 by means of one-shot multivibrator 2432, an inverter 2434, a diode 2435, resistors 2437-2442, capacitors 2444-2447 and a conductor 2449. Latch 2365 is reset at the same time the keyboard register 2359 is reset.

Referring to FIG. 17c, the DELTA FLAG is stored in latch 2453 of the status register in order to control the data displayed by the character and graphic controllers, as well as the sampling time interval of various engine parameters. The operator can control the data display and sampling time intervals by means of a refresh rate switch 2455 (FIG. 17a) which includes a potentiometer slide 2456 and a command switch 2457.

During the automatic phase of operation, switch 2435 is moved to the automatic portion of its span shown in FIG. 17a which causes switch 2457 to close. The time required in order to store a DELTA FLAG in latch 2453 is then controlled by the time period of oscillator 2460. The oscillator, in turn, is controlled by capacitor 2463 and resistors 2465-2467. The rate at which the oscillator produces pulses can be controlled by means of potentiometer slider 2456 from about 0.1 to 10 seconds. When the oscillator produces a pulse in the automatic mode, it is transmitted and stored in latch 2453 by means of NAND gates 2469-2472, an AND gate 2474, an inverter 2475 and resistors 2477-2480.

If switch 2455 is moved to the command position shown in FIG. 17a, oscillator 2460 no longer controls the rate at which a DELTA FLAG is stored. Instead, in order to store a DELTA FLAG in latch 2453, the ENTER switch on the keyboard must be depressed, or a button on the remote controller must be depressed. In either case, the enter conductor 2350 is switched to its 0 state, which results in the storing of a DELTA FLAG in latch 2453 by means of a one-shot multivibrator 2482, a diode 2483, resistors 2485, 2486 and capacitors 2488, 2489.

Referring to FIG. 17d, the circuitry for reading and resetting the KB, panel and status registers includes AND gates 2492-2502, NOR gates 2506-2508, NAND gates 2510-2514, inverters 2517-2519 and conductors 2523-2527.

In order to read the information stored in the panel register, the data processor issues a PANEL REGISTER READ INPUT COMMAND shown in Table 21.

TABLE 21

PANEL REGISTER READ INPUT COMMAND

| | | AD2 | AD3 | AD4 | AD5 | AD6 | AD7 | | |
|---|---|---|---|---|---|---|---|---|---|
| | | 1 | 0 | 0 | 1 | 0 | 1 | | |
| SW0 | SW1 | SW2 | SW3 | SW4 | SW5 - | | SW11 - | | SW15 |
| Pinpoint Mode | Pinpoint or Area | Timing Type | SW10 Pinpoint Test Selection | SW14 No. of Cylinders | 2/4 Cycles | | | | |

As previously explained, as soon as a keyboard switch is depressed, the KB FLAG is stored in latch 2452. The data processor recognizes that keyboard data is prepared to be read by issuing a STATUS REGISTER READ INPUT COMMAND shown in Table 22.

TABLE 22

STATUS REGISTER READ INPUT COMMAND

| AD2 | AD3 | AD4 | AD5 | AD6 | AD7 | SW14 | SW15 |
|---|---|---|---|---|---|---|---|
| 0 | 1 | 0 | 0 | 0 | 1 | KB FLAG | Δ FLAG |

By issuing the command, the data processor can read the status of the KB FLAG from conductor SW14.

If the KB FLAG is positive, the data processor reads the information on the keyboard by issuing a KEYBOARD REGISTER AND AMP.CAL. READ INPUT COMMAND shown in Table 23.

TABLE 23

KEYBOARD REGISTER & AMP. CAL. READ INPUT COMMAND

| AD2 | AD3 | AD4 | AD5 | AD6 | AD7 | SW0 - SW4 | SW6 |
|---|---|---|---|---|---|---|---|
| 0 | 1 | 0 | 1 | 0 | 1 | Keyboard Data | Amp.Cal. Request |

By issuing this command, the data processor can read the keyboard data from conductors SW0-SW4 and can determine whether an amps calibrate request is made from the state of conductor SW6.

After the data from the keyboard register is read, the KB FLAG is reset by issuing a KEYBOARD RESET OUTPUT COMMAND shown in Table 24.

TABLE 24

| KEYBOARD RESET OUTPUT COMMAND | | | | | | |
|---|---|---|---|---|---|---|
| AD2 | AD3 | AD4 | AD5 | AD6 | AD7 | BD14 |
| 0 | 1 | 0 | 0 | 0 | 1 | |

In this command, conductor BD14 is switched to its 1 state, FIG. 17d, so that AND gate 2500 produces a pulse which resets the keyboard register 2359 and the KB FLAG and latch 2452.

In order to reset latch 2365, which determines whether an amps calibrate routine is requested, the data processor issues an AMP CAL RESET OUTPUT COMMAND shown in Table 25.

TABLE 25

| AMP.CAL.RESET OUTPUT COMMAND | | | | | | |
|---|---|---|---|---|---|---|
| AD2 | AD3 | AD4 | AD5 | AD6 | AD7 | BD13 |
| 0 | 1 | 0 | 0 | 0 | 1 | 1 |

During this command, conductor BD13 is switched to its 1 state (FIG. 17d), so that AND gate 2503 transmits a pulse which resets latch 2365.

In order to determine whether additional data should be displayed or generated, the data processor from time-to-time issues a status register read input command to determine the state of the DELTA FLAG on conductor SW15. This command is shown in Table 22. If the DELTA FLAG has been switched to its 1 state, it indicates that a new time interval has elapsed. The data processor then resets the DELTA FLAG, thereby acknowledging that the time interval has elapsed, by issuing a DELTA FLAG RESET OUTPUT COMMAND shown in Table 26.

TABLE 26

| DELTA (Δ) FLAG RESET OUTPUT COMMAND | | | | | | |
|---|---|---|---|---|---|---|
| AD2 | AD3 | AD4 | AD5 | AD6 | AD7 | BD15 |
| 0 | 1 | 0 | 0 | 0 | 1 | 1 |

During this command, conductor BD15 is switched to its 1 state so that AND gate 2501 (FIG. 17d) produces a pulse which resets latch 2450.

Referring to FIG. 18, remote control transmitter 2550 cooperates with a companion radio receiver 2552. A typical transmitter and receiver pair useful for this purpse is manufactured by Intercontinental Dynamics Corporation, Model RT101. In response to the depression of a button 2551 (FIG. 2b) on the transmitter, the receiver generates a voltage pulse for approximately 0.5 seconds on conductor 2553.

Depression of the button either results in a PROCEED command which advances the analyzing system to the next test, or in an ENTER command which allows data to be entered into the system. The response of the system to the depression of button 2551 depends on whether the system is in the command mode, or the automatic refresh mode determined by switch 2455 (FIG. 17a). If the system is in the command mode, switch 2455 opens switch 2457 (FIG. 17c) so that a positive voltage is conducted over conductor 2562 (FIG. 18). In response to this positive voltage, a pulse is transmitted through NAND gate 2556 to conductor 2350. This pulse generates the DELTA FLAG and stores it in latch 2353 (FIG. 17c) in the manner previously described.

If the system is in the automatic refresh mode, switch 2457 (FIG. 17c) is closed so that conductor 2562 is held to ground potential. In this mode of operation, NAND gate 2556 is disabled and NAND gates 2557-2559 are enabled, so that output conductors 2352-2354 are each switched to their 0 state in the same manner as if the PROCEED button of the keyboard had been depressed. As a result, a PROCEED command is stored in latches 2350-2364 of keyboard register 2359 (FIG. 17c).

INPUT STATUS REGISTER

As previously described, a peripheral device called the input status register has storage latches located throughout the circuitry. Most of these latches have been described in connection with FIGS. 12-17. In general, upon the happening of a particular event, one of the devices described in FIGS. 12-17 sets a flag bit to a 1 state. By issuing an INPUT STATUS REGISTER INPUT COMMAND (Table 5), the data processor may read all the bits of the status register to determine the status of the flag in question. The data processor also may selectively reset the flag to a 0 state or may leave the flag bit in its 1 state by means of output commands previously described. The location and function of the various input status register flag bits is summarized in Table 27:

TABLE 27

| | INPUT STATUS REGISTER | | |
|---|---|---|---|
| FLAG NAME | SW CONDUCTOR | LOCATION | FUNCTION |
| ADC READY | 0 | FIG. 12e | Indicates whether an analog-to-digital conversion has been completed. |
| P | 1 | FIG. 14e | Indicates whether the P number is in the P register (latches of circuits 1766-1769). |
| POVRFLOW | 2 | FIG. 14e | Indicates whether the counters of circuits 1766-1769 have overflowed (i.e., P and N numbers are invalid). |
| N | 3 | FIG. 14e | Indicates whether the N number is in the N register (latches of circuits 1766-1773). |
| E | 4 | FIG. 14d | Indicates whether the E number is in the E register (latches of circuits 1770-1773). |
| EOVRFLOW | 5 | FIG. 14d | Indicates whether the counters of circuits 1770-1773 have overflowed (i.e., D and E numbers are invalid) |
| KB | 14 | FIG. 17c | Indicates that data is available in the keyboard register |
| DELTA | 15 | FIG. 17c | Indicates the time interval for refreshing display or sampling data has elapsed. |

SYSTEM PROCESSING AND MANAGEMENT

The preferred embodiment of the present invention is structured around data processor 1090 which is a 16 bit, parallel bus microprocessor having multiple accumulators, a LIFO stack, and a microinstruction set implemented in a control read-only memory for interpretation and execution of macro-level assembly language instructions.

Data processor 1090 manages the acquisition of analog and digital data from engine 100, processes the data and displays the results in alphanumeric and graphical form on CRT face 192 of display monitor 190. The system is managed under the control of front panel 182 and keyboard 184. By the use of switches 2318 and 2320 (FIG. 17a), the operator may select either pin point tests or area tests for display on the CRT screen:

The area tests are conducted in a program sequenced manner in order to locate a general area of engine malfunction. As the operator pushes the remote control button 2551 or the PROCEED button on keyboard 184, the next area test in the sequence is initiated. Until the operator pushes the PROCEED button, the data processor updates the data on the CRT screen at a refresh rate determined by the position of Refresh Rate switch 2455. The operator is allowed to push the BACK SPACE button on keyboard 184 if he wishes to return at any time to the previous step in the test sequence. Pushing the RESTART button on the keyboard at any time aborts the sequence, flushes or blanks the CRT screen, and returns the operator to the setup phase of operation.

Figure 19:
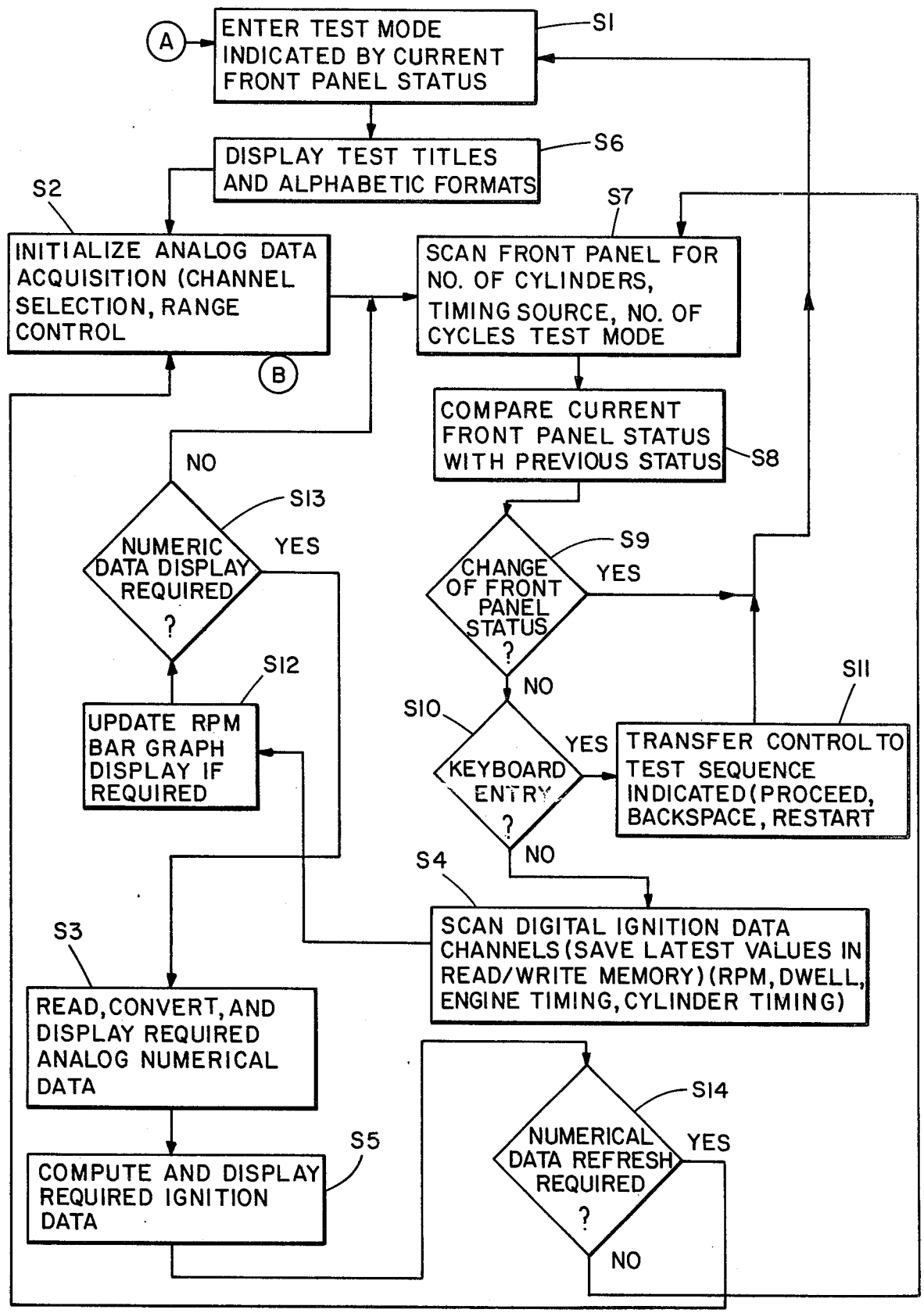
FIG. 19 is a flowchart illustrating the basic executive control sequence executed by the data processor.

In order to obtain the analog and digital data required for display on the CRT screen in both the area and pin point tests, the data processor steps through a basic executive control sequence schematically shown in the flowchart of FIG. 19. This sequence is common to all test modes and is used throughout all data acquisition subroutines, area tests and pin point tests. The executive sequence embodies a basic set of subroutines used to scan the front panel control switches and registers, read entries from keyboard 184, display characters and messages on the CRT screen, monitor the real time clock, and scan the input status register. The executive subroutines, combined with the calls to them embedded within the measurement and computational program segments, form the executive control sequence.

System status words are stored and updated in a read/write memory contained within data processor 1090. The status words enable the executive control sequence to transfer control to the required program segments or measurement subroutines. The system status words include such items as:

(1) Input status register
(2) Front panel register
(3) Last keyboard entry
(4) Program segment linkages
(5) Mode flags (area or pin point)
(6) Display row and column coordinates The encircled A in FIG. 19 indicates the initial entry point into the test mode. This same symbol is used to indicate the initial entry point on all area test or pin point test flow charts. The encircled B in FIG. 19 indicates a secondary entry point after test mode initialization and no change in test mode has been requested by the operator through the front panel or the keyboard. The same encircled B symbol is used on all area and pin point test flow charts to indicate a secondary entry point.

As shown in FIG. 19, analog data is acquired and displayed in steps S2, S3, and the digital-type ignition data obtained from the P, N E and D registers is acquired, computed and displayed in steps S4 and S5.

The manner in which the analog data is acquired and displayed is more fully described in the analog-digital converter data acquisition and display flow chart of FIG. 20. As shown in step S24, the data processor sets the range code of analog control system 1100 as required. As previously explained, the range is set by issuing the ADC FLAG RESET and ADC SETUP output commands described in Tables 1 and 2. Basically, the data processor first reads the highest numbered range of ammeter circuit 610, voltmeter circuit 700 and first reads the lowest numbered range of ohmeter-capacitance circuit 750. If the value of amperes or volts obtained from ammeter circuit 610 or voltmeter circuit 700 is lower than the stored range number (Table C), the next lower numbered range is read. If the value obtained from ohmeter-capacitance circuit 750 is too low, the next higher numbered range is read. As a result of this operation, amperes, volts and ohms are always measured in the range of the analog circuits which maximizes accuracy. This is an important feature which enhances the accuracy of the system without intervention by the operator. The range is altered by changing the range adjustment signal line which is activated by decoder 1142 (FIG. 12a).

In step S33 of FIG. 20, the data processor delays the conversion of analog data by reading real time clock 1320 through a REAL TIME CLOCK INPUT COMMAND (Table 3). As previously explained, the delay period is needed in order to allow certain of the analog data acquisition circuits to settle and attain stable conditions. The amount of time required varies from one circuit to the next and extends from a low of 50 milliseconds settling time required to read the actual amperes from circuit 610 to a high of 6000 milliseconds settling time required for the condenser leakage test conducted by circuits 750, 830 and 950.

In step S28, the data processor issues an ADC CONVERSION OUTPUT COMMAND (Table 4) which causes the conversion of the analog signal to digital form. In step S31, the status of the conversion is determined by issuing an INPUT STATUS REGISTER OUTPUT COMMAND (Table 5). If the conversion is complete, the result is read from buffers 1367, 1368 in step S36 by issuing a READ ADC INPUT COMMAND (Table 6). If the resulting digital number is outside the proper range, the program returns to step S24 where the range is adjusted by switching a different output of decoder 1142 to its 1 state.

If an overflow condition exists in which no range can read the parameter, the overflow symbol (Table S) is displayed in step S39. This is a unique feature which enables the operator to tell at a glance that the parameter can not be measured.

In step S42, K is 2500. If no conversion has been completed within 2.5 seconds, the invalid data signal is displayed (step S43).

Once an analog parameter reading has fallen within the limits defined by the ranging criteria, it can be converted to a decimal number for display in engineering units on CRT face 192 using the following formula:

Units = (ADC reading obtained from buffers 1367, 1368) (conversion factor).

The data processor automatically uses the foregoing formula in order to accurately convert the digital measurement numbers obtained from buffers 1367, 1368 to digital display signals having an engineering unit suitable for display on CRT face 192 and understandable to the operator of the system. The digital display signals are stored in the read/write memory of processor 1090 before they are outputted to character controller 1800. This is a unique feature which enables a parameter to be displayed in different engineering units merely by changing the processor program.

Figure 21:
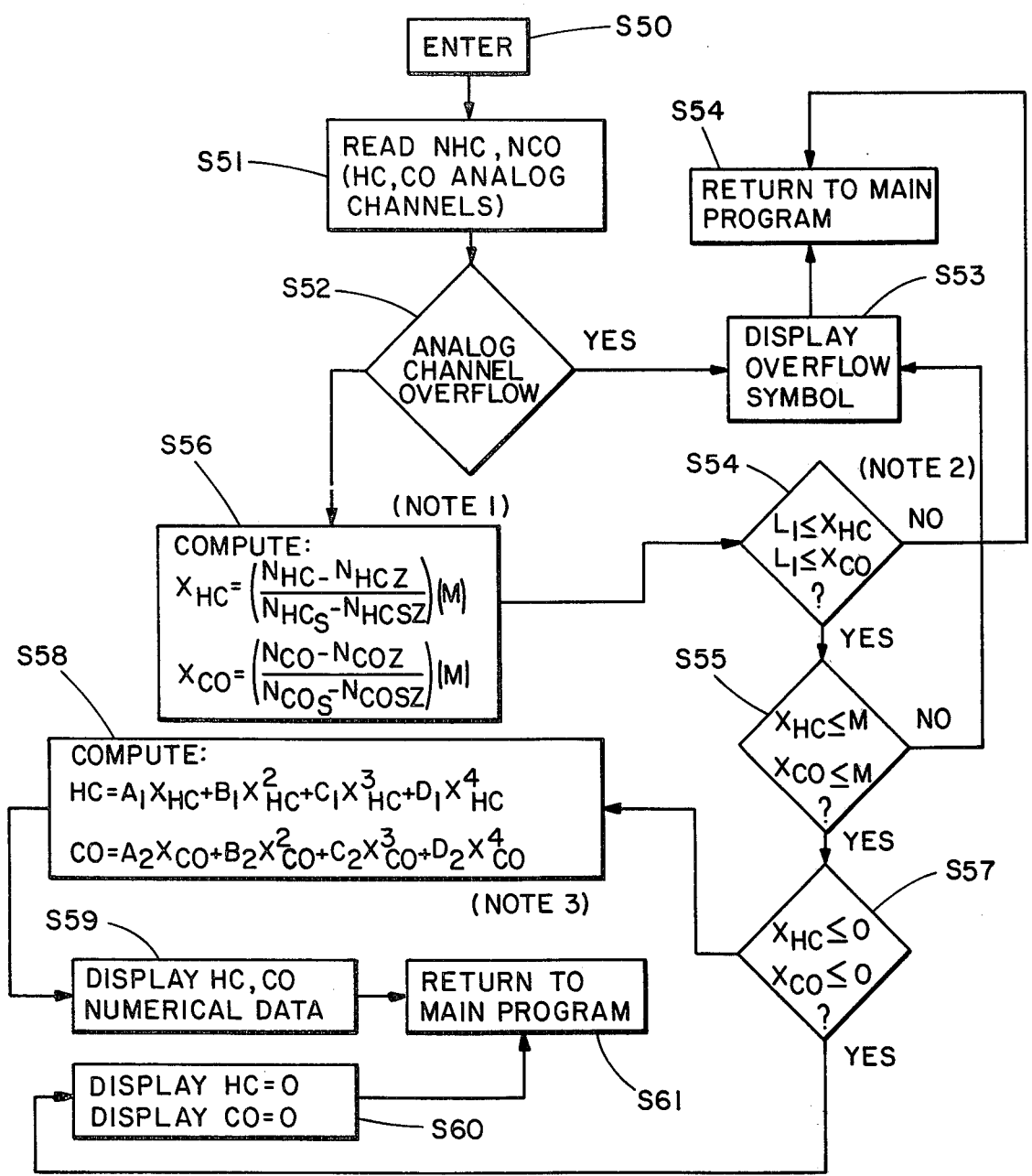
FIG. 21 is a flowchart illustrating the emissions data acquisition and display subroutine executed by the data processor.

One example of the ability of the system to perform non-linear scaling and complex linearization on measured engine parameters is shown in connection with the emissions data acquisition and display flow chart of FIG. 21. In step S51 of FIG. 21, NHC corresponds to the value read from buffers 1367, 1368 of analog system 1100 when multiplexer 1350 is programmed to read the value of the hydrocarbon (HC) parameter. NCO corresponds to the value read from buffers 1367, 1368 of analog system 100 when multiplexer 1350 is programmed to read the carbon monoxide (CO) parameter. In step S58, the data processor calculates the equation shown in order to linearize the values of HC and CO which are displayed on CRT screen 192 in step S59. Constants A1–D1 and A2–D1 are normally stored in memory 1094. The values of constants A–D, are 313.6, 30.57, −3.330 and 0.7342 respectively, and the values of constants $A_2$–$D_2$ are 0.2053, 0.2471, 0.02507 and −0.0005394, respectively. In addition, L1 used with XHC = 50 parts per million, L1 used with XCO = 0.1%, K = 14 millivolts per bit and M = 5.

Aside from the analog parameters, the data processor calculates a number of digital type engine parameters obtained from the P, N, E and D registers. The manner in which this data is obtained by the data processor is shown in the flow charts of FIGS. 22 and 23. FIG. 22 describes the acquisition and display of the P, N and accumulated D numbers, and FIG. 23 describes the acquisition and display of the E number and the D number of a per cylinder basis.

In steps S65, S66 (FIG. 22), the status of the N and P registers is determined by issuing a PN STATUS INPUT COMMAND (Table 10). In step S78, the N register is read by issuing a READ N INPUT COMMAND (Table 10); in step S80, the P register is read by issuing a P READ INPUT COMMAND (Table 11). In step S82, the program determines whether the PC mode has been set by use of the MODE CONTROL OUTPUT COMMAND (Table 12). In step S90, the P and N registers are reset by issuing a P, N FLAG RESET OUTPUT COMMAND (Table 8) and the E and D registers are reset by issuing an E FLAG RESET OUTPUT COMMAND (Table 13). In step S97, the value of K is 10,000.

In step S105 (FIG. 23), the status of the D register and number is determined by issuing an E STATUS INPUT COMMAND (Table 15). If the D number is available, it is read in step S108 by issuing a D READ INPUT COMMAND (Table 14). The value of X in step S106 is 400.

After waiting 50 microseconds (step 109), the E number is read in step S110 by issuing an E READ INPUT COMMAND (Table 16). The E and D registers (circuits 1770–1773) are then reset in step S112 by issuing an E FLAG RESET OUTPUT COMMAND (Table 13). Of course, the flowchart of FIG. 23 assumes that the per cylinder (PC) mode has been set by the use of a MODE CONTROL OUTPUT COMMAND (Table 12).

Figure 24:
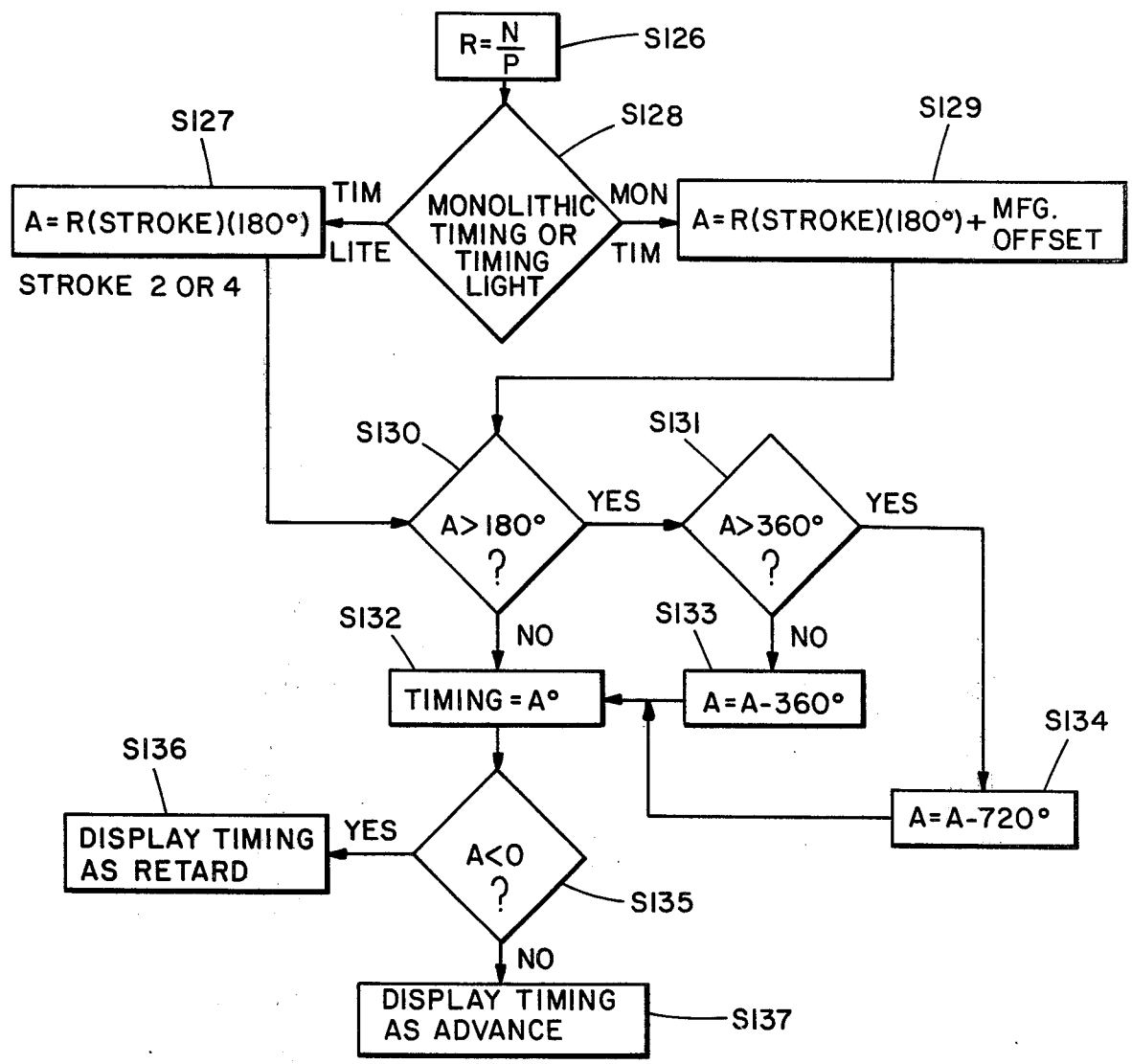
FIG. 24 is a flowchart illustrating the manner in which the data processor calculates engine timing.

The engine timing calculation required in step S94 of the flowchart of FIG. 22 is shown in FIG. 24. The "MFG. OFFSET" referred to in step S129 of FIG. 24 is the number of degrees (specified by the manufacturer) by which the monolithic timing mark 136 precedes the top dead center position of the engine. This offset in degrees is entered into the system on keyboard 184 by the operator during the set-up procedure. As previously explained, the engine timing is the number of degrees before or after the top dead center position of the engine at which the number one spark plug is fired. If the number one spark plug is fired before the top dead center position, the engine timing is displayed as an advance value. If the number one spark plug is fired after the top dead center position, the engine timing is displayed as a retard value. This display technique is illustrated in steps S135 and S137 of FIG. 24.

The calculations of RPM (speed), average dwell, dwell per cylinder, cylinder timing per cylinder, and average cylinder timing referred to in step S94 of FIG. 22 and steps S118, S120 and S124 of FIG. 23 are defined in Table 28:

TABLE 28

RPM for 2 cycle engines = 2678578/P,
RPM for 4 cycle engines = 2(2678578)/P
DWELL PER CYLINDER = D/P (360°)
AVERAGE DWELL = ($\epsilon$D)/QP (360°)
CYLINDER TIMING PER CYLINDER = (E)/P (360°) −360°/Q
(CAM LOBE)
AVERAGE CYLINDER TIMING = ($\epsilon$E)/QP (360°) − (360°)/Q
(CAM LOBE)
P = P number obtained from circuits 1766–1769 (FIGS.14e and 14i)
D = D number obtained from circuits 1770–1773 in the per cylinder mode (See FIGS. 14f and 14k)
$\epsilon$D = D number obtained from circuits 1770–1773 in the accumulative mode (i.e., sum of D numbers for all cylinders; See FIGS. 14f and 14j)
Q = number of cylinders in engine 100
E = E number obtained from circuits 1770–1773 in per cylinder mode (See FIGS. 14f and 14k)
$\epsilon$E = E number obtained from circuits 1770–1773 by repetitively operating in the per cylinder mode for each different cylinder according to the routine described in FIG. 23 (i.e., sum of E numbers for all cylinders; See FIGS. 14f and 14j)

As seen in Table 28, when the P number is used to calculate RPM, it constitutes a digital RPM signal which is inverted by the data processor.

The data processor includes numerical averaging techniques for engine parameters having continuous variations, such as engine speed and the peak kilovolt (PKV) output of the secondary coil. The averages are taken over a predetermined number of engine revolutions or a fixed number of readings depending upon the display requirements. Examples of these averaging techniques will be described more fully in connection with area tests 1 and 5.

The data processor uses the foregoing data acquisition, calculation and display capabilities in order to properly calibrate and set up the system, conduct area tests designed to uncover general areas of malfunction, and conduct pin point tests designed to isolate a defective component within the general area of malfunction.

The basic organization of these set up procedures and tests is described in the man/machine flow diagram of FIG. 25. When the system is first turned on, step S140 of FIG. 25 results in the display on CRT face 192 shown in FIG. 26. This display communicates instructions to the operator which enables cable assembly 150 to be connected to engine 100 in the manner shown in FIG. 1.

When the PROCEED button (or remote control button 2551) is pushed, step S141 is entered which results in the display shown in FIG. 27. The operator is informed to select the number of cylinders in the engine, ignition type, ignition selector position and type of timing by operating switches 2250, 2296, 2300 and 2290. The display of FIG. 27 also invites the operator to enter the TDC offset angle of the magnetic or monolithic timing input. The offset angle of the monolithic mark supplied by the manufacturer is entered by the operator on keyboard 184 (See S129 of FIG. 24). If the value is accepted by the data processor, it is displayed in the lower right hand corner of the CRT face in the position indicated by the x's in FIG. 27. If the operator makes an error in entering the offset angle, the data processor displays the word ERROR in the place where the word ACCEPTED is shown in FIG. 27. The operator can then attempt to correct the offset angle by entering a new value in the keyboard. If the new value is accepted, the display shown in FIG. 27 is outputted to the CRT face.

When the PROCEED button on the keyboard is pushed, step S142 (FIG. 25) is entered and the display shown in FIG. 28 is generated. The operator is invited to close amps calibrate switch 2430 (FIG. 17d) so that the data processor automatically goes through an amps calibration routine wherein the ambient field picked up by ammeter probe 164 is read and is automatically stored in the memory for use later in the program. The stored ampere value provides a 0 offset value which is substracted from the later-acquired ampere readings.

When the PROCEED button is again depressed, step S143 (FIG. 25) is entered and the display shown in FIG. 29 is generated. At this point in time, the operator pushes either an AREA or PIN POINT button (FIG. 17a). If the AREA button is depressed and the PROCEED button is then depressed, step S144 is entered and the display shown in box S144 of FIG. 25 is generated. When the PROCEED button is again pressed, the area tests are entered.

AREA TESTS

In area tests, a specified programmed sequence of tests is conducted by the data processor to locate a general area of engine malfunction. As the operator pushes the PROCEED button on the keyboard, the next step in the sequence is initiated, and, under control of the data processor, the operator is instructed by the CRT display. The results of each area test are displayed in alphanumeric and graphic form. Unitl the operator pushes the PROCEED button, the data processor updates (i.e., converts, calculates and displays) the data on CRT screen 192 at a refresh rate determined by refresh rate switch 2455.

In order to increase the flexibility of the system, the operator may push the BACK SPACE button on the keyboard anytime he desires to return to the previous step in the sequence. Pushing the RESTART button on the keyboard at any time aborts the sequence, blanks or flushes the CRT screen, and returns the operator to the preliminary or set-up phase (steps S140–S144, FIG. 25).

There are seven steps in the area test sequence, and each step corresponds to one "page" of information which is simultaneously displayed on the CRT screen. The seven area tests, together with the test conditions and parameters measured in each test, are described in the following Table 29:

TABLE 29

| NO. | TEST | TEST CONDITIONS | PARAMETERS MEASURED |
|---|---|---|---|
| 1. | CRANKING | DYNAMIC DISTRIBUTOR "RESISTANCE"(POINTS CLOSED PRIMARY VOLTAGE) | VOLTS |
| | | DWELL | DWELL |
| | | CRANK VOLTAGE (BATTERY) | VOLTS |
| | | CRANK COIL OUTPUT | KOLOVOLTS |
| | | CRANK AMPS (BATTERY) | AMPS |
| | | SPEED | RPM |
| 2. | ALTERNATOR OUTPUT | ALTERNATOR | RPM, MAX.AMPS |
| 3. | IDLE | SPEED | RPM |
| | | DWELL | DWELL |
| | | INITIAL ENGINE TIMING | TIMING ANGLE |
| | | EMISSIONS | HC, CO |
| 4. | LOW CRUISE | SPEED | RPM |
| | | EMISSIONS | HC, CO |
| | | IGN. PEAK KV (MAX), (MIN) | KILOVOLTS |
| 5. | CYL. POWER BALANCE | CYLINDERS SHORTED | RPM CHANGE/CYL. |
| 6. | SNAP ACCELERATION | (PLUGS UNDER LOAD) | KILOVOLTS |
| | | SPEED | RPM (MAX) |
| | | ACCELERATOR PUMP TEST | CO (MAX) |
| 7. | HI CRUISE | CHARGING TESTS | VOLTS |
| | | EMISSIONS | HC, CO |
| | | DWELL VARIATION | DWELL (Δ)* |
| | | TIMING ADVANCE | TIMING ANGLE (Δ)* |
| | | SPEED | RPM |
| | | DWELL (CURRENT) | DWELL |

TABLE 29-continued

| NO. | TEST | TEST CONDITIONS | PARAMETERS MEASURED |
|---|---|---|---|
| | | TIMING (CURRENT) (INITIAL + ADVANCE) | TIMING ANGLE |

*a = CHANGE FROM IDLE TEST

In order to illustrate the flexibility of the system, area tests 1-5 and 7 will now be described in detail:

AREA TEST 1 — CRANKING

As soon as area test 1 is entered, the data processor causes a display of the type shown in FIG. 30 to be presented on CRT face 192. However, in place of the x's shown in FIG. 30, the data processor presents arabic numbers which quantitatively define the parameters shown in FIG. 30. These numbers are derived from the data processor program segment shown in the flow chart of FIG. 31.

Figure 15C:
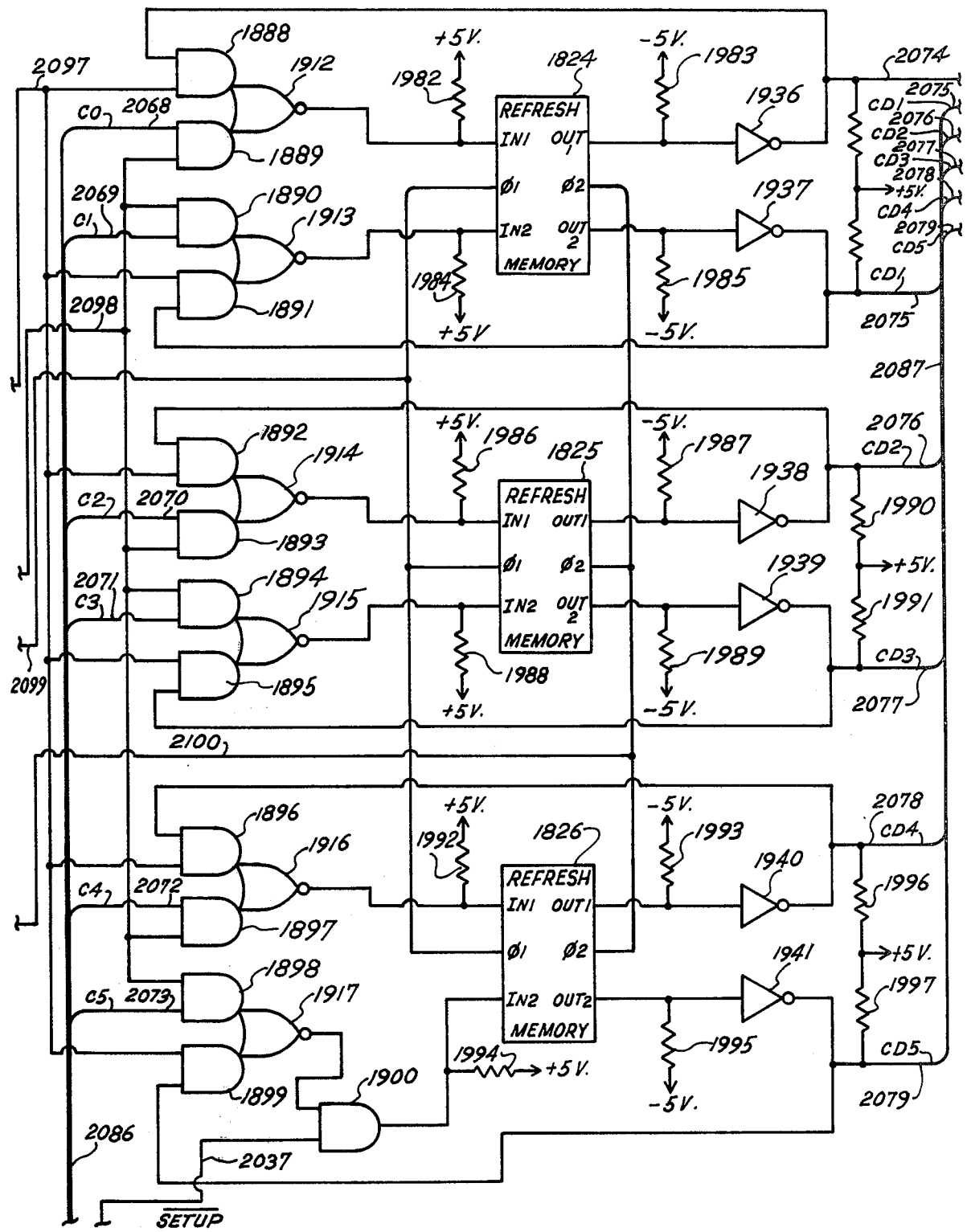
Figure 15D:
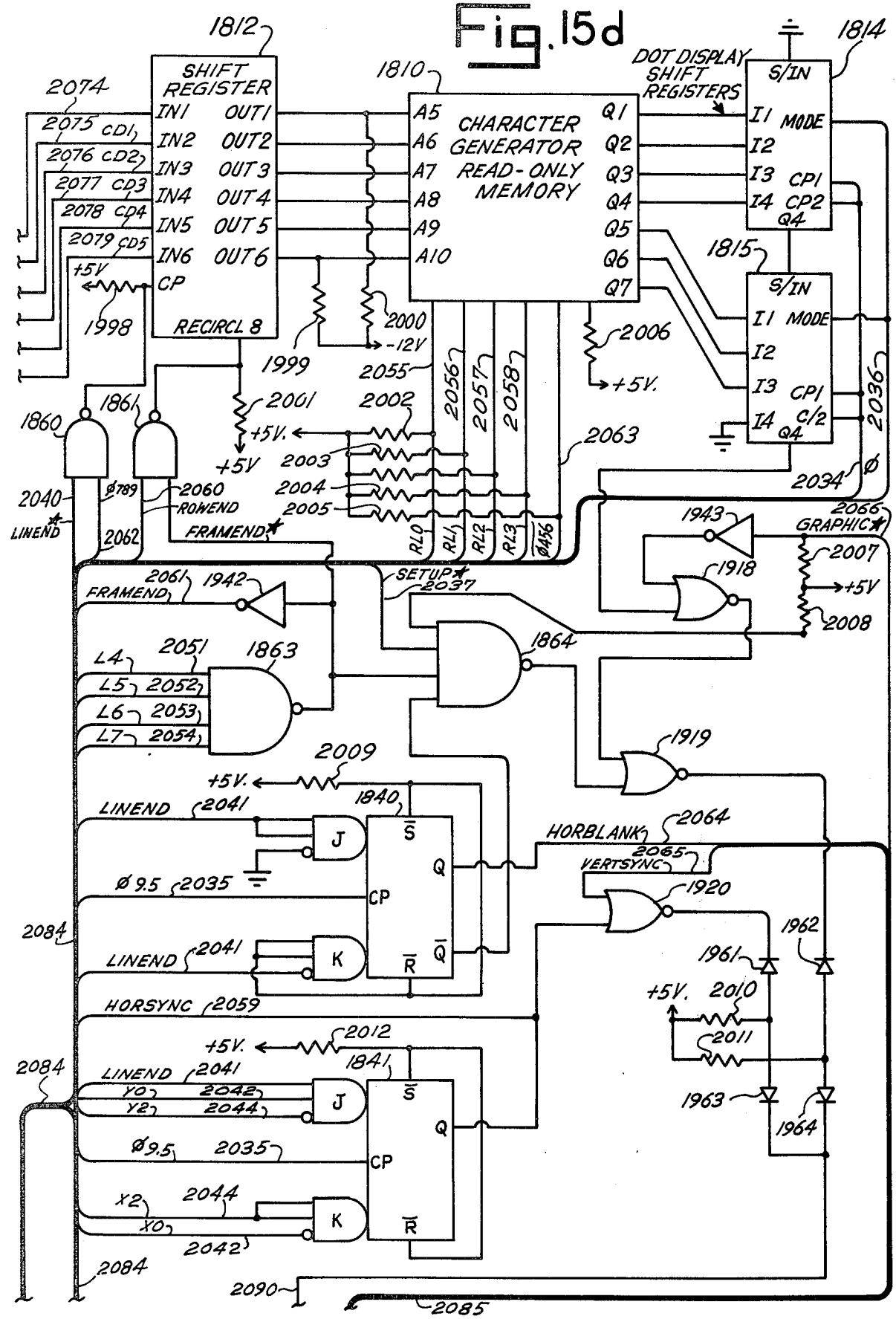
Figure 31:
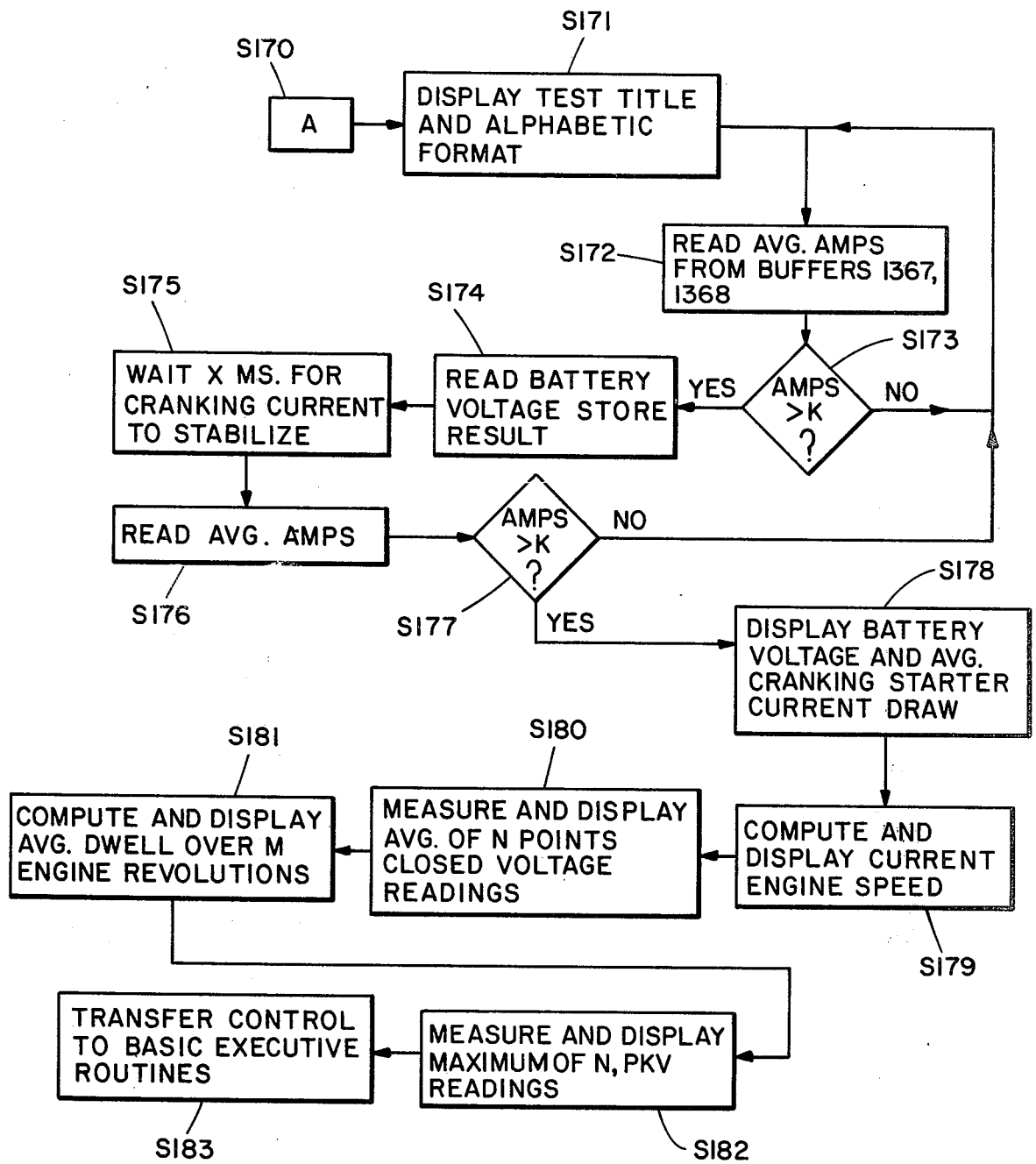
FIG. 31 is a flowchart describing the program segment executed by data processor during area test 1.

As shown in FIG. 31, step S171 results in the display of the test title and alphabetic format shown in FIG. 30. As previously explained in connection with character controller 1800, in order to display the format shown in FIG. 30, each separate character or symbol, together with its location on the CRT screen, is transmitted one-at-a-time to registers 1818-1821 and is stored in refresh memories 1824-1826 (FIG. 15c). When all the data required to display the format of FIG. 30 has been stored in the refresh memories, the display is commenced. The refresh capability of the character controller is then utilized in order to keep displaying the format until new instructions are received from the data processor. This is an important feature of the system which enables each area test format to be displayed as a single "page" on the CRT face. The page format of presenting data simplifies the task of the operator because he can view all of the critical parameters for each area test at a single glance. The same technique is used to display all other area test formats on CRT screen 192.

As shown in FIG. 30, in order to conduct the cranking test, the operator disables the ignition of engine 100 and cranks the engine by energizing the starter.

In step S172 of FIG. 31, the data processor enables an analog-to-digital conversion of the average amperes flowing through the battery cable (conductor 659) while the engine is being cranked. As shown in step S173, the data processor does not allow the number of amperes, or the number associated with any of the other parameters, to be displayed on CRT face 192 (FIG. 30) until the amperes flowing through the battery cable exceeds a predetermined number K. Normally, the value of K is 50 amperes. This is an important feature whereby the cranking of the engine is automatically detected. The operator is relieved of the responsibility of informing the system that the engine is being cranked. As a result, the proper information is displayed on the face of CRT 192 only during the actual cranking condition of the engine, not while the engine is stopped.

Before the starter draw current is displayed on row 6 of the CRT display (FIG. 30), the ambient current value stored during the amps calibration routine is substracted from the starter draw current value obtained from analog system 1100. This is an important feature which increases the accuracy of the amperes values displayed on the CRT face. A similar subtraction is made before any ampere value is displayed.

As soon as the current flowing through the battery cable exceeds 50 amperes and 1 second has elapsed (X = 1000 in step S175), the system automatically reads, stores and displays the parameters shown in FIG. 30.

Referring to step S180 (FIG. 31), the data processor takes readings of the points closed portion of the primary signal transmitted over conductor 606 to multiplexer 1350 (FIG. 12d). The N signal samplings of the points closed portion of the primary signal are then averaged and displayed opposite the legend "DYN. DIST. RES." on the CRT face 192 (FIG. 30). Normally, N = 8.

As shown in step S181, the average dwell calculation is made over M engine revolutions and is averaged and displayed opposite the "DWELL" legend on CRT face 192 (FIG. 30). Normally, M = 2. The averaging techniques described in steps S180 and S181 are important features which enable stable digital values to be displayed on the CRT face. If averaging were not used, the fractional portion of the number displayed on the screen would tend to continually change, thereby complicating the reading of the value by the operator.

As shown in step S182, data processor 1090 obtains N readings of the peak kilovolt (PKV) signal transmitted to the input of multiplexer 1350 over conductor 303 (FIG. 12d). Only the maximum one of the N readings is displayed on the CRT face opposite the legend "COIL OUTPUT" (FIG. 30). This is an important feature which automatically enables the maximum coil output to be viewed by the operator without the necessity of considering the individual coil outputs associated with each spark plug. In connection with steps S180 and S182, the value of N normally equals 8.

AREA TEST 2 — ALTERNATOR OUTPUT

Figures 32, 33:
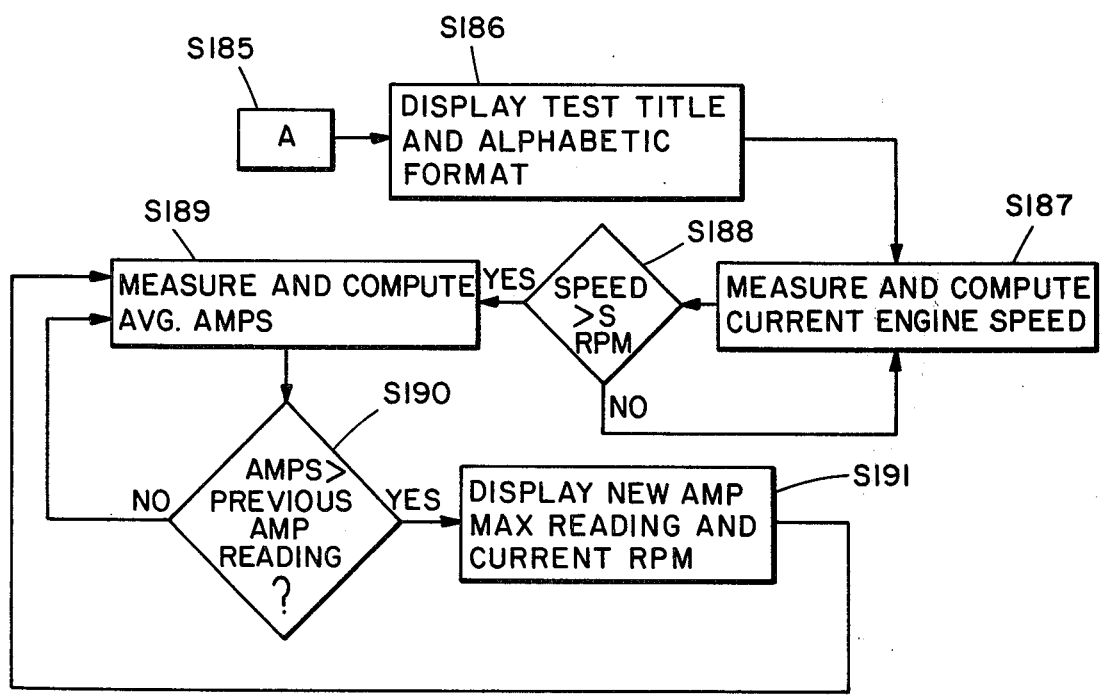
FIG. 32 illustrates the format displayed on the CRT screen during area test 2.
FIG. 33 is a flowchart illustrating the program segment executed by the data processor during area test 2.

When the operator has finished area test 1, he may advance to area test 2 by pushing the PROCEED button on the keyboard. At that time, the data processor causes character controller 1800 to display on CRT screen 192 the format shown in FIG. 32. As shown in FIG. 32, the operator is instructed to enable the ignition system, start the engine, accelerate the engine to a predetermined test speed (e.g., 2500 rpm), and return the engine to idle speed. As the engine is being accelerated to the test speed, the data processor enables the maximum amperes produced by the alternator to be displayed on screen 192, together with the engine speed at which the maximum amperes were generated. These numbers appear in the positions occupied by the x's in FIG. 32.

In order to determine the peak alternator output and the speed at which it is produced, the data processor executes the program segment shown in the flow chart of FIG. 33. In step S186, the data required to display the format shown in FIG. 32 is transmitted to character controller 1800 and is stored in the refresh memories 1824-1826 (FIG. 15c). This results in continual refreshing of the display shown in FIG. 32.

At step S187, the current engine speed is determined and used to generate the rpm bar graph. If the current engine speed is greater than the value S (which is normally set at the engine idle speed, 700 rpm), the average amperes are read from analog system 1100. In step S190, if the current average amperes are greater than the previous average ampere reading, the current reading is stored and displayed. By continuing this process as the engine is accelerated to its test speed, the maximum ampere reading and the corresponding engine speed at which the maximum reading occurs are numerically displayed on CRT screen 192. This is an important feature which enables the operator to accurately read the maximum alternator output, as well as the corresponding engine rpm, without having to evaluate a transient display. The maximum ampere reading, and corresponding rpm, are automatically computed and stored so that the operator can read them at his leisure.

In step S191, the current engine rpm is calculated and displayed on the bar graph scale. This display is executed by means of the commands previously described in Tables 17–21.

AREA TEST 3 — Idle

Figure 34:
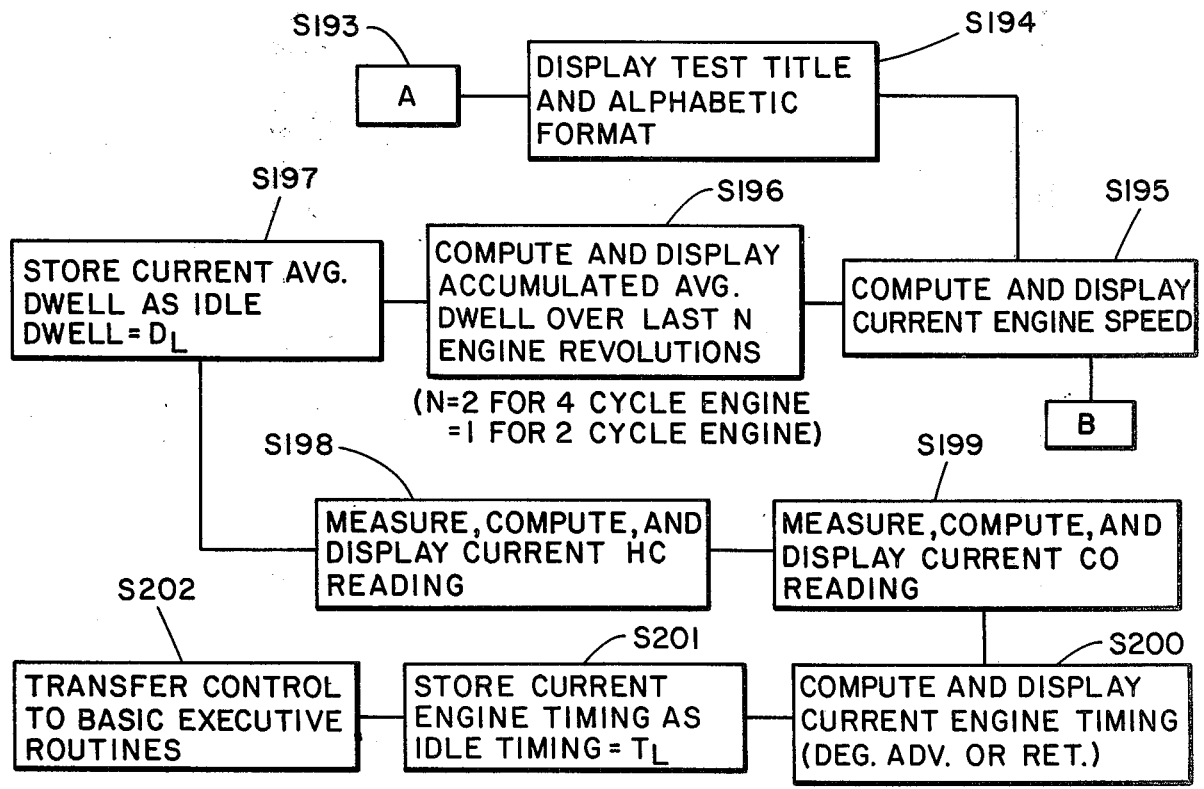
FIG. 34 illustrates the format displayed on the CRT screen during area test 3.

When the operator has completed his viewing of area test 2, he presses the PROCEED button on the keyboard and is automatically taken into area test 3. During area test 3, the data processor enables the display of the alphabetic format and rpm bar graph scale shown in FIG. 34 by excuting step S194 of the idle test program segment shown in the flowchart of FIG. 35. The position indicated by $x$'s in FIG. 34 are filled with numbers calculated by the remaining steps of the subroutine shown in FIG. 35.

In step S195, the current engine speed is calculated and displayed both in bar graph form and in numeric form. Average dwell is then calculated in the manner previously described in Table 27 for each of N engine revolutions. As explained in FIG. 35, N = 2 for four cycle engines and N = 1 for two cycle engines. The average dwell values then are averaged over the N engine revolutions and are displayed in step S196. In step S197, the average dwell value calculated in step S196 is stored as an idle dwell value (DL) for use in area test 7. In steps S198 and S199, the current HC and CO readings are measured by use of the commands shown in Tables 1–6, and the subroutine shown in the flowchart of FIG. 20, computed by the use of the subroutine shown in the flowchart of FIG. 21, and displayed by use of the commands shown in Tables 17, 18. In step S200, the engine timing is calculated in the manner described in connection with FIG. 24 and is displayed opposite the legend "INITIAL TIMING" on CRT screen 192 (FIG. 34). The engine timing at idle is then stored in step S201 for later use by the program in area test 7. This is an important feature which enables the timing at high speed (area test 7) to be compared with the idle timing obtained during area test 3. The entire process is conducted automatically by the data processor.

AREA TEST 4 — LOW CRUISE

Figure 36:
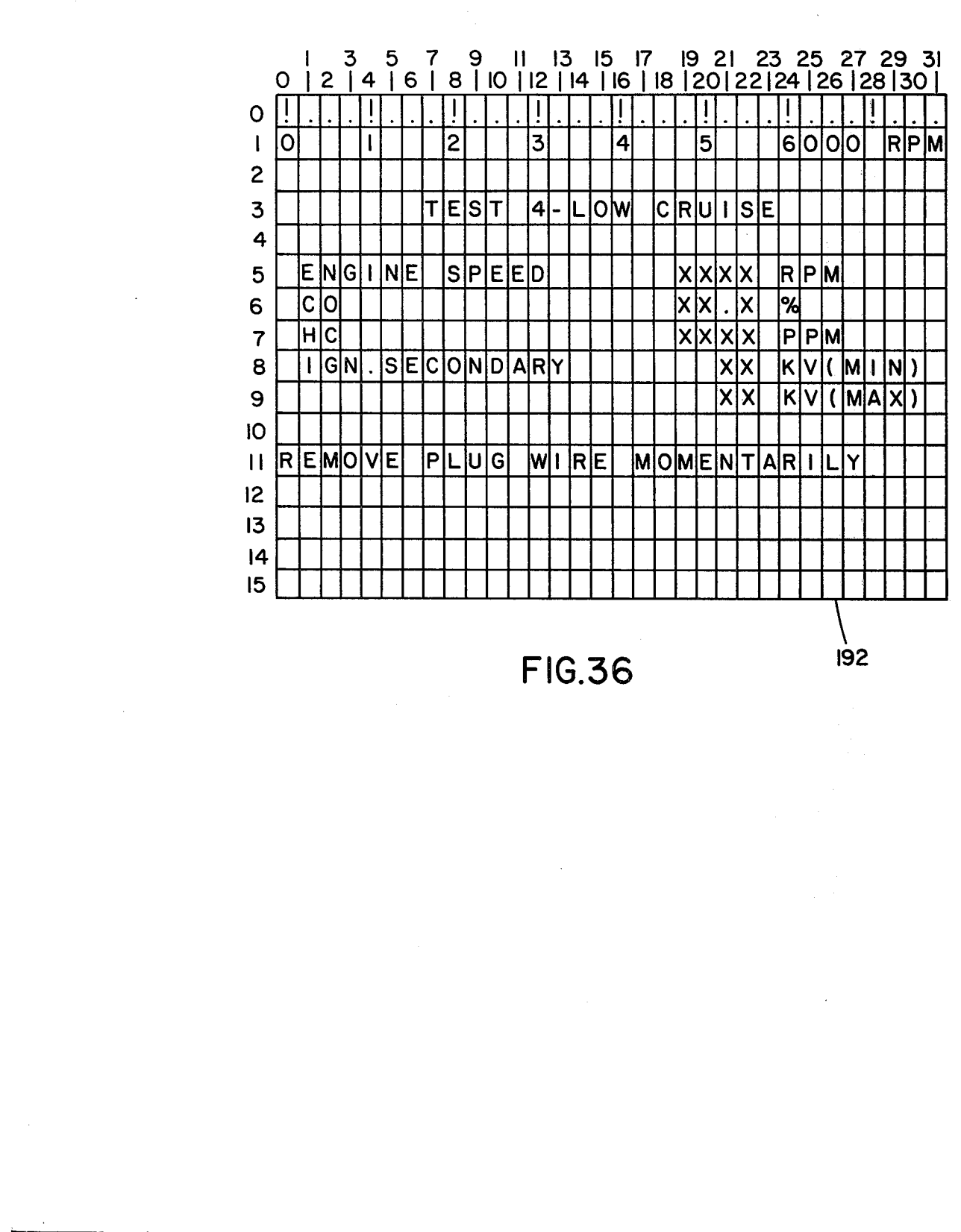
Figure 37:
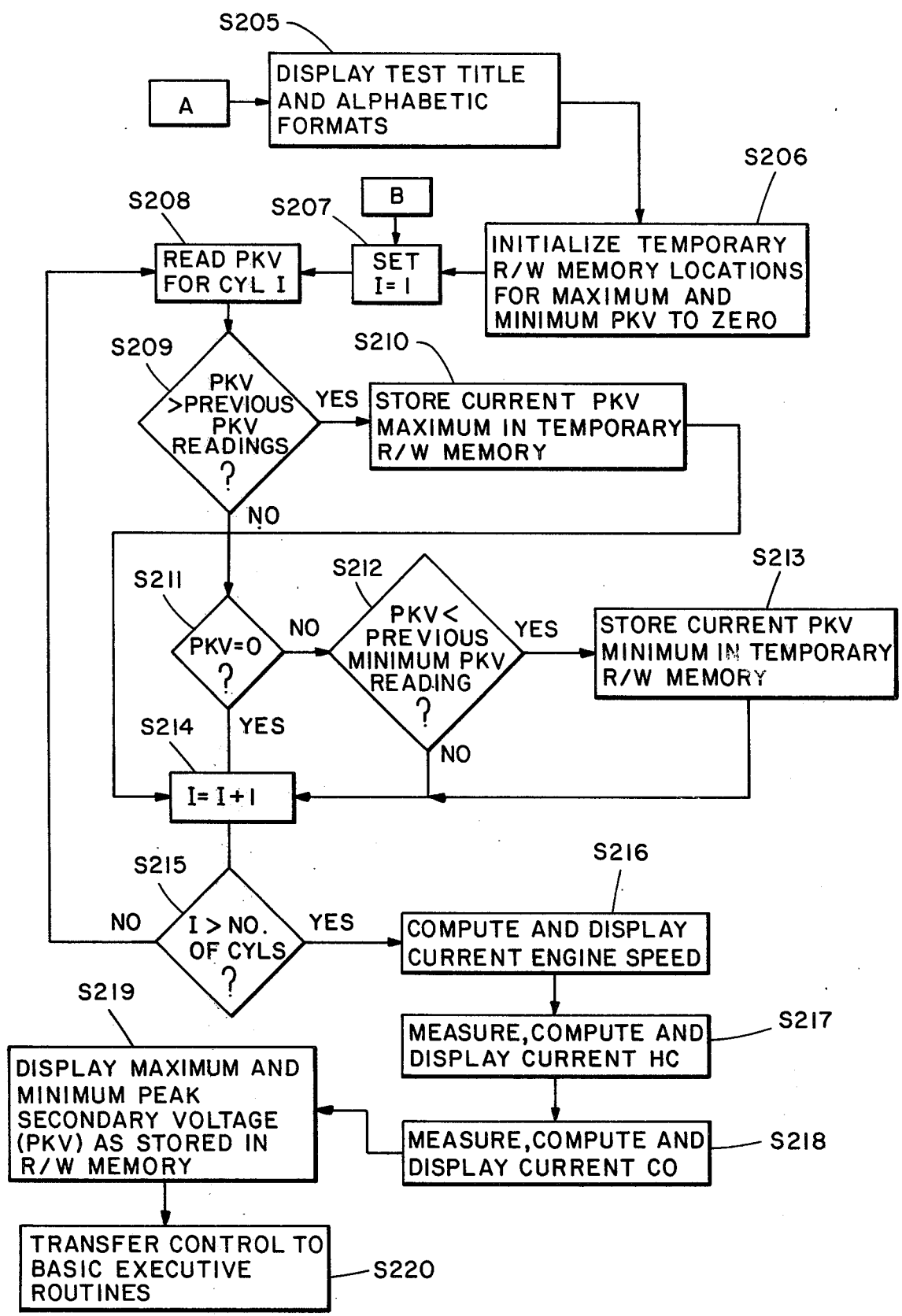
FIG. 37 is a flowchart illustrating the program segment executed by the data processor during area test 4.

When the operator has completed area test 3, he pushes the PROCEED button on the keyboard so that the data processor displays on screen 192 the alphabetic, symbolic and graphical format shown in FIG. 36 by executing step S205 of the program segment shown in the flowchart of FIG. 37. The space occupied by the $x$'s in FIG. 36 is filled with numbers calculated by the remaining steps of the program segment shown in FIG. 37.

In step S206, temporary locations in the read/write (r/w) memory in data processor 1090 are addressed in order to store the maximum and minimum PKV signals (conductor 303) obtained during subsequent steps of the program segment. As shown in steps S207, S208, the PKV signal for a selected cylinder I is read by analog system 1100. If the current PKV value is greater than the previous PKV value, the current value is stored in the temporary memory location as the current maximum PKV value (step S210). If the current PKV value is less than the previous minimum PKV value, the current value is stored as the current PKV minimum value in the temporary memory locations (step S213).

In the loop created by steps S214 and S215, the same procedure is followed for all of the cylinders so that the maximum PKV and minimum PKV reading for all cylinders of the engine are stored in temporary memory locations. The minimum value and the maximum value are displayed opposite the legends "KV (MIN) and KV (MAX)", respectively, on CRT screen 192 (FIG. 36).

According to steps S126–S218, the current engine speed and HC, CO values are also displayed. The HC and CO values, of course, are calculated according to the subroutines and commands discussed in connection with area test 3. The engine speed is displayed both numerically and in bar graph form.

AREA TEST 5 – AUTOMATIC POWER BALANCE

Figure 38:
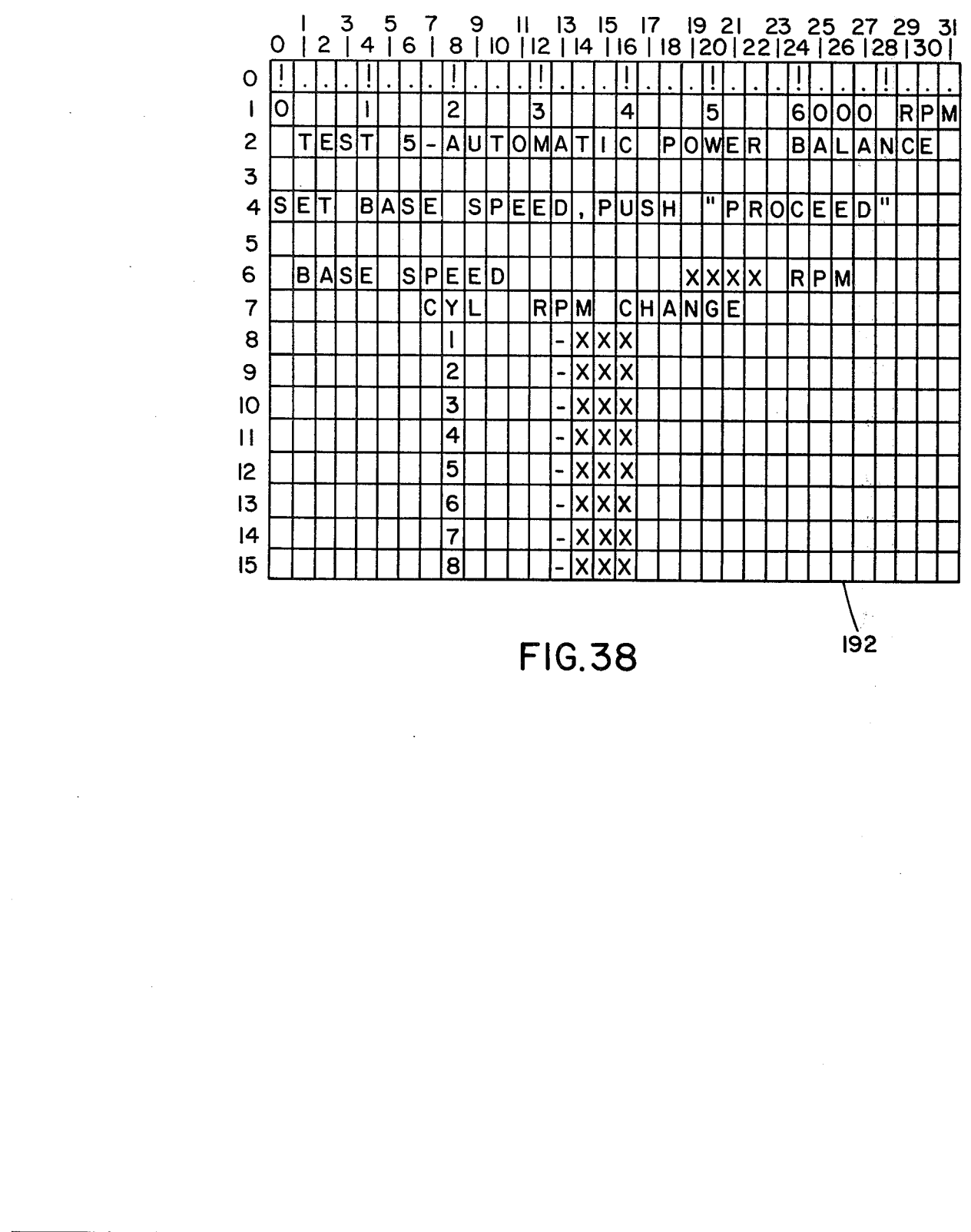

After the operator has completed area test 4, he pushes the PROCEED button to enter area test 5. Then the format shown in FIG. 38 is displayed on CRT screen 192 by execution of step S224 of the program segment shown in the flowchart of FIG. 39. The numbers indicated by the $x$'s in FIG. 38 are filled with numbers calculated by the remaining steps of the program segment described in the flow chart of FIG. 39.

Figure 39:
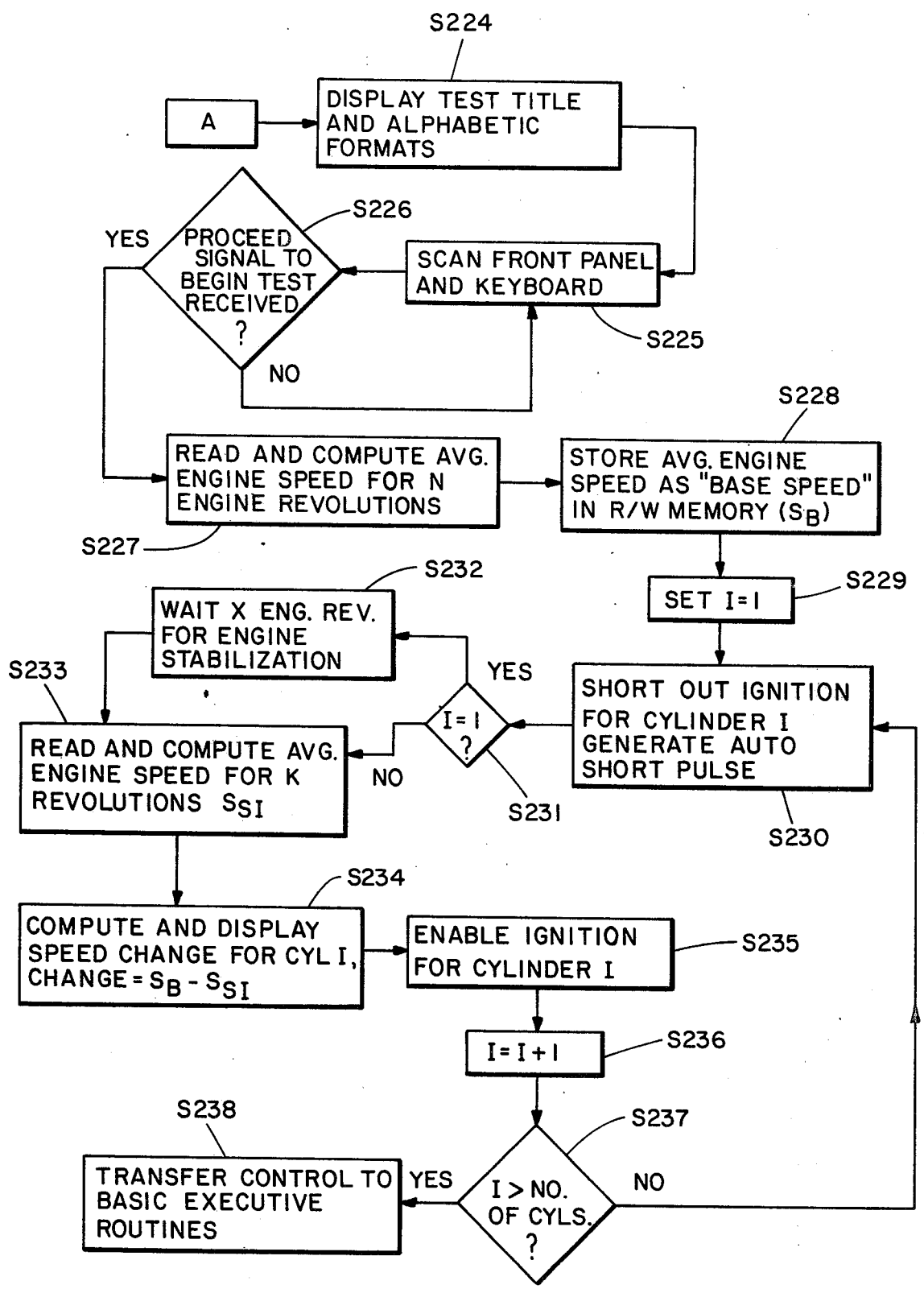
FIG. 39 is a flowchart illustrating the program segment executed by the data processor during area test 5.

The automatic power balance program segment shown in FIG. 39 sequentially shorts out contact points 118, 118a during the normal firing time of each spark plug of the engine and reports the resulting drop in engine rpm for each cylinder on CRT screen 192. In order to commence the test, the operator is instructed to set the base speed of the vehicle. The base speed can be set by at least two means:

(1) The operator can sit in the vehicle and hold the accelerator pedal in a constant position which causes the engine to rotate at the desired base speed. Normally, the base speed is between 1000 and 3000 rpm.

(2) The operator may use any one of a variety of devices for setting the throttle linkage at a fixed position which creates the desired base speed without the need to sit inside the vehicle.

When the base speed is established, the operator either pushes the PROCEED button on the keyboard or button 2551 on radio remote control unit 2550 so that the proceed code is stored in keyboard register 2359 (FIG. 17c). The data processor periodically scans the front panel switches and keyboard register to determine whether the PROCEED code has been received (step S225). When the proceed code is received, the data processor reads and computes the average engine speed for N engine revolutions, stores the computed value as the base speed (SB), and displays the converted value on CRT screen 192 opposite the legend "BASE SPEED". N is normally equal to 64. Computing the average engine speed for N engine revolutions (step S227) is an important feature which enables the change in rpm calculated when the ignition points are shorted to more accurately represent the condition of the cylinders. If the engine speed were not averaged, then the base speed could fluctuate sufficiently to cause the engine rpm change computed in step S234 to be misleading. Once the base speed has been established, it is up to the operator to maintain the throttle position at the same setting during the entire power balance test.

In step S230, after the base speed has been set, the ignition for a selected cylinder (e.g., cylinder 101) is shorted by generating an AUTO SHORT* pulse. This pulse (i.e., disable signal) is generated by issuing a CYLINDER SELECT OUTPUT COMMAND (Table 7) which operates the cylinder selection circuit 1402 (FIGS. 13a-13c) and shorting control circuit 560 (FIG. 6) in the manner previously described. The selected cylinder then is disabled by shorting contacts 118, 118a at the proper time in each engine cycle.

In step S232, the data processor waits X engine revolutions for the engine to stabilize before the engine speed is read. X normally equals 84. Engine revolutions are determined by counting ENG SYNC pulses.

In step S233, the average engine speed for K engine revolutions is determined (value SSI). K is normally set equal to 64. The value of the engine speed while the selected cylinder is shorted (SSI) is subtracted from the base speed (SB) in order to determine the change in speed for the selected cylinder (SB-SSI). The AUTO SHORT* pulse is then terminated in step S235 so that the engine speed increases to the base speed. Thereafter, the ignition for each of the cylinders is shorted in turn in the loop created by steps S236, S237 so that the change in rpm while each cylinder is disabled is displayed opposite the cylinder number on the CRT face 192 (FIG. 38).

During the entire power balance test, the current engine speed is read and displayed on the rpm bar graph scale located at the top of CRT screen 192.

After all of the cylinders have been disabled, control is transferred to the basic executive routines in step S238. It should be noted that the entire power balance test is conducted automatically by the data processor without the need for intervention by the operator. At the end of the test, the change in rpm for each cylinder is automatically recorded on the CRT face where it can be copied at the leisure of the operator.

AREA TEST 6 — SNAP ACCELERATION

After the automatic power balance test (area test 5), is completed, the operator pushes the PROCEED button in order to advance into area test 6. In area test 6, the engine is rapidly accelerated and the maximum PKV signal, maximum rpm and maximum CO reading are recorded on the CRT face 192.

AREA TEST 7 - HIGH CRUISE

Figure 41:
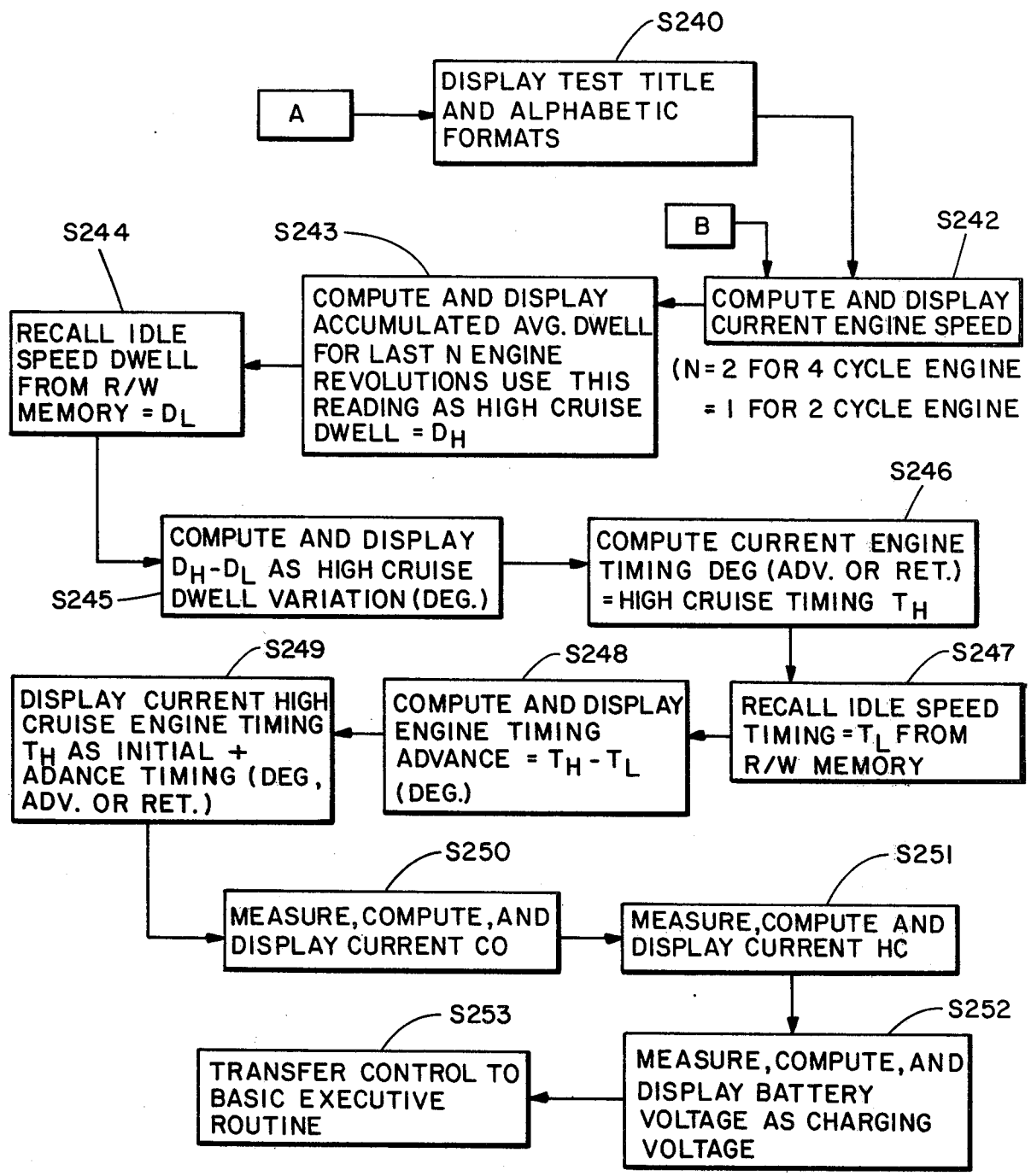
FIG. 41 is a flowchart illustrating the program segment executed by the data processor during area test 7.

After area test 6 is completed, the operator pushes the PROCEED button so that the data processor displays on CRT face 192 the bar graph scale and alphanumeric format shown in FIG. 40 by executing step S240 of the program segment shown in the flowchart of FIG. 41. As area test 7 proceeds, numbers are displayed in the positions filled with x's in FIG. 40 by the execution of the remaining steps of the program segment illustrated in FIG. 41.

At the beginning of area test 7, the operator is reminded to bring the engine up to the test speed (e.g., 1000 to 3000 rpm). The manner in which the engine is brought up to and maintained at the test speed has been previously described in connection with area test 5. In step S242, the current engine speed is calculated and displayed numerically opposite the legend "ENGINE SPEED" and graphically on the rpm bar graph scale located in row 0 of the CRT screen. In step S243, the average dwell is calculated in the manner previously described in Table 27. The average dwell reading for N engine revolutions is stored and then averaged. The average of the N average dwell readings is used as the high cruise dwell (DH) reading and is displayed opposite the legend "DWELL" on CRT face 192 (FIG. 40).

In step S244, the idle speed dwell (DL) is recalled from the read/write memory. As explained in connection with the flowchart of FIG. 35, the idle speed dwell was also averaged over N engine revolutions and stored in the read/write memory for later use. In step S245, the subtraction DH-DL is performed by the data processor, and the remainder is displayed opposite the legend "DWELL VARIATION" on CRT face 192 (FIG. 40).

In step S246, the current engine timing is calculated according to the subroutine shown in FIG. 24 and is stored in read/write memory as the high cruise timing (TH). In step S246, the idle speed timing (TL) is recalled from read/write memory. The calculation of the idle speed timing (TL) is described in step S201 of the flowchart of FIG. 35. In step S248, the data processor performs the subtraction TH-TL, and the resulting remainder is displayed as the engine timing advance opposite the legend "TIMING ADVANCE" on the CRT face 192 (FIG. 40). The current or high cruise timing TH is then displayed as degrees advance or degrees retard opposite the legend "INITIAL + ADVANCE" on CRT face 192 (FIG. 40).

As shown in steps S250 and S251, the data processor then measures, computes and displays the current CO and HC values. In step S252, the data processor measures, computes and displays the battery voltage measured over conductors 162, 163 opposite the legend "CHARGING VOLTS".

The ability of the system to store the dwell and timing advance measurements during the idle area test and to recall these measurements during the high cruise test is an important feature. This ability of the system to remember values from one area test to the next enables the operator to determine the changes in variable engine parameters, such as dwell and timing advance, in a convenient manner. These changes are recorded on CRT screen 192 until the operator can thoroughly analyze the results.

After area test 7 is completed, the operator may enter the pin point mode of operation by pushing button 2318 on the front panel (FIG. 17a). At this point in time, the data processor causes the instructions shown in FIG. 42 to be displayed on CRT face 192. This display is made in accordance with step S154 shown in the flowchart of FIG. 25.

PIN POINT TESTS

The pin point tests are selected by depressing buttons 2333-2339 on front panel 182 (FIG. 17a). There are three display modes for the presentation of engine condition or parameter values in the pin point tests which can be selected by switch 2304. These modes correspond to displaying the latest or current value, displaying the values in a historical sequence and displaying the values for a particular cylinder. The rate at which the parameter values are refreshed and displayed in the "latest" mode, and the rate at which the parameters are sampled in the "historical" mode, varies from about 0.2 to 8 seconds depending on the position of switch 2455 (FIG. 17a). Per cylinder information is only meaningful for measuring peak KV, dwell, cylinder timing and amperes. If per cylinder information is requested for other functions or parameters, the data columns are blanked on CRT screen 192.

The position of the data on CRT screen 192 during a pin point test is relative to the particular test selected. When historical data is presented on the screen, 10 sets of values are displayed, with the latest or current value always on the first or top row. The top row is separated from the rest of the values by a blank row. After the 10 sets of values have been displayed, the operator must push the PROCEED button to continue with 10 new sets of data entries.

Since only a limited amount of information can be simultaneously displayed on CRT screen 192, the order of priorities for the parameters is as follows: engine speed, Co, HC, condenser, condenser leakage, peak KV, dwell, engine timing, cylinder timing, volts, ohms, amperes. In the pin point tests, the data processor will ignore requests for display of more than 5 engine parameters. In order to select the engine parameters to be displayed during the pin point tests, appropriate buttons within the group 2333-2339 are pushed. If a newly selected parameter has a priority and column format allowing it to be displayed, or if a selected parameter has a priority greater than the priority of any parameter currently being displayed, the CRT screen will be erased, and the messages "SELECT PIN-POINT TEST MODE, PUSH DESIRED TEST BUTTONS, PUSH PROCEED BUTTON" will appear. The operator then must press the PROCEED button to enter the new parameters. This mode of operation occurs regardless of any pin point mode selection made with switch 2304.

PINPOINT IGNITION TEST IN THE PER CYLINDER MODE

Figures 42, 43:
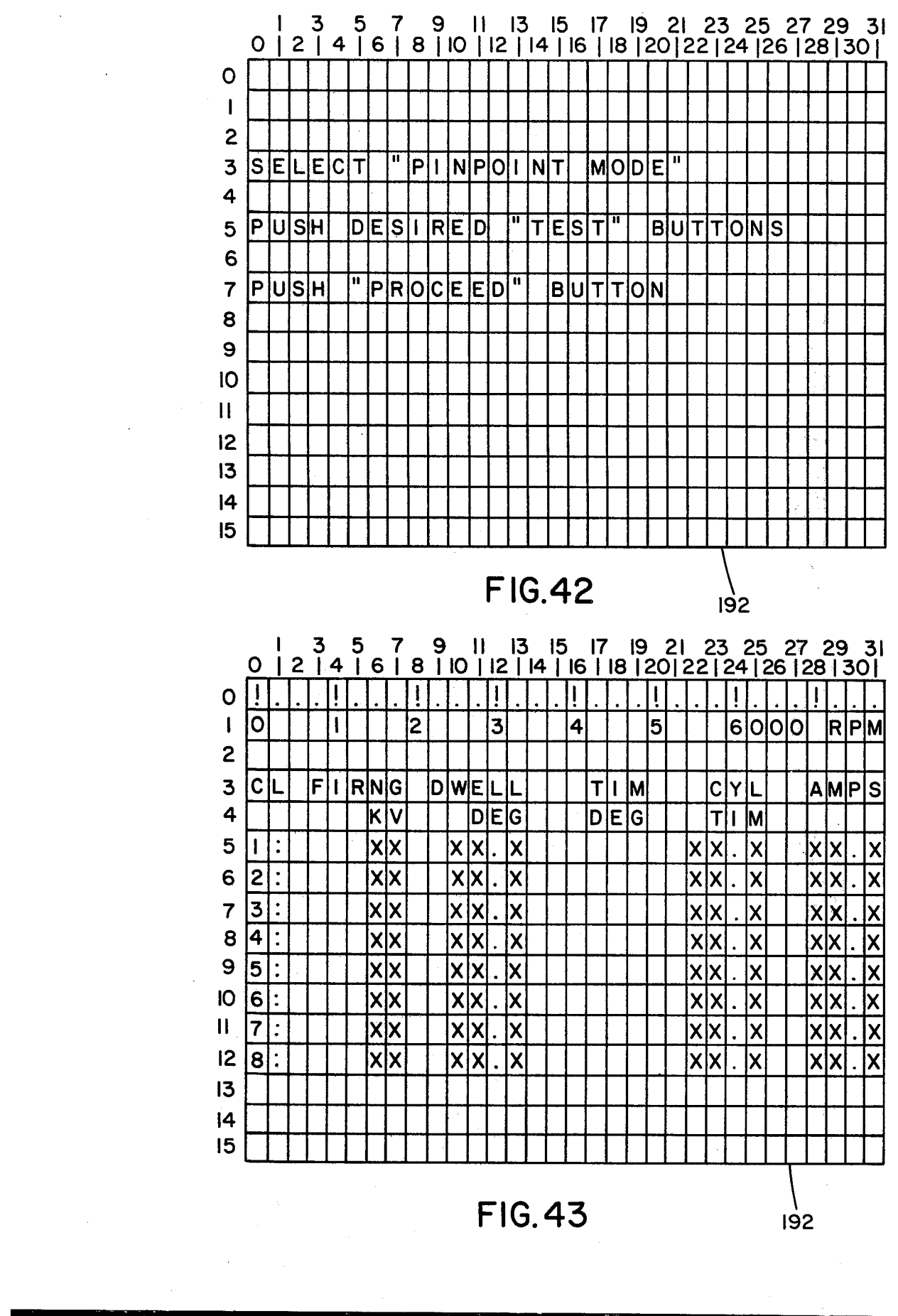

FIG. 43 discloses the rpm bar graph scale and parameter format displayed on CRT screen 192 during the pin point test if switch 2304 is moved to the per cylinder position and ignition button 2336 is pushed. As noted in FIG. 43, the number of each cylinder of the engine is displayed in the left hand column of the FIG. 43 format. Opposite each cylinder, the firing KV, (PKV) dwell degrees, cylinder timing and amps parameters are displayed:

The PKV signal is displayed under the heading "FIRNG KV" (FIG. 43). The manner in which the PKV signal is sampled on a per cylinder basis has been described in connection with the secondary signal sampler 264 (FIG. 4) analog system 1100 (FIGS. 12a-12f), cylinder selection circuit 1402 (FIGS. 13a-13c) and the flow chart of FIG. 20.

Dwell per cylinder is displayed under the heading "DWELL DEG" (FIG. 43). The manner in which dwell per cylinder is calculated and displayed has been previously described in connection with Table 27 and the flowchart of FIG. 23.

Cylinder timing per cylinder is displayed under the heading "CYL TIM". The manner in which the cylinder timing per cylinder is calculated and displayed has been previously described in connection with Table 27 and the flowchart of FIG. 23.

The numbers displayed under the "AMPS" column for each cylinder in FIG. 43 can be understood with reference to ammeter circuit 610 (FIG. 3), analog system 1100 (FIGS. 12a-12f), cylinder selection circuit 1402 (FIGS. 13a-13c), and the flow chart of FIG. 20. Basically, after an ADC CONVERSION OUTPUT COMMAND (Table 4) has been issued, each time the CYL* signal is generated by cylinder selection circuit 1402, analog-to-digital converter 1352 initiates a conversion of the "actual amperes" signal transmitted to multiplexer 1350 over conductor 660. The value of the actual amperes is calculated and displayed opposite the cylinder shown in FIG. 43 for which the CYL* signal is generated.

The "TIM DEG" heading is displayed during the pin point ignition test in the per cylinder mode, but no numbers are entered under the heading. The rpm bar graph also is displayed (FIG. 43).

The ability of the system to measure the parameters shown in FIG. 43 on a per cylinder basis is an important feature which increases the diagnostic value of the information displayed to the operator. The accuracy of the information is enhanced by the method of making direct digital measurements of engine rpm, dwell, and cylinder timing described previously. By making these measurements in the manner described, rpm, dwell and cylinder timing can be accurately measured during a single engine cycle. This is an important consideration when the engine is operated at idle speed and also when the engine is put through the snap acceleration test (area test 6). By measuring dwell and cylinder timing on a per cylinder basis, the operator is able to determine the condition of the ignition system with a degree of accuracy heretofore unattainable.

During the calculation of amperes on a per cylinder basis, the data processor subtracts the initial calibration value obtained during calibration of the ammeter circuit before the amperes value is displayed. This feature enhances the accuracy of the system and enables the operator to determine the amperes flowing through the battery cable with great precision. The ability of the system to automatically and rapidly range and read ammeter circuit 610 provides maximum accuracy and enables measurements of the battery cable current on a real time, per cylinder basis.

CONDENSER PIN POINT TEST IN THE HISTORY MODE

Figure 44:
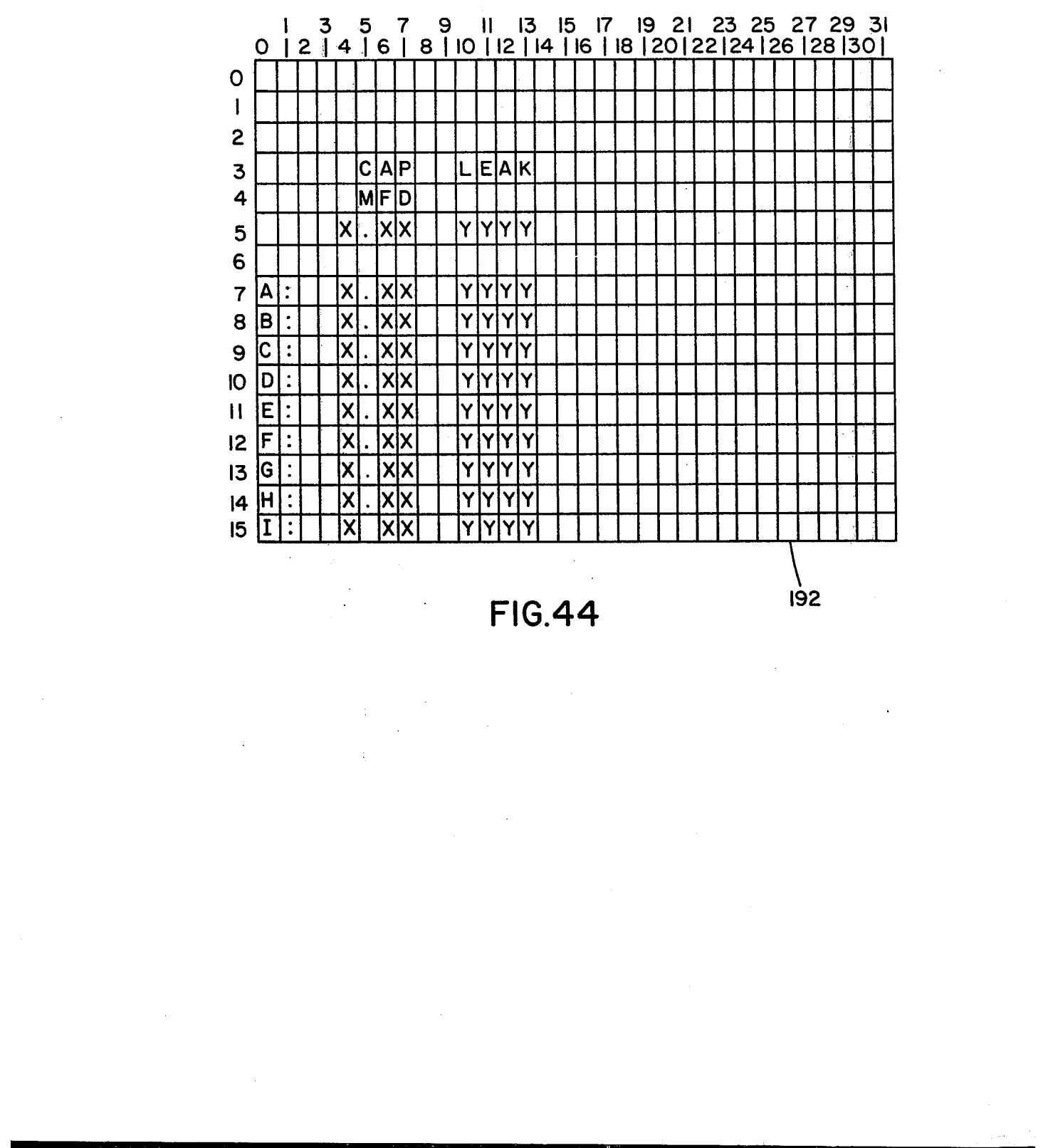

The format displayed on CRT face 192 for the condenser pin point test in the history mode is shown in FIG. 44. In order to initiate this test, the operator places a test condenser (i.e., capacitor) across leads 162, 163 (FIG. 2a). He then pushes the pin point button 2318 and CONDENSER button 2337 on the front panel (FIG. 17a). If a leakage test is desired, the operator also must push the HIGH VOLTAGE button 2339. This is a safety feature which warns the operator that a high voltage is placed on leads 162, 163 during the leakage test. The operator also moves switch 2304 to the history position. The data processor then displays the format shown in FIG. 44 on CRT face 192.

Under the heading "CAP MFD", the capacitance value of the test condenser is displayed in microfarads in the positions occupied by the x's. The current value is displayed in row 5 and periodic readings of the value are displayed on a historical basis from time-to-time in rows 7–15 opposite the letters A–I. Under the heading "LEAK", the data processor indicates the condition of the test condenser by displaying the words "GOOD" or "BAD" in the positions occupied by the y's (FIG. 44). The condition word displayed depends on the amount of leakage current flowing through the test condenser. The current condition is displayed in row 5, and the historical condition, based on measurements taken periodically, is displayed in rows 7–15 opposite the letters A–I.

The capacitance of the condenser in microfarads and the conditions of the condenser are determined by the data processor based on the program segment illustrated in the flowchart of FIG. 45. Step S260 results in the format shown in FIG. 44. In step S261, the coordinate of the row and column of the first number displayed under the "CAP MFD" heading is stored for convenient access. In step S262, the letter I, which represents the row number, is set equal to 1. (1 corresponds to the first row of the history display, i.e., row 7 shown in FIG. 44.) Step S263 determines whether a data display is requested by examining the state of the DELTA FLAG is determined by issuing an INPUT STATUS REGISTER INPUT COMMAND. The data display ca be requested in one of two ways:

(1) If switch 2455 is set to its automatic position (FIG. 17a), the DELTA FLAG is set to 1 at a time interval adjustable from about 0.2 to 8 seconds.

(2) If switch 2455 is in the command position, a data display request which takes a reading, makes a calculation and displays a value or condition opposite one of the letters A–I is only made when the ENTER button is depressed or the remote control button 2551 is depressed.

As soon as a data display request is received, the value of the condenser capacitance is calculated by the data processor using ohmeter-capacitance circuit 750, current source circuit 830, and analog control system 1100. The manner in which capacitance is read is described in connection with Tables 1–6 and FIG. 20. After the capacitance value is measured and calculated, it is displayed on current value row 5. If it is decided in step S266 that more history rows can be displayed on CRT screen 192, the capacitance value measured in step S265 is also displayed on history row I. In the present example in which I = 1, the value is displayed in row 7 opposite the letter A.

If it is determined that a leakage test is required in step S268, the row and column display coordinates are incremented to the leakage position below the lable "LEAK". The data processor then delays for six seconds while the test condenser is charging up. (In step S270, X = 6). The condenser leakage current is then measured and computed. In order to perform the leak test, the data processor switches leakage line 1143 (FIG. 12a) to its 1 state so that relays K10–K12 switch their corresponding contacts to a condition opposite the one shown in FIG. 11a. As a result, high voltage is conducted to the condenser over conductors 162, 163. Any leakage current flowing through the condenser results in a voltage across resistor 964 (FIG. 11a) which is conducted over conductors 162a, 163 to the circuitry shown in FIG. 9. The voltage is amplified in circuit 702 and is further operated on by circuits 752, 753 (FIG. 10) to produce a voltage on leakage conductor 823 which is proportional to the value of the leakage current flowing through resistor 964 (FIG. 11a). This voltage is converted to a digital number by analog control system 1100 in the manner described in the flow chart of FIG. 20.

If the resultant digital number indicates a leakage current above a predetermined number of microamperes, the word "BAD" is displayed in row 5 (step S274, FIG. 45). If the value of the digital number obtained from analog control system 1100 indicates a leakage current equal to or below the predetermined number of microamps (i.e., K microamps), the term "GOOD" is displayed in row 5. If it is determined in step S275 that more history rows can be displayed, the GOOD or BAD condition is displayed in history row I. In this case, since I is set equal to 1, the appropriate word is displayed in row 7 opposite the letter A.

The data processor then switches leakage conductor 1143 (FIG. 12a) to its 0 state so that the relay contacts described in FIG. 11a are switched to the states shown in FIG. 11a. As soon as the relay contacts are switched, the high voltage is removed from leads 162, 163, and the data processor delays for 1.0 second so that the test condenser can discharge. (In step S277, Y = 1.0). If more history rows can be displayed as determined in step S278, the I value is incremented by 1, and the row and column display coordinates are again set to display the values under the "CAP MFD" heading. control is then transferred to the executive routines in step S281.

If the executive routines indicate that the capacitance test is still desired, the subroutine is entered at step B (FIG. 45), and the capacitance and leakage tests are repeated for the next display row 8 opposite the letter B when the period of time set by refresh rate switch 2455 has elasped (or when an ENTER command is received).

Each time a new value is entered in one of the history rows 7–15, the same value is also entered in the current value row 5. Moreover, after all of the history rows 7–15 have been filled, the current value row 5 continues to be refreshed with new data at the rate determined by the setting of refresh rate switch 2455. The subroutine is repeated if the PROCEED button is pushed.

The history mode of operation of the pin point test is an important feature which enables the operator to determine the manner in which parameter values change as a function of time. As a result, the condition of engine parameters which change as a function of time may be determined with a degree of accuracy heretofore unattainable.

EXECUTABLE BINARY CODE LISTING

Although the foregoing description of the preferred embodiment will enable a person of ordinary skill in the art to make and use the same, the following detailed binary code listing for data processor 1090 is included to provide detailed information concerning the programming and operation of the overall system. Additional detailed features of the system will become apparent to those skilled in the art from reviewing the program listing. The listing is given in hexadecimal code. The left-hand column is the memory location in memory 1094 in hexadecimal code, and the right-hand column is either instructions or data in hexadecimal code. This code can be used on a National SemiConductor Microprocessor Model IMP-16c.

```
                    .PAGE    'BEGIN TESTS'
                    .LOCAL
           0000     .TSECT
                TSECT:
           0100     .=.+0100
                ;
                ;        RESTART
                ;
                BEGIN:
0100 4CFF A
0101 A03E B
0102 A013 B
0103 4C00 A
0104 A057 B
0105 A015 B
0106 A016 B
0107 A019 B
0108 A010 B
0109 4C01 A
010A A082 B
010B 2D6E A@

010C 2D6E A@
010D 4F80 A
010E 4C00 A
010F A083 B
0110 A025 B
0111 A019 B
0112 0620 A
0113 0624 A
0114 0614 A
0115 4CFF A
0116 0608 A
0117 2D64 A@
0118 010B T
0119 0129 T
011A 2D62 A@
011B E052 A
011C 554E A
011D 2032 A
011E 3030 A
011F 3120 A
0120 434F A
0121 4D50 A
0122 5554 A
0123 4552 A
0124 204E A
0125 4F57 A
0126 2052 A
0127 4541 A
0128 4459 A
0129 E04D A
012A 414B A
012B 4520 A
012C 5445 A
012D 5354 A
012E 2043 A
012F 4F4E A
0130 4E45 A
0131 4354 A
0132 494F A
0133 4E52 A
0134 C015 A
0135 2013 A
0136 1467 A
0137 6060 A
0138 2545 A@

0139 2D42 A@
013A 010B T
013B 021F T
013C 2D40 A@
013D E050 A
013E 524F A
013F 4752 A
0140 414D A
0141 2022 A
0142 5345 A
0143 542D A
0144 5550 A
0145 2220 A
0146 434F A
0147 4E54 A
0148 524F A
0149 4C53 A
014A C02A A
014B 204E A
014C 4F2E A
014D 204F A
014E 4620 A
014F 4159 A
0150 4C53 A
0151 2E20 A
0152 A02A A
0153 2049 A
0154 474E A
0155 2E20 A
0156 5459 A
0157 5045 A
0158 A02A A
0159 2049 A
015A 474E A
015B 2E20 A
015C 5345 A
015D 4C45 A
015E 4354 A
015F 4F52 A
0160 A02A A
0161 200A A
0162 A020 A
0163 2049 A
0164 4620 A
0165 4041 A
0166 474E A
0167 4554 A
0168 4943 A
0169 2C20 A
016A A020 A
016B 2022 A
016C 454E A
016D 5445 A
016E 5222 A
016F 2054 A
0170 4442 A
0171 204F A
0172 4646 A
0173 5345 A
0174 5420 A
0175 414E A
0176 474C A
0177 4520 A
0178 6060 A
0179 210D A
017A 0ED8 T
017B 0F06 T
017C 0DE8 T
017D 0C9A T
017E 0DEE T
017F 0000 A
0180 0000 A
0181 0000 A
0182 0000 A
0183 0000 A
0184 0000 A
0185 0000 A
0186 0000 A 0187 8174 A
0188 2DF6 A@
0189 0600 A
018A C172 A
018B 1BFC A
018C 4C03 A
018D A069 B
018E 4C00 A
018F A075 B
0190 A058 B
0191 A05B D
0192 8168 A
0193 A079 B
0194 2DEB A@
0195 21FE A
0196 F169 A
0197 21EF A
0198 F1E8 A
0199 213A A
019A F168 A
019B 2417 B
019C F167 A
019D 2411 B
019E F167 A
019F 25E2 A@
01A0 F164 A
01A1 2122 A
01A2 F15E A
01A3 2128 A
01A4 F15D A
```

| | |
|---|---|
| 01A5 2166 A | 01F1 3400 A |
| 01A6 E158 A | 01F2 3400 A |
| 01A7 2102 A | 01F3 F50A A |
| 01A8 212B A | 01F4 D116 A |
| 01A9 21DD A | 01F5 2D89 A@ |
| | 01F6 0600 A |
| | 01F7 8079 B |
| | 01F8 C104 A |
| 01AA 8075 B | 01F9 A079 B |
| 01AB 1428 A | 01FA 0200 A |
| 01AC 1507 A | 01FB FD00 A |
| 01AD 8069 B | 01FC F040 A |
| 01AE 1125 A | 01FD 0080 A |
| | 01FE 0000 A |
| 01AF 8058 B | 01FF 0009 A |
| 01B0 5C03 A | 0200 000A A |
| 01B1 C058 B | 0201 000B A |
| 01B2 C058 B | 0202 000C A |
| 01B3 2101 A | 0203 000D A |
| 01B4 8058 B | 0204 000E A |
| 01B5 3400 A | 0205 000F A |
| 01B6 A058 B | 0206 0010 A |
| | 0207 0003 A |
| 01B7 2930 A | 0208 005A A |
| 01B8 8458 B | 0209 005C A |
| | 020A 0060 A |
| | 020B 0042 A |
| 01B9 8075 B | |
| 01BA 1104 A | |
| 01BB 7875 B | 020C 8458 B |
| 01BC E5C6 A | 020D 8075 B |
| 01BD 21D6 A | 020E 1503 A |
| 01BE 2115 A | 020F 5D03 A |
| 01BF 7C69 B | 0210 C458 B |
| 01C0 2081 A | 0211 C458 B |
| 01C1 E5C2 A | 0212 7C58 B |
| 01C2 21D1 A | 0213 2101 A |
| 01C3 2110 A | 0214 5101 A |
| | 0215 A457 B |
| 01C4 8069 B | 0216 2D61 A@ |
| 01C5 D075 B | 0217 E0E0 A |
| 01C6 D140 A | 0218 E0E0 A |
| 01C7 6858 B | 0219 E441 A |
| 01C8 1508 A | 021A 4342 A |
| 01C9 7858 B | 021B 4550 A |
| 01CA 291D A | 021C 5445 A |
| 01CB 21C8 A | 021D 4460 A |
| | 021E 255A A@ |
| 01CC 8058 B | 021F 2D5A A@ |
| 01CD 5C03 A | 0220 0139 T |
| 01CE C058 B | 0221 0230 T |
| 01CF C058 B | 0222 2D58 A@ |
| 01D0 A058 B | 0223 E015 A |
| 01D1 8075 B | 0224 2022 A |
| 01D2 7875 B | 0225 1811 A |
| 01D3 11F6 A | 0226 A014 A |
| | 0227 6060 A |
| 01D4 2DB0 A@ | 0228 4FA8 A |
| 01D5 E0E0 A | 0229 0400 A |
| 01D6 E0E0 A | 022A 5C08 A |
| 01D7 E82A A | 022B 1201 A |
| 01D8 2A2A A | 022C 2102 A |
| 01D9 201C A | 022D 2D4E A@ |
| 01DA 202A A | 022E 21F9 A |
| 01DB 2A2A A | 022F 2D4D A@ |
| 01DC 6060 A | |
| 01DD 4C00 A | |
| 01DE A058 B | |
| | 0230 2D49 A@ |
| | 0231 0139 T |
| 01DF 2DA0 A@ | 0232 0242 T |
| 01E0 21FE A | 0233 2D44 A@ |
| 01E1 F11E A | 0234 E0E0 A |
| 01E2 21A4 A | 0235 E0C0 A |
| 01E3 F11F A | 0236 1520 A |
| 01E4 2417 B | 0237 2200 A |
| 01E5 F120 A | 0238 2011 A |
| 01E6 259B A@ | 0239 1467 A |
| 01E7 21F7 A | 023A 6060 A |
| | 023B 4FA8 A |
| | 023C 0400 A |
| 01E8 8079 B | 023D 5C09 A |
| 01E9 F518 A | 023E 1201 A |
| 01EA C11D A | 023F 2D3E A@ |
| 01EB F515 A | 0240 2D3B A@ |
| 01EC C11C A | 0241 21F9 A |
| 01ED E511 A | |
| 01EE 2101 A | |
| 01EF 2103 A | 0242 2D37 A@ |
| 01F0 C119 A | 0243 021F T |
| | 0244 0259 T |
| | 0245 4C00 A |

```
0246 A025 B
0247 2D33 A@
0248 E015 A
0249 2022 A
024A 4152 A
024B 4541 A
024C 2220 A
024D 4F52 A
024E 2022 A
024F 5049 A
0250 4E50 A
0251 4F49 A
0252 4E54 A
0253 2220 A
0254 14C0 A
0255 1520 A
0256 1314 A
0257 6060 A
0258 2520 A@

0259 4C01 A
025A A025 D
025B 4C00 A
025C A032 B
025D 4FA0 A
025E 0600 A
025F 2D1A A@
0260 0242 T
0261 020A T
0262 2D1C A@
0263 711C A
0264 251C A@

0265 2D15 A@
0266 E050 A
0267 524F A
0268 4752 A
0269 414D A
026A 2022 A
026B 414E A
026C 414C A
026D 4F47 A
026E 2043 A
026F 4F4E A
0270 5452 A
0271 4F4C A
0272 5322 A

0273 C015 A
0274 2013 A
0275 1467 A
0276 6060 A
0277 2501 A@
0278 0C9D T
0279 0DEE T
027A 0DE8 T
027B 0C9A T
027C 0DF0 T
027D 0F84 T
027E 1026 T
027F 0E72 T
0280 0004 A
0281 05DF T
0282 0000 A
0283 0000 A
0284 0000 A
0285 0000 A
0286 0000 A
0287 0000 A
0288 0000 A
0289 0000 A
028A 7825 B
028B 2DF6 A@
028C 2DF6 A@
028D 2DF1 A@
028E 71F1 A
028F 25F1 A@

0290 2DE9 A@
0291 0259 T
0292 033C T
0293 4C00 A
0294 A083 B
0295 4FA0 A
0296 0600 A 0297 2DE3 A@
0298 8704 A 0299 2031 A
029A 2D1A A
029B 494E A
029C 4720 A
029D C044 A
029E 4953 A
029F 01A0 A
02A0 1A20 A
02A1 02C1 A
02A2 4241 A
02A3 5454 A
02A4 4552 A
02A5 5998 A
02A6 09A1 A
02A7 5354 A
02A8 4152 A
02A9 5445 A
02AA 5220 A
02AB 4452 A
02AC 4157 A
02AD 980C A
02AE A11A A
02AF 494E A
02B0 4767 A
02B1 2003 A
02B2 9808 A
02B3 A144 A
02B4 594E A
02B5 2E20 A
02B6 4449 A
02B7 5354 A
02B8 2E20 A
02B9 5245 A
02BA 532E A
02BB 9809 A
02BC A006 A
02BD 9807 A
02BE A152 A
02BF 454C A
02C0 2E43 A
02C1 4F4D A
02C2 5052 A
02C3 4553 A
02C4 5349 A
02C5 4F4E A
02C6 9825 A
02C7 A143 A
02C8 4F49 A
02C9 4C20 A
02CA 4F55 A
02CB 5450 A
02CC 5554 A
02CD 984B A
02CE 56E0 A
02CF A00E A
02D0 6060 A

02D1 2DB2 A@
02D2 2DB2 A@
02D3 0032 A
02D4 B964 A
02D5 3320 A
02D6 130C A
02D7 B964 A
02D8 3310 A
02D9 04C3 A
02DA B964 A
02DB 0008 A
02DC 0131 A
02DD 3C81 A
02DE 11F2 A
02DF 1B02 A
02E0 E1A5 A
02E1 21EF A

02E2 2DA2 A@
02E3 0320 A
02E4 0964 A
02E5 3210 A
02E6 01E8 A
02E7 0968 A
02E8 0008 A
02E9 04C3 A
02EA A07B B
02EB 8061 B
02EC A07D B
```

```
02ED 8010 B
02EE 1102 A
02EF 4CFF A
02F0 2101 A
02F1 807F B
02F2 A07C B
02F3 8132 A
02F4 2D92 A@

02F5 2D8F A@
02F6 012C A
02F7 B960 A
02F8 3320 A
02F9 01E8 A
02FA B964 A
02FB 3310 A
02FC 04C3 A
02FD B964 A
02FE 0008 A
02FF 0131 A
0300 F187 A
0301 2107 A
0302 4E32 A
0303 8461 B
0304 7584 A
0305 8980 A
0306 A83B B
0307 E08B B
0308 21C8 A 0309 851E A
030A A494 B
030B 8461 B
030C 5DFE A
030D 651C A
030E C51C A
030F 2D1C A@
0310 8518 A
0311 A494 B 0312 4E01 A
0313 807C B
0314 F118 A
0315 A810 B
0316 A07F B
0317 847D B
0318 5DFE A
0319 6510 A
031A C510 A
031B 807B B
031C 2D0F A@
031D 2D10 A@
031E 7B01 A
031F 8B15 A
0320 9808 A
0321 AE0E A
0322 E85C A
0323 2D0B A@
0324 2D0B A@
0325 21FD A
0326 03E8 A
0327 0064 A
0328 6B00 A
0329 5B00 A
032A 003F A
032B 0040 A
032C 0BFC T
032D FFFF A
032E 0741 T
032F 0DF0 T
0330 0EAE T
0331 0000 A
0332 0000 A
0333 0000 A
0334 0000 A
0335 0000 A
0336 0000 A
0337 0000 A
0338 0000 A
0339 0000 A
033A 0000 A
033B 0000 A 033C 2DF4 A@
033D 0290 T
033E 03A3 T
033F 4C01 A
0340 A083 B 0341 2DF0 A@
0342 0FC3 A
0343 0420 A
0344 322D A
0345 1B20 A
0346 4F55 A
0347 5450 A
0348 5554 A
0349 C067 A
034A 454E A
034B 01A0 A
034C 5354 A
034D 4152 A
034E 5420 A
034F 0220 A
0350 A080 A
0351 4143 A
0352 4345 A
0353 4C45 A
0354 5241 A
0355 5445 A
0356 2054 A
0357 4F04 A
0358 2003 A
0359 A052 A
035A 4554 A
035B 5552 A
035C 4E20 A
035D 544F A
035E 2049 A
035F 444C A
0360 4520 A
0361 C150 A
0362 4541 A
0363 4B20 A
0364 0098 A
0365 0867 A
0366 A11B A
0367 2050 A
0368 4541 A
0369 4B20 A
036A 980C A
036B 6060 A 036C 4C00 A
036D A012 B 036E 2DC4 A@
036F 2DBF A@
0370 2DBF A@
0371 2DC2 A@
0372 2DC2 A@
0373 E1C2 A
0374 21F9 A
0375 2DB8 A@
0376 AB41 A 0377 2DBF A@
0378 012C A
0379 B960 A
037A 3320 A
037B 01E8 A
037C B964 A
037D 3310 A
037E 04C3 A
037F B964 A
0380 0008 A
0381 0131 A
0382 F1AA A
0383 210E A
0384 E012 B
0385 2112 A
0386 A012 B
0387 2DA6 A@
0388 AB41 A
0389 8510 A
038A A494 B
038B 8461 B
038C 5DFE A
038D 659C A
038E C59C A 038F 8012 B
0390 2D9B A@
0391 2106 A 0392 8107 A
0393 A094 B
0394 4C00 A
0395 A012 B
```

```
0396 4CFF A
0397 2D94 A@

0398 2D9F A@
0399 21DD A
039A BB00 A
039B 0000 A
039C 0000 A
039D 0000 A
039E 0000 A
039F 0000 A
03A0 0000 A
03A1 0000 A
03A2 0000 A

03A3 2D8D A@
03A4 023C T
03A5 03F2 T
03A6 2D8B A@
03A7 0FC9 A
03A8 0420 A
03A9 322D A
03AA 4944 A
03AB 4C45 A
03AC 20C1 A
03AD 0098 A
03AE 08A0 A
03AF 0698 A
03B0 07A1 A
03B1 434F A
03B2 9825 A
03B3 A148 A
03B4 4398 A
03B5 0BA1 A
03B6 494E A
03B7 4954 A
03B8 4941 A
03B9 4C20 A
03BA 0A20 A
03BB 2A98 A
03BC 0720 A
03BD C12A A
03BE 2053 A
03BF 4545 A
03C0 2040 A
03C1 4647 A
03C2 2049 A
03C3 4E52 A
03C4 5452 A
03C5 5542 A
03C6 5449 A
03C7 4F4E A
03C8 53C0 A
03C9 4348 A
03CA 4543 A
03CB 4B20 A
03CC 5043 A
03CD 5620 A
03CE 2620 A
03CF 4D41 A
03D0 4E49 A
03D1 464F A
03D2 4C44 A
03D3 2056 A
03D4 4143 A
03D5 5555 A
03D6 4D60 A

03D7 2DC3 A@
03D8 2DC3 A@
03D9 5B01 A
03DA 6B08 A
03DB 7B02 A
03DC 8E03 A
03DD 9B09 A
03DE 9FD3 A
03DF 2DBD A@
03E0 4C00 A
03E1 A04E B
03E2 2DBB A@
03E3 4C00 A
03E4 A04D B
03E5 2DB9 A@
03E6 21F0 A
03E7 0000 A
03E8 0000 A
```

```
03E9 0000 A
03EA 0000 A
03EB 0000 A
03EC 0000 A
03ED 0000 A
03EE 0000 A
03EF 0000 A
03F0 0000 A
03F1 0000 A

03F2 2DAD A@
03F3 03A3 T
03F4 0479 T

03F5 2DAB A@
03F6 0FC6 A
03F7 0420 A
03F8 342D A
03F9 4C4F A
03FA 570D A
03FB 20C1 A
03FC 0098 A
03FD 08A1 A
03FE 434F A
03FF 9825 A
0400 A148 A
0401 4398 A
0402 0BA1 A
0403 4947 A
0404 4E2E A
0405 5345 A
0406 434F A
0407 4E44 A
0408 4152 A
0409 5998 A
040A 4B56 A
040B 284D A
040C 494E A
040D 2920 A
040E 984B A
040F 5619 A
0410 C052 A
0411 454D A
0412 4F56 A
0413 4520 A
0414 504C A
0415 5547 A
0416 2057 A
0417 4952 A
0418 4520 A
0419 404F A
041A 4D45 A
041B 4E54 A
041C 4152 A
041D 494C A
041E 5920 A
041F A050 A
0420 4552 A
0421 464F A
0422 524D A
0423 2053 A
0424 434F A
0425 5045 A
0426 2054 A
0427 4553 A
0428 5453 A
0429 A00E A
042A 6060 A 042B 4C00 A
042C A04F B
042D A050 B
042E A072 B 042F 2DB7 A@
0430 8068 B
0431 A027 B
0432 4C00 A

0433 A036 B
0434 4FB4 A
0435 0600 A
0436 2DB1 A@
0437 2DB1 A@
```

```
0428 0000 A
0429 1040 A
043A 000A A
043B 0031 A
043C F1AD A
043D 2112 A

043E EC4F B
043F 2101 A
0440 AC4F B
0441 1104 A
0442 8050 B
0443 1101 A
0444 EC50 B
0445 AC50 B 0446 8036 B
0447 4802 A
0448 E068 B
0449 F068 B
044A 2101 A
044B 2101 A
044C 4C01 A
044D 7C27 B
044E 21E4 A
044F 2105 A

0450 A050 B
0451 A04F B
0452 8010 C
0453 1101 A
0454 A072 B 0455 2D95 A@
0456 2D95 A@
0457 5D01 A
0458 6B02 A
0459 7B43 A
045A 8050 B
045B 8918 B
045C A894 B
045D 4D10 A 045E 8C72 B
045F FD6D A
0460 AC10 B
0461 2D8C A@
0462 804F B
0463 8911 A
0464 A894 B
0465 4D10 A
0466 8C72 B
0467 FD85 A
0468 AC10 B
0469 2D84 A@
046A 8050 B
046B F183 A
046C 2101 A
046D 2104 A
046E 4C00 A
046F A072 B
0470 A050 B
0471 A04F B 0472 2D02 A@
0473 21BB A
0474 8D00 A
0475 9800 A
0476 0E11 T
0477 0000 A
0478 0000 A 0479 2D7D A@
047A 03F2 T
047B 04AB T 047C 2DFB A@
047D 0FA9 A
047E 0420 A
047F 3520 A
0480 4155 A
0481 544F A
```

```
0482 4D41 A
0483 5449 A
0484 4320 A
0485 504F A
0486 5745 A
0487 5220 A
0488 4241 A
0489 4C41 A
048A 4E43 A
048B 45C0 A
048C 5345 A
048D 5420 A
048E 4241 A
048F 5345 A
0490 2003 A
0491 2C20 A
0492 1520 A
0493 13C1 A
0494 4241 A
0495 5345 A
0496 2003 A
0497 9808 A
0498 A743 A
0499 594C A
049A 2020 A
049B 0820 A
049C 4348 A
049D 414E A
049E 4745 A
049F 6060 A

04A0 8542 A
04A1 2D43 A@

04A2 4FB4 A
04A3 8128 A
04A4 0600 A
04A5 2D40 A@
04A6 2D40 A@
04A7 2D40 A@
04A8 2D40 A@
04A9 2D40 A@
04AA 21F7 A

04AB 2DCB A@
04AC 03F2 T
04AD 0521 T
04AE 4C00 A
04AF A071 B
04B0 8468 B
04B1 A427 B
04B2 8120 A
04B3 A094 B
04B4 4E00 A

04B5 A836 B
04B6 4C10 A
04B7 293B A

04B8 A018 B
04B9 4D20 A
04BA 2D30 A@
04BB 8123 A
04BC A094 B

04BD 8836 B
04BE C922 A
04BF 3381 A
04C0 4FB4 A
04C1 0600 A

04C2 8036 B
04C3 6128 A
04C4 1502 A
04C5 8118 A
04C6 2D26 A@

04C7 4C00 A
04C8 A07F B
04C9 4C10 A
04CA 2928 A
04CB D018 B
```

```
04CC 1203 A
04CD 4D01 A
04CE A47F B
04CF 5001 A

04D0 4D60 A
04D1 2049 A@
04D2 4FB4 A
04D3 8103 A
04D4 0600 A

04D5 8094 B
04D6 C10D A
04D7 A094 B
04D8 7336 B
04D9 7C27 B
04DA 21E2 A

04DB 2512 A@
04DC 4000 A
04DD 400F A
04DE 0015 A
04DF 8800 A
04E0 6B00 A
04E1 C000 A
04E2 84E2 A
04E3 8462 A
04E5 0D8D T
04E6 0DD3 T
04E7 0EAE T
04E8 0862 T
04E9 087B T
04EA 0DF0 T
04EB 0BFC T
04EC C00F A
04ED 0DAE T
04EE 0DEE T
04EF 0000 A
04F0 0000 A
04F1 0000 A
04F2 0000 A

04F3 A070 B
04F4 5CFF A
04F5 A085 B
04F6 4C00 A
04F7 A086 B
04F8 A084 B
04F9 4C00 A
04FA A06B B
04FB 2DEB A@
04FC 2DED A@
04FD 2DEA A@
04FE 2DEA A@

04FF 4000 A
0500 3131 A
0501 806B B
0502 1108 A
0503 C485 B
0504 A485 B
0505 0080 A
0506 4400 A
0507 5C02 A
0508 1201 A
0509 7886 B
050A 7884 B
050B 4400 A 050C 8C84 B
050D EC70 B
050E 21EA A
050F 8086 B
0510 8485 B
0511 2DDD A@
0512 3481 A
0513 0200 A
0514 0000 A
0515 0000 A
0516 0000 A
0517 0000 A
0518 0000 A
0519 0000 A
051A 0000 A
051B 0000 A
051C 0000 A
051D 0000 A
051E 0000 A
051F 0000 A
0520 0000 A 0521 2DCE A@
0522 0479 T
0523 0585 T 0524 2DCC A@
0525 0FC3 A
0526 0420 A
0527 2036 A
0528 2D53 A
0529 4E41 A
052A 5020 A
052B 4143 A
052C 4345 A
052D 4C45 A
052E 5241 A
052F 5449 A
0530 4F4E A

0531 A100 A
0532 9808 A
0533 1967 A
0534 8143 A
0535 4F98 A
0536 2519 A
0537 C867 A
0538 504C A
0539 5547 A
053A 914B A
053B 5619 A
053C 6060 A
053F 8868 B
0540 4C00 A
0541 A092 B
0542 A01E B
0543 8DAE A
0544 AC29 B
0545 A300 A
0546 4B01 A
0547 4AFF A
0548 21FC A 0549 2D9C A@
054A 2D9D A@
054B E092 B
054C 2103 A
054D A092 B
054E 2DC5 A@
054F 4B41 A 0550 2DC4 A@
0551 EC1E B
0552 2103 A
0553 AC1E B
0554 2DBF A@
0555 5B42 A 0556 8868 B
0557 A827 B
0558 4C00 A
0559 A071 B
055A 8127 A
055B A094 B
055C 4C00 A
055D 8D94 A
055E AC29 B
055F A026 B
0560 4FB4 A
0561 0600 A
0562 2DB3 A@
0563 0000 A
0564 1840 A
0565 000A A
0566 0031 A

0567 F1AF A
0568 2104 A
0569 8C29 B
056A E200 A
056B 2103 A
056C A300 A
```

```
056D 4010 A
056E 2DA9 A@

056F 7829 B
0570 8094 B
0571 C111 A
0572 A094 B
0573 8036 B
0574 4802 A
0575 E068 B
0576 F068 B
0577 2101 A
0578 2103 A
0579 810A A
057A A094 B
057B 4C01 A
057C 7C27 B
057D 21E1 A
057E 2D9A A@
057F 2D9A A@
0580 2D9A A@
0581 21C7 A
0582 8A00 A
0583 2000 A
0584 9A00 A 0585 2D96 A@
0586 0521 T
0587 010B T 0588 2D94 A@
0589 0FC6 A
058A 0420 A
058B 372D A
058C 4849 A
058D 4748 A
058E 0DA0 A
058F 4252 A
0590 494E A
0591 4720 A
0592 454E A
0593 4749 A
0594 4E45 A
0595 2054 A
0596 4F04 A
0597 2003 A
0598 A167 A
0599 0098 A
059A 08A0 A
059B 0688 A
059C 9807 A 059D 80A0 A
059E 0667 A
059F 5641 A
05A0 5249 A
05A1 4154 A
05A2 494F A
05A3 4E20 A

05A4 9807 A

05A5 A10A A
05A6 2041 A
05A7 4456 A
05A8 414E A
05A9 4345 A

05AA 9807 A
05AB A149 A
05AC 4E49 A
05AD 5449 A
05AE 414C A
05AF 202B A
05B0 2041 A
05B1 4456 A
05B2 414E A
05B3 4345 A

05B4 9807 A

05B5 A143 A
05B6 4F98 A

05B7 25A1 A

05B8 4843 A

05B9 980B A
```

```
05BA A143 A
05BB 4841 A
05BC 5247 A
05BD 494E A
05BE 4720 A

05BF 0398 A
05C0 0967 A

05C1 C00E A

05C2 6060 A

05C3 2D0C A@
05C4 2D0C A@
05C5 5B01 A
05C6 6B03 A
05C7 7B11 A
05C8 8B12 A
05C9 9B09 A
05CA 9F93 A
05CB AB02 A
05CC BB03 A
05CD CB4B A
05CE 2D03 A@
05CF 21F3 A
05D0 0DD3 T
05D1 0741 T
05D2 0E11 T
05D3 0000 A
05D4 0000 A
05D5 0000 A
05D6 0000 A
05D7 0000 A
05D8 0000 A
05D9 0000 A
05DA 0000 A
05DB 0000 A
05DC 0000 A
05DD 0000 A
05DE 0000 A
05DF 2DF3 A@
05E0 0259 T
05E1 0605 T
05E2 4C00 A
05E3 A082 B
05E4 A091 B
05E5 4FA0 A
05E6 0600 A

05E7 2CEC A@
05E8 E053 A
05E9 454C A
05EA 4543 A
05EB 5420 A
05EC 2250 A
05ED 494E A
05EE 504F A
05EF 494E A
05F0 5420 A
05F1 4D4F A
05F2 4445 A
05F3 2220 A

05F4 C015 A
05F5 2044 A
05F6 4553 A
05F7 4952 A
05F8 4544 A
05F9 2022 A
05FA 5445 A
05FB 5254 A
05FC 2220 A
05FD 1453 A

05FE C015 A
05FF 2013 A
0600 1467 A
0601 6060 A
0602 2D02 A@
0603 2D02 A@
0604 21FD A 0605 2DCD A@
0606 05DF T
0607 0605 T
0608 2DCB A@
0609 6060 A
060A 4C00 A
060B A083 B
```

```
060C 2DC9 A@
060D 2181 A
060E 61C8 A
060F F1C7 A
0610 2102 A
0611 755E A
0612 2105 A 0613 4C01 A
0614 A082 B
0615 2DBE A@
0616 0FCD A
0617 6060 A 0618 2DBF A@
0619 6155 A
061A F154 A
061B 25BD A@

061C 2DB9 A@
061D 1203 A
061E 4E09 A
061F 854E A
0620 2DB9 A@

0621 2DB4 A@
0622 7140 A
0623 2161 A
0624 2DB6 A@
0625 E192 A
0626 A503 A
0627 6060 A
0628 4C08 A
0629 A071 B 062A 4D01 A
062B 4FB4 A
062C 0400 A
062D 5C0A A
062E 1201 A
062F A491 B
0630 2DA5 A@
0631 5C05 A
0632 1220 A
0633 8091 B
0634 1110 A
0635 2DA6 A@
0636 E443 A
0637 4F8A A
0638 4843 A
0639 8E54 A
063A 454D A
063B 5020 A
063C A525 A
063D 890B A
063E 8D07 A
063F 2043 A
0640 6060 A
0641 4C12 A
0642 C071 B
0643 A071 B
0644 210A A 0645 2D96 A@
0646 E443 A
0647 4F8A A
0648 4843 A
0649 A525 A
064A 890B A
064B 6060 A
064C 4C0C A
064D C071 B
064E A071 B 064F 2D86 A@
0650 5000 A
0651 7110 A
0652 211F A 0653 2D82 A@
0654 5C07 A
0655 121C A 0656 2D85 A@
0657 E146 A
0658 4952 A
0659 4E47 A
065A 8606 A
065B 8F54 A
065C 494D A
065D 9543 A
065E 594C A
065F A44B A
0660 5689 A
0661 078F A
0662 0795 A
0663 5449 A
0664 4D60 A
0665 4C18 A
0666 C071 B
0667 A071 B 0668 2D1C A@
0669 6105 A
066A F104 A
066B 2112 A
066C 214A A 066D 5062 A
066E 7062 A
066F 0003 A
0670 0240 A
0671 001A A 0672 2D32 A@
0673 5C08 A
0674 1209 A 0675 2D20 A@
0676 E109 A
0677 6060 A
0678 4C06 A
0679 C071 B
067A A071 B
067B E1F5 A
067C 2101 A
067D 2139 A 067E 2D26 A@
067F 5C0A A
0680 1236 A 0681 2D24 A@
0682 E20C A
0683 6060 A
0684 2132 A 0685 4C02 A
0686 A071 B
0687 2D1D A@
0688 5C06 A
0689 120D A 068A 2D1B A@
068B E343 A
068C 4150 A
068D 884C A
068E 4541 A
068F 4B8F A
0690 5345 A
0691 52A2 A
0692 4D46 A
0693 448F A
0694 5245 A
0695 5360 A
0696 2120 A 0697 2D0D A@
0698 5C09 A
0699 1210 A
```

```
069A 2D0B A@
069B E212 A
069C 6060 A
069D 2119 A 069E 2D08 A@
069F E043 A
06A0 4C60 A
06A1 85CB A
06A2 2D05 A@
06A3 4C02 A
06A4 2184 A

06A5 0EAE T
06A6 0C9F T
06A7 0C9D T
06A8 0D8D T
06A9 0000 A
06AA 0000 A
06AB 0000 A
06AC 0000 A
06AD 0000 A
06AE 0000 A
     0000 A
     0000 A
     0000 A
     0000 A
     0000 A
     0000 A
     0000 A
     0000 A

06B7 2DED A@
06B8 61B6 A
06B9 F1B5 A
06BA 215A A
06BB 5CFF A
06BC A06A B

06BD 4C40 A
06BE A071 B
06BF 2DE9 A@

06C0 2DE4 A@
06C1 71AE A
06C2 2102 A

06C3 2DC6 A@
06C4 53E1 A

06C5 2DDF A@
06C6 5C05 A
06C7 1211 A

06C8 8021 C
06C9 1103 A
06CA 297A A
06CB 56A2 A
06CC 59A3 A
06CD 5CFA A
06CE 4C12 A
06CF C071 B
06D0 A071 B
06D1 2106 A

06D2 2972 A
06D3 56A2 A
06D4 59E3 A
06D5 4C0C A
06D6 C071 B
06D7 A071 B
06D8 2117 A

06D9 2DCB A@
06DA 5C06 A
06DB 1207 A
06DC 2968 A
06DD 52A4 A
06DE 56A5 A
06DF 59E6 A
06E0 8158 A
06E1 2DC9 A@
06E2 2126 A

06E3 2DC1 A@

06E4 5C05 A
06E5 1201 A
06E6 2122 A
06E7 5C02 A
06E8 1207 A
06E9 295B A
06EA 56BD A
06EB 59A8 A
06EC 5C29 A
06ED 5CB7 A
06EE 5FEA A
06EF 2119 A

06F0 2DB4 A@
06F1 5C03 A
06F2 120B A
06F3 2951 A
06F4 56EB A
06F5 4C06 A
06F6 C071 B
06F7 A071 B
06F8 2DAC A@
06F9 5C05 A
06FA 1209 A
06FB 8091 B
06FC 130C A
06FD 2106 A

06FE 2DA6 A@
06FF 5C09 A
0700 1203 A
0701 2943 A
0702 53EC A
0703 2105 A 0704 2DA0 A@
0705 5C0A A
0706 1202 A
0707 293D A
0708 56FB A
0709 8071 B
070A 4D01 A
070B 5CFB A
070C F12D A
070D 4D00 A
070E 3400 A
070F 646A B
0710 A46A B
0711 5C05 A
0712 A071 B
0713 2D98 A@
0714 21AB A 0715 8068 B
0716 A027 B
0717 4C00 A
0718 A036 B
0719 A071 B
071A 2D92 A@
071B 2D92 A@
071C 8036 B
071D 4FB4 A
071E 0600 A 071F 2D8F A@

0720 2D84 A@
0721 5C07 A
0722 1207 A
0723 2921 A
0724 5387 A
0725 5698 A
0726 5CD9 A
0727 4C18 A
0728 C071 B
0729 A071 B 072A 2D85 A@
072B 5C0A A
072C 1202 A
072D 2917 A
072E 53CD A 072F 7836 B
0730 8071 B
```

```
0731 5CFB A
0732 4801 A
0733 3081 A
0734 5C05 A
0735 7C27 B
0736 21E2 A
0737 2D03 A@
0738 21DC A
0739 01F4 A
073A 000A A
073B 0DC7 T
073C 0000 A
073D 0000 A
073E 0000 A
073F 0000 A
0740 0900 A
0741 4000 A
0742 4C00 A
0743 A071 B
0744 4400 A 0745 5700 A
0746 4200 A
0747 4100 A
0748 4000 A 0749 8E00 A
074A A394 B
074B 5E08 A
074C 5EF5 A
074D C90D A
074E 8A00 A
074F 4300 A
0750 2A00 A
0751 4700 A
0752 4B01 A
0753 8094 B
0754 5C09 A
0755 12F3 A 0756 4400 A
0757 4500 A
0758 4600 A
0759 5700 A
075A 0200 A 075B 075B T
075C 085B T
075D 0AA1 T
075E 0A3B T
075F 0819 T
0760 07F3 T
0761 0838 T
0762 077A T
0763 0CF7 T
0764 089D T
0765 093F T
0766 0848 T
0767 07C9 T
0768 07E7 T
0769 0977 T
076A 0779 T
076B 0779 T
076C 08FB T
076D 09A9 T
076E 08B0 T
076F 0779 T
0770 091F T
0771 0779 T
0772 08C1 T
0773 0912 T
0774 091F T
0775 0A27 T
0776 07DB T
0777 0780 T
0778 0793 T 0779 25C2 A@

077A 2DC2 A@
077B 0000 A
077C 1E40 A
077D 0008 A
077E 0031 A
077F 0200 A 0780 4C03 A
0781 A054 B
0782 4C00 A
0783 A092 B
0784 2DB8 A@
0785 0000 A
0786 1840 A
0787 0008 A
0788 0031 A

0789 F1B4 A
078A 2106 A
078B E092 B
078C 2101 A
078D A092 B
078E 7C54 B
078F 21F4 A
0790 8092 B 0791 4D10 A
0792 25AC A@

0793 4C03 A
0794 A027 B
0795 4C00 A
0796 A052 B
0797 A053 B
0798 A054 B
0799 A06B B
079A 2DA5 A@

079B 2D23 A@
079C 2D23 A@
079D 2D9F A@
079E 0000 A
079F 1840 A
07A0 0008 A
07A1 0031 A

07A2 F198 A
07A3 2119 A
07A4 C052 B
07A5 A052 B
07A6 0080 A
07A7 4400 A
07A8 5C02 A
07A9 1201 A
07AA 7853 B
07AB 7854 B

07AC 806B B
07AD 11ED A
07AE 4C00 A
07AF 7C27 B
07B0 21E8 A
07B1 8454 B
07B2 5DFF A
07B3 C452 B
07B4 0080 A
07B5 4400 A
07B6 5C02 A
07B7 1201 A
07B8 7853 B
07B9 8053 B
07BA 8C54 B
07BB 2D05 A@
07BC 3481 A

07BD 4D10 A
07BE 2580 A@
07BF 0CF0 T
07C0 0EAE T
07C1 10AC T
07C2 0000 A
07C3 0000 A
07C4 0000 A
07C5 0000 A
07C6 0000 A
07C7 0000 A
07C8 0000 A

07C9 2DF8 A@
07CA 03E8 A
07CB 2F68 A
07CC FF80 A
07CD 01E8 A
07CE 2F68 A
07CF FF90 A
```

| | |
|---|---|
| 07D0 | 1E79 A |
| 07D1 | 2560 A |
| 07D2 | FFA0 A |
| 07D3 | 04E0 A |
| 07D4 | 257C A |
| 07D5 | FFB0 A |
| 07D6 | 07CD A |
| 07D7 | 2578 A |
| 07D8 | 0048 A |
| 07D9 | 0C7C A |
| 07DA | 0200 A |

| | |
|---|---|
| 07DB | 2DE6 A@ |
| 07DC | 012C A |
| 07DD | BF60 A |
| 07DE | 3320 A |
| 07DF | 01E8 A |
| 07E0 | BF64 A |
| 07E1 | 3310 A |
| 07E2 | 04C3 A |
| 07E3 | BF64 A |
| 07E4 | 0008 A |
| 07E5 | 0131 A |
| 07E6 | 0200 A |

| | |
|---|---|
| 07E7 | 2DDA A@ |
| 07E8 | 0032 A |
| 07E9 | 3F60 A |
| 07EA | 3320 A |
| 07EB | 01E8 A |
| 07EC | 3F64 A |
| 07ED | 3310 A |
| 07EE | 04C3 A |
| 07EF | 3F64 A |
| 07F0 | 0008 A |
| 07F1 | 0131 A |
| 07F2 | 0200 A |

| | |
|---|---|
| 07F3 | 2DCC A@ |
| 07F4 | 5C0C A |
| 07F5 | 1228 A |
| 07F6 | 2DCB A@ |
| 07F7 | 1770 A |
| 07F8 | 6184 A |
| 07F9 | 0003 A |
| 07FA | 130C A |

| | |
|---|---|
| 07FB | 8010 B |
| 07FC | 1519 A |
| 07FD | FD49 A |
| 07FE | 2101 A |
| 07FF | 210B A |
| 0800 | 8094 B |
| 0801 | A095 B |
| 0802 | 4C44 A |
| 0803 | 2DBF A@ |
| 0804 | 4C41 A |
| 0805 | 2DBD A@ |
| 0806 | 4C42 A |
| 0807 | 2DBB A@ |
| 0808 | 4C20 A |
| 0809 | 2DB9 A@ |
| 080A | 0200 A |
| 080B | 8094 B |
| 080C | A095 B |
| 080D | 4C44 A |
| 080E | 2DB4 A@ |
| 080F | 4C4F A |
| 0810 | 2DB2 A@ |
| 0811 | 4C4F A |
| 0812 | 2DB0 A@ |
| 0813 | 4C47 A |
| 0814 | 2DAE A@ |
| 0815 | 0200 A |
| 0816 | 4CFF A |
| 0817 | 4D10 A |
| 0818 | 25AB A@ |

| | |
|---|---|
| 0819 | 2DA8 A@ |
| 081A | 07D0 A |
| 081B | 5568 A |
| 081C | 0003 A |
| 081D | 0031 A |
| 081E | 0200 A |

| | |
|---|---|
| 081F | 4C08 A |
| 0820 | A090 B |
| 0821 | 4C00 A |
| 0822 | A08F B |
| 0823 | A08E B |

| | |
|---|---|
| 0824 | 2D9D A@ |
| 0825 | 0000 A |
| 0826 | 4048 A |
| 0827 | 000C A |
| 0828 | 04C3 A |
| 0829 | F19B A |
| 082A | 210B A |
| 082B | 3181 A |
| 082C | 5CFD A |
| 082D | C08F B |
| 082E | A08F B |
| 082F | 6596 A |
| 0830 | C48E B |
| 0831 | A48E B |
| 0832 | 7C90 B |
| 0833 | 21F0 A |
| 0834 | 7592 A |
| 0835 | C192 A |

| | |
|---|---|
| 0836 | 4D12 A |
| 0837 | 258C A@ |

| | |
|---|---|
| 0838 | 2D89 A@ |
| 0839 | 00C8 A |
| 083A | 7944 A |
| 083B | 0008 A |
| 083C | 0100 A |
| 083D | FD09 A |
| 083E | 2585 A@ |
| 083F | 807F B |
| 0840 | 1101 A |
| 0841 | 218E A |
| 0842 | ED03 A |
| 0843 | FD02 A |
| 0844 | 21C6 A |
| 0845 | 218A A |

| | |
|---|---|
| 0846 | 0140 A |
| 0847 | FFFF A |

| | |
|---|---|
| 0848 | 2D08 A@ |
| 0849 | 0220 A |
| 084A | 0F64 A |
| 084B | 3310 A |
| 084C | 01E8 A |
| 084D | 0F68 A |
| 084E | 0008 A |
| 084F | 04C3 A |
| 0850 | 0200 A |

| | |
|---|---|
| 0851 | 0B28 T |
| 0852 | 0000 A |
| 0853 | 0000 A |
| 0854 | 0000 A |
| 0855 | 0000 A |
| 0856 | 0000 A |
| 0857 | 0000 A |
| 0858 | 0000 A |
| 0859 | 0000 A |
| 085A | 0000 A |

| | |
|---|---|
| 085B | 2906 A |
| 085C | 291E A |
| 085D | 1102 A |
| 085E | 4D20 A |
| 085F | 25F2 A@ |

| | |
|---|---|
| 0860 | 4D94 A |
| 0861 | 25F1 A@ |

| | |
|---|---|
| 0862 | 2DF1 A@ |
| 0863 | 8076 B |
| 0864 | 1102 A |
| 0865 | 4C00 A |
| 0866 | 0200 A |

```
0867 8077 B
0868 7111 A
0869 2101 A
086A 21FA A
086B 8C77 B
086C 850C A
086D 2DE7 A@
086E 1203 A
086F 5D01 A
0870 4C51 A
0871 2101 A
0872 4C28 A
0873 2DE2 A@
0874 3481 A
0875 E1E1 A
0876 1201 A
0877 81DF A
0878 0200 A
0879 DF32 A
087A FF80 A 087B 4000 A
087C 4FA0 A
087D 8083 B
087E 1108 A
087F 4400 A
0880 4000 A
0881 8508 A
0882 2DD5 A@
0883 C1D5 A
0884 7106 A
0885 8107 A
0886 C105 A 0887 0500 A
0888 4400 A
0889 0200 A 088A 0937 A
088B FE00 A
088C 8000 A
088D 01FF A
088E 0000 A
088F 0000 A
0890 0000 A
0891 0000 A
0892 0000 A
0893 0000 A
0894 0000 A
0895 0000 A
0896 0000 A
0897 0000 A
0898 0000 A
0899 0000 A
089A 0000 A
089B 0000 A
089C 0000 A 089D 292C A
089E 2107 A
089F 4D19 A
08A0 4E08 A
08A1 A88A B
08A2 1202 A
08A3 788A B
08A4 5001 A
08A5 25AC A@

08A6 4CFF A
08A7 A08A B
08A8 21B7 A

08A9 2920 A
08AA 21B5 A
08AB D04E B
08AC 1201 A
08AD 5001 A
08AE 4D19 A
08AF 25A2 A@

08B0 8094 B
08B1 A095 B
08B2 4C2E A
08B3 2DA6 A@

08B4 808A B
08B5 1102 A
08B6 1206 A

08B7 21A8 A

08B8 4C56 A
08B9 2DA0 A@
08BA 4C44 A
08BB 2D9E A@
08BC 2106 A

08BD 4C54 A
08BE 2D9B A@
08BF 4C45 A
08C0 21FA A
08C1 8094 B
08C2 A095 B
08C3 848A B
08C4 4C41 A
08C5 F524 A
08C6 4C20 A
08C7 F521 A
08C8 4C52 A
08C9 2590 A@

08CA 2D89 A@
08CB 8076 B
08CC 1101 A
08CD 0200 A
08CE 8066 B
08CF 15FD A
08D0 846E B
08D1 8115 A
08D2 2D85 A@
08D3 8C77 B
08D4 2D81 A@
08D5 2DB8 A@
08D6 5D01 A
08D7 1201 A
08D8 5D01 A
08D9 5C08 A
08DA 1201 A
08DB 2101 A
08DC C457 B

08DD E50A A
08DE 2105 A

08DF E50B A
08E0 2102 A
08E1 D504 A
08E2 2101 A
08E3 D507 A
08E4 3481 A
08E5 0201 A

08E6 1C20 A
08E7 0708 A
08E8 0705 A
08E9 0001 A
08EA FFFF A
08EB 0E10 A
08EC 00D4 A
08ED 0000 A
08EE 0000 A
08EF 0000 A
08F0 0000 A
08F1 0000 A
08F2 0000 A
08F3 0000 A
08F4 0000 A
08F5 0000 A
08F6 0000 A

08F7 290A A
08F8 2596 A@
08F9 4D19 A
08FA 2595 A@

08FB 2906 A
08FC 2592 A@
08FD D04D B
```

```
08FE 1201 A
08FF 5001 A
0900 4D19 A
0901 258E A0

0902 2D8E A0
0903 803F B
0904 6876 B
0905 1101 A
0906 0200 A
0907 2D86 A0
0908 8C68 D
0909 85E1 A
090A 4C00 A
090B 2D86 A0

090C 8038 B
090D 2D85 A0
090E 8C77 B
090F 2D82 A0
0910 3481 A
0911 0201 A 0912 2D81 A0
0913 2581 A0
0914 2D81 A0
0915 85D5 A
0916 8076 B
0917 15FB A
0918 8039 B
0919 2DD3 A0
091A 8C77 B
091B 2DD2 A0
091C 3481 A
091D 4D19 A
091E 25D0 A0

091F 2DD0 A0
0920 25D0 A0
0921 2911 A
0922 2DCF A0
0923 85C7 A
0924 8076 B
0925 15FA A
0926 803D B
0927 2DC5 A0
0928 8C77 B
0929 2DC4 A0
092A 3481 A
092B D04C B
092C 4E00 A
092D 1202 A
092E 4601 A
092F 5001 A
0930 A87F B
0931 4D59 A
0932 258C A0

0933 4C00 A
0934 858E A
0935 8C68 B
0936 2D87 A0
0937 A44C B
0938 0200 A
0939 0000 A
093A 0000 A
093B 0000 A
093C 0000 A
093D 0000 A
093E 0000 A 093F 8068 B
0940 A027 B
0941 29F1 A
0942 4C00 A
0943 A088 B
0944 A036 B
0945 4F84 A
0946 0600 A
0947 2DAC A0
0948 2DA7 A0
0949 2124 A 094A 803D B
094B 8CFD A
094C 4801 A
094D 8CFF A
094E C088 B
094F A088 B
0950 8036 B 0951 4802 A
0952 E068 B
0953 F068 B
0954 4C01 A
0955 7C27 B
0956 21ED A 0957 2D9D A0
0958 2D9D A0
0959 8076 B
095A 1515 A
095B 2D96 A0
095C 808E A
095D 8088 B
095E 2D8E A0
095F 8C77 B
0960 2D8D A0
0961 3481 A
0962 5004 A
0963 5CF4 A
0964 8C68 B
0965 2D88 A0
0966 3481 A
0967 4801 A
0968 D04C B
0969 1201 A
096A 5001 A
096B 4D19 A
096C 2D82 A0
096D 0200 A 096E 2D86 A0
096F 2D86 A0

0970 2580 A0
0971 0000 A
0972 0000 A
0973 0000 A
0974 0000 A
0975 0000 A
0976 0000 A 0180
01A8

0977 81C1 A
0978 A029 B
0979 8068 B
097A A027 B
097B 4F94 A
097C 4C01 A
097D A019 B
097E 0600 A
097F 4F00 A

0980 AC36 B
0981 2C81 A
0982 4F84 A
0983 0600 A
0984 4C00 A
0985 A090 B
0986 A059 B
0987 A055 B
0988 A05A B
0989 A056 B
098A 2D9F A0
098B 2104 A
098C 4E01 A
098D A810 B
098E 4CFF A
098F 25AB A0
0990 4F88 A
0991 4C01 A
0992 0600 A
0993 4F84 A
```

```
0994 81A7 A
0995 0600 A
0996 81A6 A
0997 0600 A
0998 2DA5 A@
0999 1502 A
099A 4CFF A
099B 217E A
099C 4F84 A
099D 0400 A
099E 61D2 A
099F F102 A
09A0 2179 A
09A1 F12A A
09A2 2177 A
09A3 E1CE A
09A4 2101 A
09A5 5001 A
09A6 61CB A
09A7 3381 A
09A8 7890 B
09A9 8490 B
09AA E5C8 A
09AB 2101 A
09AC 21DF A

09AD E056 B
09AE 2102 A
09AF A056 B
09B0 A455 B
09B1 1107 A
09B2 805A B
09B3 1103 A
09B4 EC5A B
09B5 2101 A
09B6 2102 A
09B7 AC5A B
09B8 A459 B

09B9 4FB4 A
09BA 0400 A
09BB 14D4 A

09BC 8059 B
09BD E055 B
09BE 2102 A
09BF 805A B
09C0 2101 A
09C1 8056 B
09C2 B029 B

09C3 7829 B
09C4 8C36 B
09C5 4B02 A
09C6 EC68 B
09C7 FC68 B
09C8 4F01 A
09C9 7C27 B
09CA 2185 A
09CB 210B A
09CC 0200 A
09CD 0000 A
09CE 0000 A
09CF 0000 A
09D0 0000 A
09D1 0000 A
09D2 0000 A
09D3 0000 A
09D4 0000 A
09D5 0000 A
09D6 0000 A

09D7 4C00 A
09D8 A026 B
09D9 859A A
09DA 8C68 B
09DB 2D99 A@
09DC A428 B
09DD 8068 B
09DE A090 B
09DF 8196 A
09E0 A029 B
09E1 3381 A
09E2 8068 B
09E3 F027 B
09E4 4E00 A

09E5 9029 B
09E6 8700 A
09E7 5001 A
09E8 3400 A
09E9 1201 A
09EA 5001 A
09EB 3200 A
09EC 4E01 A
09ED 7C27 B
09EE 21F6 A
09EF 3981 A
09F0 4C0A A
09F1 2DD8 A@
09F2 4C00 A
09F3 4300 A
09F4 8C68 B
09F5 2DD8 A@
09F6 4905 A
09F7 4C00 A
09F8 4F0A A
09F9 2DD4 A@
09FA 81D4 A
09FB 2DD1 A@
09FC 9C29 B
09FD 2DD0 A@
09FE 4E00 A
09FF D5D0 A
0A00 3481 A
0A01 1202 A
0A02 5101 A
0A03 2101 A
0A04 4E01 A
0A05 8028 B
0A06 2DC6 A@
0A07 8DC8 A
0A08 2DC5 A@

0A09 3381 A
0A0A 1101 A
0A0B 5101 A
0A0C C426 B
0A0D A426 B

0A0E 4700 A
0A0F 7829 B
0A10 DC68 B
0A11 806B B
0A12 7C90 B
0A13 21CF A

0A14 8426 B
0A15 4905 A
0A16 4C00 A
0A17 4F0A A
0A18 2DB5 A@
0A19 3481 A
0A1A 4E00 A
0A1B A819 B
0A1C 4D18 A
0A1D 25B3 A@

0A1E 03E3 A
0A1F 0000 A
0A20 0000 A
0A21 0000 A
0A22 0000 A
0A23 0000 A
0A24 0000 A
0A25 0000 A
0A26 0000 A
0A27 2DAA A@
0A28 0032 A
0A29 A180 A
0A2A 0009 A
0A2B 019C A
0A2C FDA6 A
0A2D 2103 A
0A2E 3C81 A
0A2F 1501 A
0A30 2102 A
0A31 4D20 A
0A32 259E A@
0A33 25A0 A@
0A34 0000 A
0A35 0000 A
0A36 0000 A
0A37 0000 A
0A38 0000 A
0A39 0000 A
0A3A 0000 A
0A3B 2D99 A@
```

```
0A3C 2597 A@
0A3D 4C00 A
0A3E A089 B
0A3F A05C B
0A40 2102 A

0A41 4C01 A
0A42 A089 B

0A43 2092 A@
0A44 F08E A
0A45 2149 A
0A46 AC6D B
0A47 8089 B
0A48 1105 A

0A49 3D81 A
0A4A 4C0E A
0A4B 2D81 A@
0A4C A449 B
0A4D 2112 A

0A4E 2DC0 A@
0A4F DC4B B
0A50 2C81 A
0A51 1202 A
0A52 5301 A
0A53 785C B
0A54 3D81 A
0A55 8144 A
0A56 2DC9 A@
0A57 8C46 B
0A58 DC47 B
0A59 EDC7 A
0A5A 25C7 A@
0A5B 2DC7 A@
0A5C A449 B
0A5D E53C A
0A5E 2101 A
0A5F 2166 A

0A60 81BD A
0A61 A03C B
0A62 8125 A
0A63 2DEC A@
0A64 A042 B
0A65 A048 B

0A66 8049 B
0A67 8449 B
0A68 2929 A
0A69 07D4 A
0A6A A44A B
0A6B 2DB4 A@
0A6C A043 B
0A6D C048 B
0A6E A048 B

0A6F 8102 A
0A70 8449 B
0A71 2920 A

0A72 019F A
0A73 804A B
0A74 2DAB A@
0A75 A044 B
0A76 5001 A
0A77 C048 B
0A78 A048 B

0A79 81AA A
0A7A 844A B
0A7B 2916 A
0A7C 0000 A
0A7D 804A B
0A7E 2DA1 A@
0A7F 4804 A
0A80 5CFD A
0A81 A045 B
0A82 C048 B

0A83 A048 B
0A84 805C B
0A85 1108 A

0A86 8089 B
```
```
0A87 1506 A
0A88 8048 B
0A89 049B A
0A8A 1202 A
0A8B 4C00 A
0A8C 2102 A
0A8D 2594 A@
0A8E 8048 B
0A8F 4D60 A
0A90 2D95 A@
0A91 0200 A

0A92 2D8D A@
0A93 8C3C B
0A94 2D8E A@
0A95 4700 A
0A96 8500 A
0A97 2301 A

0A98 504B A
0A99 01F4 A
0A9A 1388 A
0A9B FFFF A
0A9C 0000 A
0A9D 0000 A
0A9E 0000 A
0A9F 0000 A
0AA0 0000 A

0AA1 2964 A
0AA2 2591 A@
0AA3 4C00 A
0AA4 A05C B
0AA5 2101 A
0AA6 4C01 A
0AA7 A089 B
0AA8 2D8C A@
0AA9 F18C A
0AAA 2151 A
0AAB AC67 B
0AAC 8089 B
0AAD 1107 A

0AAE 2D81 A
0AAF 4C0E A
0AB0 2D86 A@
0AB1 4F0A A
0AB2 2D85 A@
0AB3 A422 B
0AB4 2117 A

0AB5 2954 A
0AB6 DC24 B
0AB7 3C81 A
0AB8 1202 A
0AB9 5301 A
0ABA 785C B
0ABB 3D81 A
0ABC 81DC A
0ABD 2D0E A@
0ABE 8C1F B
0ABF DC20 B
0AC0 EDDC A
0AC1 25DC A@
0AC2 2DDC A@
0AC3 A422 B
0AC4 E5D4 A
0AC5 2106 A

0AC6 4D04 A
0AC7 2D08 A@
0AC8 8094 B
0AC9 A095 B
0ACA 4C5E A
0ACB 2544 A@

0ACC 8132 A
0ACD 2DCE A@
0ACE A01A B
0ACF A021 B

0AD0 8022 B
0AD1 8422 B
```

```
0AD2 292D A        0B1A 0000 A
0AD3 194E A        0B1B 0000 A
0AD4 A123 B        0B1C 0000 A
0AD5 2DC6 A@       0B1D 0000 A
0AD6 A01B B        0B1E 0000 A
0AD7 C021 B        0B1F 0000 A
0AD8 A021 B        0B20 0000 A
                   0B21 0000 A
0AD9 8102 A        0B22 0000 A
0ADA 8422 B        0B23 0000 A
0ADB 2924 A        0B24 0000 A
                   0B25 0000 A
0ADC 0291 A        0B26 0000 A
0ADD 8023 B        0B27 0000 A
0ADE 2DED A@       0B28 4600 A
0ADF A01C B        0B29 8200 A
0AE0 C021 B        0B2A A037 B
0AE1 A021 B

0AE2 8023 B
0AE3 4D0E A        0B2B 4F88 A
0AE4 291B A        0B2C 4C01 A
0AE5 000E A        0B2D 0600 A
0AE6 8023 B
0AE7 2DB4 A@
0AE8 A010 B        0B2E 8202 A
0AE9 5001 A        0B2F 61E3 A
0AEA C021 B        0B30 S601 A
0AEB 4D0A A        0B31 5DF4 A
0AEC 2DAF A@       0B32 A462 B
0AED 2481 A        0B33 5D07 A
0AEE 4802 A        0B34 2400 A
0AEF 5CFE A        0B35 A063 B

0B36 8019 B
                   0B37 1507 A
0AF0 A021 B        0B38 2DDB A@
0AF1 805C D        0B39 61DB A
0AF2 1108 A        0B3A F1DA A
                   0B3B 2101 A
0AF3 8089 B        0B3C 2102 A
0AF4 1506 A        0B3D 7863 B
0AF5 8021 D        0B3E 7863 B
0AF6 D11A A
0AF7 1202 A        0B3F 8201 A
0AF8 4C00 A        0B40 4F84 A
0AF9 2102 A        0B41 5C07 A
0AFA 25A3 A@       0B42 1209 A
0AFB 8021 B

0AFC 4D5A A        0B43 4C08 A
0AFD 2D14 A@       0B44 C0C3 B
0AFE 0200 A
                   0B45 3181 A
0AFF 1506 A        0B46 65CF A
                   0B47 F5CF A
                   0B48 61CF A

0B49 0600 A
                   0B4A 8027 B
0B00 2D9B A@       0B4B 2DCD A@
0B01 4F64 A
0B02 2D9C A@
0B03 4700 A        0B4C 8063 B
0B04 8300 A
0B05 2201 A
                   0B4D E1CC A
                   0B4E 2102 A
                   0B4F E1CB A
0B06 803E B        0B50 61CB A
0B07 1101 A        0B51 0600 A
0B08 0200 A
0B09 0201 A
                   0B52 2DCA A@
                   0B53 116C A

0B0A 807F B        0B54 4F84 A
0B0B 1103 A        0B55 0400 A
0B0C 5301 A        0B56 6173 A
0B0D 4C00 A        0B57 A064 B
0B0E A07F B        0B58 F175 A
0B0F 0200 A        0B59 2160 A
0B10 0C5F T        0B5A F174 A
0B11 0A0B A        0B5B 215E A
0B12 0BFC T
0B13 0000 A
0B14 0000 A        0B5C 4D00 A
0B15 0000 A        0B5D A47F B
0B16 0000 A        0B5E E16F A
0B17 0000 A        0B5F 2109 A
0B18 0000 A
0B19 0000 A        0B60 3181 A
```

```
0B61 8201 A
0B62 5101 A
0B63 656A A
0B64 787F B
0B65 5CF5 A
0B66 1303 A

0B67 4C00 A
0B68 A07F B
0B69 3181 A
0B6A 8202 A
0B6B 5CF9 A
0B6C 110B A
0B6D F1AA A
0B6E 2109 A
0B6F A08C B
0B70 E48C B
0B71 2101 A
0B72 2105 A
0B73 8202 A
0B74 5CFD A
0B75 1302 A

0B76 4A03 A
0B77 21B3 A

0B78 8203 A
0B79 2DA4 A0
0B7A 5C08 A
0B7B 5CF8 A
0B7C 3400 A

0B7D 8602 A
0B7E 5CFC A
0B7F 659F A
0B80 A478 B
0B81 8601 A
0B82 A461 B
0B83 3381 A
0B84 8202 A
0B85 5CFD A
0B86 1202 A
0B87 4A03 A
0B88 21FB A

0B89 4A04 A
0B8A 4200 A

0B8B 3C81 A
0B8C 4801 A
0B8D 2101 A
0B8E 2126 A
0B8F 8062 B
0B90 F13F A
0B91 2112 A
0B92 F18D A
0B93 2110 A
0B94 F13C A
0B95 2101 A
0B96 211E A
0B97 8061 B
0B98 613A A
0B99 5CFE A
0B9A F12C A
0B9B 2101 A
0B9C 2118 A

0B9D 7C81 A
0B9E 0103 A
0B9F 1202 A
0BA0 5001 A
0BA1 787F B
0BA2 3381 A
0BA3 2111 A

0BA4 8019 B
0BA5 150F A
0BA6 807F B
0BA7 1101 A
0BA8 5301 A
0BA9 8061 B
0BAA 5CFE A
0BAB 1302 A
0BAC DC16 B
0BAD 2101 A
0BAE DC15 B

0BAF 4C00 A
0BB0 A07F B
0BB1 3C81 A
0BB2 1202 A
0BB3 5301 A
0BB4 787F B

0BB5 82FD A
0BB6 5CF6 A
0BB7 130A A

0BB8 3C81 A
0BB9 0200 A

0BBA 8202 A
0BBB 5CFD A
0BBC 1303 A
0BBD 5CFC A
0BBE F115 A
0BBF 21B6 A

0BC0 4CFF A
0BC1 21BB A
0BC2 3C81 A
0BC3 8361 B
0BC4 5EFC A
0BC5 3981 A
0BC6 6506 A
0BC7 7504 A
0BC8 0502 A
0BC9 2132 A
0BCA 03FF A
0BCB 0040 A
0BCC 0080 A
0BCD 00BF A
0BCE 01FF A
0BCF 0200 A
0BD0 0003 A
0BD1 0002 A
0BD2 005B A
0BD3 001C A
0BD4 01FF A
0BD5 0000 A
0BD6 0000 A
0BD7 0000 A
0BD8 0000 A
0BD9 0000 A
0BDA 0000 A

0BDB 4C01 A
0BDC A040 B

0BDD AC8D B
0BDE 4FE8 A
0BDF 0400 A
0BE0 4C00 A
0BE1 A03A B
0BE2 A010 B
0BE3 4F88 A
0BE4 0400 A
0BE5 1214 A
0BE6 8040 B
0BE7 1502 A
0BE8 2DEC A0
0BE9 2DEC A0
0BEA 4FE8 A
0BEB 0400 A
0BEC 61EA A
0BED C03A B
0BEE A03A B
0BEF E1E8 A
0BF0 21F2 A
0BF1 4C01 A
0BF2 A010 B
0BF3 4C00 A
0BF4 8C8D B

0BF5 4000 A
0BF6 4C00 A
0BF7 A040 B
0BF8 4400 A
0BF9 0200 A
0BFA 4CFF A
0BFB 21F8 A
0BFC 4000 A
0BFD 8094 B
0BFE A095 B
0BFF 4C07 A
```

```
0C00 3483 A
0C01 7158 A
0C02 6958 A
0C03 A06C B
0C04 5DFD A
0C05 4C07 A
0C06 3483 A
0C07 A06F B
0C08 5DFD A
0C09 A47E B
0C0A 4400 A
0C0B F151 A
0C0C 2144 A

0C0D 4E04 A
0C0E A890 B
0C0F 4E00 A
0C10 4D00 A
0C11 A465 B
0C12 110F A
0C13 3181 A
0C14 3481 A
0C15 1104 A
0C16 4C00 A
0C17 4F0A A
0C18 2DC0 A0
0C19 7865 B
0C1A 3200 A
0C1B 5AFC A
0C1C 7C90 B
0C1D 21F6 A
0C1E 3481 A
0C1F 1101 A
0C20 7865 B
0C21 3981 A
0C22 1106 A
0C23 5DFC A
0C24 5C0C A
0C25 2100 A
0C26 7C6C B
0C27 3081 A
0C28 7C65 B

0C29 8065 B
0C2A E06F B
0C2B 2105 A
0C2C 5DFC A
0C2D 7C6C B
0C2E 3081 A
0C2F 7C65 B
0C30 21F8 A

0C31 806C B
0C32 1205 A

0C33 4C4B A
0C34 292A A
0C35 4C03 A
0C36 C06C B
0C37 A06C B

0C38 4C0F A
0C39 3422 A
0C3A 2923 A
0C3B 7C6C B
0C3C 2102 A
0C3D 4C2E A
0C3E 2920 A
0C3F 5DFC A
0C40 3481 A
0C41 15F6 A
0C42 806C B
0C43 12F4 A

0C44 7C7E B
0C45 2104 A
0C46 807F B
0C47 1102 A
0C48 4C2D A
0C49 2915 A

0C4A 8094 B
0C4B D095 B
0C4C E10C A
0C4D 2101 A
0C4E 0200 A
0C4F 4C20 A
0C50 21F8 A

0C51 8010 D
0C52 1502 A
0C53 4C1E A
0C54 21F4 A
0C55 4C00 A
0C56 A010 B
0C57 4C2A A
0C58 21F0 A

0C59 0200 A
0C5A 0004 A
0C5B FFF8 A
0C5C 0003 A
0C5D FFFF A

0C5E C129 A

0C5F 6129 A
0C60 F127 A
0C61 4C0F A
0C62 5C01 A
0C63 4C00 A
0C64 4100 A
0C65 8495 B
0C66 5DF9 A
0C67 4000 A
0C68 2D2B A0
0C69 5000 A
0C6A 71F1 A
0C6B 2102 A
0C6C C471 B
0C6D 2103 A
0C6E 8071 B
0C6F 611A A
0C70 3100 A
0C71 5D07 A
0C72 4400 A
0C73 3400 A
0C74 2D28 A0
0C75 0600 A
0C76 8471 B
0C77 6514 A
0C78 5D07 A
0C79 3100 A
0C7A 8095 B
0C7B 5C0A A
0C7C 1205 A
0C7D 806A B
0C7E 1103 A
0C7F 3481 A
0C80 2D14 A0
0C81 0500 A
0C82 4500 A
0C83 8035 D
0C84 0106 A
0C85 A095 B
0C86 4700 A
0C87 0200 A

0C88 0030 A
0C89 003F A
0C8A 001F A
0C8B 0080 A
0C8C FFE0 A

0C8D 8094 B
0C8E A095 B
0C8F 4C20 A
0C90 29CE A
0C91 49FF A
0C92 21FC A
0C93 0200 A
0C94 AEAE T
0C95 0D86 T
0C96 0000 A
0C97 0000 A
0C98 0000 A
0C99 0000 A
0C9A 2DFA A0
0C9B 4C01 A
0C9C 0600 A

0C9D 4C00 A
0C9E A071 B
0C9F 4600 A
0CA0 8071 B
0CA1 5C07 A
0CA2 A079 B
```

```
0CA3 8200 A
0CA4 5CF8 A
0CA5 2904 A
0CA6 8200 A
0CA7 2902 A
0CA8 4A01 A
0CA9 21F9 A

0CAA 612F A
0CAB E12F A
0CAC 2122 A
0CAD F125 A
0CAE 211B A
0CAF F12C A
0CB0 4C4F A
0CB1 E132 A
0CB2 2112 A
0CB3 F12A A
0CB4 2122 A
0CB5 F12C A
0CB6 211D A
0CB7 F127 A
0CB8 0200 A
0CB9 E126 A

0CBA 25DB A@

0CBB 8479 B
0CBC 6520 A
0CBD 5C09 A
0CBE 5CFE A
0CBF 3400 A
0CC0 8471 B
0CC1 5C07 A
0CC2 3400 A
0CC3 A079 B
0CC4 0200 A

0CC5 611B A
0CC6 5C01 A
0CC7 C079 B
0CC8 2DCC A@
0CC9 0600 A
0CCA 8079 B
0CCB C119 A
0CCC 710C A
0CCD A079 B
0CCE 0200 A

0CCF 4200 A
0CD0 8915 A
0CD1 2200 A
0CD2 8A00 A
0CD3 21CF A

0CD4 4600 A
0CD5 4600 A
0CD6 0200 A
0CD7 4400 A
0CD8 2201 A

0CD9 1F80 A
0CDA 00FF A
0CDB 001F A
0CDC 0030 A
0CDD F07F A
0CDE 0060 A
0CDF 0067 A
0CE0 007F A
0CE1 003F A
0CE2 0065 A
0CE3 0020 A
0CE4 005F A
0CE5 0080 A

0CE6 0CE7 T
0CE7 0D04 T
0CE8 0D06 T
0CE9 0D0D T
0CEA 0D11 T
0CEB 0D14 T
0CEC 0D17 T
0CED 0D1B T
0CEE 0D1F T
0CEF 0D21 T
0CF0 0D23 T
0CF1 0D26 T
0CF2 0D2A T
0CF3 0D2C T
0CF4 0D2F T
0CF5 0D33 T
0CF6 0D3D T
0CF7 0D4C T
0CF8 0D4F T
0CF9 0D55 T
0CFA 0D58 T
0CFB 0D5E T
0CFC 0D62 T
0CFD 0D65 T
0CFE 0D6C T
0CFF 0D71 T
0D00 0D77 T
0D01 0D7A T
0D02 0D7D T
0D03 0D83 T

0D04 0203 A
0D05 2066 A
0D06 4142 A
0D07 4C45 A
0D08 2049 A
0D09 474E A
0D0A 4954 A
0D0B 494F A
0D0C 4E66 A
0D0D 454E A
0D0E 4749 A
0D0F 4E45 A
0D10 2066 A
0D11 5250 A
0D12 4545 A
0D13 4466 A
0D14 2054 A
0D15 4553 A
0D16 5466 A
0D17 504F A
0D18 494E A
0D19 5453 A
0D1A 6666 A
0D1B 2044 A
0D1C 5745 A
0D1D 4C4C A
0D1E 2066 A
0D1F 4445 A
0D20 4766 A
0D21 5250 A
0D22 4D66 A
0D23 564F A
0D24 4C54 A
0D25 5266 A
0D26 5449 A
0D27 4D49 A
0D28 4E47 A
0D29 6666 A
0D2A 5050 A
0D2B 4D66 A
0D2C 414D A
0D2D 5053 A
0D2E 6666 A
0D2F 2043 A
0D30 5255 A
0D31 4953 A
0D32 4566 A
0D33 5245 A
0D34 4144 A
0D35 2056 A
0D36 4143 A
0D37 5555 A
0D38 4D20 A
0D39 4741 A
0D3A 5547 A
0D3B 4520 A
0D3C 6666 A
0D3D 1010 A
0D3E 1010 A
0D3F 1010 A
0D40 1010 A
0D41 4F84 A
0D42 3188 A
0D43 328C A
0D44 3390 A
0D45 3494 A
```

```
0D46 3598 A
0D47 3620 A
0D48 2030 A
0D49 2052 A
0D4A 504D A
0D4B 6666 A
0D4C 212E A
0D4D 2E2E A
0D4E 6666 A
0D4F 4341 A
0D50 4C49 A
0D51 4252 A
0D52 4154 A
0D53 4522 A
0D54 2066 A
0D55 4F48 A
0D56 4D53 A
0D57 6666 A
0D58 2250 A
0D59 524F A
0D5A 4345 A
0D5B 4544 A
0D5C 2220 A
0D5D 6666 A
0D5E 4255 A
0D5F 5454 A
0D60 4F4E A
0D61 6666 A
0D62 5055 A
0D63 5348 A
0D64 6666 A
0D65 4341 A
0D66 4C49 A
0D67 4252 A
0D68 4154 A
0D69 494F A
0D6A 4E20 A
0D6B 6666 A
0D6C 434F A
0D6D 4D50 A
0D6E 4C45 A
0D6F 5445 A
0D70 6666 A
0D71 494E A
0D72 4652 A
0D73 412D A
0D74 5245 A
0D75 4420 A
0D76 6666 A
0D77 284D A
0D78 4158 A
0D79 2966 A
0D7A 4252 A
0D7B 414E A
0D7C 4B66 A
0D7D 414C A
0D7E 5445 A
0D7F 524E A
0D80 4154 A
0D81 4F52 A
0D82 6666 A
0D83 4552 A
0D84 524F A
0D85 5266 A

0D86 4F9C A
0D87 4000 A
0D88 0400 A
0D89 1701 A
0D8A 21FD A
0D8B 4400 A
0D8C 0200 A

0D8D 8868 B

0D8E 2481 A
0D8F 29F6 A
0D90 0600 A
0D91 710D A
0D92 2107 A
0D93 29F2 A
0D94 4000 A
0D95 610A A
0D96 C10A A
0D97 29EE A
0D98 0600 A
0D99 4400 A
0D9A C103 A
0D9B 4AFF A
0D9C 21F2 A
0D9D 0200 A

0D9E 1002 A
0D9F 0F80 A
0DA0 F000 A
0DA1 00F4 A
0DA2 0000 A
0DA3 0000 A
0DA4 0000 A
0DA5 0000 A
0DA6 0000 A
0DA7 0000 A
0DA8 0000 A
0DA9 0000 A
0DAA 0000 A
0DAB 0000 A
0DAC 0000 A
0DAD 0000 A
0DAE A070 B
0DAF 4C00 A
0DB0 A06B B
0DB1 2DF0 A@
0DB2 293D A
0DB3 2DEF A@
0DB4 806B B
0DB5 11FB A
0DB6 7C70 B
0DB7 21F7 A
0DB8 0200 A

0DB9 AC8D B
0DBA A08C B
0DBB 4FE8 A
0DBC 0400 A
0DBD 4C00 A
0DBE A03A B
0DBF 4FE4 A
0DC0 0400 A
0DC1 140A A
0DC2 4FE8 A
0DC3 0400 A
0DC4 610F A
0DC5 C03A B
0DC6 A0CA B
0DC7 E100 A
0DC8 21F3 A
0DC9 808C B
0DCA 8C8D B
0DCB 0201 A
0DCC 808C B
0DCD 8C8D B
0DCE 0200 A

0DCF 4FA4 A
0DD0 813C A
0DD1 0600 A
0DD2 0200 A

0DD3 4FA4 A
0DD4 4C00 A
0DD5 0600 A
0DD6 0200 A

0DD7 8147 A
0DD8 4F88 A
0DD9 0600 A
0DDA 2136 A

0DDB A07A B
0DDC 5400 A
0DDD 4100 A
0DDE 4200 A
0DDF 4300 A
0DE0 4000 A
0DE1 807A B
0DE2 0200 A

0DE3 4700 A
0DE4 4600 A
0DE5 4500 A
0DE6 4400 A
0DE7 0200 A

0DE8 4700 A
```

```
0DE9 8500 A                    0E2F 71F0 A
0DEA A017 B                    0E30 0200 A
0DEB 8301 A                    0E31 6118 A
0DEC A011 B                    0E32 E1EE A
0DED 2302 A                    0E33 2101 A
                               0E34 211A A
                               0E35 3181 A
                               0E36 A051 B
                               0E37 4F88 A
0DEE 2901 A                    0E38 8102 A
0DEF 21FE A                    0E39 0600 A
0DF0 2082 A@                   0E3A 8051 B
0DF1 29E9 A                    0E3B 0201 A
0DF2 2083 A@
0DF3 2083 A@
0DF4 2101 A                    0E3C 4FA8 A
0DF5 29E5 A                    0E3D 0400 A
0DF6 2931 A                    0E3E 61E1 A
0DF7 2101 A                    0E3F 8C41 B
0DF8 2101 A                    0E40 3C82 A
0DF9 21E9 A                    0E41 11DC A
                               0E42 3C82 A
0DFA 2DAD A@                   0E43 A041 B
0DFB 2DAD A@                   0E44 1101 A
0DFC 8051 B                    0E45 25DC A@
0DFD 610E A                    0E46 25DC A@
0DFE F10F A                    0E47 7105 A
0DFF 2105 A                    0E48 25D9 A@
0E00 F10E A                    0E49 0200 A
0E01 2105 A                    0E4A 001F A
0E02 F10D A                    0E4B 000A A
0E03 2105 A                    0E4C 000C A
                               0E4D 0020 A
0E04 21F4 A                    0E4E 000F A

0E05 2DA4 A@
0E06 2417 B                    0E4F 2DD4 A@
                               0E50 E04D A
0E07 2DA2 A@                   0E51 4559 A
0E08 2411 B                    0E52 424F A
                               0E53 4152 A
0E09 2DA0 A@                   0E54 4420 A
0E0A 25A0 A@                   0E55 1C67 A
                               0E56 6060 A
0E0B 4000 A                    0E57 4C00 A
0E0C 001F A                    0E58 4FA0 A
0E0D 8000 A                    0E59 0600 A
0E0E 000D A                    0E5A 4F88 A
0E0F 000E A                    0E5B 81AF A
0E10 0010 A                    0E5C 0600 A
                               0E5D 29CB A
                               0E5E 21FE A
                               0E5F F1E0 A
                               0E60 25C2 A@
                               0E61 21FB A

0E11 AC8D B                    0E62 2DC1 A@
0E12 A08C B                    0E63 E04E A
0E13 4700 A                    0E64 554D A
0E14 29D8 A                    0E65 2E20 A
0E15 2D8C A@                   0E66 4F46 A
0E16 4300 A                    0E67 2043 A
0E17 4F88 A                    0E68 594C A
0E18 0400 A                    0E69 494E A
0E19 12F9 A                    0E6A 4445 A
0E1A 8104 A                    0E6B 5253 A
0E1B 0600 A                    0E6C 201C A
0E1C 8C8D B                    0E6D 6060 A
0E1D 808C B                    0E6E 4C00 A
                               0E6F 4FA0 A
0E1E 0200 A                    0E70 0600 A
0E1F 8000 A                    0E71 21EB A
0E20 0000 A                    0E72 4300 A
0E21 0000 A                    0E73 4103 A
0E22 0000 A                    0E74 4FA4 A
0E23 0000 A                    0E75 0400 A
0E24 0000 A                    0E76 3181 A
0E25 0000 A                    0E77 0400 A
0E26 0000 A                    0E78 3482 A
0E27 0000 A                    0E79 15FB A
                               0E7A 7526 A
                               0E7B 2101 A
                               0E7C 6522 A
                               0E7D 3481 A
                               0E7E 50F5 A
                               0E7F 652B A
0E28 2913 A                    0E80 A468 B
                               0E81 3181 A
0E29 4F88 A
0E2A 0400 A                    0E82 6510 A
0E2B 5C01 A                    0E83 F51C A
0E2C 12F1 A
0E2D 4FA8 A
0E2E 0400 A
```

```
0E84 611D A
0E85 711D A
0E86 611D A
0E87 711D A
0E88 611D A
0E89 711D A
0E8A 611D A
0E8B 711D A
0E8C 611D A
0E8D A073 B
0E8E 5CF5 A
0E8F 618E A
0E90 F10F A
0E91 2107 A
0E92 12CF A
0E93 11CE A
0E94 E187 A
0E95 2101 A
0E96 21CB A
0E97 F183 A
0E98 21C9 A
0E99 8073 B
0E9A 4500 A
0E9B 4700 A
0E9C 0200 A
0E9D 0700 A
0E9E 0100 A
0E9F FFFC A
0EA0 0003 A
0EA1 0004 A
0EA2 F93F A
0EA3 0400 A
0EA4 FDBF A
0EA5 0200 A
0EA6 FE1F A
0EA7 0180 A
0EA8 FFCF A
0EA9 0040 A
0EAA FFDF A
0EAB 000F A
0EAC 00FF A
0EAD F814 A
0EAE AC93 B
0EAF 4F88 A
0EB0 0400 A
0EB1 71E8 A
0EB2 2101 A
0EB3 210A A
0EB4 71E9 A
0EB5 2D1F A
0EB6 4F88 A
0EB7 0400 A
0EB8 71EC A
0EB9 2D1C A
0EBA 4F88 A
0EBB 0400 A
0EBC 71E6 A
0EBD 2D19 A
0EBE 8C93 B
0EBF 4100 A
0EC0 8473 B
0EC1 8041 B
0EC2 1102 A
0EC3 4500 A
0EC4 0200 A
0EC5 2943 A
0EC6 29AB A
0EC7 3482 A
0EC8 75D8 A
0EC9 2101 A
0ECA 61E2 A
0ECB 6108 A
0ECC 4500 A
0ECD 1502 A
0ECE 8073 B
0ECF 0200 A
0ED0 8025 B
0ED1 11FC A
0ED2 2905 A
0ED3 250B A0
0ED4 FFF7 A
0ED5 E000 A
0ED6 E0AA A
0ED7 E155 A
0ED8 4600 A
0ED9 4C0F A
0EDA 4400 A
0EDB 49FF A
0EDC 21FD A
0EDD 4200 A
0EDE 2501 A0
0EDF 0259 T
0EE0 0F77 T
0EE1 0000 A
0EE2 0000 A
0EE3 0000 A
0EE4 0000 A
0EE5 0000 A
0EE6 0000 A
0EE7 0000 A
0EE8 110F A
0EE9 AC3B B
0EEA A03A B
0EEB 4F88 A
0EEC 0400 A
0EED 2DF3 A0
0EEE 298F A
0EEF 4F88 A
0EF0 0400 A
0EF1 61BA A
0EF2 5001 A
0EF3 CC3A B
0EF4 A03A B
0EF5 1801 A
0EF6 21F6 A
0EF7 8C3B B
0EF8 0200 A
0EF9 AC3B B
0EFA A03A B
0EFB 4F88 A
0EFC 0400 A
0EFD 0400 A
0EFE 61A0 A
0EFF 5001 A
0F00 CC3A B
0F01 A03A B
0F02 1801 A
0F03 21F9 A
0F04 8C3B B
0F05 0200 A
0F06 4000 A
0F07 4200 A
0F08 4C0F A
0F09 4F84 A
0F0A 0600 A
0F0B 4700 A
0F0C 4400 A
0F0D 0200 A
0F0E AC81 B
0F0F A080 B
0F10 4F88 A
0F11 0400 A
0F12 A087 B
0F13 5000 A
0F14 7134 A
0F15 2112 A
0F16 7133 A
0F17 212A A
0F18 4F00 A
0F19 AC66 B
0F1A 4F88 A
0F1B 712F A
0F1C 210F A
```

```
0F1D 4C01 A
0F1E A076 B

0F1F 8074 B
0F20 1102 A
0F21 4C0E A

0F22 2101 A
0F23 4C3E A
0F24 0600 A

0F25 8C81 B
0F26 8080 B
0F27 0200 A

0F28 7121 A
0F29 2118 A
0F2A AC66 B
0F2B 21EF A

0F2C 4C00 A
0F2D A076 B
0F2E 8183 A
0F2F A082 B
0F30 A06B B
0F31 0408 A
0F32 A06E B
0F33 5C10 A
0F34 0404 A
0F35 A077 B
0F36 11E6 A
0F37 5C10 A
0F38 8074 B
0F39 15E5 A
0F3A 040C A
0F3B A033 B
0F3C 9087 B
0F3D 710F A
0F3E 2131 A
0F3F 4C00 A
0F40 A03F B
0F41 21DD A

0F42 7108 A
0F43 2101 A
0F44 21D8 A
0F45 7C82 B
0F46 21DE A
0F47 7882 B
0F48 21D4 A
0F49 0008 A
0F4A 0002 A
0F4B 0004 A
0F4C 0010 A
0F4D 0020 A
0F4E 4F88 A
0F4F 0400 A
0F50 4C00 A
0F51 A02A B
0F52 2D8E A@
0F53 2D8F A@
0F54 4F88 A
0F55 0400 A
0F56 5000 A
0F57 71F4 A
0F58 2101 A
0F59 2108 A
0F5A 4F83 A
0F5B 0400 A
0F5C 6187 A
0F5D C03A B
0F5E A02A B
0F5F E185 A
0F60 21F1 A
0F61 210B A
0F62 040C A
0F63 A039 B
0F64 5C10 A
0F65 0410 A
0F66 A03D B
0F67 0400 A
0F68 4000 A
0F69 4C30 A
0F6A 0600 A
0F6B 4400 A
0F6C 71E0 A
0F6D 0200 A

0F6E 0201 A

0F6F 4F94 A
0F70 4C01 A

0F71 A074 B
0F72 0600 A

0F73 4C30 A
0F74 4F88 A
0F75 0600 A
0F76 0200 A

0F77 293E A
0F78 4F94 A
0F79 4C00 A
0F7A 21F6 A
0F7B 0000 A
0F7C 0000 A
0F7D 0000 A
0F7E 0000 A
0F7F 0000 A
0F80 0000 A
0F81 0000 A
0F82 0000 A
0F83 0000 A
0F84 2DF6 A@
0F85 E0E0 A
0F86 434F A
0F87 4D50 A
0F88 5554 A
0F89 4552 A
0F8A 2018 A
0F8B 16A0 A
0F8C 494E A
0F8D 2050 A
0F8E 524F A
0F8F 4345 A
0F90 5253 A
0F91 6060 A

0F92 4F88 A
0F93 91E8 A@
0F94 0600 A

0F95 4FA4 A
0F96 4C01 A
0F97 0600 A

0F98 8161 A
0F99 2DE3 A@

0F9A 3081 A
0F9B 297E A
0F9C 2954 A
0F9D 2DE0 A@
0F9E AC4B B
0F9F 3081 A
0FA0 297F A
0FA1 294F A
0FA2 2DDB A@
0FA3 AC24 B

0FA4 4FA4 A
0FA5 4C05 A
0FA6 0600 A

0FA7 8151 A
0FA8 2DD4 A@

0FA9 3081 A
0FAA 296F A
0FAB 2945 A
0FAC 2DD1 A@
0FAD AC47 B
```

```
0FAE 3081 A
0FAF 2970 A
0FB0 2940 A
0FB1 2DCC A0
0FB2 AC20 B

0FB3 4FA4 A
0FB4 4C07 A
0FB5 0600 A

0FB6 8142 A
0FB7 2DC5 A0

0FB8 3081 A
0FB9 2960 A
0FBA 2936 A
0FBB 2DC2 A0
0FBC AC46 B
0FBD 3081 A
0FBE 2961 A
0FBF 2931 A
0FC0 2DBD A0
0FC1 AC1F B

0FC2 8046 B
0FC3 D047 B
0FC4 1201 A
0FC5 5001 A
0FC6 3381 A
0FC7 D135 A
0FC8 1201 A
0FC9 2134 A
0FCA 4C00 A
0FCB 852F A
0FCC D44B B
0FCD 2DB1 A0
0FCE D52D A
0FCF 3481 A
0FD0 1201 A
0FD1 212C A
0FD2 801F B
0FD3 D020 B
0FD4 1201 A
0FD5 5001 A
0FD6 2381 A
0FD7 D125 A
0FD8 1201 A
0FD9 2124 A
0FDA 4C00 A
0FDB 851F A
0FDC D424 B
0FDD 2DA1 A0

0FDE D51D A
0FDF 3481 A
0FE0 1201 A
0FE1 211C A

0FE2 4FA4 A
0FE3 4C05 A
0FE4 0600 A

0FE5 8112 A
0FE6 2D96 A0

0FE7 4C00 A
0FE8 A03E B
0FE9 0600 A

0FEA 2D90 A0
0FEB E0E0 A
0FEC E067 A
0FED 1816 A
0FEE 1767 A
0FEF 6060 A
0FF0 2157 A

0FF1 FD6E A
0FF2 2101 A

0FF3 0200 A
0FF4 4E00 A
0FF5 A810 B
0FF6 4500 A
0FF7 2106 A

0FF8 03E8 A
0FF9 1388 A
0FFA 3A98 A
0FFB 01FE A
0FFC 0001 A
0FFD 0047 A

0FFE 4C00 A
0FFF 4FA4 A
1000 0600 A
1001 2D0E A0
1002 E0E0 A
1003 E018 A
1004 5345 A
1005 5256 A
1006 4943 A
1007 4520 A
1008 5245 A
1009 5155 A 100A 4952 A
100B 4544 A
100C 6060 A
100D 4C01 A
100E A03E B
100F 0200 A
1010 0C9D T
1011 0000 A
1012 0000 A
1013 0000 A
1014 0000 A
1015 0000 A
1016 0000 A
1017 0000 A
1018 0000 A
1019 0000 A 101A 2DF6 A0
101B 0000 A
101C 8880 A
101D 0008 A
101E 0100 A
101F 0200 A 1020 2DF0 A0
1021 0000 A
1022 9880 A
1023 0008 A
1024 0100 A
1025 0200 A 1026 4C00 A
1027 A015 B
1028 A016 B
1029 A014 B
102A 4C01 A
102B A019 B
102C 2DE4 A0
102D 012C A
102E B964 A
102F 0008 A
1030 0131 A
1031 FDE0 A
1032 211B A
1033 4300 A 1034 3D81 A
```

```
1035 4C00 A
1036 4F0A A
1037 2974 A
1038 4700 A
1039 807F B
103A 1102 A
103B 5301 A
103C 5101 A
103D AC15 B
103E A416 B
103F 4C00 A
1040 A013 B 1041 2DCE A@
1042 E0E0 A
1043 E0E0 A
1044 A067 A
1045 0C20 A
1046 1617 A
1047 6060 A 1048 4F88 A
1049 810F A
104A 0600 A
104B 4C00 A
104C A019 B
104D 0200 A
104E 4CFF A
104F A014 B
1050 4E00 A
1051 A810 B 1052 2DBD A@
1053 E0E0 A
1054 E0E0 A
1055 A067 A
1056 161C A
1057 6060 A
1058 21EF A
1059 2000 A 105A 2DB8 A@
105B 4C00 A
105C A083 B
105D 4FA0 A
105E 0600 A 105F 2DB4 A@
1060 E753 A
1061 4552 A
1062 5649 A
1063 4345 A
1064 2016 A
1065 C742 A
1066 4F92 A
1067 2520 A
1068 C740 A
1069 4291 A
106A 0E45 A
106B 0C40 A
106C 4C00 A
106D A071 B
106E 4FA4 A
106F 4C01 A
1070 0600 A
1071 A019 B
1072 8117 A
1073 A094 B
1074 4F88 A
1075 0400 A
1076 1203 A
1077 8114 A
1078 0600 A
1079 2109 A
107A 4FA8 A
107B 0400 A
107C 5CFB A
107D 13F6 A
107E 4FA4 A
107F 4C00 A
1080 0600 A
```

```
1081 A019 B
1082 2592 A@
1083 2D92 A@
1084 8106 A
1085 A094 B
1086 2D90 A@
1087 2D90 A@
1088 97CD A
1089 21E8 A 108A 5780 A
108B 7780 A
108C 8000 A
108D 0000 A
108E 0000 A
108F 0000 A
1090 0000 A 0002
       000B
       0002
       0003
       0000
       0001
       0002
       0003

1091 A85E B
1092 AC5F B
1093 7554 A
1094 3180 A
1095 7552 A
1096 2101 A
1097 2103 A 1098 4DFF A
1099 4CFF A
109A 210D A
109B 4E00 A
109C 4F10 A
109D 5000 A 109E 0A00 A
109F 5E01 A
10A0 1301 A
10A1 3600 A
10A2 5AFF A
10A3 5CFF A
10A4 4BFF A
10A5 21FA A
10A6 3181 A
10A7 3881 A
10A8 8C5F B
10A9 885E B
10AA 0A80 A
10AB 0200 A

10AC A85E B

10AD 3380 A

10AE 1207 A
10AF 5CFF A
10B0 3380 A
10B1 5DFF A
10B2 1301 A
10B3 C534 A
10B4 5CFF A
10B5 2101 A
10B6 3380 A
10B7 1502 A
10B8 F5D4 A
10B9 0200 A

10BA A060 B
10BB EC60 B
```

```
10BC 2101 A
10BD 2103 A

10BE 4DFF A
10BF 4CFF A
10C0 211F A
10C1 1201 A
10C2 21FD A
10C3 3281 A
10C4 5001 A
10C5 3C00 A
10C6 1B1D A
10C7 4CF0 A
10C8 A05D B
10C9 0A00 A
10CA 4C00 A
10CB 5C01 A
10CC 5A01 A
10CD 5A01 A
10CE 3881 A
10CF 5001 A
10D0 3C00 A
10D1 1B03 A
10D2 4C00 A
10D3 5C01 A
10D4 2104 A
10D5 5001 A
10D6 3281 A
10D7 4CFF A
10D8 5C01 A
10D9 5901 A
10DA 785D B
10DB 21F1 A
10DC 3481 A
10DD 1201 A
10DE 2105 A
10DF 3881 A
10E0 0A80 A
10E1 885E B
10E2 8C5F B
10E3 0200 A
10E4 8C02 A
10E5 3F00 A
10E6 21F9 A
10E7 7000 A
10E8 8000 A 005E
005F
005E
005F
005D
0060

10FE
10E9

10E9 0000 A
10EA 0000 A
10EB 0000 A
10EC 0000 A
10ED 0000 A
10EE 0000 A
10EF 0000 A
10F0 0000 A
10F1 0000 A
10F2 0000 A
10F3 0000 A
10F4 0000 A
10F5 0000 A
10F6 0000 A
10F7 0000 A
10F8 0000 A
10F9 0000 A
10FA 0000 A
10FB 0000 A
```

```
10FC 0000 A
10FD 0000 A

10FE
10FE 2500 A
10FF 0100 T
017F 0D36 T
0180 0E23 T
0181 0011 A
0182 010B T
0183 0E10 A
0184 0168 A
0185 0C9D T
0282 0F77 T
0283 0F06 T
0284 0DCF T
0285 0B28 T
0286 01F4 A
0287 0EE8 T
0288 FFFF A
0289 0004 A
0331 0DE8 T
0332 0C9A T
0333 0DCF T
0334 0862 T
0335 087B T
0336 02BC A
0337 0B28 T
0338 0E11 T
039B 0DCF T
039C 0741 T
039D 08CA T
039E 0902 T
039F 0E11 T
03A0 0DE8 T
03A1 0C9A T
03E7 0DD3 T
03E8 0F0E T
03E9 0B28 T
03EA FFFF A
03EB 0F06 T
03EC 0741 T
03ED 0001 A
03EE 08FC T
03EF FFFF A
0477 0DE8 T
0478 0C9A T
04EF 10AC T
04F0 0DE8 T
04F1 0C9A T
04F2 002A B
0514 0741 T
0515 1020 T
0516 0B28 T
0517 FFFF A
0518 08FC T
0519 0F06 T
051A 0EAE T
051B 0DF0 T
051C 0DE8 T
051D 0C9A T
05D3 0DE8 T
05D4 0C9A T
05D5 0DF0 T
05D6 0EAE T
05D7 0003 A
05D8 0E72 T
05D9 069E T
05DA 0D8E T
05DB 0C9D T
05DC 0C9F T
06A9 0DD7 T
06AA 0745 T
06AB 0EE8 T
06AC 0E11 T
06AD 0362 T
06AE 087B T
```

| | |
|---|---|
| 06AF | 0F6F T |
| 06B0 | 0EAE T |
| 073C | 010B T |
| 073D | 0B28 T |
| 073E | FFFF A |
| 073F | 0BFC T |
| 0740 | 0F0E T |
| 07C2 | 0B28 T |
| 07C3 | 0C5F T |
| 07C4 | 0BFC T |
| 07C5 | FFFF A |
| 07C6 | 0007 A |
| 07C7 | 0004 A |
| 07C8 | 0001 A |
| 0852 | 0BFC T |
| 0853 | 0C8D T |
| 0854 | 0F0E T |
| 0855 | 0EAE T |
| 0856 | 10AC T |
| 0857 | 270F A |
| 0858 | 1091 T |
| 0859 | 0005 A |
| 085A | 0C5F T |
| 088E | 0EAE T |
| 088F | 0860 T |
| 0890 | 0BFC T |
| 0891 | 0F0E T |
| 0892 | 10AC T |
| 0893 | 1091 T |
| 0894 | 0F4E T |
| 0895 | 0860 T |
| 0896 | 0EAE T |
| 08ED | 1091 T |
| 08EE | 10AC T |
| 08EF | 0BFC T |
| 08F0 | 0F4E T |
| 08F1 | 0860 T |
| 08F2 | 0EAE T |
| 08F3 | 0E10 A |
| 08F4 | 0F6F T |
| 08F5 | 0F06 T |
| 08F6 | 0F77 T |
| 0939 | 002A B |
| 093A | 0DB9 T |
| 093B | 0A1A T |
| 093C | 01A8 A |
| 093D | 0180 A |
| 093E | 0BDB T |
| 0971 | 03FF A |
| 0972 | 01FF A |
| 0973 | 07D0 A |
| 0974 | 03E8 A |
| 0975 | 10AC T |
| 0976 | 002A B |
| 09CD | 1091 T |
| 09CE | 10AC T |
| 09CF | 07D0 A |
| 09D0 | 03E8 A |
| 09D1 | 0BFC T |
| 09D2 | 0B28 T |
| 09D3 | FFFF A |
| 09D4 | 0860 T |
| 09D5 | 0B06 T |
| 09D6 | 101A T |
| 0A1F | 0B0A T |
| 0A20 | 1091 T |
| 0A21 | FFFF A |
| 0A22 | 0860 T |
| 0A23 | 10AC T |
| 0A24 | 0181 A |
| 0A25 | 0033 A |
| 0A26 | 0BFC T |
| 0A34 | 0860 T |
| 0A35 | 1020 T |
| 0A36 | FFFF A |
| 0A37 | 1091 T |
| 0A38 | 10AC T |
| 0A9C | 1091 T |
| 0A9D | FFFF A |
| 0A9E | 0860 T |
| 0A9F | 10AC T |
| 0AA0 | 0C8D T |
| 0B13 | 0077 A |
| 0B14 | 0EAE T |
| 0B15 | 0003 A |
| 0B16 | 0F80 A |
| 0B17 | 0580 A |
| 0B18 | 01FF A |
| 0B19 | 0EE3 T |
| 0B1A | 0380 A |
| 0B1B | 0500 A |
| 0B1C | 0FF0 A |
| 0B1D | 0BDD T |
| 0B1E | 1091 T |
| 0C1F | 0007 A |
| 0B20 | 000B A |
| 0BD5 | 0DF0 T |
| 0BD6 | 0EAE T |
| 0BD7 | 00FF A |
| 0BD8 | 09B0 A |
| 0BD9 | 10AC T |
| 0C96 | 010B T |
| 0DA2 | 0EAE T |
| 0DA3 | 0F0E T |
| 0DA4 | 00FF A |
| 0DA5 | 09B0 A |
| 0DA6 | 0362 T |
| 0DA7 | 037B T |
| 0DA8 | 0F77 T |
| 0DA9 | 0F06 T |
| 0DAA | 0ED3 T |
| 0DAB | 010B T |
| 0E20 | 0020 A |
| 0E21 | 0011 A |
| 0E22 | 105A T |
| 0E23 | 010B T |
| 0E24 | 0C9A T |
| 0EE1 | 0CF0 T |
| 0EE2 | 0EB3 A |
| 0EE3 | 0EAE T |
| 0EC4 | 00FF A |
| 0EE5 | 0190 A |
| 0F7B | 0C9D T |
| 0F7C | 1059 T |
| 0F7D | 0EF3 T |
| 0F7E | 0E0A T |
| 0F7F | 10AC T |
| 0F80 | FFFF A |
| 1011 | 0B28 T |
| 1012 | FFFF A |
| 1013 | 0ED3 T |
| 1014 | 0C9A T |
| 1015 | 010B T |
| 1016 | 0AA6 T |
| 1017 | 0A41 T |
| 1018 | 0741 T |
| 108D | 0000 A |
| PTRS | |

Those skilled in the art will recognize that only a single preferred embodiment has been disclosed, and that the preferred embodiment can be modified without departing from the spirit and scope of the invention. For example, the invention can be used in connection with a diesel type engine in which each firing chamber is fitted with an ignitor which comprises a fuel injector. In such a system, the firing pulse which actuates or fires the ignitor comprises a pressure wave inside a fuel line connected to an injector. A mechanical or electrical switch creates pressure in the fuel line or opens the injectors sequentially in order to inject fuel into the proper firing chamber at the proper time. The pressure wave or firing pulse created as the fuel is injected can be used as a source of timing pulses in the same manner as the ignition signals of a conventional gasoline-powered internal combustion engine which uses spark plugs.

What is claimed is:

1. Improved apparatus for measuring the dwell of an ignition system of an internal combustion engine having a predetermined number of cylinders and fuel ignitors, said ignition system comprising a switch periodically opened and closed in synchronism with the rotation of the engine in order to create time-spaced ignition pulses for firing the ignitors, the switch being closed for a dwell time period and being open for a firing time period in order to create such ignition pulse, said apparatus comprising:
- clock means for producing clock pulses at a predetermined rate;
- first counter means for counting the clock pulses;
- second counter means for counting the clock pulses;
- first gate means for transmitting clock pulses to the first counter means in response to a first one of the ignition pulses and for preventing the transmission of clock pulses to the first counter means in response to a second one of the ignition pulses;
- second gate means for transmitting clock pulses to the second counter means only during the duration of one or more dwell time periods which occur between the first ignition pulse and the second ignition pulse;
- processor means for producing a digital dwell signal having a value proportional to the count of the second counter means divided by the count of the first counter means; and
- display means for displaying a swell number having a value proportional to the value of the dwell signal.

2. Apparatus, as claimed in claim 1, and further comprising means for electrically coupling the first gate means to a single one of the ignitors, whereby the first one and second one of the ignition pulses are successive ignition pulses transmitted to said single one of the ignitors.

3. Apparatus, as claimed in claim 2, wherein the second gate means comprises means for transmitting clock pulses to the second counter means during only a single dwell time period which occurs between the first and second ignition pulses and wherein the apparatus further comprises means for selecting the dwell time period during which the clock pulses are transmitted to the second counter means, whereby the dwell number associated with a preselected ignitor is displayed on the display means.

4. Apparatus, as claimed in claim 2, wherein the second gate means comprises means for transmitting clock pulses to the second counter means during each dwell time period occurring between the first ignition pulse and the second ignition pulse, whereby the dwell number displayed on the display means represents the averge dwell time of the ignition system.

5. Apparatus, as claimed in claim 4, wherein the processor means further comprises means for dividing the count of the second counter means by the predetermined number of chambers.

6. Apparatus, as claimed in claim 1, wherein the processor means comprises a digital computer.

7. Apparatus, as claimed in claim 1, wherein the display means comprises:
- a character generator; and
- a cathode ray tube monitor.

8. Improved apparatus for measuring the timing of a chamber of an internal combustion engine having a predetermined number of chambers and including an ignition system having fuel ignitors, said ignition system comprising a switch periodically opened and closed in synchronism with the rotation of the engine in order to create time-spaced ignition pulses for firing the ignitors, the time duration between successive closures of the switch defining a chamber timing period, said apparatus comprising:
- clock means for producing clock pulses at a predetermined rate;
- first counter means for counting the clock pulses;
- second counter means for counting the clock pulses;
- first gate means for transmitting clock pulses to the first counter means in response to a first one of the ignition pulses and for preventing the transmission of clock pulses to the first counter means in response to a second one of the ignition pulses;
- second gate means for transmitting clock pulses to the second counter means only during one or more selected chamber timing periods which occur between the first ignition pulse and the second ignition pulse;
- means for modifying the one or more selected chamber timing periods during which clock pulses are transmitted to the second counter means;
- processor means for producing a digital chamber timing signal having a value proportional to the count of the second counter means divided by the count of the first counter means; and
- display means for displaying a chamber timing number having a value proportional to the value of the chamber timing signal, whereby the chamber timing number displayed on the display means is associated with one or more preselected chambers and ignitors.

9. Apparatus, as claimed in claim 8, and further comprising means for electrically coupling the first gate means to a single one of the ignitors, whereby the first one and second one of the ignition pulses are successive ignition pulses transmitted to said single one of the ignitors.

10. Apparatus, as claimed in claim 9, wherein the processor means comprises means for individually selecting each of the chamber timing periods within an engine cycle and for summing the individual resulting counts of the second counter means, whereby the chamber timing number displayed on the display means represents the average chamber timing of the ignition system.

11. Apparatus, as claimed in claim 10, wherein the processor means comprises means for dividing the summed individual counts of the second counter means by the predetermined number of chambers.

12. Apparatus, as claimed in claim 8, wherein the processor means comprises a digital computer.

13. Apparatus, as claimed in claim 8, wherein the display means comprises:
- a character generator; and
- a cathode ray tube monitor.

14. Apparatus for analyzing an internal combustion engine comprising:
- means coupled to the engine for generating a digital measurement signal corresponding to a predetermined engine condition;
- display means having a face for displaying at a first location on the face a first character group of alphabetic letters indicative of the unit in which the predetermined engine condition is measured and for displaying at a second location on the face a first number indicative of the value of the engine condition being measured;
- memory means for storing a first character code signal corresponding to the first character group, a first display address signal corresponding to the first location, and a second display address signal corresponding to the second location;
- display controller means for enabling the display means to display the first character group at the first location in response to the first character code signal and the first display address signal and for enabling the display means to display the first number at the second location in response to the second display address signal and a first digital display signal corresponding to the value of said engine condition in the units indicated by the first character group; and processor means for altering the value of the digital measurement signal to produce the first digital display signal, transmitting the first digital display signal and second display address signal to the display controller means and for transmitting the first character code signal and first display address signal to the display controller means, at least said first digital display signal being produced and transmitted to the display controller means in less than 8 seconds from the time the engine condition occurs, whereby the units and value of the engine condition are displayed in digital form on the face of the display means in real time, so that an operator of the apparatus can determine the value of the engine condition as the engine is operating.

15. Apparatus, as claimed in claim 14, wherein the means coupled to the engine for generating comprises:

analog measuring means for generating an analog measuring signal corresponding to the engine condition being measured; and converter means for converting the analog measuring signal to the digital measurement signal.

16. Apparatus, as claimed in claim 14, wherein the memory means comprises a digital read-only memory for storing an application control program.

17. Apparatus, as claimed in claim 14, wherein the processor means comprises:

an arithmetic unit;

a control unit;

means for transmitting data from the memory means to the display controller means; and means for enabling the temporary storage of the first digital display signal before transmitting the first digital display signal to the display controller means.

18. Apparatus, as claimed in claim 14, wherein the display controller means comprises a buffer memory for storing the first character code signal while the first character group is displayed on the face of the display means.

19. Apparatus, as claimed in claim 14, wherein the display means comprises a cathode ray tube.

20. Apparatus, as claimed in claim 19, wherein the cathode ray tube comprises an electron gun for scanning the face with a predetermined number of scan lines at a predetermined rate, and wherein the display controller means comprises:

clock means for generating clock pulses at a predetermined rate;

row counter means for counting clock pulses so that each scan is divided into a predetermined number of rows; and line counter means for counting the scans so that the face of the cathode ray tube means is divided into a predetermined number of lines for displaying characters.

21. Apparatus, as claimed in claim 14, and further comprising panel switch means for selecting the type of engine condition to be displayed, wherein the processor means comprises means for periodically interrogating the panel switch means independent of the selection state of the panel switch means, whereby a change in the type of engine condition selected on the panel switch means results in a substantially instantaneous change of the unit and value displayed on the display means.

22. Apparatus, as claimed in claim 21, wherein the processor means comprises executive means for interrogating the panel switch means before the first digital display signal and second display address signal are transmitted to the display controller means.

23. Apparatus, as claimed in claim 14, wherein the processor means comprises means for transmitting the first character code signal and the first display address signal in parallel form to the display controller means, whereby the display of engine parameters in real time is facilitated.

24. Apparatus, as claimed in claim 23, wherein the first character code signal and the first display address signal are transmitted to the display controller means in a single word.

25. Apparatus, as claimed in claim 14, wherein the memory means comprises means for storing an instruction signal corresponding to an alphabetic instruction to be displayed on the display means, wherein the processor means comprises means for transmitting the instruction signal to the display controller means, and wherein the display controller means comprises means for displaying the alphabetic instruction simultaneously with the first character group and the first number on the display means.

26. Apparatus for analyzing an internal combustion engine comprising:

means coupled to the engine for generating a digital measurement signal corresponding to a predetermined engine condition;

display means having a face for displaying at a first location on the face a first character group of alphabetic letters indicative of the unit in which the predetermined engine condition is measured, for displaying at a second location on the face a first number indicative of the value of the engine condition being measured at a first point in time, and for displaying at a third location on the face a second number indicative of the value of the engine condition being measured at a second point in time;

memory means for storing a first character code signal corresponding to the first character group, a first display address signal corresponding to the first location, a second display address signal corresponding to the second location, and a third display address signal corresponding to the third location;

display controller means for enabling the display means to display the first character group at the first location in response to the first character code signal and the first display address signal, for enabling the display means to display the first number at the second location in response to the second display address signal and a first digital display signal corresponding to the value of said engine condition in the units indicated by the first character group at the first point in time, and for enabling the display means to display the second number at the third location in response to the third display address signal and a second digital display signal corresponding to the value of said engine condition in the units indicated by the first character group at the second point in time;

processor means for transmitting the first character code signal and first display address signal to the display controller means, operative in a first mode at the first point in time for altering the value of the digital measurement signal to produce the first digital display signal and for transmitting the first digital display signal and second display address signal to the display controller means, and operative in a second mode at the second point in time for altering the value of the digital measurement signal to produce the second digital display signal and for transmitting the second digital display signal and third display address signal to the display controller means; and selection means for operating the processor means in the first mode whereby the first number is displayed on the face of the display means so that the value of the engine condition at the first point in time can be observed, and for operating the processor means in the second mode whereby the second number is displayed on the face of the display means so that the value of the engine condition at the second point in time can be observed.

27. Apparatus, as claimed in claim 26, wherein the selection means comprises a transmitter located remotely from the processor means for selectively determining the operating mode of the processor means.

28. Apparatus, as claimed in claim 26, wherein the means coupled to the engine for generating comprises:
analog measuring means for generating an analog measuring signal corresponding to the engine condition being measured; and
converter means for converting the analog measuring signal to the digital measurement signal.

29. Apparatus, as claimed in claim 26, wherein the memory means comprises a digital memory.

30. Apparatus, as claimed in claim 26, wherein the processor means comprises:
an arithmetic unit;
a control unit;
means for transmitting data from the memory means to the display controller means; and
means for enabling the temporary storage of the first digital display signal before transmitting the first digital display signal to the display controller means.

31. Apparatus, as claimed in claim 26, wherein the display controller means comprises a buffer memory for storing the first character code signal while the first character group is displayed on the face of the display means.

32. Apparatus, as claimed in claim 26, wherein the display means comprises a cathode ray tube.

33. Apparatus, as claimed in claim 31, wherein the cathode ray tube comprises an electron gun for scanning the face with a predetermined number of scan lines at a predetermined rate, and wherein the display controller means comprises:
clock means for generating clock pulses at a predetermined rate;
row counter means for counting clock pulses so that each scan is divided into a predetermined number of rows; and
line counter means for counting the scans so that the face of the cathode ray tube is divided into a predetermined number of lines for displaying characters.

34. Apparatus, as claimed in claim 26, wherein the memory means comprises means for storing an instruction signal corresponding to an alphabetic instruction to be displayed on the display means, wherein the processor means comprises means for transmitting the instruction signal to the display controller means, and wherein the display controller means comprises means for displaying the alphabetic instruction simultaneously with the first character group, the first number and the second number on the display means.

35. Apparatus for automatically analyzing an internal combustion engine during a first operating state and a second operating state comprising:
means coupled to the engine for generating first and second digital measurement signals corresponding to first and second engine conditions, respectively, which are useful for analyzing the first operating state and for generating third and fourth digital measurement signals corresponding to third and fourth engine conditions, respectively, which are useful for analyzing the second operating state;
display means having a face for displaying simultaneously during a first time period first and second numbers corresponding to the first and second digital measurement signals, respectively, a first character group of alphabetical letters indicative of the units of the first number and a second character group of alphabetical letters indicative of the units of the second number, and for displaying simultaneously during a second time period, third and fourth numbers corresponding to the third and fourth digital measurement signals, respectively, a third character group of alphabetical letters indicative of the units of the third number and a fourth character group of alphabetical letters indicative of the units of the fourth number;
memory means for storing first character code signals corresponding to the first character group, second character code signals corresponding to the second character group, third character code signals corresponding to the third character group and fourth character code signals corresponding to the fourth character code group;
display controller means for enabling the display means to display the first character code group in response to the first character code signals, to display the second character code group in response to the second character code signals, to display the third character code group in response to the third character code signals, to display the fourth character code group in response to the fourth character code signals, to display the first number in response to a first digital display signal corresponding to the value of the first engine condition in the units indicated by the first character code group, to display the second number in response to a second digital display signal corresponding to the value of the second engine condition in the units indicated by the second character group, to display the third number in response to a third digital display signal corresponding to the value of the third engine condition in the units indicated by the third character group, and to display the fourth number in response to a fourth digital display signal corresponding to the value of the fourth engine condition in the units indicated by the fourth character group;
processor means for operating in a first mode during the first time period to alter the digital measurement signals to produce the first and second digital display signals, respectively, and to transmit the first and second digital display signals and the first and second character code signals to the display controller means so that the first and second numbers and the first and second character groups are displayed, and for operating in a second mode during the second time period to alter the value of the third and fourth digital measurement signals to produce the third and fourth digital display signals, respectively, and to transmit the third and fourth digital display signals and the third and fourth character control signals to the display controller means so that the third and fourth numbers and the third and fourth character groups are displayed; and selection means for enabling the processor means to operate in the first mode so that the first operating state of the engine can be analyzed by observing the first and second numbers on the face of the display means and for enabling the processor means to operate in the second mode so that the second operating state of the engine can be analyzed by observing the third and fourth numbers on the face of the display means.

36. Apparatus, as claimed in claim 35, wherein the means coupled to the engine for generating comprises:

analog measuring means for generating an analog measuring signal corresponding to the engine condition being measured; and converter means for converting the analog measuring signal to the digital measurement signal.

37. Apparatus, as claimed in claim 35, wherein the memory means comprises a digital memory.

38. Apparatus, as claimed in claim 35, wherein the processor means comprises:

an arithmetic unit;

a control unit;

means for transmitting data from the memory means to the display controller means; and means for enabling the temporary storage of the first digital display signal before transmitting the first digital display signal to the display controller means.

39. Apparatus, as claimed in claim 35, wherein the display controller means comprises a buffer memory for storing the first character code signal while the first character group is displayed on the face of the display means.

40. Apparatus, as claimed in claim 35, wherein the display means comprises a cathode ray tube.

41. Apparatus, as claimed in claim 40, wherein the cathode ray tube comprises an electron gun for scanning the face with a predetermined number of scan lines at a predetermined rate, and wherein the display controller means comprises:

clock means for generating clock pulses at a predetermined rate;

row counter means for counting clock pulses so that each scan is divided into a predetermined number of rows; and line counter means for counting the scans so that the face of the cathode ray tube means is divided into a predetermined number of lines for displaying characters.

42. Apparatus, as claimed in claim 35, wherein the memory means comprises means for storing character signals corresponding to a first alphabetic instruction and a second alphabetic instruction to be displayed on the display means, wherein the processor means comprise means for transmitting the character signals to the display controller means, and wherein the display controller means comprises means for displaying the first alphabetic instruction during the first time period and for displaying the second alphabetic instruction during the second time period.

43. Apparatus, as claimed in claim 35, wherein the processor means enables the storage of the first digital measurement signal in the memory means during the first time period, and uses the first and third digital measurement signals during the second time period in order to calculate a fifth digital display signal for display on the display means.

44. Apparatus, as claimed in claim 35, wherein the selection means comprises a transmitter located remotely from the processor means.

45. Apparatus for displaying a first engine condition associated with a first chamber of an internal combustion engine and for separately displaying a second engine condition associated with a second chamber of the internal combustion engine, said apparatus comprising:

means coupled to the engine for generating a first digital measurement signal corresponding to the first engine condition and for generating a second digital measurement signal corresponding to the second engine condition;

display means having a face for displaying at a first location on the face a first character group indicative of the unit in which the first and second engine conditions are measured, for displaying at a second location on the face a first number indicative of the value of the first engine condition and for displaying at a third location on the face a second number indicative of the value of the second engine condition;

memory means for storing first character code signals corresponding to the first character group, a first display address signal corresponding to the first location, a second display address signal corresponding to the second location and a third display address signal corresponding to the third location;

display controller means for enabling the display means to display the first character group at the first location in response to the first character code signals and the first display address signal, for enabling the display means to display the first number at the second location in response to the second display address signal and a first digital display signal corresponding to the value of said first engine condition in the units indicated by the first character group, for enabling the first display means to display the second number at the third location in response to the third display address signal and a second digital display signal corresponding to the value of said second engine condition in the units indicated by the first character group; and processor means for transmitting the first character code signals and first display address signal to the display controller means so that the first character group is displayed, for altering the value of the first and second digital measurement signals to produce the first and second digital display signals and transmitting the first and second digital display signals together with the second and third display address signals to the display controller means, whereby the first number and second number are simultaneously displayed on the face of the display means so that the value of the first and second engine conditions can be observed.

46. Apparatus, as claimed in claim 45, wherein the means coupled to the engine for generating comprises:
   analog measuring means for generating an analog measuring signal corresponding to the engine condition being measured; and
   converter means for converting the analog measuring signal to the digital measurement signal.

47. Apparatus, as claimed in claim 45, wherein the memory means comprises a digital read-only memory for storing an application control program.

48. Apparatus, as claimed in claim 45, wherein the processor means comprises:
   an arithmetic unit;
   a control unit;
   means for transmitting data from the memory means to the display controller means; and
   means for enabling the temporary storage of the first digital display signal before transmitting the first digital display signal to the display controller means.

49. Apparatus, as claimed in claim 45, wherein the display controller means comprises a buffer memory for storing the first character code signals while the first character group is displayed on the face of the display means.

50. Apparatus, as claimed in claim 45, wherein the display means comprises a cathode ray tube.

51. Apparatus, as claimed in claim 50, wherein the cathode ray tube comprises an electron gun for scanning the face with a predetermined number of scan lines at a predetermined rate, and wherein the display controller means comprises:
   clock means for generating clock pulses at a predetermined rate;
   row counter means for counting clock pulses so that each scan is divided into a predetermined number of rows; and
   line counter means for counting the scans so that the face of the cathode ray tube means is divided into a predetermined number of lines for displaying characters.

52. Apparatus, as claimed in claim 45, wherein the internal combustion engine comprises a first ignitor located adjacent the first chamber, a second ignitor located adjacent the second chamber, a switch periodically opened and closed in synchronism with the engine to create a first firing signal for activating the first ignitor and for creating a second firing signal for activating the second ignitor and wherein the means coupled to the engine further comprises:
   chamber selection means for producing a first chamber selection pulse during the creation of the first firing signal and for producing a second chamber selection pulse during the creation of the second firing signal; and
   means for producing the first digital measurement signal in response to the first chamber selection pulse and for producing the second digital measurement signal in response to the second chamber selection pulse.

53. Apparatus, as claimed in claim 52, wherein the chamber selection means comprises:
   register means for receiving from the processor means a first selection code corresponding to the first chamber or a second selection code corresponding to the second chamber;
   first counter means for counting the signals produced by the opening and closing of the switch and for producing a first counting state during the creation of the first firing signal and for producing a second counting state during the creation of the second firing signal; and
   comparator means for generating the first chamber selection pulse when the first selection code corresponds to a first counting state and for generating the second chamber selection pulse when the second chamber selection code corresponds to the second counting state.

54. Apparatus, as claimed in claim 45, and further comprising panel switch means for selecting the type of engine condition to be displayed, wherein the processor means comprises means for periodically interrogating the panel switch means independent of the selection state of the panel switch means, whereby a change in the type of engine condition selected on the panel switch means results in a substantially instantaneous change of the unit and values displayed on the display means.

55. Apparatus, as claimed in claim 54, wherein the processor means comprises executive means for interrogating the panel switch means before the first and second digital display signals and the first, second and third display address signals are transmitted to the display controller means.

56. Apparatus, as claimed in claim 45, wherein the processor means comprises means for transmitting the first character code signal and the first display address signal in parallel form to the display controller means, whereby the display of engine parameters in real time is facilitated.

57. Apparatus, as claimed in claim 56, wherein the first character code signal and the first display address signal are transmitted to the display controller means in a single word.

58. Apparatus, as claimed in claim 45, wherein the first character group comprises alphabetic letters.

59. Apparatus for determining and displaying the value of a predetermined parameter of an internal combustion engine having a plurality of chambers fitted with ignitors operated by a series of time-spaced firing signals, said apparatus comprising:
   means coupled to the engine for generating a digital measurement signal proportional to the value of the predetermined parameter;
   display means having a face for displaying at a first location a scale of numbers indicative of the predetermined parameter and for displaying a variable graphic image adjacent the scale;
   memory means for storing first character code signals corresponding to the scale of numbers and first number display address signals corresponding to the first location;
   display controller means for enabling the display means to display the scale of numbers at the first location in response to the first character code signals and the first number display address signals, and for producing a graphic image at a position adjacent the scale of numbers determined by the value of a digital display signal, so that the predetermined parameter is visually represented; and
   processor means for transmitting the first character code signals and first number display address signals to the display controller means so that the scale of numbers is displayed and for converting the digital measurement signal into a digital display signal and transmitting the digital signal to the display controller means so that the graphic image is displayed on the display means.

60. Apparatus, as claimed in claim 59, wherein the means coupled to the engine comprises:
clock means for producing clock pulses at a predetermined rate;
counter means for counting the clock pulses; and
gate means for transmitting the clock pulses to the counter means in response to a first one of the firing signals and for preventing clock pulses from being transmitted to the counter means in response to a second one of the firing pulses in order to form the digital measurement signal in the counter means.

61. Apparatus, as claimed in claim 60, wherein the processor means comprises means for computing the digital display signal from the digital measurement signal by inverting the digital measurement signal.

62. Apparatus, as claimed in claim 60, wherein the gate means is responsive only to the firing pulse transmitted to a single one of the ignitors.

63. Apparatus, as claimed in claim 62, wherein the first firing signal occurs at the beginning of one engine cycle and the second firing signal occurs at the beginning of the next subsequent engine cycle.

64. Apparatus, as claimed in claim 59, wherein the processor means comprises means for dividing a constant by the number of pulses counted by the counter means.

65. Apparatus, as claimed in claim 59, wherein the means coupled to the engine comprises means for generating a digital measurement signal proportional to the speed of the engine, whereby the speed of the engine is visually represented.

66. Apparatus, as claimed in claim 59, wherein the display means comprises a cathode ray tube.

67. Apparatus, as claimed in claim 66, wherein the cathode ray tube comprises:
an electron gun for striking the face of the tube with an electron beam in response to the graphic signal; and
scanning means for scanning the beam across the face in a series of parallel lines, each line being scanned during a predetermined time period.

68. Apparatus, as claimed in claim 67, wherein the display controller means comprises:
first latch means for storing a row number signal corresponding to the row on the face at which the graphic image is to be produced;
first counter means for counting the number of rows scanned by the scanning means, and for producing a first start signal in the row indicated by the row number signal;
second counter means for counting the number of lines scanned by the scanning means within the row indicated by the row number and for producing a second start signal in a predetermined line;
means for receiving clock pulses at a predetermined rate;
second latch means for storing the digital display signal;
third counter means for generating a stop signal after the receipt of a predetermined number of clock pulses proportional to the value of the digital display signal;
means for resetting the third counter means at the beginning of each scan line; and
means responsive to the first and second counter means for generating the graphic signal in response to the first and second start signals and terminating the graphic signal in response to the stop signal, whereby the cathode ray tube generates a visible line having a length proportional to the value of the predetermined parameter.

69. Apparatus, as claimed in claim 68, wherein the memory means comprises means for storing the row number signal.

70. Apparatus for measuring and displaying a parameter useful for diagnosing an internal combustion engine comprising:
transducer means for generating a digital calibration signal corresponding to the ambient value of the parameter adjacent the engine during a first time period and for generating a digital measurement signal corresponding to the value of the parameter produced by the engine as well as the ambient value of the parameter during a second time period;
display means including a face for displaying a digital measurement number indicative of the value of the parameter produced only by the engine;
memory means for storing the digital calibration signal;
processor means for combining the digital calibration signal and the digital measurement signal to produce a digital calculated signal having a value which eliminates the effect of the ambient value of the parameter on the digital measurement signal; and
display controller means for enabling the display means to display the digital measurement number in response to the digital calculated signal.

71. Apparatus, as claimed in claim 70, wherein the transducer means comprises:
analog measuring means for generating an analog measuring signal corresponding to the parameter being measured; and
converter means for converting the analog measuring signal to a digital signal.

72. Apparatus, as claimed in claim 70, wherein the parameter is amperes.

73. Apparatus, as claimed in claim 70, wherein the memory means comprises a digital read-only memory for storing an application control program.

74. Apparatus, as claimed in claim 70, wherein the processor means comprises:
an arithmetic unit;
a control unit; and
means for transmitting data among the processor means, memory means, transducer means and display controller means.

75. Apparatus, as claimed in claim 74, wherein the arithmetic unit comprises means for subtracting the digital calibration signal from the digital measurement signal.

76. Apparatus, as claimed in claim 70, wherein the display means comprises a cathode ray tube.

77. Apparatus, as claimed in claim 76, wherein the display controller means comprises a character generator.

78. Apparatus, as claimed in claim 70, and further comprising panel switch means for selecting the engine parameter to be displayed, wherein the processor means comprises means for periodically interrogating the panel switch means independent of the selection state of the panel switch means, whereby a change in the engine parameter selected on the panel switch means results in a substantially instantaneous change of the measurement number displayed on the display means.

79. Apparatus, as claimed in claim 78, wherein the processor means comprises executive means for interrogating the panel switch means before the digital calculated signal is transmitted to the display controller means.

80. Apparatus for measuring and displaying a parameter useful for diagnosing an internal combustion engine comprising:
- transducer means coupled to the engine for generating a digital measurement signal corresponding to the value of the parameter produced by the engine;
- display means including a face for displaying a digital measurement number indicative of the value of the parameter produced by the engine if the digital measurement number is within a predetermined range of values and for displaying a symbol if the digital measurement signal is outside the predetermined range of values;
- memory means for storing range signals indicative of the range of values of the digital measurement number acceptable for display on the display means;
- processor means for comparing the digital measurement signal with the range signals, for producing the error signal if the value of the digital measurement signal is outside the predetermined range of values indicated by the range signals, and for producing a digital display signal corresponding to the value of the digital measurement signal is within the predetermined range of values indicated by the range signals; and
- display controller means for enabling the display means to display the digital measurement number in response to the digital display signal and for enabling the display means to display the symbol in response to the error signal.

81. Apparatus, as claimed in claim 80, wherein the transducer means comprises:
- analog measuring means for generating an analog measuring signal corresponding to the parameter being measured; and
- converter means for converting the analog measuring signal to the digital measurement signal.

82. Apparatus, as claimed in claim 81, wherein the parameter is current.

83. Apparatus, as claimed in claim 81, wherein the parameter is resistance.

84. Apparatus, as claimed in claim 80, wherein the memory means comprises a digital read-only memory for storing an application control program.

85. Apparatus, as claimed in claim 80, wherein the processor means comprises:
- an arithmetic unit;
- a control unit; and
- means for transmitting data among the processor means, memory means, transducer means and display controller means.

86. Apparatus, as claimed in claim 80, wherein the display means comprises a cathode ray tube.

87. Apparatus, as claimed in claim 86, wherein the display controller means comprises a character generator.

88. Apparatus, as claimed in claim 80, and further comprising panel switch means for selecting the engine parameter to be displayed, wherein the processor means comprises means for periodically interrogating the panel switch means independent of the selection state of the panel switch means, whereby a change in the engine parameter selected on the panel switch means results in a substantially instantaneous change of the digital measurement number displayed on the display means.

89. Apparatus, as claimed in claim 88, wherein the processor means comprises executive means for interrogating the panel switch means before the digital display signal is transmitted to the display controller means.

90. Apparatus for automatically determining the relative power produced by at least the first and second chambers of an internal combustion engine, the first and second chambers being fitted with first and second ignitors fired by time-spaced firing signals generated by the engine, said apparatus comprising:
- disabling means for preventing a firing signal from being transmitted to the first ignitor in response to a first disable signal and for preventing a firing signal from being transmitted to the second ignitor in response to a second disable signal;
- speed detection means for generating a digital base speed signal having a value proportional to the base speed of the engine when the first or second ignitors are enabled to receive firing signals, for generating a first digital disabled speed signal proportional to the first disabled speed of the engine when the first ignitor is prevented from receiving firing signals and for generating a second digital disabled speed signal having a value proportional to the second disabled speed of the engine when the second ignitor is prevented from receiving firing signals;
- memory means for storing the digital base speed signal in response to a store signal;
- display means for displaying a first speed change number indicating the difference between the speed of the engine when both first and second ignitors are enabled and when the first ignitor is prevented from receiving firing signals and for displaying a second speed change number indicating the difference between the speed of the engine when both first and second ignitors are enabled and when the second ignitor is prevented from receiving firing signals;
- display controller means for enabling the display means to display the first speed change number in response to a first speed change signal and for enabling the display means to display the second speed change number in response to a second speed change signal; and
- processor means for enabling the production of the first disabled speed signal at a first point in time and for calculating the first speed change number in response to the digital base speed signal and the first disabled speed signal, whereby the first speed change number is displayed, and
- for enabling the production of the second disabled speed signal at a second point in time and for calculating the second speed change number in response to the digital base speed signal and the second disabled speed signal, whereby the second speed change number is displayed.

91. Apparatus, as claimed in claim 90, wherein the processor means comprises means for sampling the digital base speed signal over a first predetermined number of engine revolutions and for averaging the values of the sampled digital base speed signals, whereby the average base speed of the engine over the first predetermined number of engine revolutions is used to calculate the first and second speed change numbers.

92. Apparatus, as claimed in claim 91, wherein the processor means further comprises:
   means for sampling the first digital disabled speed signal over a second predetermined number of engine revolutions and for averaging the values of the sampled first digital disabled speed signals, whereby the average first disabled speed of the engine over the second predetermined number of engine revolutions is used to calculate the first speed change number; and
   means for sampling the second digital disabled speed signal over a third predetermined number of engine revolutions and for averaging the values of the sampled second digital disabled speed signals, whereby the average second disabled speed of the engine over the third predetermined number of engine revolutions is used to calculate the second speed change number.

93. Apparatus, as claimed in claim 92, wherein the speed detection means comprises:
   clock means for producing clock pulses at a predetermined rate;
   a counter means for counting clock pulses; and
   gate means for transmitting clock pulses to the counter means in response to a first one of the firing pulses and for inhibiting clock pulses from being transmitted to the counter means in response to a second one of the firing pulses.

94. Apparatus, as claimed in claim 92, wherein the processor means comprises an arithmetic unit and a control unit.

95. Apparatus, as claimed in claim 90, wherein the memory means comprises a digital, read-write memory.

96. Apparatus, as claimed in claim 90, wherein the display means comprises a cathode ray tube.

97. Apparatus, as claimed in claim 90, wherein the digital base speed signal has a value proportional to the average base speed of the engine when the first and second ignitors are enabled to receive firing signals.

98. Apparatus for measuring and displaying a parameter of an internal combustion engine which is capable of varying over a first and second range of values, said apparatus comprising:
   analog measuring means operable with a first degree of sensitivity for generating a first analog measuring signal having a first value proportional to the parameter and operable with a second degree of sensitivity for generating a second analog measuring signal having a value proportional to the parameter times a scale factor;
   converter means for converting the first analog measuring signal to a first digital measurement signal and for converting the second analog measuring signal to a second digital measurement signal;
   display means having a face for displaying at a first location on the face a first character group indicative of the units in which the parameter is measured and for displaying at a second location on the face a first number indicative of the value of the parameter in the first range and a second number indicative of the value of the parameter in the second range;
   display controller means for enabling the display means to display the first number at the second location in response to a first digital display signal and to display the second number at the second location in response to a second digital display signal;
   memory means for storing a scale factor signal corresponding to the scale factor; and
   processor means for operating the analog measuring means with the first degree of sensitivity when the parameter is within the first range of values so that the first digital measurement signal is produced and for converting the first digital measurement signal into the first conversion signal to form the first digital display signal whereby the first number is displayed, and for operating the analog measuring means with the second degree of sensitivity when the parameter is within the second range of values so that the second digital measurement signal is produced and for combining the second digital measurement signal with the scale factor signal to form the second digital display signal whereby the second number is displayed.

99. Apparatus, as claimed in claim 98, wherein the memory means comprises means for storing a range digital signal having a value between the first range of values and the second range of values, and wherein the processor means comprises means for comparing the range digital signal with the first digital measurement signal to determine whether the parameter lies within the first or second range of values.

100. Apparatus, as claimed in claim 99, wherein:
   the analog measuring means and converter means comprise an amplifier including means for adjusting the gain of the amplifier to a first level in response to a first adjustment signal and capable of adjusting the gain of the amplifier to a second level in response to a second adjustment signal; and
   the processor means comprises means for generating the first adjustment signal when the parameter is within the first range of values and for generating the second adjustment signal when the parameter is within the second range of values.

101. Apparatus, as claimed in claim 100, wherein the memory means further comprises a digital memory.

102. Apparatus, as claimed in claim 101, wherein the display means comprises a cathode ray tube.

103. Apparatus, as claimed in claim 102, wherein the processor means comprises an arithmetic unit for multiplying the value of second digital measurement signal times the value of the scale factor signal to form the second digital display signal.

104. Apparatus for measuring and displaying the maximum value of a parameter of an internal combustion engine which varies in value comprising in combination:
   means for generating during a predetermined time period a series of time-spaced digital measurement signals having values corresponding to the values of the parameter as it varies;
   memory means for storing at any one instant in time the measurement signal having the largest value of all the measurement signals generated during the predetermined time period;
   processor means for repetitively comparing the value of the stored measurement signal with the value of a subsequently-generated measurement signal and for storing the subsequently-generated measurement signal in place of the stored measurement signal in the memory means if the value of the subsequently-generated measurement signal is greater than the value of the stored measurement signal; and display means for displaying a number corresponding to the value of the measurement signal remaining in the memory means at the end of the predetermined time period, whereby the maximum value of the parameter occurring during the predetermined time period is displayed.

105. Apparatus, as claimed in claim 104, wherein the parameter is current.

106. Apparatus, as claimed in claim 104, wherein the processor means comprises a digital computer.

107. Apparatus, as claimed in claim 104, wherein the display means comprises:
a character generator; and
a cathode ray tube monitor.

108. Apparatus, as claimed in claim 104, wherein the engine comprises an ignition system including a high voltage secondary coil for generating secondary ignition signals and wherein the parameter comprises the secondary ignition signal voltage.

109. Apparatus, as claimed in claim 108, wherein the means for generating comprises:
means for generating a threshold signal in response to the rising of the secondary ignition signal voltage above a predetermined threshold level;
means for generating a cross-over signal in response to a decrease in said secondary ignition signal voltage after said voltage has attained the maximum value;
a storage capacitor; and
gate means responsive to the threshold and cross-over signals for enabling the storage capacitor to charge to a storage voltage proportional to the secondary ignition signal voltage, for generating a sample signal indicating that the storage voltage is available for sampling and for thereafter discharging the storage capacitor.

110. Apparatus, as claimed in claim 104, wherein the predetermined time period is no greater than the time required for one revolution of said engine.

111. Apparatus for measuring and displaying the minimum value of a parameter of an internal combustion engine which varies in value comprising in combination:
means for generating during a predetermined time period a series of time-spaced digital measurement signals having values corresponding to the values of the parameter as it varies;
memory means for storing at any one instant in time the measurement signal having the smallest value of all the measurement signals generated during the predetermined time period;
processor means for repetitively comparing the value of the stored measurement signal with the value of one or more subsequently-generated measurement signals and for storing the subsequently-generated measurement signal in place of the stored measurement signal in the memory means if the value of the subsequently-generated measurement signal is less than the value of the stored measurement signal; and
display means for displaying a number corresponding to the value of the measurement signal remaining in the memory means at the end of the predetermined time period, whereby the minimum value of the parameter occurring during the predetermined time period is displayed.

112. Apparatus, as claimed in claim 111, wherein the processor means comprises a digital computer.

113. Apparatus, as claimed in claim 111, wherein the engine comprises an ignition system including a high voltage secondary coil for generating secondary ignition signals and wherein the parameter comprises the secondary ignition signal voltage.

114. Apparatus, as claimed in claim 111, wherein the means for generating comprises:
means for generating a threshold signal in response to the rising of the secondary ignition signal voltage above a predetermined threshold level;
means for generating a cross-over signal in response to a decrease in said secondary ignition signal voltage after said voltage has attained the maximum value;
a storage capacitor; and
gate means responsive to the threshold and cross-over signals for enabling the storage capacitor to charge to a storage voltage proportional to the secondary ignition signal voltage, for generating a sample signal indicating that the storage voltage is available for sampling and for thereafter discharging the storage capacitor.

115. Apparatus, as claimed in claim 111, wherein the predetermined time period is no greater than the time required for one revolution of said engine.

116. Apparatus for determining the timing of an internal combustion engine having a plurality of chambers fitted with ignitors which are operated by a series of time-spaced firing pulses and having a timing mark which passes a timing location when the engine is located at a predetermined number of degrees prior to a top dead center position, said apparatus comprising:
a register for storing the predetermined number of degrees;
manually operable means for entering the predetermined number of degrees into the register;
generator means for generating a timing pulse when the timing mark passes the timing location;
clock means for producing clock pulses at a predetermined rate;
a counter means for counting clock pulses;
gate means for transmitting clock pulses to the counter means between the occurrence of a first and second one of the firing pulses to obtain a first count proportional to the time period between the first and second ignition pulses, and for transmitting clock pulses to the counter means between the occurrence of one of the firing pulses and the timing pulse to obtain a second count proportional to the time period between the last said firing pulse and the timing pulse;
processor means for generating a timing number proportional to the second count divided by the first count plus the predetermined number of degrees; and
display means for displaying a timing display number proportional to the timing number in digital form.

117. Apparatus, as claimed in claim 116, wherein the gate means is responsive only to the firing pulses transmitted to a single one of the ignitors.

118. Apparatus, as claimed in claim 116, wherein the first firing pulse occurs at the beginning of one engine cycle and the second firing pulse occurs at the beginning of the next subsequent engine cycle.

119. Apparatus, as claimed in claim 116, wherein the processor means comprises means for multiplying a constant times the quotient of the second count divided by the first count.

120. Apparatus, as claimed in claim 116, wherein the display means comprises:
   a character generator; and
   a cathode ray tube monitor.

121. Apparatus, as claimed in claim 116, wherein the manually-operable means comprises a keyboard capable of generating digital data.

122. Apparatus, as claimed in claim 116, wherein the processor means comprises means for determining whether the timing number exceeds a predetermined number of degrees, whereby the timing display number is displayed as degrees advance or as degrees retard.

123. Apparatus for measuring and displaying a parameter useful for diagnosing an internal combustion engine comprising:
   transducer means for generating a digital measurement signal corresponding to the value of the parameter produced by the engine;
   display means including a face for displaying a digital measurement number indicative of the value of the parameter;
   memory means for storing first and second linearization constants;
   processor means for multiplying the value of the digital measurement signal times the value of the first linearization constant to produce a first partial result signal, for multiplying a power of the value of the digital measurement signal times the value of the second linearization constant to produce a second partial result signal, and for summing the values of the first and second partial result signals in order to produce a digital calculated signal, whereby the value of the digital measurement signal is linearized; and
   display controller means for enabling the display means to display the digital measurement number in response to the digital calculated signal.

124. Apparatus, as claimed in claim 122, wherein the processor means comprises:
   an arithmetic unit;
   a control unit; and
   means for transmitting data among the processor means, memory means, transducer means and display controller means.

125. Apparatus, as claimed in claim 124, wherein the display means comprises a cathode ray tube.

126. Apparatus, as claimed in claim 124, wherein the transducer means comprises:
   analog measuring means for generating an analog measuring signal corresponding to the parameter being measured; and
   converter means for converting the analog measuring signal to the digital measurement signal.

127. Apparatus, as claimed in claim 124, wherein the parameter is the concentration of an exhaust emission from the engine.

128. Apparatus, as claimed in claim 124, wherein the memory means comprises a digital read-only memory for storing the first and second linearization constants.

* * * * *